US008112816B2

(12) United States Patent
Momma et al.

(10) Patent No.: US 8,112,816 B2
(45) Date of Patent: Feb. 7, 2012

(54) DOCUMENT VERIFICATION APPARATUS AND DOCUMENT VERIFICATION METHOD

(75) Inventors: Atsuhito Momma, Kanagawa (JP); Naoki Hayashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1186 days.

(21) Appl. No.: 11/434,957

(22) Filed: May 17, 2006

(65) Prior Publication Data
US 2006/0265593 A1    Nov. 23, 2006

(30) Foreign Application Priority Data

May 17, 2005    (JP) ................................. 2005-144611
May 11, 2006    (JP) ................................. 2006-132999

(51) Int. Cl.
*G06F 21/00*    (2006.01)
(52) U.S. Cl. ........................... 726/30; 715/234; 713/176
(58) Field of Classification Search .................. 713/176; 726/26–30
See application file for complete search history.

(56) References Cited

U.S. PATENT DOCUMENTS

| 7,281,205 | B2* | 10/2007 | Brook .......................... 715/237 |
| 7,356,616 | B2* | 4/2008 | Kaler et al. .................... 709/246 |
| 7,730,467 | B1* | 6/2010 | Hejlsberg et al. ............. 717/143 |
| 2005/0149729 | A1* | 7/2005 | Zimmer et al. ................ 713/168 |

FOREIGN PATENT DOCUMENTS

| JP | A 2003-84987 | 3/2003 |
| JP | A 2003-85016 | 3/2003 |
| JP | A 2003-150586 | 5/2003 |
| JP | A 2004-30651 | 1/2004 |

* cited by examiner

Primary Examiner — Gilberto Barron, Jr.
Assistant Examiner — Simon Kanaan
(74) Attorney, Agent, or Firm — Oliff & Berridge, PLC

(57) ABSTRACT

A document verification apparatus includes a determining portion that determines whether a change that influences a verification result is made to at least one of an electronic document and a given condition, after it is verified whether or not the electronic document that has been input satisfies the given condition, and also includes an outputting portion that outputs the verification result after it is verified whether or not the electronic document satisfies the given condition, if it is determined that the change is made to at least one of the electronic document and the given condition, or outputs a result of a time when it is verified whether or not the electronic document satisfies the given condition most recently, if it is determined that the change is not made.

68 Claims, 107 Drawing Sheets

FIG.3

```
1  <?xml version="1.0" encoding="Shift_JIS"?>
2  <itineraryRequest xmlns:xsi="http://www.w3.org/2001/XMLSchema-instance"
   xsi:noNamespaceSchemaLocation="itineraryRequest.xsd">
3    <customer>
4      <name>AtsuhitoMomma</name>
5      <id>01234567</id>
6      <language>ja</language>
7    </customer>
8    <passengers>
9      <adult>2</adult>
10     <children>1</children>
11   </passengers>
12   <origin>
13     <nearestStation>
14       <railroadCompany>EAST JAPAN RAILWAY COMPANY</railroadCompany>
15       <route>Tokaido Main Line</route>
16       <station>Tshujido</station>
17     </nearestStation>
18   </origin>
19   <departureDate>2005-02-25T12:00:00+09:00</departureDate>
20   <arrivalDate>2005-03-03T17:00:00+09:00</arrivalDate>
21   <destination>
22     <nation>U.S.A</nation>
23     <region>Hawaii</region>
24     <city>Honolulu</city>
25   </destination>
26   <budget currency="JPY">
27     <lowest>0</lowest>
28     <highest>200000</highest>
29   </budget>
30 </itineraryRequest>
```

FIG.4

```
1   <?xml version="1.0" encoding="Shift_JIS"?>
2   <xs:schema xmlns:xs="http://www.w3.org/2001/XMLSchema">
3    <xs:element name="itineraryRequest" type="itineraryRequestType"/>
4    <xs:complexType name="itineraryRequestType">
5     <xs:sequence>
6      <xs:element ref="customer"/>
7      <xs:element ref="passengers"/>
8      <xs:element ref="origin"/>
9      <xs:element ref="departureDate"/>
10     <xs:element ref="arrivalDate"/>
11     <xs:element ref="destination"/>
12     <xs:element ref="budget"/>
13    </xs:sequence>
14   </xs:complexType>
15   <xs:element name="customer" type="customerType"/>
16   <xs:complexType name="customerType">
17    <xs:sequence>
18     <xs:element ref="name"/>
19     <xs:element ref="id"/>
20     <xs:element ref="language"/>
21    </xs:sequence>
22   </xs:complexType>
23   <xs:element name="name" type="xs:string"/>
24   <xs:element name="id" type="xs:integer"/>
25   <xs:element name="language" type="xs:language"/>
26   <xs:element name="passengers" type="passengersType"/>
27   <xs:complexType name="passengersType">
28    <xs:sequence>
29     <xs:element ref="adult"/>
30     <xs:element ref="children"/>
31    </xs:sequence>
32   </xs:complexType>
33   <xs:element name="adult" type="xs:integer"/>
34   <xs:element name="children" type="xs:integer"/>
35   <xs:element name="origin" type="originType"/>
36   <xs:complexType name="originType">
37    <xs:sequence>
38     <xs:element ref="nearestStation"/>
39    </xs:sequence>
40   </xs:complexType>
41   <xs:element name="nearestStation" type="nearestStationType"/>
42   <xs:complexType name="nearestStationType">
43    <xs:sequence>
44     <xs:element ref="railroadCompany"/>
45     <xs:element ref="route"/>
46     <xs:element ref="station"/>
47    </xs:sequence>
48   </xs:complexType>
49   <xs:element name="railroadCompany" type="xs:string"/>
50   <xs:element name="route" type="xs:string"/>
51   <xs:element name="station" type="xs:string"/>
52   <xs:element name="departureDate" type="xs:dateTime"/>
53   <xs:element name="arrivalDate" type="xs:dateTime"/>
54   <xs:element name="destination" type="destinationType"/>
55   <xs:complexType name="destinationType">
56    <xs:sequence>
57     <xs:element ref="nation"/>
58     <xs:element ref="region"/>
59     <xs:element ref="city"/>
60    </xs:sequence>
61   </xs:complexType>
62   <xs:element name="nation" type="xs:string"/>
63   <xs:element name="region" type="xs:string"/>
64   <xs:element name="city" type="xs:string"/>
65   <xs:element name="budget" type="budgetType"/>
66   <xs:complexType name="budgetType">
67    <xs:sequence>
68     <xs:element ref="lowest"/>
69     <xs:element ref="highest"/>
70    </xs:sequence>
71    <xs:attribute name="currency" type="xs:string" use="required"/>
72   </xs:complexType>
73   <xs:element name="lowest" type="xs:integer"/>
74   <xs:element name="highest" type="xs:integer"/>
75  </xs:schema>
```

FIG.5

```
 1  <?xml version="1.0" encoding="Shift_JIS"?>
 2  <itineraryInProcess xmlns:xsi="http://www.w3.org/2001/XMLSchema-instance"
    xsi:noNamespaceSchemaLocation="itineraryInProcess.xsd" xml:lang="ja">
 3    <passengers>
 4      <adult>2</adult>
 5      <children>1</children>
 6    </passengers>
 7    <eventList>
 8      <travel status="requested">
 9        <source type="station">
10          <place xml:lang="ja">JR Tokaido Main Line Tsujido Station</place>
11          <earliestDepartureTime>2005-02-25T12:00:00+09:00</earliestDepartureTime>
12        </source>
13        <destination type="station">
14          <place xml:lang="ja">JR Narita Line Narita-Airport station</place>
15        </destination>
16      </travel>
17      <travel status="inactive">
18        <source type="airport">
19          <place xml:lang="en">NRT</place>
20        </source>
21        <destination type="airport">
22          <place xml:lang="en">HNL</place>
23        </destination>
24      </travel>
25      <travel status="inactive">
26        <source type="rent-a-car">
27          <place/>
28        </source>
29        <destination type="accommodation">
30          <place/>
31        </destination>
32      </travel>
33      <stay status="inactive">
34        <place/>
35        <arrivalDate>2005-02-25-10:00</arrivalDate>
36        <departureDate>2005-03-02-10:00</departureDate>
37      </stay>
38      <travel status="inactive">
39        <source type="accomodation">
40          <place/>
41        </source>
42        <destination type="rent-a-car">
43          <place/>
44        </destination>
45      </travel>
46      <travel status="inactive">
47        <source type="airport">
48          <place xml:lang="en">HNL</place>
49        </source>
50        <destination type="airport">
51          <place xml:lang="en">NRT</place>
52        </destination>
53      </travel>
54      <travel status="requested">
55        <source type="station">
56          <place xml:lang="ja">JR Narita Line Narita-Airport station</place>
57        </source>
58        <destination type="station">
59          <place xml:lang="ja">JR Tokaido Main Line Tsujido station</place>
60          <latestArrivalTime>2005-03-03T17:00:00+09:00</latestArrivalTime>
61        </destination>
62      </travel>
63    </eventList>
64  </itineraryInProcess>
```

FIG.6

```
1  <?xml version="1.0" encoding="Shift_JIS"?>
2  <xs:schema xmlns:xs="http://www.w3.org/2001/XMLSchema">
3    <xs:annotation>
4      <xs:documentation>This schema is for the itineraryInProcess document.  It is compliant with W3C XML Schema specification.</xs:documentation>
5    </xs:annotation>
6    <xs:import namespace="http://www.w3.org/XML/1998/namespace" schemaLocation="xml.xsd"/>
7    <xs:element name="itineraryInProcess" type="itineraryInProcessType"/>
8    <xs:complexType name="itineraryInProcessType">
9      <xs:sequence>
10       <xs:element ref="passengers"/>
11       <xs:element ref="eventList"/>
12     </xs:sequence>
13     <xs:attribute ref="xml:lang" use="required"/>
14   </xs:complexType>
15   <xs:element name="passengers" type="passengersType"/>
16   <xs:complexType name="passengersType">
17     <xs:sequence>
18       <xs:element ref="adult"/>
19       <xs:element ref="children"/>
20     </xs:sequence>
21   </xs:complexType>
22   <xs:element name="adult" type="xs:integer"/>
23   <xs:element name="children" type="xs:integer"/>
24   <xs:element name="eventList" type="eventListType"/>
25   <xs:complexType name="eventListType">
26     <xs:choice minOccurs="0" maxOccurs="unbounded">
27       <xs:element ref="travel"/>
28       <xs:element ref="stay"/>
29     </xs:choice>
30   </xs:complexType>
31   <xs:element name="travel" type="travelType"/>
32   <xs:complexType name="travelType">
33     <xs:sequence>
34       <xs:element ref="source"/>
35       <xs:element ref="destination"/>
36       <xs:element ref="method" minOccurs="0" maxOccurs="1"/>
37     </xs:sequence>
38     <xs:attribute name="status" type="xs:string" use="required"/>
39   </xs:complexType>
40   <xs:element name="source" type="sourceType"/>
41   <xs:complexType name="sourceType">
42     <xs:sequence>
43       <xs:element ref="place"/>
44       <xs:element ref="earliestDepartureTime" minOccurs="0" maxOccurs="1"/>
45     </xs:sequence>
46     <xs:attribute name="type" type="xs:string" use="required"/>
47   </xs:complexType>
48   <xs:element name="destination" type="destinationType"/>
49   <xs:complexType name="destinationType">
50     <xs:sequence>
51       <xs:element ref="place"/>
52       <xs:element ref="latestArrivalTime" minOccurs="0" maxOccurs="1"/>
53     </xs:sequence>
54     <xs:attribute name="type" type="xs:string" use="required"/>
55   </xs:complexType>
56   <xs:element name="place" type="placeType"/>
57   <xs:complexType name="placeType">
58     <xs:simpleContent>
59       <xs:extension base="xs:string">
60         <xs:attribute ref="xml:lang" use="optional"/>
61       </xs:extension>
62     </xs:simpleContent>
63   </xs:complexType>
64   <xs:element name="earliestDepartureTime" type="xs:dateTime"/>
65   <xs:element name="latestArrivalTime" type="xs:dateTime"/>
66   <xs:element name="method" type="methodType"/>
67   <xs:complexType name="methodType">
68     <xs:sequence>
69       <xs:element ref="identifier"/>
70       <xs:element ref="departureTime"/>
71       <xs:element ref="arrivalTime"/>
72     </xs:sequence>
73   </xs:complexType>
74   <xs:element name="identifier" type="identifierType"/>
75   <xs:complexType name="identifierType">
76     <xs:simpleContent>
77       <xs:extension base="xs:string">
78         <xs:attribute ref="xml:lang" use="optional"/>
79       </xs:extension>
80     </xs:simpleContent>
81   </xs:complexType>
82   <xs:element name="departureTime" type="xs:dateTime"/>
83   <xs:element name="arrivalTime" type="xs:dateTime"/>
84   <xs:element name="stay" type="stayType"/>
85   <xs:complexType name="stayType">
86     <xs:sequence>
87       <xs:element ref="place"/>
88       <xs:element ref="arrivalDate"/>
89       <xs:element ref="departureDate"/>
90     </xs:sequence>
91     <xs:attribute name="status" type="xs:string" use="required"/>
92   </xs:complexType>
93   <xs:element name="arrivalDate" type="xs:date"/>
94   <xs:element name="departureDate" type="xs:date"/>
95 </xs:schema>
```

FIG.7

```xml
1  <?xml version="1.0" encoding="Shift_JIS"?>
2  <itineraryInProcess xmlns:xsi="http://www.w3.org/2001/XMLSchema-instance"
   xsi:noNamespaceSchemaLocation="itineraryInProcess.xsd" xml:lang="ja">
3    <passengers>
4      <adult>2</adult>
5      <children>1</children>
6    </passengers>
7    <eventList>
8      <travel status="reserved">
9        <source type="station">
10         <place xml:lang="ja">JR Tokaido Main Line Ofuna station</place>
11         <earliestDepartureTime>2005-02-25T12:00:00+09:00</earliestDepartureTime>
12       </source>
13       <destination type="station">
14         <place xml:lang="ja">JR Narita Line Narita-Airport station</place>
15       </destination>
16       <method>
17         <identifier xml:lang="ja">Narita Express 100 the number 1 car, 1A,1B,2A,2B</identifier>
18         <departureTime>2005-02-25T13:35:00+09:00</departureTime>
19         <arrivalTime>2005-02-25T15:25:00+09:00</arrivalTime>
20       </method>
21     </travel>
22     <travel status="inactive">
23       <source type="airport">
24         <place xml:lang="en">NRT</place>
25       </source>
26       <destination type="airport">
27         <place xml:lang="en">HNL</place>
28       </destination>
29     </travel>
30     <travel status="inactive">
31       <source type="rent-a-car">
32         <place/>
33       </source>
34       <destination type="accommodation">
35         <place/>
36       </destination>
37     </travel>
38     <stay status="inactive">
39       <place/>
40       <arrivalDate>2005-02-25-10:00</arrivalDate>
41       <departureDate>2005-03-02-10:00</departureDate>
42     </stay>
43     <travel status="inactive">
44       <source type="accomodation">
45         <place/>
46       </source>
47       <destination type="rent-a-car">
48         <place/>
49       </destination>
50     </travel>
51     <travel status="inactive">
52       <source type="airport">
53         <place xml:lang="en">HNL</place>
54       </source>
55       <destination type="airport">
56         <place xml:lang="en">NRT</place>
57       </destination>
58     </travel>
59     <travel status="reserved">
60       <source type="station">
61         <place xml:lang="ja">JR Narita Line Narita-Airport station</place>
62       </source>
63       <destination type="station">
64         <place xml:lang="ja">JR Tokaido Main Line Tsujido station</place>
65         <latestArrivalTime>2005-03-03T17:00:00+09:00</latestArrivalTime>
66       </destination>
67       <method>
68         <identifier xml:lang="ja">Narita Express 101 the number 2 car, 1A,1B,2A,2B</identifier>
69         <departureTime>2005-03-03T14:45:00+09:00</departureTime>
70         <arrivalTime>2005-03-03T16:40:00+09:00</arrivalTime>
71       </method>
72     </travel>
73   </eventList>
74 </itineraryInProcess>
```

FIG.8

```xml
1  <?xml version="1.0" encoding="Shift_JIS"?>
2  <itineraryInProcess xmlns:xsi="http://www.w3.org/2001/XMLSchema-instance"
   xsi:noNamespaceSchemaLocation="itineraryInProcess.xsd" xml:lang="ja">
3    <passengers>
4      <adult>2</adult>
5      <children>1</children>
6    </passengers>
7    <eventList>
8      <travel status="reserved">
9        <source type="station">
10         <place xml:lang="ja">JR Tokaido Main Line Ofuna station</place>
11         <earliestDepartureTime>2005-02-25T12:00:00+09:00</earliestDepartureTime>
12       </source>
13       <destination type="station">
14         <place xml:lang="ja">JR Narita Line Narita-Airport station</place>
15       </destination>
16       <method>
17         <identifier xml:lang="ja">Narita Express 100 the number 1 car, 1A,1B,2A,2B</identifier>
18         <departureTime>2005-02-25T13:35:00+09:00</departureTime>
19         <arrivalTime>2005-02-25T15:25:00+09:00</arrivalTime>
20       </method>
21     </travel>
22     <travel status="requested">
23       <source type="airport">
24         <place xml:lang="en">NRT</place>
25         <earliestDepartureTime>2005-02-25T15:25:00+09:00</earliestDepartureTime>
26       </source>
27       <destination type="airport">
28         <place xml:lang="en">HNL</place>
29       </destination>
30     </travel>
31     <travel status="inactive">
32       <source type="rent-a-car">
33         <place/>
34       </source>
35       <destination type="accommodation">
36         <place/>
37       </destination>
38     </travel>
39     <stay status="inactive">
40       <place/>
41       <arrivalDate>2005-02-25-10:00</arrivalDate>
42       <departureDate>2005-03-02-10:00</departureDate>
43     </stay>
44     <travel status="inactive">
45       <source type="accomodation">
46         <place/>
47       </source>
48       <destination type="rent-a-car">
49         <place/>
50       </destination>
51     </travel>
52     <travel status="requested">
53       <source type="airport">
54         <place xml:lang="en">HNL</place>
55       </source>
56       <destination type="airport">
57         <place xml:lang="en">NRT</place>
58         <latestArrivalTime>2005-03-03T13:45:00+09:00</latestArrivalTime>
59       </destination>
60     </travel>
61     <travel status="reserved">
62       <source type="station">
63         <place xml:lang="ja">JR Narita Line Narita-Airport station</place>
64       </source>
65       <destination type="station">
66         <place xml:lang="ja">JR Tokaido Main Line Tsujido station</place>
67         <latestArrivalTime>2005-03-03T17:00:00+09:00</latestArrivalTime>
68       </destination>
69       <method>
70         <identifier xml:lang="ja">Narita Express 101 the number 2 car, 1A,1B,2A,2B</identifier>
71         <departureTime>2005-03-03T14:45:00+09:00</departureTime>
72         <arrivalTime>2005-03-03T16:40:00+09:00</arrivalTime>
73       </method>
74     </travel>
75   </eventList>
76 </itineraryInProcess>
```

FIG.9

```xml
1  <?xml version="1.0" encoding="Shift_JIS"?>
2  <itineraryInProcess xmlns:xsi="http://www.w3.org/2001/XMLSchema-instance"
   xsi:noNamespaceSchemaLocation="itineraryInProcess.xsd" xml:lang="ja">
3    <passengers>
4      <adult>2</adult>
5      <children>1</children>
6    </passengers>
7    <eventList>
8      <travel status="reserved">
9        <source type="station">
10         <place xml:lang="ja">JR Tokaido Main Line Ofuna station</place>
11         <earliestDepartureTime>2005-02-25T12:00:00+09:00</earliestDepartureTime>
12       </source>
13       <destination type="station">
14         <place xml:lang="ja">JR Narita Line Narita-Airport station</place>
15       </destination>
16       <method>
17         <identifier xml:lang="ja">Narita Express 100 the number 1 car, 1A,1B,2A,2B</identifier>
18         <departureTime>2005-02-25T13:35:00+09:00</departureTime>
19         <arrivalTime>2005-02-25T15:25:00+09:00</arrivalTime>
20       </method>
21     </travel>
22     <travel status="reserved">
23       <source type="airport">
24         <place xml:lang="en">NRT</place>
25         <earliestDepartureTime>2005-02-25T15:25:00+09:00</earliestDepartureTime>
26       </source>
27       <destination type="airport">
28         <place xml:lang="en">HNL</place>
29       </destination>
30       <method>
31         <identifier xml:lang="ja">Japan Airlines Flight 80</identifier>
32         <departureTime>2005-02-25T18:30:00+09:00</departureTime>
33         <arrivalTime>2005-02-25T06:45:00-10:00</arrivalTime>
34       </method>
35     </travel>
36     <travel status="inactive">
37       <source type="rent-a-car">
38         <place/>
39       </source>
40       <destination type="accommodation">
41         <place/>
42       </destination>
43     </travel>
44     <stay status="inactive">
45       <place/>
46       <arrivalDate>2005-02-25-10:00</arrivalDate>
47       <departureDate>2005-03-02-10:00</departureDate>
48     </stay>
49     <travel status="inactive">
50       <source type="accomodation">
51         <place/>
52       </source>
53       <destination type="rent-a-car">
54         <place/>
55       </destination>
56     </travel>
57     <travel status="requested">
58       <source type="airport">
59         <place xml:lang="en">HNL</place>
60       </source>
61       <destination type="airport">
62         <place xml:lang="en">NRT</place>
63         <latestArrivalTime>2005-03-03T13:45:00+09:00</latestArrivalTime>
64       </destination>
65     </travel>
66     <travel status="reserved">
67       <source type="station">
68         <place xml:lang="ja">JR Narita Line Narita-Airport station</place>
69       </source>
70       <destination type="station">
71         <place xml:lang="ja">JR Tokaido Main Line Tsujido station</place>
72         <latestArrivalTime>2005-03-03T17:00:00+09:00</latestArrivalTime>
73       </destination>
74       <method>
75         <identifier xml:lang="ja">Narita Express 101 the number 2 car, 1A,1B,2A,2B</identifier>
76         <departureTime>2005-03-03T14:45:00+09:00</departureTime>
77         <arrivalTime>2005-03-03T16:40:00+09:00</arrivalTime>
78       </method>
79     </travel>
80   </eventList>
81 </itineraryInProcess>
```

FIG.10

```xml
1  <?xml version="1.0" encoding="Shift_JIS"?>
2  <itineraryInProcess xmlns:xsi="http://www.w3.org/2001/XMLSchema-instance"
   xsi:noNamespaceSchemaLocation="itineraryInProcess.xsd" xml:lang="ja">
3    <passengers>
4      <adult>2</adult>
5      <children>1</children>
6    </passengers>
7    <eventList>
8      <travel status="reserved">
9        <source type="station">
10         <place xml:lang="ja">JR Tokaido Main Line Ofuna station</place>
11         <earliestDepartureTime>2005-02-25T12:00:00+09:00</earliestDepartureTime>
12       </source>
13       <destination type="station">
14         <place xml:lang="ja">JR Narita Line Narita-Airport station</place>
15       </destination>
16       <method>
17         <identifier xml:lang="ja">Narita Express 100 the number 1 car, 1A,1B,2A,2B</identifier>
18         <departureTime>2005-02-25T13:35:00+09:00</departureTime>
19         <arrivalTime>2005-02-25T15:25:00+09:00</arrivalTime>
20       </method>
21     </travel>
22     <travel status="reserved">
23       <source type="airport">
24         <place xml:lang="en">NRT</place>
25         <earliestDepartureTime>2005-02-25T15:25:00+09:00</earliestDepartureTime>
26       </source>
27       <destination type="airport">
28         <place xml:lang="en">HNL</place>
29       </destination>
30       <method>
31         <identifier xml:lang="ja">Japan Airlines Flight 80</identifier>
32         <departureTime>2005-02-25T18:30:00+09:00</departureTime>
33         <arrivalTime>2005-02-25T06:45:00-10:00</arrivalTime>
34       </method>
35     </travel>
36     <travel status="inactive">
37       <source type="rent-a-car">
38         <place/>
39       </source>
40       <destination type="accommodation">
41         <place/>
42       </destination>
43     </travel>
44     <stay status="inactive">
45       <place/>
46       <arrivalDate>2005-02-25-10:00</arrivalDate>
47       <departureDate>2005-03-02-10:00</departureDate>
48     </stay>
49     <travel status="inactive">
50       <source type="accommodation">
51         <place/>
52       </source>
53       <destination type="rent-a-car">
54         <place/>
55       </destination>
56     </travel>
57     <travel status="reserved">
58       <source type="airport">
59         <place xml:lang="en">HNL</place>
60       </source>
61       <destination type="airport">
62         <place xml:lang="en">NRT</place>
63         <latestArrivalTime>2005-03-03T13:45:00+09:00</latestArrivalTime>
64       </destination>
65       <method>
66         <identifier xml:lang="ja">All Nippon Airways Flight 7025</identifier>
67         <departureTime>2005-03-02T09:25:00-10:00</departureTime>
68         <arrivalTime>2005-03-03T13:35:00+09:00</arrivalTime>
69       </method>
70     </travel>
71     <travel status="reserved">
72       <source type="station">
73         <place xml:lang="ja">JR Narita Line Narita-Airport station</place>
74       </source>
75       <destination type="station">
76         <place xml:lang="ja">JR Tokaido Main Line Tsujido station</place>
77         <latestArrivalTime>2005-03-03T17:00:00+09:00</latestArrivalTime>
78       </destination>
79       <method>
80         <identifier xml:lang="ja">Narita Express 101 the number 2 car, 1A,1B,2A,2B</identifier>
81         <departureTime>2005-03-03T14:45:00+09:00</departureTime>
82         <arrivalTime>2005-03-03T16:40:00+09:00</arrivalTime>
83       </method>
84     </travel>
85   </eventList>
86 </itineraryInProcess>
```

FIG.11

```
1  <?xml version="1.0" encoding="Shift_JIS"?>
2  <itineraryInProcess xmlns:xsi="http://www.w3.org/2001/XMLSchema-instance"
   xsi:noNamespaceSchemaLocation="itineraryInProcess.xsd" xml:lang="ja">
3    <passengers>
4      <adult>2</adult>
5      <children>1</children>
6    </passengers>
7    <eventList>
8      <travel status="reserved">
9        <source type="station">
10         <place xml:lang="ja">JR Tokaido Main Line Ofuna station</place>
11         <earliestDepartureTime>2005-02-25T12:00:00+09:00</earliestDepartureTime>
12       </source>
13       <destination type="station">
14         <place xml:lang="ja">JR Narita Line Narita-Airport station</place>
15       </destination>
16       <method>
17         <identifier xml:lang="ja">Narita Express 100 the number 1 car, 1A,1B,2A,2B</identifier>
18         <departureTime>2005-02-25T13:35:00+09:00</departureTime>
19         <arrivalTime>2005-02-25T15:25:00+09:00</arrivalTime>
20       </method>
21     </travel>
22     <travel status="reserved">
23       <source type="airport">
24         <place xml:lang="en">NRT</place>
25         <earliestDepartureTime>2005-02-25T15:25:00+09:00</earliestDepartureTime>
26       </source>
27       <destination type="airport">
28         <place xml:lang="en">HNL</place>
29       </destination>
30       <method>
31         <identifier xml:lang="ja">Japan Airlines Flight 80</identifier>
32         <departureTime>2005-02-25T18:30:00+09:00</departureTime>
33         <arrivalTime>2005-02-25T06:45:00-10:00</arrivalTime>
34       </method>
35     </travel>
36     <travel status="requested">
37       <source type="rent-a-car">
38         <place/>
39         <earliestDepartureTime>2005-02-25T06:45:00-10:00</earliestDepartureTime>
40       </source>
41       <destination type="accommodation">
42         <place/>
43       </destination>
44     </travel>
45     <stay status="inactive">
46       <place/>
47       <arrivalDate>2005-02-25-10:00</arrivalDate>
48       <departureDate>2005-03-02-10:00</departureDate>
49     </stay>
50     <travel status="requested">
51       <source type="accommodation">
52         <place/>
53       </source>
54       <destination type="rent-a-car">
55         <place/>
56         <latestArrivalTime>2005-03-02T07:25:00-10:00</latestArrivalTime>
57       </destination>
58     </travel>
59     <travel status="reserved">
60       <source type="airport">
61         <place xml:lang="en">HNL</place>
62       </source>
63       <destination type="airport">
64         <place xml:lang="en">NRT</place>
65         <latestArrivalTime>2005-03-03T13:45:00+09:00</latestArrivalTime>
66       </destination>
67       <method>
68         <identifier xml:lang="ja">All Nippon Airways Flight 7025</identifier>
69         <departureTime>2005-03-02T09:25:00-10:00</departureTime>
70         <arrivalTime>2005-03-03T13:35:00+09:00</arrivalTime>
71       </method>
72     </travel>
73     <travel status="reserved">
74       <source type="station">
75         <place xml:lang="ja">JR Narita Line Narita-Airport station</place>
76       </source>
77       <destination type="station">
78         <place xml:lang="ja">JR Tokaido Main Line Tsujido station</place>
79         <latestArrivalTime>2005-03-03T17:00:00+09:00</latestArrivalTime>
80       </destination>
81       <method>
82         <identifier xml:lang="ja">Narita Express 101 the number 2 car, 1A,1B,2A,2B</identifier>
83         <departureTime>2005-03-03T14:45:00+09:00</departureTime>
84         <arrivalTime>2005-03-03T16:40:00+09:00</arrivalTime>
85       </method>
86     </travel>
87   </eventList>
88 </itineraryInProcess>
```

FIG.12

```xml
1  <?xml version="1.1" encoding="Shift_JIS"?>
2  <itineraryInProcess xmlns:xsi="http://www.w3.org/2001/XMLSchema-instance"
   xsi:noNamespaceSchemaLocation="itineraryInProcess.xsd" xml:lang="ja">
3    <passengers>
4      <adult>2</adult>
5      <children>1</children>
6    </passengers>
7    <eventList>
8      <travel status="reserved">
9        <source type="station">
10         <place xml:lang="ja">JR Tokaido Main Line Ofuna station</place>
11         <earliestDepartureTime>2005-02-25T12:00:00+09:00</earliestDepartureTime>
12       </source>
13       <destination type="station">
14         <place xml:lang="ja">JR Narita Line Narita-Airport station</place>
15       </destination>
16       <method>
17         <identifier xml:lang="ja">Narita Express 100 the number 1 car, 1A,1B,2A,2B</identifier>
18         <departureTime>2005-02-25T13:35:00+09:00</departureTime>
19         <arrivalTime>2005-02-25T15:25:00+09:00</arrivalTime>
20       </method>
21     </travel>
22     <travel status="reserved">
23       <source type="airport">
24         <place xml:lang="en">NRT</place>
25         <earliestDepartureTime>2005-02-25T15:25:00+09:00</earliestDepartureTime>
26       </source>
27       <destination type="airport">
28         <place xml:lang="en">HNL</place>
29       </destination>
30       <method>
31         <identifier xml:lang="ja">Japan Airlines Flight 80</identifier>
32         <departureTime>2005-02-25T18:30:00+09:00</departureTime>
33         <arrivalTime>2005-02-25T06:45:00-10:00</arrivalTime>
34       </method>
35     </travel>
36     <travel status="reserved">
37       <source type="rent-a-car">
38         <place xml:lang="en">Hertz Honolulu Airport Branch</place>
39         <earliestDepartureTime>2005-02-25T06:45:00-10:00</earliestDepartureTime>
40       </source>
41       <destination type="accommodation">
42         <place/>
43       </destination>
44       <method>
45         <identifier xml:lang="en">Hertz Honolulu Airport Branch</identifier>
46         <departureTime>2005-02-25T05:45:00-10:00</departureTime>
47         <arrivalTime>2005-02-25T07:45:00-10:00</arrivalTime>
48       </method>
49     </travel>
50     <stay status="inactive">
51       <place/>
52       <arrivalDate>2005-02-25-10:00</arrivalDate>
53       <departureDate>2005-03-02-10:00</departureDate>
54     </stay>
55     <travel status="reserved">
56       <source type="accomodation">
57         <place/>
58       </source>
59       <destination type="rent-a-car">
60         <place xml:lang="en">HNL</place>
61         <latestArrivalTime>2005-03-02T07:25:00-10:00</latestArrivalTime>
62       </destination>
63       <method>
64         <identifier xml:lang="en">Hertz Honolulu Airport Branch</identifier>
65         <departureTime>2005-02-25T05:25:00-10:00</departureTime>
66         <arrivalTime>2005-02-25T07:25:00-10:00</arrivalTime>
67       </method>
68     </travel>
69     <travel status="reserved">
70       <source type="airport">
71         <place xml:lang="en">HNL</place>
72       </source>
73       <destination type="airport">
74         <place xml:lang="en">NRT</place>
75         <latestArrivalTime>2005-03-03T13:45:00+09:00</latestArrivalTime>
76       </destination>
77       <method>
78         <identifier xml:lang="ja">All Nippon Airways Flight 7025</identifier>
79         <departureTime>2005-03-02T09:25:00-10:00</departureTime>
80         <arrivalTime>2005-03-03T13:35:00+09:00</arrivalTime>
81       </method>
82     </travel>
83     <travel status="reserved">
84       <source type="station">
85         <place xml:lang="ja">JR Narita Line Narita-Airport station</place>
86       </source>
87       <destination type="station">
88         <place xml:lang="ja">JR Tokaido Main Line Tsujido station</place>
89         <latestArrivalTime>2005-03-03T17:00:00+09:00</latestArrivalTime>
90       </destination>
91       <method>
92         <identifier xml:lang="ja">Narita Express 101 the number 2 car, 1A,1B,2A,2B</identifier>
93         <departureTime>2005-03-03T14:45:00+09:00</departureTime>
94         <arrivalTime>2005-03-03T16:40:00+09:00</arrivalTime>
95       </method>
96     </travel>
97   </eventList>
98 </itineraryInProcess>
```

FIG.13

```
 1  <?xml version="1.0" encoding="Shift_JIS"?>
 2  <itineraryInProcess xmlns:xsi="http://www.w3.org/2001/XMLSchema-instance"
    xsi:noNamespaceSchemaLocation="itineraryInProcess.xsd" xml:lang="ja">
 3    <passengers>
 4      <adult>2</adult>
 5      <children>1</children>
 6    </passengers>
 7    <eventList>
 8      <travel status="reserved">
 9        <source type="station">
10          <place xml:lang="ja">JR Tokaido Main Line Ofuna station</place>
11          <earliestDepartureTime>2005-02-25T12:00:00+09:00</earliestDepartureTime>
12        </source>
13        <destination type="station">
14          <place xml:lang="ja">JR Narita Line Narita-Airport station</place>
15        </destination>
16        <method>
17          <identifier xml:lang="ja">Narita Express 100 the number 1 car, 1A,1B,2A,2B</identifier>
18          <departureTime>2005-02-25T13:35:00+09:00</departureTime>
19          <arrivalTime>2005-02-25T15:25:00+09:00</arrivalTime>
20        </method>
21      </travel>
22      <travel status="reserved">
23        <source type="airport">
24          <place xml:lang="en">NRT</place>
25          <earliestDepartureTime>2005-02-25T15:25:00+09:00</earliestDepartureTime>
26        </source>
27        <destination type="airport">
28          <place xml:lang="en">HNL</place>
29        </destination>
30        <method>
31          <identifier xml:lang="ja">Japan Airlines Flight 80</identifier>
32          <departureTime>2005-02-25T18:30:00+09:00</departureTime>
33          <arrivalTime>2005-02-25T06:45:00-10:00</arrivalTime>
34        </method>
35      </travel>
36      <travel status="reserved">
37        <source type="rent-a-car">
38          <place xml:lang="en">Hertz Honolulu Airport Branch</place>
39          <earliestDepartureTime>2005-02-25T06:45:00-10:00</earliestDepartureTime>
40        </source>
41        <destination type="accommodation">
42          <place/>
43        </destination>
44        <method>
45          <identifier xml:lang="en">Hertz Honolulu Airport Branch</identifier>
46          <departureTime>2005-02-25T6:45:00-10:00</departureTime>
47          <arrivalTime>2005-02-25T07:45:00-10:00</arrivalTime>
48        </method>
49      </travel>
50      <stay status="requested">
51        <place/>
52        <arrivalDate>2005-02-25-10:00</arrivalDate>
53        <departureDate>2005-03-02-10:00</departureDate>
54      </stay>
55      <travel status="reserved">
56        <source type="accomodation">
57          <place/>
58        </source>
59        <destination type="rent-a-car">
60          <place xml:lang="en">HNL</place>
61          <latestArrivalTime>2005-03-02T07:25:00-10:00</latestArrivalTime>
62        </destination>
63        <method>
64          <identifier xml:lang="en">Hertz Honolulu Airport Branch</identifier>
65          <departureTime>2005-02-25T6:25:00-10:00</departureTime>
66          <arrivalTime>2005-02-25T07:25:00-10:00</arrivalTime>
67        </method>
68      </travel>
69      <travel status="reserved">
70        <source type="airport">
71          <place xml:lang="en">HNL</place>
72        </source>
73        <destination type="airport">
74          <place xml:lang="en">NRT</place>
75          <latestArrivalTime>2005-03-03T13:45:00+09:00</latestArrivalTime>
76        </destination>
77        <method>
78          <identifier xml:lang="ja">All Nippon Airways Flight 7025</identifier>
79          <departureTime>2005-03-02T19:25:00-10:00</departureTime>
80          <arrivalTime>2005-03-03T13:35:00+09:00</arrivalTime>
81        </method>
82      </travel>
83      <travel status="reserved">
84        <source type="station">
85          <place xml:lang="ja">JR Narita Line Narita-Airport station</place>
86        </source>
87        <destination type="station">
88          <place xml:lang="ja">JR Tokaido Main Line Tsujido station</place>
89          <latestArrivalTime>2005-03-03T17:00:00+09:00</latestArrivalTime>
90        </destination>
91        <method>
92          <identifier xml:lang="ja">Narita Express 101 the number 2 car, 1A,1B,2A,2B</identifier>
93          <departureTime>2005-03-03T14:45:00+09:00</departureTime>
94          <arrivalTime>2005-03-03T16:40:00+09:00</arrivalTime>
95        </method>
96      </travel>
97    </eventList>
98  </itineraryInProcess>
```

FIG.14

```xml
1  <?xml version="1.0" encoding="Shift_JIS"?>
2  <itineraryInProcess xmlns:xsi="http://www.w3.org/2001/XMLSchema-instance"
   xsi:noNamespaceSchemaLocation="itineraryInProcess.xsd" xml:lang="ja">
3   <passengers>
4    <adult>2</adult>
5    <children>1</children>
6   </passengers>
7   <eventList>
8    <travel status="reserved">
9     <source type="station">
10     <place xml:lang="ja">JR Tokaido Main Line Ofuna station</place>
11     <earliestDepartureTime>2005-02-25T12:00:00+09:00</earliestDepartureTime>
12    </source>
13    <destination type="station">
14     <place xml:lang="ja">JR Narita Line Narita-Airport station</place>
15    </destination>
16    <method>
17     <identifier xml:lang="ja">Narita Express 100 the number 1 car, 1A,1B,2A,2B</identifier>
18     <departureTime>2005-02-25T13:35:00+09:00</departureTime>
19     <arrivalTime>2005-02-25T15:25:00+09:00</arrivalTime>
20    </method>
21   </travel>
22   <travel status="reserved">
23    <source type="airport">
24     <place xml:lang="en">NRT</place>
25     <earliestDepartureTime>2005-02-25T15:25:00+09:00</earliestDepartureTime>
26    </source>
27    <destination type="airport">
28     <place xml:lang="en">HNL</place>
29    </destination>
30    <method>
31     <identifier xml:lang="ja">Japan Airlines Flight 80</identifier>
32     <departureTime>2005-02-25T18:30:00+09:00</departureTime>
33     <arrivalTime>2005-02-25T06:45:00-10:00</arrivalTime>
34    </method>
35   </travel>
36   <travel status="reserved">
37    <source type="rent-a-car">
38     <place xml:lang="en">Hertz Honolulu Airport Branch</place>
39     <earliestDepartureTime>2005-02-25T06:45:00-10:00</earliestDepartureTime>
40    </source>
41    <destination type="accommodation">
42     <place/>
43    </destination>
44    <method>
45     <identifier xml:lang="en">Hertz Honolulu Airport Branch</identifier>
46     <departureTime>2005-02-25T06:45:00-10:00</departureTime>
47     <arrivalTime>2005-02-25T07:45:00-10:00</arrivalTime>
48    </method>
49   </travel>
50   <stay status="reserved">
51    <place xml:lang="en">AMBASSADOR HOTEL OF WAIKIKI</place>
52    <arrivalDate>2005-02-25-10:00</arrivalDate>
53    <departureDate>2005-03-02-10:00</departureDate>
54   </stay>
55   <travel status="reserved">
56    <source type="accommodation">
57     <place/>
58    </source>
59    <destination type="rent-a-car">
60     <place xml:lang="en">HNL</place>
61     <latestArrivalTime>2005-03-02T07:25:00-10:00</latestArrivalTime>
62    </destination>
63    <method>
64     <identifier xml:lang="en">Hertz Honolulu Airport Branch</identifier>
65     <departureTime>2005-02-25T06:25:00-10:00</departureTime>
66     <arrivalTime>2005-02-25T07:25:00-10:00</arrivalTime>
67    </method>
68   </travel>
69   <travel status="reserved">
70    <source type="airport">
71     <place xml:lang="en">HNL</place>
72    </source>
73    <destination type="airport">
74     <place xml:lang="en">NRT</place>
75     <latestArrivalTime>2005-03-03T13:45:00+09:00</latestArrivalTime>
76    </destination>
77    <method>
78     <identifier xml:lang="ja">All Nippon Airways Flight 7025</identifier>
79     <departureTime>2005-03-02T09:25:00-10:00</departureTime>
80     <arrivalTime>2005-03-03T13:35:00+09:00</arrivalTime>
81    </method>
82   </travel>
83   <travel status="requested">
84    <source type="station">
85     <place xml:lang="ja">JR Narita Line Narita-Airport station</place>
86    </source>
87    <destination type="station">
88     <place xml:lang="ja">JR Tokaido Main Line Tsujido station</place>
89     <latestArrivalTime>2005-03-03T17:00:00+09:00</latestArrivalTime>
90    </destination>
91    <method>
92     <identifier xml:lang="ja">Narita Express 101 the number 2 car, 1A,1B,2A,2B</identifier>
93     <departureTime>2005-03-03T14:45:00+09:00</departureTime>
94     <arrivalTime>2005-03-03T16:40:00+09:00</arrivalTime>
95    </method>
96   </travel>
97  </eventList>
98 </itineraryInProcess>
```

FIG.15

```xml
1  <?xml version="1.0" encoding="Shift_JIS"?>
2  <itineraryInProcess xmlns:xsi="http://www.w3.org/2001/XMLSchema-instance"
   xsi:noNamespaceSchemaLocation="itineraryInProcess.xsd" xml:lang="ja">
3    <passengers>
4      <adult>2</adult>
5      <children>1</children>
6    </passengers>
7    <eventList>
8      <travel status="reserved">
9        <source type="station">
10         <place xml:lang="ja">JR Tokaido Main Line Ofuna station</place>
11         <earliestDepartureTime>2005-02-25T12:00:00+09:00</earliestDepartureTime>
12       </source>
13       <destination type="station">
14         <place xml:lang="ja">JR Narita Line Narita-Airport station</place>
15       </destination>
16       <method>
17         <identifier xml:lang="ja">Narita Express 100 the number 1 car, 1A,1B,2A,2B</identifier>
18         <departureTime>2005-02-25T13:35:00+09:00</departureTime>
19         <arrivalTime>2005-02-25T15:25:00+09:00</arrivalTime>
20       </method>
21     </travel>
22     <travel status="reserved">
23       <source type="airport">
24         <place xml:lang="en">NRT</place>
25         <earliestDepartureTime>2005-02-25T15:25:00+09:00</earliestDepartureTime>
26       </source>
27       <destination type="airport">
28         <place xml:lang="en">HNL</place>
29       </destination>
30       <method>
31         <identifier xml:lang="ja">Japan Airlines Flight 80</identifier>
32         <departureTime>2005-02-25T18:31:00+09:00</departureTime>
33         <arrivalTime>2005-02-25T06:45:00-10:00</arrivalTime>
34       </method>
35     </travel>
36     <travel status="reserved">
37       <source type="rent-a-car">
38         <place xml:lang="en">Hertz Honolulu Airport Branch</place>
39         <earliestDepartureTime>2005-02-25T06:45:00-10:00</earliestDepartureTime>
40       </source>
41       <destination type="accommodation">
42         <place xml:lang="en">AMBASSADOR HOTEL OF WAIKIKI</place>
43       </destination>
44       <method>
45         <identifier xml:lang="en">Hertz Honolulu Airport Branch</identifier>
46         <departureTime>2005-02-25T06:45:00-10:00</departureTime>
47         <arrivalTime>2005-02-25T07:45:00-10:00</arrivalTime>
48       </method>
49     </travel>
50     <stay status="reserved">
51       <place xml:lang="en">AMBASSADOR HOTEL OF WAIKIKI</place>
52       <arrivalDate>2005-02-25-10:00</arrivalDate>
53       <departureDate>2005-03-02-10:00</departureDate>
54     </stay>
55     <travel status="reserved">
56       <source type="accomodation">
57         <place xml:lang="en">AMBASSADOR HOTEL OF WAIKIKI</place>
58       </source>
59       <destination type="rent-a-car">
60         <place xml:lang="en">HNL</place>
61         <latestArrivalTime>2005-03-02T07:25:00-10:00</latestArrivalTime>
62       </destination>
63       <method>
64         <identifier xml:lang="en">Hertz Honolulu Airport Branch</identifier>
65         <departureTime>2005-02-25T06:25:00-10:00</departureTime>
66         <arrivalTime>2005-02-25T07:25:00-10:00</arrivalTime>
67       </method>
68     </travel>
69     <travel status="reserved">
70       <source type="airport">
71         <place xml:lang="en">HNL</place>
72       </source>
73       <destination type="airport">
74         <place xml:lang="en">NRT</place>
75         <latestArrivalTime>2005-03-03T13:45:00+09:00</latestArrivalTime>
76       </destination>
77       <method>
78         <identifier xml:lang="ja">All Nippon Airways Flight 7025</identifier>
79         <departureTime>2005-03-02T09:25:00-10:00</departureTime>
80         <arrivalTime>2005-03-03T13:35:00+09:00</arrivalTime>
81       </method>
82     </travel>
83     <travel status="requested">
84       <source type="station">
85         <place xml:lang="ja">JR Narita Line Narita Airport station</place>
86       </source>
87       <destination type="station">
88         <place xml:lang="ja">JR Tokaido Main Line Tsujido station</place>
89         <latestArrivalTime>2005-03-03T17:00:00+09:00</latestArrivalTime>
90       </destination>
91       <method>
92         <identifier xml:lang="ja">Narita Express 101 the number 2 car, 1A,1B,2A,2B</identifier>
93         <departureTime>2005-03-03T14:45:00+09:00</departureTime>
94         <arrivalTime>2005-03-03T16:40:00+09:00</arrivalTime>
95       </method>
96     </travel>
97   </eventList>
98 </itineraryInProcess>
```

FIG.16

```
1  <?xml version="1.0" encoding="Shift_JIS"?>
2  <itinerary xmlns:xsi="http://www.w3.org/2001/XMLSchema-instance" xsi:noNamespaceSchemaLocation="itinerary.xsd" xml:lang="ja">
3    <travel>
4      <source type="station">
5        <place xml:lang="ja">JR Tokaido Main Line Ofuna station</place>
6      </source>
7      <destination type="station">
8        <place xml:lang="ja">JR Narita Line Narita-Airport station</place>
9      </destination>
10     <method>
11       <identifier xml:lang="ja">Narita Express 100 the number 1 car, 1A,1B,2A,2B</identifier>
12       <departureTime>2005-02-25T13:35:00+09:00</departureTime>
13       <arrivalTime>2005-02-25T15:25:00+09:00</arrivalTime>
14     </method>
15   </travel>
16   <travel>
17     <source type="airport">
18       <place xml:lang="en">NRT</place>
19     </source>
20     <destination type="airport">
21       <place xml:lang="en">HNL</place>
22     </destination>
23     <method>
24       <identifier xml:lang="ja">Japan Airlines Flight 80</identifier>
25       <departureTime>2005-02-25T18:30:00+09:00</departureTime>
26       <arrivalTime>2005-02-25T06:45:00-10:00</arrivalTime>
27     </method>
28   </travel>
29   <travel>
30     <source type="rent-a-car">
31       <place xml:lang="en">Hertz Honolulu Airport Branch</place>
32     </source>
33     <destination type="accommodation">
34       <place xml:lang="en">AMBASSADOR HOTEL OF WAIKIKI</place>
35     </destination>
36     <method>
37       <identifier xml:lang="en">Hertz Honolulu Airport Branch</identifier>
38       <departureTime>2005-02-25T06:45:00-10:00</departureTime>
39       <arrivalTime>2005-02-25T07:45:00-10:00</arrivalTime>
40     </method>
41   </travel>
42   <stay>
43     <place xml:lang="en">AMBASSADOR HOTEL OF WAIKIKI</place>
44     <arrivalDate>2005-02-25-10:00</arrivalDate>
45     <departureDate>2005-03-02-10:00</departureDate>
46   </stay>
47   <travel>
48     <source type="accomodation">
49       <place xml:lang="en">AMBASSADOR HOTEL OF WAIKIKI</place>
50     </source>
51     <destination type="rent-a-car">
52       <place xml:lang="en">HNL</place>
53     </destination>
54     <method>
55       <identifier xml:lang="en">Hertz Honolulu Airport Branch</identifier>
56       <departureTime>2005-02-25T06:25:00-10:00</departureTime>
57       <arrivalTime>2005-02-25T07:25:00-10:00</arrivalTime>
58     </method>
59   </travel>
60   <travel>
61     <source type="airport">
62       <place xml:lang="en">HNL</place>
63     </source>
64     <destination type="airport">
65       <place xml:lang="en">NRT</place>
66     </destination>
67     <method>
68       <identifier xml:lang="ja">All Nippon Airways Flight 7025</identifier>
69       <departureTime>2005-03-02T09:25:00-10:00</departureTime>
70       <arrivalTime>2005-03-03T13:35:00+09:00</arrivalTime>
71     </method>
72   </travel>
73   <travel>
74     <source type="station">
75       <place xml:lang="ja">JR Narita Line Narita-Airport station</place>
76     </source>
77     <destination type="station">
78       <place xml:lang="ja">JR Tokaido Main Line Tsujido station</place>
79     </destination>
80     <method>
81       <identifier xml:lang="ja">Narita Express 101 the number 2 car, 1A,1B,2A,2B</identifier>
82       <departureTime>2005-03-03T14:45:00+09:00</departureTime>
83       <arrivalTime>2005-03-03T16:40:00+09:00</arrivalTime>
84     </method>
85   </travel>
86 </itinerary>
```

FIG.17

```
1  <?xml version="1.0" encoding="Shift_JIS"?>
2  <xs:schema xmlns:xs="http://www.w3.org/2001/XMLSchema">
3    <xs:annotation>
4      <xs:documentation>This schema is for the itineraryInProcess document.  It is compliant with W3C XML Schema specification.</xs:documentation>
5    </xs:annotation>
6    <xs:import namespace="http://www.w3.org/XML/1998/namespace" schemaLocation="xml.xsd"/>
7    <xs:element name="itinerary" type="itineraryType"/>
8    <xs:complexType name="itineraryType">
9      <xs:choice minOccurs="0" maxOccurs="unbounded">
10       <xs:element ref="travel"/>
11       <xs:element ref="stay"/>
12     </xs:choice>
13     <xs:attribute ref="xml:lang" use="required"/>
14   </xs:complexType>
15   <xs:element name="travel" type="travelType"/>
16   <xs:complexType name="travelType">
17     <xs:sequence>
18       <xs:element ref="source"/>
19       <xs:element ref="destination"/>
20       <xs:element ref="method" minOccurs="0" maxOccurs="1"/>
21     </xs:sequence>
22   </xs:complexType>
23   <xs:element name="source" type="sourceType"/>
24   <xs:complexType name="sourceType">
25     <xs:sequence>
26       <xs:element ref="place"/>
27     </xs:sequence>
28     <xs:attribute name="type" type="xs:string" use="required"/>
29   </xs:complexType>
30   <xs:element name="destination" type="destinationType"/>
31   <xs:complexType name="destinationType">
32     <xs:sequence>
33       <xs:element ref="place"/>
34     </xs:sequence>
35     <xs:attribute name="type" type="xs:string" use="required"/>
36   </xs:complexType>
37   <xs:element name="place" type="placeType"/>
38   <xs:complexType name="placeType">
39     <xs:simpleContent>
40       <xs:extension base="xs:string">
41         <xs:attribute ref="xml:lang" use="optional"/>
42       </xs:extension>
43     </xs:simpleContent>
44   </xs:complexType>
45   <xs:element name="method" type="methodType"/>
46   <xs:complexType name="methodType">
47     <xs:sequence>
48       <xs:element ref="identifier"/>
49       <xs:element ref="departureTime"/>
50       <xs:element ref="arrivalTime"/>
51     </xs:sequence>
52   </xs:complexType>
53   <xs:element name="identifier" type="identifierType"/>
54   <xs:complexType name="identifierType">
55     <xs:simpleContent>
56       <xs:extension base="xs:string">
57         <xs:attribute ref="xml:lang" use="optional"/>
58       </xs:extension>
59     </xs:simpleContent>
60   </xs:complexType>
61   <xs:element name="departureTime" type="xs:dateTime"/>
62   <xs:element name="arrivalTime" type="xs:dateTime"/>
63   <xs:element name="stay" type="stayType"/>
64   <xs:complexType name="stayType">
65     <xs:sequence>
66       <xs:element ref="place"/>
67       <xs:element ref="arrivalDate"/>
68       <xs:element ref="departureDate"/>
69     </xs:sequence>
70   </xs:complexType>
71   <xs:element name="arrivalDate" type="xs:date"/>
72   <xs:element name="departureDate" type="xs:date"/>
73 </xs:schema>
```

FIG.18

```xml
1  <?xml version="1.0" encoding="Shift_JIS"?>
2  <itinerary xmlns:xsi="http://www.w3.org/2001/XMLSchema-instance" xsi:noNamespaceSchemaLocation="itinerary.xsd" xml:lang="ja">
3    <travel>
4      <source type="station">
5        <place xml:lang="ja">JR Tokaido Main Line Ofuna station</place>
6      </source>
7      <destination type="station">
8        <place xml:lang="ja">JR Narita Line Narita-Airport station</place>
9      </destination>
10     <method>
11       <identifier xml:lang="ja">Narita Express 100 the number 1 car, 1A,1B,2A,2B</identifier>
12       <departureTime>2005-02-25T13:35:00+09:00</departureTime>
13       <arrivalTime>2005-02-25T15:25:00+09:00</arrivalTime>
14     </method>
15   </travel>
16   <travel>
17     <source type="airport">
18       <place xml:lang="ja">New Tokyo International Airport</place>
19     </source>
20     <destination type="airport">
21       <place xml:lang="ja">Honolulu International Airport</place>
22     </destination>
23     <method>
24       <identifier xml:lang="ja">Japan Airlines Flight 80</identifier>
25       <departureTime>2005-02-25T18:30:00+09:00</departureTime>
26       <arrivalTime>2005-02-25T06:45:00-10:00</arrivalTime>
27     </method>
28   </travel>
29   <travel>
30     <source type="rent-a-car">
31       <place xml:lang="ja">Hertz Honolulu Airport Branch</place>
32     </source>
33     <destination type="accommodation">
34       <place/>
35     </destination>
36     <method>
37       <identifier xml:lang="ja">Hertz Honolulu Airport Branch</identifier>
38       <departureTime>2005-02-25T06:45:00-10:00</departureTime>
39       <arrivalTime>2005-02-25T07:45:00-10:00</arrivalTime>
40     </method>
41   </travel>
42   <stay>
43     <place xml:lang="ja">AMBASSADOR HOTEL OF WAIKIKI</place>
44     <arrivalDate>2005-02-25-10:00</arrivalDate>
45     <departureDate>2005-03-02-10:00</departureDate>
46   </stay>
47   <travel>
48     <source type="accomodation">
49       <place xml:lang="ja">AMBASSADOR HOTEL OF WAIKIKI</place>
50     </source>
51     <destination type="rent-a-car">
52       <place xml:lang="ja">Honolulu International Airport</place>
53     </destination>
54     <method>
55       <identifier xml:lang="ja">Hertz Honolulu Airport Branch</identifier>
56       <departureTime>2005-02-25T06:25:00-10:00</departureTime>
57       <arrivalTime>2005-02-25T07:25:00-10:00</arrivalTime>
58     </method>
59   </travel>
60   <travel>
61     <source type="airport">
62       <place xml:lang="ja">Honolulu International Airport</place>
63     </source>
64     <destination type="airport">
65       <place xml:lang="ja">New Tokyo International Airport</place>
66     </destination>
67     <method>
68       <identifier xml:lang="ja">All Nippon Airways Flight 7025</identifier>
69       <departureTime>2005-03-02T09:25:00-10:00</departureTime>
70       <arrivalTime>2005-03-03T13:35:00+09:00</arrivalTime>
71     </method>
72   </travel>
73   <travel>
74     <source type="station">
75       <place xml:lang="ja">JR Narita Line Narita-Airport station</place>
76     </source>
77     <destination type="station">
78       <place xml:lang="ja">JR Tokaido Main Line Tsujido station</place>
79     </destination>
80     <method>
81       <identifier xml:lang="ja">Narita Express 101 the number 2 car, 1A,1B,2A,2B</identifier>
82       <departureTime>2005-03-03T14:45:00+09:00</departureTime>
83       <arrivalTime>2005-03-03T16:40:00+09:00</arrivalTime>
84     </method>
85   </travel>
86 </itinerary>
```

FIG.19

```xml
1  <?xml version="1.0" encoding="Shift_JIS"?>
2  <soapenv:Envelope xmlns:soapenv="http://schemas.xmlsoap.org/soap/envelope">
3    <soapenv:Header>
4      <digest validity="true">03bebcec33576e46bfe3563877ee544e</digest>
5    </soapenv:Header>
6    <soapenv:Body>
7      <itineraryInProcess xmlns:xsi="http://www.w3.org/2001/XMLSchema-instance"
         xsi:noNamespaceSchemaLocation="itineraryInProcess.xsd" xml:lang=":a">
8        <passengers>
9          <adult>2</adult>
10         <children>1</children>
11       </passengers>
12       <eventList>
13         <travel status="reserved">
14           <source type="station">
15             <place xml:lang="ja">JR Tokaido Main Line Ofuna station</place>
16           </source>
17           <destination type="station">
18             <place xml:lang="ja">JR Narita Line Narita-Airport station</place>
19           </destination>
20           <method>
21             <identifier xml:lang="ja">Narita Express 100 the number 1 car, 1A,1B,2A,2B</identifier>
22             <departureTime>2005-02-25T13:35:00+09:00</departureTime>
23             <arrivalTime>2005-02-25T15:25:00+09:00</arrivalTime>
24           </method>
25         </travel>
26         <travel status="reserved">
27           <source type="airport">
28             <place xml:lang="en">NRT</place>
29             <earliestDepartureTime>2005-02-25T15:25:00+09:00</earliestDepartureTime>
30           </source>
31           <destination type="airport">
32             <place xml:lang="en">HNL</place>
33           </destination>
34           <method>
35             <identifier xml:lang="ja">Japan Airlines Flight 80</identifier>
36             <departureTime>2005-02-25T18:30:00+09:00</departureTime>
37             <arrivalTime>2005-02-25T06:45:00-10:00</arrivalTime>
38           </method>
39         </travel>
40         <travel status="requested">
41           <source type="rent-a-car">
42             <place/>
43             <earliestDepartureTime>2005-02-25T06:45:00-10:00</earliestDepartureTime>
44           </source>
45           <destination type="accommodation">
46             <place/>
47           </destination>
48         </travel>
49         <stay status="inactive">
50           <place/>
51           <arrivalDate>2005-02-25-10:00</arrivalDate>
52           <departureDate>2005-03-02-10:00</departureDate>
53         </stay>
54         <travel status="requested">
55           <source type="accommodation">
56             <place/>
57           </source>
58           <destination type="rent-a-car">
59             <place/>
60             <latestArrivalTime>2005-03-02T07:25:00-10:00</latestArrivalTime>
61           </destination>
62         </travel>
63         <travel status="reserved">
64           <source type="airport">
65             <place xml:lang="en">HNL</place>
66           </source>
67           <destination type="airport">
68             <place xml:lang="en">NRT</place>
69             <latestArrivalTime>2005-03-03T13:45:00+09:00</latestArrivalTime>
70           </destination>
71           <method>
72             <identifier xml:lang="ja">All Nippon Airways Flight 7025</identifier>
73             <departureTime>2005-03-02T09:25:00-10:00</departureTime>
74             <arrivalTime>2005-03-03T13:35:00+09:00</arrivalTime>
75           </method>
76         </travel>
77         <travel status="reserved">
78           <source type="station">
79             <place xml:lang="ja">JR Narita Line Narita-Airport station</place>
80           </source>
81           <destination type="station">
82             <place xml:lang="ja">JR Tokaido Main Line Tsujido station</place>
83           </destination>
84           <method>
85             <identifier xml:lang="ja">Narita Express 101 the number 2 car, 1A,1B,2A,2B</identifier>
86             <departureTime>2005-03-03T14:45:00+09:00</departureTime>
87             <arrivalTime>2005-03-03T16:40:00+09:00</arrivalTime>
88           </method>
89         </travel>
90       </eventList>
91     </itineraryInProcess>
92   </soapenv:Body>
93 </soapenv:Envelope>
```

FIG.22

```
1  <?xml version="1.0" encoding="Shift_JIS"?>
2  <soapenv:Envelope xmlns:soapenv="http://schemas.xmlsoap.org/soap/envelope">
3    <soapenv:Header>
4      <validatorID validity="true">0000000.00</validatorID>
5    </soapenv:Header>
6    <soapenv:Body>
7      <itineraryInProcess xmlns:xsi="http://www.w3.org/2001/XMLSchema-instance"
         xsi:noNamespaceSchemaLocation="itineraryInProcess.xsd" xml:lang="ja">
8        <passengers>
9          <adult>2</adult>
10         <children>1</children>
11       </passengers>
12       <eventList>
13         <travel status="reserved">
14           <source type="station">
15             <place xml:lang="ja">JR Tokaido Main Line Ofuna station</place>
16             <earliestDepartureTime>2005-02-25T12:00:00+09:00</earliestDepartureTime>
17           </source>
18           <destination type="station">
19             <place xml:lang="ja">JR Narita Line Narita-Airport station</place>
20           </destination>
21           <method>
22             <identifier xml:lang="ja">Narita Express :00 the number 1 car, 1A,1B,2A,2B</identifier>
23             <departureTime>2005-02-25T13:35:00+09:00</departureTime>
24             <arrivalTime>2005-02-25T15:25:00+09:00</arrivalTime>
25           </method>
26         </travel>
27         <travel status="reserved">
28           <source type="airport">
29             <place xml:lang="en">NRT</place>
30             <earliestDepartureTime>2005-02-25T15:25:00+09:00</earliestDepartureTime>
31           </source>
32           <destination type="airport">
33             <place xml:lang="en">HNL</place>
34           </destination>
35           <method>
36             <identifier xml:lang="ja">Japan Airlines Flight 80</identifier>
37             <departureTime>2005-02-25T18:30:00+09:00</departureTime>
38             <arrivalTime>2005-02-25T06:45:00-10:00</arrivalTime>
39           </method>
40         </travel>
41         <travel status="inactive">
42           <source type="rent-a-car">
43             <place/>
44             <earliestDepartureTime>2005-02-25T06:45:00-10:00</earliestDepartureTime>
45           </source>
46           <destination type="accommodation">
47             <place/>
48           </destination>
49         </travel>
50         <stay status="inactive">
51           <place/>
52           <arrivalDate>2005-02-25-10:00</arrivalDate>
53           <departureDate>2005-03-02-10:00</departureDate>
54         </stay>
55         <travel status="inactive">
56           <source type="accomodation">
57             <place/>
58           </source>
59           <destination type="rent-a-car">
60             <place/>
61             <latestArrivalTime>2005-03-02T07:25:00-10:00</latestArrivalTime>
62           </destination>
63         </travel>
64         <travel status="reserved">
65           <source type="airport">
66             <place xml:lang="en">HNL</place>
67           </source>
68           <destination type="airport">
69             <place xml:lang="en">NRT</place>
70             <latestArrivalTime>2005-03-03T13:45:00+09:00</latestArrivalTime>
71           </destination>
72           <method>
73             <identifier xml:lang="ja">All Nippon Airways Flight 7025</identifier>
74             <departureTime>2005-03-02T09:25:00-10:00</departureTime>
75             <arrivalTime>2005-03-03T13:35:00+09:00</arrivalTime>
76           </method>
77         </travel>
78         <travel status="reserved">
79           <source type="station">
80             <place xml:lang="ja">JR Narita Line Narita-Airport station</place>
81           </source>
82           <destination type="station">
83             <place xml:lang="ja">JR Tokaido Main Line Tsujido station</place>
84             <latestArrivalTime>2005-03-03T17:00:00+09:00</latestArrivalTime>
85           </destination>
86           <method>
87             <identifier xml:lang="ja">Narita Express :01 the number 2 car, 1A,1B,2A,2B</identifier>
88             <departureTime>2005-03-03T14:45:00+09:00</departureTime>
89             <arrivalTime>2005-03-03T16:40:00+09:00</arrivalTime>
90           </method>
91         </travel>
92       </eventList>
93     </itineraryInProcess>
94   </soapenv:Body>
95 </soapenv:Envelope>
```

FIG.23

```xml
1  <?xml version="1.0" encoding="Shift_JIS"?>
2  <soapenv:Envelope xmlns:soapenv="http://schemas.xmlsoap.org/soap/envelope">
3    <soapenv:Header>
4      <validatorID validity="true">UUUUUU100</validatorID>
5    </soapenv:Header>
6    <soapenv:Body>
7      <itineraryInProcess xmlns:xsi="http://www.w3.org/2001/XMLSchema-instance" xsi:noNamespaceSchemaLocation="itineraryInProcess.xsd" xml:lang="ja">
8        <passengers>
9          <adult>2</adult>
10         <children>1</children>
11       </passengers>
12       <eventList>
13         <travel status="reserved">
14           <source type="station">
15             <place xml:lang="ja">JR Tokaido Main Line Ofuna station</place>
16             <earliestDepartureTime>2005-02-25T12:00:00+09:00</earliestDepartureTime>
17           </source>
18           <destination type="station">
19             <place xml:lang="ja">JR Narita Line Narita-Airport station</place>
20           </destination>
21           <method>
22             <identifier xml:lang="ja">Narita Express 100 the number 1 car, 1A,1B,2A,2B</identifier>
23             <departureTime>2005-02-25T13:35:00+09:00</departureTime>
24             <arrivalTime>2005-02-25T15:25:00+09:00</arrivalTime>
25           </method>
26         </travel>
27         <travel status="reserved">
28           <source type="airport">
29             <place xml:lang="en">NRT</place>
30             <earliestDepartureTime>2005-02-25T15:25:00+09:00</earliestDepartureTime>
31           </source>
32           <destination type="airport">
33             <place xml:lang="en">HNL</place>
34           </destination>
35           <method>
36             <identifier xml:lang="ja">Japan Airlines Flight 80</identifier>
37             <departureTime>2005-02-25T18:30:00+09:00</departureTime>
38             <arrivalTime>2005-02-25T06:45:00-10:00</arrivalTime>
39           </method>
40         </travel>
41         <travel status="requested">
42           <source type="rent-a-car">
43             <place/>
44             <earliestDepartureTime>2005-02-25T06:45:00-10:00</earliestDepartureTime>
45           </source>
46           <destination type="accommodation">
47             <place/>
48           </destination>
49         </travel>
50         <stay status="inactive">
51           <place/>
52           <arrivalDate>2005-02-25-10:00</arrivalDate>
53           <departureDate>2005-03-02-10:00</departureDate>
54         </stay>
55         <travel status="requested">
56           <source type="accommodation">
57             <place/>
58           </source>
59           <destination type="rent-a-car">
60             <place/>
61             <latestArrivalTime>2005-03-02T07:25:00-10:00</latestArrivalTime>
62           </destination>
63         </travel>
64         <travel status="reserved">
65           <source type="airport">
66             <place xml:lang="en">HNL</place>
67           </source>
68           <destination type="airport">
69             <place xml:lang="en">NRT</place>
70             <latestArrivalTime>2005-03-03T13:45:00+09:00</latestArrivalTime>
71           </destination>
72           <method>
73             <identifier xml:lang="ja">All Nippon Airways Flight 7025</identifier>
74             <departureTime>2005-03-02T09:25:00-10:00</departureTime>
75             <arrivalTime>2005-03-03T13:35:00+09:00</arrivalTime>
76           </method>
77         </travel>
78         <travel status="reserved">
79           <source type="station">
80             <place xml:lang="ja">JR Narita Line Narita-Airport station</place>
81           </source>
82           <destination type="station">
83             <place xml:lang="ja">JR Tokaido Main Line Tsujido station</place>
84             <latestArrivalTime>2005-03-03T17:00:00+09:00</latestArrivalTime>
85           </destination>
86           <method>
87             <identifier xml:lang="ja">Narita Express 101 the number 2 car, 1A,1B,2A,2B</identifier>
88             <departureTime>2005-03-03T14:45:00+09:00</departureTime>
89             <arrivalTime>2005-03-03T16:40:00+09:00</arrivalTime>
90           </method>
91         </travel>
92       </eventList>
93     </itineraryInProcess>
94   </soapenv:Body>
95 </soapenv:Envelope>
```

FIG.28

```
1  <?xml version="1.0" encoding="Shift_JIS"?>
2  <soapenv:Envelope xmlns:soapenv="http://schemas.xmlsoap.org/soap/envelope">
3    <soapenv:Header>
4      <digest validity="true">3bebcec335f6e46bfe3563897ee544e0</digest>
5    </soapenv:Header>
6    <soapenv:Body>
7      <itineraryInProcess xmlns:xsi="http://www.w3.org/2001/XMLSchema-instance"
         xsi:noNamespaceSchemaLocation="itineraryInProcess.xsd" xml:lang="ja" >
8        <passengers>
9          <adult>2</adult>
10         <children>1</children>
11       </passengers>
12       <eventList>
13         <travel status="reserved">
14           <source type="station">
15             <place xml:lang="ja">JR Tokaido Main Line Ōfuna station</place>
16           </source>
17           <destination type="station">
18             <place xml:lang="ja">JR Narita Line Narita-Airport station</place>
19           </destination>
20           <method>
21             <identifier xml:lang="ja">Narita Express 100 the number 1 car, 1A,1B,2A,2B</identifier>
22             <departureTime>2005-02-25T13:35:00+09:00</departureTime>
23             <arrivalTime>2005-02-25T15:25:00+09:00</arrivalTime>
24           </method>
25         </travel>
26         <travel status="reserved">
27           <source type="airport">
28             <place xml:lang="en">NRT</place>
29             <earliestDepartureTime>2005-02-25T15:25:00+09:00</earliestDepartureTime>
30           </source>
31           <destination type="airport">
32             <place xml:lang="en">HNL</place>
33           </destination>
34           <method>
35             <identifier xml:lang="ja">Japan Airlines Flight 80</identifier>
36             <departureTime>2005-02-25T18:30:00+09:00</departureTime>
37             <arrivalTime>2005-02-25T06:45:00-10:00</arrivalTime>
38           </method>
39         </travel>
40         <travel status="requested">
41           <source type="rent-a-car">
42             <place/>
43             <earliestDepartureTime>2005-02-25T06:45:00-10:00</earliestDepartureTime>
44           </source>
45           <destination type="accommodation">
46             <place/>
47           </destination>
48         </travel>
49         <stay status="inactive">
50           <place/>
51           <arrivalDate>2005-02-25-10:00</arrivalDate>
52           <departureDate>2005-03-02-10:00</departureDate>
53         </stay>
54         <travel status="requested">
55           <source type="accommodation">
56             <place/>
57           </source>
58           <destination type="rent-a-car">
59             <place/>
60             <latestArrivalTime>2005-03-02T07:25:00-10:00</latestArrivalTime>
61           </destination>
62         </travel>
63         <travel status="reserved">
64           <source type="airport">
65             <place xml:lang="en">HNL</place>
66           </source>
67           <destination type="airport">
68             <place xml:lang="en">NRT</place>
69             <latestArrivalTime>2005-03-03T13:45:00+09:00</latestArrivalTime>
70           </destination>
71           <method>
72             <identifier xml:lang="ja">All Nippon Airways Flight 7025</identifier>
73             <departureTime>2005-03-02T09:25:00-10:00</departureTime>
74             <arrivalTime>2005-03-03T13:35:00+09:00</arrivalTime>
75           </method>
76         </travel>
77         <travel status="reserved">
78           <source type="station">
79             <place xml:lang="ja">JR Narita Line Narita-Airport station</place>
80           </source>
81           <destination type="station">
82             <place xml:lang="ja">JR Tokaido Main Line Tsujido station</place>
83           </destination>
84           <method>
85             <identifier xml:lang="ja">Narita Express 101 the number 2 car, 1A,1B,2A,2B</identifier>
86             <departureTime>2005-03-03T14:45:00+09:00</departureTime>
87             <arrivalTime>2005-03-03T16:40:00+09:00</arrivalTime>
88           </method>
89         </travel>
90       </eventList>
91     </itineraryInProcess>
92   </soapenv:Body>
93 </soapenv:Envelope>
```

FIG.29

```
1   DOCUMENT: #document
2   ELEMENT: itineraryInProcess
3     ATTRIBUTE: "xml:lang"
4       TEXT: "ja"
5     ATTRIBUTE: "xmlns:xsi"
6       TEXT: "http://www.w3.org/2001/XMLSchema-instance"
7     ATTRIBUTE: "xsi:noNamespaceSchemaLocation"
8       TEXT: "itineraryInProcess.xsd"
9     ELEMENT: passengers
10      ELEMENT: adult
11        TEXT: "2"
12      ELEMENT: children
13        TEXT: "1"
14    ELEMENT: eventList
15      ELEMENT: travel
16        ATTRIBUTE: "status"
17          TEXT: "reserved"
18        ELEMENT: source
19          ATTRIBUTE: "type"
20            TEXT: "station"
21          ELEMENT: place
22            ATTRIBUTE: "xml:lang"
23              TEXT: "ja"
24            TEXT: "JR Tokaido Main Line Ofuna station"
25          ELEMENT: earliestDepartureTime
26            TEXT: "2005-02-25T12:00:00+09:00"
27        ELEMENT: destination
28          ATTRIBUTE: "type"
29            TEXT: "station"
30          ELEMENT: place
31            ATTRIBUTE: "xml:lang"
32              TEXT: "ja"
33            TEXT: "JR Narita Line Narita-Airport station"
34        ELEMENT: method
35          ELEMENT: identifier
36            ATTRIBUTE: "xml:lang"
37              TEXT: "ja"
38            TEXT: "Narita Express 100 the number 1 car, 1A,1B,2A,2B"
39          ELEMENT: departureTime
40            TEXT: "2005-02-25T13:35:00+09:00"
41          ELEMENT: arrivalTime
42            TEXT: "2005-02-25T15:25:00+09:00"
43      ELEMENT: travel
44        ATTRIBUTE: "status"
45          TEXT: "reserved"
46        ELEMENT: source
47          ATTRIBUTE: "type"
48            TEXT: "airport"
49          ELEMENT: place
50            ATTRIBUTE: "xml:lang"
51              TEXT: "en"
52            TEXT: "NRT"
53          ELEMENT: earliestDepartureTime
54            TEXT: "2005-02-25T15:25:00+09:00"
55        ELEMENT: destination
56          ATTRIBUTE: "type"
57            TEXT: "airport"
58          ELEMENT: place
59            ATTRIBUTE: "xml:lang"
60              TEXT: "en"
61            TEXT: "HNL"
62        ELEMENT: method
63          ELEMENT: identifier
64            ATTRIBUTE: "xml:lang"
65              TEXT: "ja"
66            TEXT: "Japan Airlines Flight 80"
67          ELEMENT: departureTime
68            TEXT: "2005-02-25T18:30:00+09:00"
69          ELEMENT: arrivalTime
70            TEXT: "2005-02-25T06:45:00-10:00"
71      ELEMENT: travel
72        ATTRIBUTE: "status"
73          TEXT: "requested"
74        ELEMENT: source
75          ATTRIBUTE: "type"
76            TEXT: "rent-a-car"
77          ELEMENT: place
78          ELEMENT: earliestDepartureTime
79            TEXT: "2005-02-25T06:45:00-10:00"
80        ELEMENT: destination
81          ATTRIBUTE: "type"
82            TEXT: "accommodation"
83          ELEMENT: place
84    ELEMENT: stay
85      ATTRIBUTE: "status"
86        TEXT: "inactive"
87      ELEMENT: place
88      ELEMENT: arrivalDate
89        TEXT: "2005-02-25-10:00"
90      ELEMENT: departureDate
91        TEXT: "2005-03-02-10:00"
92    ELEMENT: travel
93      ATTRIBUTE: "status"
94        TEXT: "requested"
95      ELEMENT: source
96        ATTRIBUTE: "type"
97          TEXT: "accomodation"
98        ELEMENT: place
99      ELEMENT: destination
100       ATTRIBUTE: "type"
101         TEXT: "rent-a-car"
102       ELEMENT: place
103       ELEMENT: latestArrivalTime
104         TEXT: "2005-03-02T07:25:00-10:00"
105   ELEMENT: travel
106     ATTRIBUTE: "status"
107       TEXT: "reserved"
108     ELEMENT: source
109       ATTRIBUTE: "type"
110         TEXT: "airport"
111       ELEMENT: place
112         ATTRIBUTE: "xml:lang"
113           TEXT: "en"
114         TEXT: "HNL"
115     ELEMENT: destination
116       ATTRIBUTE: "type"
117         TEXT: "airport"
118       ELEMENT: place
119         ATTRIBUTE: "xml:lang"
120           TEXT: "en"
121         TEXT: "NRT"
122       ELEMENT: latestArrivalTime
123         TEXT: "2005-03-03T13:45:00+09:00"
124     ELEMENT: method
125       ELEMENT: identifier
126         ATTRIBUTE: "xml:lang"
127           TEXT: "ja"
128         TEXT: "All Nippon Airways Flight 7025"
129       ELEMENT: departureTime
130         TEXT: "2005-03-02T09:25:00-10:00"
131       ELEMENT: arrivalTime
132         TEXT: "2005-03-03T13:35:00+09:00"
133   ELEMENT: travel
134     ATTRIBUTE: "status"
135       TEXT: "reserved"
136     ELEMENT: source
137       ATTRIBUTE: "type"
138         TEXT: "station"
139       ELEMENT: place
140         ATTRIBUTE: "xml:lang"
141           TEXT: "ja"
142         TEXT: "JR Narita Line Narita-Airport station"
143     ELEMENT: destination
144       ATTRIBUTE: "type"
145         TEXT: "station"
146       ELEMENT: place
147         ATTRIBUTE: "xml:lang"
148           TEXT: "ja"
149         TEXT: "JR Tokaido Main Line Tsujido station"
150       ELEMENT: latestArrivalTime
151         TEXT: "2005-03-03T17:00:00+09:00"
152     ELEMENT: method
153       ELEMENT: identifier
154         ATTRIBUTE: "xml:lang"
155           TEXT: "ja"
156         TEXT: "Narita Express 101 the number 2 car, 1A,1B,2A,2B"
157       ELEMENT: departureTime
158         TEXT: "2005-03-03T14:45:00+09:00"
159       ELEMENT: arrivalTime
160         TEXT: "2005-03-03T16:40:00+09:00"
```

FIG.30

| NODE NUMBER | DESCRIPTION |
|---|---|
| 1 | NODE REPRESENTING THE WHOLE DOCUMENT OF FIG. 29 |
| 2 | NODE REPRESENTING itineraryInProcess ELEMENT (LINES 2 - 86 ) |
| 3 | NODE REPRESENTING xml:lang ATTRIBUTE IN itineraryInProcess ELEMENT (LINE 2) |
| 4 | NODE REPRESENTING xml:lang ATTRIBUTE VALUE IN itineraryInProcess ELEMENT (LINE 2) |
| 5 | NODE REPRESENTING xml:xsi ATTRIBUTE IN itineraryInProcess ELEMENT (LINE 2) |
| 6 | NODE REPRESENTING xml:xsi ATTRIBUTE VALUE IN itineraryInProcess ELEMENT (LINE 2) |
| 7 | NODE REPRESENTING xsi:noNamespaceSchemaLocation ATTRIBUTE IN itineraryInProcess ELEMENT (LINE 2) |
| 8 | NODE REPRESENTING xsi:noNamespaceSchemaLocation ATTRIBUTE VALUE IN itineraryInProcess ELEMENT (LINE 2) |
| 9 | NODE REPRESENTING passengers ELEMENT (LINES 3 - 6) |
| 10 | NODE REPRESENTING adult ELEMENT (LINE 4) |
| 11 | NODE REPRESENTING TEXT CONTENT OF adult ELEMENT (LINE 4) |
| 12 | NODE REPRESENTING children ELEMENT (LINE 5) |
| 13 | NODE REPRESENTING TEXT CONTENT OF children ELEMENT (LINE 5) |
| 14 | NODE REPRESENTING evenList ELEMENT (LINES 7 - 85) |
| 15 | NODE REPRESENTING travel ELEMENT (LINES 8 - 20) |
| 16 | NODE REPRESENTING status ATTRIBUTE IN travel ELEMENT (LINE 8) |
| 17 | NODE REPRESENTING status ATTRIBUTE VALUE IN travel ELEMENT (LINE 8) |
| 18 | NODE REPRESENTING source ELEMENT (LINES 9 - 11) |
| 19 | NODE REPRESENTING type ATTRIBUTE IN source ELEMENT (LINE 9) |
| 20 | NODE REPRESENTING type ATTRIBUTE VALUE IN source ELEMENT (LINE 9) |
| 21 | NODE REPRESENTING place ELEMENT (LINE 10) |
| 22 | NODE REPRESENTING xml:lang ATTRIBUTE OF place ELEMENT (LINE 10) |
| 23 | NODE REPRESENTING xml:lang ATTRIBUTE VALUE OF place ELEMENT (LINE 10) |
| 24 | NODE REPRESENTING TEXT CONTENT OF place ELEMENT (LINE 10) |
| 25 | NODE REPRESENTOFG earliestDepartureTime ELEMENT (LINE 11) |
| 26 | NODE REPRESENTING TEXT CONTENT OF earliestDepartureTime ELEMENT (LINE 11) |
| 27 | NODE REPRESENTING source ELEMENT (LINES 12 - 14) |
| 28 | NODE REPRESENTING type ATTRIBUTE IN source ELEMENT (LINE 12) |
| 29 | NODE REPRESENTING type ATTRIBUTE VALUE IN source ELEMENT (LINE 12) |
| 30 | NODE REPRESENTING place ELEMENT (LINE 13) |
| 31 | NODE REPRESENTING xml:lang ATTRIBUTE OF place ELEMENT (LINE 13) |
| 32 | NODE REPRESENTING xml:lang ATTRIBUTE VALUE OF place ELEMENT (LINE 13) |
| 33 | NODE REPRESENTING TEXT CONTENT OF place ELEMENT (LINE 13) |
| 34 | NODE REPRESENTING method ELEMENT (LINES 15 - 19) |
| 35 | NODE REPRESENTING identifier ELEMENT (LINE 16) |
| 36 | NODE REPRESENTING xml:lang ATTRIBUTE OF identifier ELEMENT (LINE 16) |
| 37 | NODE REPRESENTING xml:lang ATTRIBUTE VALUE OF identifier ELEMENT (LINE 16) |
| 38 | NODE REPRESENTING xml:lang TEXT CONTENT OF identifier ELEMENT (LINE 16) |
| 39 | NODE REPRESENTING departureTime ELEMENT (LINE 17) |
| 40 | NODE REPRESENTING TEXT CONTENT OF departureTime ELEMENT (LINE 17) |
| 41 | NODE REPRESENTING arrivalTime ELEMENT (LINE 18) |
| 42 | NODE REPRESENTING TEXT CONTENT OF arrivalTime ELEMENT (LINE 18) |

FIG.31

```
1  <?xml version="1.0" encoding="Shift_JIS"?>
2  <soapenv:Envelope xmlns:soapenv="http://schemas.xmlsoap.org/soap/envelope">
3   <soapenv:Header>
4    <digest validity="true">3bebcec335f6e46bfe3563897ee544e0</digest>
5   </soapenv:Header>
6   <soapenv:Body>
7    <itineraryInProcess xmlns:xsi="http://www.w3.org/2001/XMLSchema-instance" xsi:noNamespaceSchemaLocation="itineraryInProcess.xsd" xml:lang="ja">
8     <passengers>
9      <adult>2</adult>
10     <children>1</children>
11    </passengers>
12    <eventList>
13     <travel status="reserved">
14      <source type="station">
15       <place xml:lang="ja">JR Tokaido Main Line Ofuna station</place>
16      </source>
17      <destination type="station">
18       <place xml:lang="ja">JR Narita Line Narita-Airport station</place>
19      </destination>
20      <method>
21       <identifier xml:lang="ja">Narita Express 100 the number 1 car, 1A,1B,2A,2B</identifier>
22       <departureTime>2005-02-25T13:35:00+09:00</departureTime>
23       <arrivalTime>2005-02-25T15:25:00+09:00</arrivalTime>
24      </method>
25     </travel>
26     <travel status="reserved">
27      <source type="airport">
28       <place xml:lang="en">NRT</place>
29       <earliestDepartureTime>2005-02-25T15:25:00+09:00</earliestDepartureTime>
30      </source>
31      <destination type="airport">
32       <place xml:lang="en">HNL</place>
33      </destination>
34      <method>
35       <identifier xml:lang="ja">Japan Airlines Flight 80</identifier>
36       <departureTime>2005-02-25T18:30:00+09:00</departureTime>
37       <arrivalTime>2005-02-25T06:45:00-10:00</arrivalTime>
38      </method>
39     </travel>
40     <travel status="requested">
41      <source type="rent-a-car">
42       <place/>
43       <earliestDepartureTime>2005-02-25T06:45:00-10:00</earliestDepartureTime>
44      </source>
45      <destination type="accommodation">
46       <place/>
47      </destination>
48     </travel>
49     <stay status="inactive">
50      <place/>
51      <arrivalDate>2005-02-25-10:00</arrivalDate>
52      <departureDate>2005-03-02-10:00</departureDate>
53     </stay>
54     <travel status="requested">
55      <source type="accomodation">
56       <place/>
57      </source>
58      <destination type="rent-a-car">
59       <place/>
60       <latestArrivalTime>2005-03-02T07:25:00-10:00</latestArrivalTime>
61      </destination>
62     </travel>
63     <travel status="reserved">
64      <source type="airport">
65       <place xml:lang="en">HNL</place>
66      </source>
67      <destination type="airport">
68       <place xml:lang="en">NRT</place>
69       <latestArrivalTime>2005-03-03T13:45:00+09:00</latestArrivalTime>
70      </destination>
71      <method>
72       <identifier xml:lang="ja">All Nippon Airways Flight 7025</identifier>
73       <departureTime>2005-03-02T09:25:00-10:00</departureTime>
74       <arrivalTime>2005-03-03T13:35:00+09:00</arrivalTime>
75      </method>
76     </travel>
77     <travel status="reserved">
78      <source type="station">
79       <place xml:lang="ja">JR Narita Line Narita-Airport station</place>
80      </source>
81      <destination type="station">
82       <place xml:lang="ja">JR Tokaido Main Line Tsujido station</place>
83      </destination>
84      <method>
85       <identifier xml:lang="ja">Narita Express 101 the number 2 car, 1A,1B,2A,2B</identifier>
86       <departureTime>2005-03-03T14:45:00+09:00</departureTime>
87       <arrivalTime>2005-03-03T16:40:00+09:00</arrivalTime>
88      </method>
89     </travel>
90    </eventList>
91   </itineraryInProcess>
92   </soapenv:Body>
93  </soapenv:Envelope>
```

FIG.32

```
1  <?xml version="1.0" encoding="Shift_JIS"?>
2  <xs:schema xmlns:xs="http://www.w3.org/2001/XMLSchema">
3    <xs:annotation>
4      <xs:documentation>This schema is for the itineraryInProcess document.  It is compliant with W3C XML Schema
       specification.</xs:documentation>
5    </xs:annotation>
6    <xs:import namespace="http://www.w3.org/XML/1998/namespace" schemaLocation="xml.xsd"/>
7    <xs:element name="itineraryInProcess" type="itineraryInProcessType"/>
8    <xs:complexType name="itineraryInProcessType">
9      <xs:sequence>
10       <xs:element ref="passengers"/>
11       <xs:element ref="eventList"/>
12     </xs:sequence>
13     <xs:attribute ref="xml:lang" use="required"/>
14   </xs:complexType>
15   <xs:element name="passengers" type="passengersType"/>
16   <xs:complexType name="passengersType">
17     <xs:sequence>
18       <xs:element ref="adult"/>
19       <xs:element ref="children"/>
20     </xs:sequence>
21   </xs:complexType>
22   <xs:element name="adult" type="xs:integer"/>
23   <xs:element name="children" type="xs:integer"/>
24   <xs:element name="eventList" type="eventListType"/>
25   <xs:complexType name="eventListType">
26     <xs:choice minOccurs="0" maxOccurs="unbounded">
27       <xs:element ref="travel"/>
28       <xs:element ref="stay"/>
29     </xs:choice>
30   </xs:complexType>
31   <xs:element name="travel" type="travelType"/>
32   <xs:complexType name="travelType">
33     <xs:sequence>
34       <xs:element ref="source"/>
35       <xs:element ref="destination"/>
36       <xs:element ref="method" minOccurs="0" maxOccurs="1"/>
37     </xs:sequence>
38     <xs:attribute name="status" type="xs:string" use="required"/>
39   </xs:complexType>
40   <xs:element name="source" type="sourceType"/>
41   <xs:complexType name="sourceType">
42     <xs:sequence>
43       <xs:element ref="place"/>
44       <xs:element ref="earliestDepartureTime" minOccurs="0" maxOccurs="1"/>
45     </xs:sequence>
46     <xs:attribute name="type" type="xs:string" use="required"/>
47   </xs:complexType>
48   <xs:element name="destination" type="destinationType"/>
49   <xs:complexType name="destinationType">
50     <xs:sequence>
51       <xs:element ref="place"/>
52       <xs:element ref="latestArrivalTime" minOccurs="0" maxOccurs="1"/>
53     </xs:sequence>
54     <xs:attribute name="type" type="xs:string" use="required"/>
55   </xs:complexType>
56   <xs:element name="place" type="placeType"/>
57   <xs:complexType name="placeType">
58     <xs:simpleContent>
59       <xs:extension base="xs:string">
60         <xs:attribute ref="xml:lang" use="optional"/>
61       </xs:extension>
62     </xs:simpleContent>
63   </xs:complexType>
64   <xs:element name="earliestDepartureTime" type="xs:dateTime"/>
65   <xs:element name="latestArrivalTime" type="xs:dateTime"/>
66   <xs:element name="method" type="methodType"/>
67   <xs:complexType name="methodType">
68     <xs:sequence>
69       <xs:element ref="identifier"/>
70       <xs:element ref="departureTime"/>
71       <xs:element ref="arrivalTime"/>
72     </xs:sequence>
73   </xs:complexType>
74   <xs:element name="identifier" type="identifierType"/>
75   <xs:complexType name="identifierType">
76     <xs:simpleContent>
77       <xs:extension base="xs:string">
78         <xs:attribute ref="xml:lang" use="optional"/>
79       </xs:extension>
80     </xs:simpleContent>
81   </xs:complexType>
82   <xs:element name="departureTime" type="xs:dateTime"/>
83   <xs:element name="arrivalTime" type="xs:dateTime"/>
84   <xs:element name="stay" type="stayType"/>
85   <xs:complexType name="stayType">
86     <xs:sequence>
87       <xs:element ref="place"/>
88       <xs:element ref="arrivalDate"/>
89       <xs:element ref="departureDate"/>
90     </xs:sequence>
91     <xs:attribute name="status" type="xs:string" use="required"/>
92   </xs:complexType>
93   <xs:element name="arrivalDate" type="xs:date"/>
94   <xs:element name="departureDate" type="xs:date"/>
95 </xs:schema>
```

FIG.33

```xml
1  <?xml version="1.0" encoding="Shift_JIS"?>
2  <itineraryInProcess xmlns:xsi="http://www.w3.org/2001/XMLSchema-instance"
   xsi:noNamespaceSchemaLocation="itineraryInProcess.xsd" xml:lang="ja">
3    <passengers>
4      <adult>2</adult>
5      <children>1</children>
6    </passengers>
7    <eventList>
8      <travel status="requested">
9        <source type="station">
10         <place xml:lang="ja">JR Tokaido Main Line Tsujido station</place>
11         <earliestDepartureTime>2005-02-25T12:00:00+09:00</earliestDepartureTime>
12       </source>
13       <destination type="station">
14         <place xml:lang="ja">JR Narita Line Narita-Airport station</place>
15       </destination>
16     </travel>
17     <travel status="inactive">
18       <source type="airport">
19         <place xml:lang="en">NRT</place>
20       </source>
21       <destination type="airport">
22         <place xml:lang="en">HNL</place>
23       </destination>
24     </travel>
25     <travel status="inactive">
26       <source type="rent-a-car">
27         <place>TBD</place>
28       </source>
29       <destination type="accommodation">
30         <place>TBD</place>
31       </destination>
32     </travel>
33     <stay status="inactive">
34       <place>TBD</place>
35       <arrivalDate>2005-02-25-10:00</arrivalDate>
36       <departureDate>2005-03-02-10:00</departureDate>
37     </stay>
38     <travel status="inactive">
39       <source type="accomodation">
40         <place>TBD</place>
41       </source>
42       <destination type="rent-a-car">
43         <place>TBD</place>
44       </destination>
45     </travel>
46     <travel status="inactive">
47       <source type="airport">
48         <place xml:lang="en">HNL</place>
49       </source>
50       <destination type="airport">
51         <place xml:lang="en">NRT</place>
52       </destination>
53     </travel>
54     <travel status="requested">
55       <source type="station">
56         <place xml:lang="ja">JR Narita Line Narita-Airport station</place>
57       </source>
58       <destination type="station">
59         <place xml:lang="ja">JR Tokaido Main Line Tsujido station</place>
60         <latestArrivalTime>2005-03-03T17:00:00+09:00</latestArrivalTime>
61       </destination>
62     </travel>
63   </eventList>
64 </itineraryInProcess>
```

FIG.35

```xml
1  <?xml version="1.0" encoding="Shift_JIS"?>
2  <soapenv:Envelope xmlns:soapenv="http://schemas.xmlsoap.org/soap/envelope">
3    <soapenv:Header>
4      <digest validity="true" documentLength="2769"><![CDATA[ian<a'innHonpRr 0n_a_t2Tanic rsi]]></digest>
5    </soapenv:Header>
6    <soapenv:Body>
7      <itineraryInProcess xmlns:xsi="http://www.w3.org/2001/XMLSchema-instance"
         xsi:noNamespaceSchemaLocation="itineraryInProcess.xsd" xml:lang="ja">
8        <passengers>
9          <adult>2</adult>
10         <children>1</children>
11       </passengers>
12       <eventList>
13         <travel status="reserved">
14           <source type="station">
15             <place xml:lang="ja">JR Tokaido Main Line Ofuna station</place>
16           </source>
17           <destination type="station">
18             <place xml:lang="ja">JR Narita Line Narita-Airport station</place>
19           </destination>
20           <method>
21             <identifier xml:lang="ja">Narita Express 100 the number 1 car, 1A,1B,2A,2B</identifier>
22             <departureTime>2005-02-25T13:35:00+09:00</departureTime>
23             <arrivalTime>2005-02-25T15:25:00+09:00</arrivalTime>
24           </method>
25         </travel>
26         <travel status="reserved">
27           <source type="airport">
28             <place xml:lang="en">NRT</place>
29             <earliestDepartureTime>2005-02-25T15:25:00+09:00</earliestDepartureTime>
30           </source>
31           <destination type="airport">
32             <place xml:lang="en">HNL</place>
33           </destination>
34           <method>
35             <identifier xml:lang="ja">Japan Airlines Flight 80</identifier>
36             <departureTime>2005-02-25T18:30:00+09:00</departureTime>
37             <arrivalTime>2005-02-25T06:45:00-10:00</arrivalTime>
38           </method>
39         </travel>
40         <travel status="requested">
41           <source type="rent-a-car">
42             <place/>
43             <earliestDepartureTime>2005-02-25T06:45:00-10:00</earliestDepartureTime>
44           </source>
45           <destination type="accommodation">
46             <place/>
47           </destination>
48         </travel>
49         <stay status="inactive">
50           <place/>
51           <arrivalDate>2005-02-25-10:00</arrivalDate>
52           <departureDate>2005-03-02-10:00</departureDate>
53         </stay>
54         <travel status="requested">
55           <source type="accomodation">
56             <place/>
57           </source>
58           <destination type="rent-a-car">
59             <place/>
60             <latestArrivalTime>2005-03-02T07:25:00-10:00</latestArrivalTime>
61           </destination>
62         </travel>
63         <travel status="reserved">
64           <source type="airport">
65             <place xml:lang="en">HNL</place>
66           </source>
67           <destination type="airport">
68             <place xml:lang="en">NRT</place>
69             <latestArrivalTime>2005-03-03T13:45:00+09:00</latestArrivalTime>
70           </destination>
71           <method>
72             <identifier xml:lang="ja">All Nippon Airways Flight 7025</identifier>
73             <departureTime>2005-03-02T09:25:00-10:00</departureTime>
74             <arrivalTime>2005-03-03T13:35:00+09:00</arrivalTime>
75           </method>
76         </travel>
77         <travel status="reserved">
78           <source type="station">
79             <place xml:lang="ja">JR Narita Line Narita Airport station</place>
80           </source>
81           <destination type="station">
82             <place xml:lang="ja">JR Tokaido Main Line Tsujido station</place>
83           </destination>
84           <method>
85             <identifier xml:lang="ja">Narita Express 101 the number 2 car, 1A,1B,2A,2B</identifier>
86             <departureTime>2005-03-03T14:45:00+09:00</departureTime>
87             <arrivalTime>2005-03-03T16:40:00+09:00</arrivalTime>
88           </method>
89         </travel>
90       </eventList>
91     </itineraryInProcess>
92   </soapenv:Body>
93 </soapenv:Envelope>
```

FIG.39

```xml
1  <?xml version="1.0" encoding="Shift_JIS"?>
2  <soapenv:Envelope xmlns:soapenv="http://schemas.xmlsoap.org/soap/envelope">
3    <soapenv:Header>
4      <digest validity="true" documentLength="2923"><![CDATA[annl 5ee0/n5 tu ri=dlma00at100p]]></digest>
5    </soapenv:Header>
6    <soapenv:Body>
7      <itineraryInProcess xmlns:xsi="http://www.w3.org/2001/XMLSchema-instance" xsi:noNamespaceSchemaLocation="itineraryInProcess.xsd" xml:lang="ja">
8        <passengers>
9          <adult>2</adult>
10         <children>1</children>
11       </passengers>
12       <eventList>
13         <travel status="reserved">
14           <source type="station">
15             <place xml:lang="ja">JR Tokaido Main Line Ofuna station</place>
16           </source>
17           <destination type="station">
18             <place xml:lang="ja">JR Narita Line Narita-Airport station</place>
19           </destination>
20           <method>
21             <identifier xml:lang="ja">Narita Express 100 the number 1 car, 1A,1B,2A,2B</identifier>
22             <departureTime>2005-02-25T13:35:00+09:00</departureTime>
23             <arrivalTime>2005-02-25T15:25:00+09:00</arrivalTime>
24           </method>
25         </travel>
26         <travel status="reserved">
27           <source type="airport">
28             <place xml:lang="en">NRT</place>
29             <earliestDepartureTime>2005-02-25T15:25:00+09:00</earliestDepartureTime>
30           </source>
31           <destination type="airport">
32             <place xml:lang="en">HNL</place>
33           </destination>
34           <method>
35             <identifier xml:lang="ja">Japan Airlines Flight 80</identifier>
36             <departureTime>2005-02-25T18:30:00+09:00</departureTime>
37             <arrivalTime>2005-02-25T06:45:00-10:00</arrivalTime>
38           </method>
39         </travel>
40         <travel status="requested">
41           <source type="rent-a-car">
42             <place/>
43             <earliestDepartureTime>2005-02-25T06:45:00-10:00</earliestDepartureTime>
44           </source>
45           <destination type="accommodation">
46             <place/>
47           </destination>
48         </travel>
49         <stay status="inactive">
50           <place/>
51           <arrivalDate>2005-02-25-10:00</arrivalDate>
52           <departureDate>2005-03-02-10:00</departureDate>
53         </stay>
54         <travel status="requested">
55           <source type="accomodation">
56             <place/>
57           </source>
58           <destination type="rent-a-car">
59             <place/>
60             <latestArrivalTime>2005-03-02T07:25:00-10:00</latestArrivalTime>
61           </destination>
62         </travel>
63         <travel status="reserved">
64           <source type="airport">
65             <place xml:lang="en">HNL</place>
66           </source>
67           <destination type="airport">
68             <place xml:lang="en">NRT</place>
69             <latestArrivalTime>2005-03-03T13:45:00+09:00</latestArrivalTime>
70           </destination>
71           <method>
72             <identifier xml:lang="ja">All Nippon Airways Flight 7025</identifier>
73             <departureTime>2005-03-02T09:25:00-10:00</departureTime>
74             <arrivalTime>2005-03-03T13:35:00+09:00</arrivalTime>
75           </method>
76         </travel>
77         <travel status="reserved">
78           <source type="station">
79             <place xml:lang="ja">JR Narita Line Narita-Airport station</place>
80           </source>
81           <destination type="station">
82             <place xml:lang="ja">JR Tokaido Main Line Tsujido station</place>
83           </destination>
84           <method>
85             <identifier xml:lang="ja">Narita Express 101 the number 2 car, 1A,1B,2A,2B</identifier>
86             <departureTime>2005-03-03T14:45:00+09:00</departureTime>
87             <arrivalTime>2005-03-03T16:40:00+09:00</arrivalTime>
88           </method>
89         </travel>
90       </eventList>
91     </itineraryInProcess>
92   </soapenv:Body>
93 </soapenv:Envelope>
```

FIG.40

```
 1  <?xml version="1.0" encoding="Shift_JIS"?>
 2  <itineraryInProcess xmlns:xsi="http://www.w3.org/2001/XMLSchema-instance"
    xsi:noNamespaceSchemaLocation="itineraryInProcess.xsd xmlValidator.xsd" xml:lang="ja">
 3    <passengers>
 4      <adult contentType="xs:integer">2</adult>
 5      <children contentType="xs:integer">1</children>
 6    </passengers>
 7    <eventList>
 8      <travel status="reserved">
 9        <source type="station">
10          <place xml:lang="ja" contentType="xs:string">JR Tokaido Main Line Ofuna station</place>
11        </source>
12        <destination type="station">
13          <place xml:lang="ja" contentType="xs:string">JR Narita Line Narita-Airport station</place>
14        </destination>
15        <method>
16          <identifier xml:lang="ja" contentType="xs:string">Narita Express 100 the number 1 car, 1A,1B,2A,2B</identifier>
17          <departureTime contentType="xs:dateTime">2005-02-25T13:35:00+09:00</departureTime>
18          <arrivalTime contentType="xs:dateTime">2005-02-25T15:25:00+09:00</arrivalTime>
19        </method>
20      </travel>
21      <travel status="reserved">
22        <source type="airport">
23          <place xml:lang="en" contentType="xs:string">NRT</place>
24          <earliestDepartureTime contentType="xs:dateTime">2005-02-25T15:25:00+09:00</earliestDepartureTime>
25        </source>
26        <destination type="airport">
27          <place xml:lang="en" contentType="xs:string">HNL</place>
28        </destination>
29        <method>
30          <identifier xml:lang="ja" contentType="xs:string">Japan Airlines Flight 80</identifier>
31          <departureTime contentType="xs:dateTime">2005-02-25T18:30:00+09:00</departureTime>
32          <arrivalTime contentType="xs:dateTime">2005-02-25T06:45:00-10:00</arrivalTime>
33        </method>
34      </travel>
35      <travel status="requested">
36        <source type="rent-a-car">
37          <place/>
38          <earliestDepartureTime contentType="xs:dateTime">2005-02-25T06:45:00-10:00</earliestDepartureTime>
39        </source>
40        <destination type="accommodation">
41          <place/>
42        </destination>
43      </travel>
44      <stay status="inactive">
45        <place/>
46        <arrivalDate contentType="xs:date">2005-02-25-10:00</arrivalDate>
47        <departureDate contentType="xs:date">2005-03-02-10:00</departureDate>
48      </stay>
49      <travel status="requested">
50        <source type="accomodation">
51          <place/>
52        </source>
53        <destination type="rent-a-car">
54          <place/>
55          <latestArrivalTime contentType="xs:dateTime">2005-03-02T07:25:00-10:00</latestArrivalTime>
56        </destination>
57      </travel>
58      <travel status="reserved">
59        <source type="airport">
60          <place xml:lang="en" contentType="xs:string">HNL</place>
61        </source>
62        <destination type="airport">
63          <place xml:lang="en" contentType="xs:string">NRT</place>
64          <latestArrivalTime contentType="xs:dateTime">2005-03-03T13:45:00+09:00</latestArrivalTime>
65        </destination>
66        <method>
67          <identifier xml:lang="ja" contentType="xs:string">All Nippon Airways Flight 7025</identifier>
68          <departureTime contentType="xs:dateTime">2005-03-02T09:25:00-10:00</departureTime>
69          <arrivalTime contentType="xs:dateTime">2005-03-03T13:35:00+09:00</arrivalTime>
70        </method>
71      </travel>
72      <travel status="reserved">
73        <source type="station">
74          <place xml:lang="ja" contentType="xs:string">JR Narita Line Narita-Airport station</place>
75        </source>
76        <destination type="station">
77          <place xml:lang="ja" contentType="xs:string">JR Tokaido Main Line Tsujido station</place>
78        </destination>
79        <method>
80          <identifier xml:lang="ja" contentType="xs:string">Narita Express 101 the number 2 car, 1A,1B,2A,2B</identifier>
81          <departureTime contentType="xs:string">2005-03-03T14:45:00+09:00</departureTime>
82          <arrivalTime contentType="xs:string">2005-03-03T16:40:00+09:00</arrivalTime>
83        </method>
84      </travel>
85    </eventList>
86  </itineraryInProcess>
```

FIG.41

```
1  <?xml version="1.0" encoding="Shift_JIS"?>
2  <xs:schema xmlns:xs="http://www.w3.org/2001/XMLSchema">
3    <xs:annotation>
4      <xs:documentation>This schema is for the itineraryInProcess document. It is compliant with W3C XML Schema specification.</xs:documentation>
5    </xs:annotation>
6    <xs:import namespace="http://www.w3.org/XML/1998/namespace" schemaLocation="xml.xsd"/>
7    <xs:element name="itineraryInProcess" type="itineraryInProcessType"/>
8    <xs:complexType name="itineraryInProcessType">
9      <xs:sequence>
10       <xs:element ref="passengers"/>
11       <xs:element ref="eventList"/>
12     </xs:sequence>
13     <xs:attribute ref="xml:lang" use="required"/>
14   </xs:complexType>
15   <xs:element name="passengers" type="passengersType"/>
16   <xs:complexType name="passengersType">
17     <xs:sequence>
18       <xs:element ref="adult"/>
19       <xs:element ref="children"/>
20     </xs:sequence>
21   </xs:complexType>
22   <xs:element name="adult" type="xs:integer"/>
23   <xs:element name="children" type="xs:integer"/>
24   <xs:element name="eventList" type="eventListType"/>
25   <xs:complexType name="eventListType">
26     <xs:choice minOccurs="0" maxOccurs="unbounded">
27       <xs:element ref="travel"/>
28       <xs:element ref="stay"/>
29     </xs:choice>
30   </xs:complexType>
31   <xs:element name="travel" type="travelType"/>
32   <xs:complexType name="travelType">
33     <xs:sequence>
34       <xs:element ref="source"/>
35       <xs:element ref="destination"/>
36       <xs:element ref="method" minOccurs="0" maxOccurs="1"/>
37     </xs:sequence>
38     <xs:attribute name="status" type="xs:string" use="required"/>
39   </xs:complexType>
40   <xs:element name="source" type="sourceType"/>
41   <xs:complexType name="sourceType">
42     <xs:sequence>
43       <xs:element ref="place"/>
44       <xs:element ref="earliestDepartureTime" minOccurs="0" maxOccurs="1"/>
45     </xs:sequence>
46     <xs:attribute name="type" type="xs:string" use="required"/>
47   </xs:complexType>
48   <xs:element name="destination" type="destinationType"/>
49   <xs:complexType name="destinationType">
50     <xs:sequence>
51       <xs:element ref="place"/>
52       <xs:element ref="latestArrivalTime" minOccurs="0" maxOccurs="1"/>
53     </xs:sequence>
54     <xs:attribute name="type" type="xs:string" use="required"/>
55   </xs:complexType>
56   <xs:element name="place" type="placeType"/>
57   <xs:complexType name="placeType">
58     <xs:simpleContent>
59       <xs:extension base="xs:string">
60         <xs:attribute ref="xml:lang" use="optional"/>
61       </xs:extension>
62     </xs:simpleContent>
63   </xs:complexType>
64   <xs:element name="earliestDepartureTime" type="xs:dateTime"/>
65   <xs:element name="latestArrivalTime" type="xs:dateTime"/>
66   <xs:element name="method" type="methodType"/>
67   <xs:complexType name="methodType">
68     <xs:sequence>
69       <xs:element ref="identifier"/>
70       <xs:element ref="departureTime"/>
71       <xs:element ref="arrivalTime"/>
72     </xs:sequence>
73   </xs:complexType>
74   <xs:element name="identifier" type="identifierType"/>
75   <xs:complexType name="identifierType">
76     <xs:simpleContent>
77       <xs:extension base="xs:string">
78         <xs:attribute ref="xml:lang" use="optional"/>
79       </xs:extension>
80     </xs:simpleContent>
81   </xs:complexType>
82   <xs:element name="departureTime" type="xs:dateTime"/>
83   <xs:element name="arrivalTime" type="xs:dateTime"/>
84   <xs:element name="stay" type="stayType"/>
85   <xs:complexType name="stayType">
86     <xs:sequence>
87       <xs:element ref="place"/>
88       <xs:element ref="arrivalDate"/>
89       <xs:element ref="departureDate"/>
90     </xs:sequence>
91     <xs:attribute name="status" type="xs:string" use="required"/>
92   </xs:complexType>
93   <xs:element name="arrivalDate" type="xs:date"/>
94   <xs:element name="departureDate" type="xs:date"/>
95 </xs:schema>
```

FIG.42

```
1  <?xml version="1.0" encoding="Shift_JIS"?>
2  <itineraryInProcess xmlns:xsi="http://www.w3.org/2001/XMLSchema-instance"
   xsi:noNamespaceSchemaLocation="itineraryInProcess.xsd xmlValidator.xsd" xml:lang="ja">
3   <passengers contentType="mixed">
4    <adult contentType="xs:integer">2</adult>
5    <children contentType="xs:integer">1</children>
6   A child is three-year-old.
7   </passengers>
8   <eventList>
9    <travel status="reserved">
10    <source type="station">
11     <place xml:lang="ja" contentType="xs:string">JR Tokaido Main Line Ofuna station</place>
12    </source>
13    <destination type="station">
14     <place xml:lang="ja" contentType="xs:string">JR Narita Line Narita-Airport station</place>
15    </destination>
16    <method>
17     <identifier xml:lang="ja" contentType="xs:string">Narita Express 100 the number 1 car, 1A,1B,2A,2B</identifier>
18     <departureTime contentType="xs:dateTime">2005-02-25T13:35:00+09:00</departureTime>
19     <arrivalTime contentType="xs:dateTime">2005-02-25T15:25:00+09:00</arrivalTime>
20    </method>
21   </travel>
22   <travel status="reserved">
23    <source type="airport">
24     <place xml:lang="en" contentType="xs:string">NRT</place>
25     <earliestDepartureTime contentType="xs:dateTime">2005-02-25T15:25:00+09:00</earliestDepartureTime>
26    </source>
27    <destination type="airport">
28     <place xml:lang="en" contentType="xs:string">HNL</place>
29    </destination>
30    <method>
31     <identifier xml:lang="ja" contentType="xs:string">Japan Airlines Flight 80</identifier>
32     <departureTime contentType="xs:dateTime">2005-02-25T18:30:00+09:00</departureTime>
33     <arrivalTime contentType="xs:dateTime">2005-02-25T06:45:00-10:00</arrivalTime>
34    </method>
35   </travel>
36   <travel status="requested">
37    <source type="rent-a-car">
38     <place/>
39     <earliestDepartureTime contentType="xs:dateTime">2005-02-25T06:45:00-10:00</earliestDepartureTime>
40    </source>
41    <destination type="accommodation">
42     <place/>
43    </destination>
44   </travel>
45   <stay status="inactive">
46    <place/>
47    <arrivalDate contentType="xs:date">2005-02-25-10:00</arrivalDate>
48    <departureDate contentType="xs:date">2005-03-02-10:00</departureDate>
49   </stay>
50   <travel status="requested">
51    <source type="accomodation">
52     <place/>
53    </source>
54    <destination type="rent-a-car">
55     <place/>
56     <latestArrivalTime contentType="xs:dateTime">2005-03-02T07:25:00-10:00</latestArrivalTime>
57    </destination>
58   </travel>
59   <travel status="reserved">
60    <source type="airport">
61     <place xml:lang="en" contentType="xs:string">HNL</place>
62    </source>
63    <destination type="airport">
64     <place xml:lang="en" contentType="xs:string">NRT</place>
65     <latestArrivalTime contentType="xs:dateTime">2005-03-03T13:45:00+09:00</latestArrivalTime>
66    </destination>
67    <method>
68     <identifier xml:lang="ja" contentType="xs:string">All Nippon Airways Flight 7025</identifier>
69     <departureTime contentType="xs:dateTime">2005-03-02T09:25:00-10:00</departureTime>
70     <arrivalTime contentType="xs:dateTime">2005-03-03T13:35:00+09:00</arrivalTime>
71    </method>
72   </travel>
73   <travel status="reserved">
74    <source type="station">
75     <place xml:lang="ja" contentType="xs:string">JR Narita Line Narita-Airport station</place>
76    </source>
77    <destination type="station">
78     <place xml:lang="ja" contentType="xs:string">JR Tokaido Main Line Tsujido station</place>
79    </destination>
80    <method>
81     <identifier xml:lang="ja" contentType="xs:string">Narita Express 101 the number 2 car, 1A,1B,2A,2B</identifier>
82     <departureTime contentType="xs:string">2005-03-03T14:45:00+09:00</departureTime>
83     <arrivalTime contentType="xs:string">2005-03-03T16:40:00+09:00</arrivalTime>
84    </method>
85   </travel>
86  </eventList>
87 </itineraryInProcess>
```

FIG.44

```
1    DOCUMENT: #document
2    ELEMENT: itineraryInProcess
3     ATTRIBUTE: "xml:lang"
4      TEXT: "ja"
5     ATTRIBUTE: "xmlns:xsi"
6      TEXT: "http://www.w3.org/2001/XMLSchema-instance"
7     ATTRIBUTE: "xsi:noNamespaceSchemaLocation"
8      TEXT: "itineraryInProcess.xsd"
9     ELEMENT: passengers
10     ELEMENT: adult
11      TEXT: "2"
12     ELEMENT: children
13      TEXT: "1"
14    ELEMENT: eventList
15     ELEMENT: travel
16      ATTRIBUTE: "status"
17       TEXT: "reserved"
18      ELEMENT: source
19       ATTRIBUTE: "type"
20        TEXT: "station"
21       ELEMENT: place
22        ATTRIBUTE: "xml:lang"
23         TEXT: "ja"
25       ELEMENT: earliestDepartureTime
26        TEXT: "2005-02-25T12:00:00+09:00"
27       ELEMENT: destination
28        ATTRIBUTE: "type"
29         TEXT: "station"
30        ELEMENT: place
31         ATTRIBUTE: "xml:lang"
32          TEXT: "ja"
34        ELEMENT: method
35         ELEMENT: identifier
36          ATTRIBUTE: "xml:lang"
37           TEXT: "ja"
39         ELEMENT: departureTime
40          TEXT: "2005-02-25T13:35:00+09:00"
41         ELEMENT: arrivalTime
42          TEXT: "2005-02-25T15:25:00+09:00"
43      ELEMENT: travel
44       ATTRIBUTE: "status"
45        TEXT: "reserved"
46       ELEMENT: source
47        ATTRIBUTE: "type"
48         TEXT: "airport"
49        ELEMENT: place
50         ATTRIBUTE: "xml:lang"
51          TEXT: "en"
53        ELEMENT: earliestDepartureTime
54         TEXT: "2005-02-25T15:25:00+09:00"
55        ELEMENT: destination
56         ATTRIBUTE: "type"
57          TEXT: "airport"
58         ELEMENT: place
59          ATTRIBUTE: "xml:lang"
60           TEXT: "en"
62         ELEMENT: method
63          ELEMENT: identifier
64           ATTRIBUTE: "xml:lang"
65            TEXT: "ja"
67          ELEMENT: departureTime
68           TEXT: "2005-02-25T18:30:00+09:00"
69          ELEMENT: arrivalTime
70           TEXT: "2005-02-25T06:45:00-10:00"
71       ELEMENT: travel
72        ATTRIBUTE: "status"
73         TEXT: "requested"
74        ELEMENT: source
75         ATTRIBUTE: "type"
76          TEXT: "rent-a-car"
77         ELEMENT: place
78         ELEMENT: earliestDepartureTime
79          TEXT: "2005-02-25T06:45:00-10:00"
80         ELEMENT: destination
81          ATTRIBUTE: "type"
82           TEXT: "accommodation"
83          ELEMENT: place
84         ELEMENT: stay
85          ATTRIBUTE: "status"
86           TEXT: "inactive"
87          ELEMENT: place
88          ELEMENT: arrivalDate
89           TEXT: "2005-02-25-10:00"
90          ELEMENT: departureDate
91           TEXT: "2005-03-02-10:00"
92       ELEMENT: travel
93        ATTRIBUTE: "status"
94         TEXT: "requested"
95        ELEMENT: source
96         ATTRIBUTE: "type"
97          TEXT: "accommodation"
98         ELEMENT: place
99         ELEMENT: destination
100         ATTRIBUTE: "type"
101          TEXT: "rent-a-car"
102         ELEMENT: place
103        ELEMENT: latestArrivalTime
104         TEXT: "2005-03-02T07:25:00-10:00"
105      ELEMENT: travel
106       ATTRIBUTE: "status"
107        TEXT: "reserved"
108       ELEMENT: source
109        ATTRIBUTE: "type"
110         TEXT: "airport"
111        ELEMENT: place
112         ATTRIBUTE: "xml:lang"
113          TEXT: "en"
115        ELEMENT: destination
116         ATTRIBUTE: "type"
117          TEXT: "airport"
118         ELEMENT: place
119          ATTRIBUTE: "xml:lang"
120           TEXT: "en"
122         ELEMENT: latestArrivalTime
123          TEXT: "2005-03-03T13:45:00+09:00"
124         ELEMENT: method
125          ELEMENT: identifier
126           ATTRIBUTE: "xml:lang"
127            TEXT: "ja"
129          ELEMENT: departureTime
130           TEXT: "2005-03-02T09:25:00-10:00"
131          ELEMENT: arrivalTime
132           TEXT: "2005-03-03T13:35:00+09:00"
133       ELEMENT: travel
134        ATTRIBUTE: "status"
135         TEXT: "reserved"
136        ELEMENT: source
137         ATTRIBUTE: "type"
138          TEXT: "station"
139         ELEMENT: place
140          ATTRIBUTE: "xml:lang"
141           TEXT: "ja"
143         ELEMENT: destination
144          ATTRIBUTE: "type"
145           TEXT: "station"
146          ELEMENT: place
147           ATTRIBUTE: "xml:lang"
148            TEXT: "ja"
150          ELEMENT: latestArrivalTime
151           TEXT: "2005-03-03T17:00:00+09:00"
152          ELEMENT: method
153           ELEMENT: identifier
154            ATTRIBUTE: "xml:lang"
155             TEXT: "ja"
157           ELEMENT: departureTime
158            TEXT: "2005-03-03T14:45:00+09:00"
159           ELEMENT: arrivalTime
160            TEXT: "2005-03-03T16:40:00+09:00"
```

FIG.46

```
1  <?xml version="1.0" encoding="Shift_JIS"?>
2  <xs:schema xmlns:xs="http://www.w3.org/2001/XMLSchema">
3    <xs:annotation>
4      <xs:documentation>This schema is for the inineraryInProcess document.
       It is compliant with W3C XML Schema specification </xs:documentation>
5    </xs:annotation>
6    <xs:import namespace="http://www.w3.org/XML/1998/namespace" schemaLocation="xml.xsd"/>
7    <xs:complexType name="integerType">
8      <xs:simpleContent>
9        <xs:extension base="xs:integer">
10         <xs:anyAttribute namespace="##any" processContents="lax"/>
11       </xs:extension>
12     </xs:simpleContent>
13   </xs:complexType>
14   <xs:complexType name="dateTimeType">
15     <xs:simpleContent>
16       <xs:extension base="xs:dateTime">
17         <xs:anyAttribute namespace="##any" processContents="lax"/>
18       </xs:extension>
19     </xs:simpleContent>
20   </xs:complexType>
21   <xs:complexType name="dateType">
22     <xs:simpleContent>
23       <xs:extension base="xs:date">
24         <xs:anyAttribute namespace="##any" processContents="lax"/>
25       </xs:extension>
26     </xs:simpleContent>
27   </xs:complexType>
28   <xs:complexType name="stringType">
29     <xs:simpleContent>
30       <xs:extension base="xs:string">
31         <xs:anyAttribute namespace="##any" processContents="lax"/>
32       </xs:extension>
33     </xs:simpleContent>
34   </xs:complexType>
35   <xs:element name="itineraryInProcess" type="itineraryInProcessType"/>
36   <xs:complexType name="itineraryInProcessType">
37     <xs:sequence>
38       <xs:element ref="passengers"/>
39       <xs:element ref="eventList"/>
40     </xs:sequence>
41     <xs:attribute ref="xml:lang" use="required"/>
42     <xs:anyAttribute namespace="##any" processContents="lax"/>
43   </xs:complexType>
44   <xs:element name="passengers" type="passengersType"/>
45   <xs:complexType name="passengersType">
46     <xs:sequence>
47       <xs:any minOccurs="0" maxOccurs="unbounded" processContents="skip"/>
48     </xs:sequence>
49     <xs:anyAttribute namespace="##any" processContents="lax"/>
50   </xs:complexType>
51   <xs:element name="adult" type="integerType"/>
52   <xs:element name="children" type="integerType"/>
53   <xs:element name="eventList" type="eventListType"/>
54   <xs:complexType name="eventListType">
55     <xs:choice minOccurs="0" maxOccurs="unbounded">
56       <xs:element ref="travel"/>
57       <xs:element ref="stay"/>
58     </xs:choice>
59     <xs:anyAttribute namespace="##any" processContents="lax"/>
60   </xs:complexType>
61   <xs:element name="travel" type="travelType"/>
62   <xs:complexType name="travelType">
63     <xs:sequence>
64       <xs:element ref="source"/>
65       <xs:element ref="destination"/>
66       <xs:element ref="method" minOccurs="0" maxOccurs="1"/>
67     </xs:sequence>
68     <xs:attribute name="status" type="xs:string" use="required"/>
69     <xs:anyAttribute namespace="##any" processContents="lax"/>
70   </xs:complexType>
71   <xs:element name="source" type="sourceType"/>
72   <xs:complexType name="sourceType">
73     <xs:sequence>
74       <xs:element ref="place"/>
75       <xs:element ref="earliestDepartureTime" minOccurs="0" maxOccurs="1"/>
76     </xs:sequence>
77     <xs:attribute name="type" type="xs:string" use="required"/>
78     <xs:anyAttribute namespace="##any" processContents="lax"/>
79   </xs:complexType>
80   <xs:element name="destination" type="destinationType"/>
81   <xs:complexType name="destinationType">
82     <xs:sequence>
83       <xs:element ref="place"/>
84       <xs:element ref="latestArrivalTime" minOccurs="0" maxOccurs="1"/>
85     </xs:sequence>
86     <xs:attribute name="type" type="xs:string" use="required"/>
87     <xs:anyAttribute namespace="##any" processContents="lax"/>
88   </xs:complexType>
89   <xs:element name="place" type="placeType"/>
90   <xs:complexType name="placeType">
91     <xs:simpleContent>
92       <xs:extension base="stringType">
93         <xs:attribute ref="xml:lang" use="optional"/>
94         <xs:anyAttribute namespace="##any" processContents="lax"/>
95       </xs:extension>
96     </xs:simpleContent>
97   </xs:complexType>
98   <xs:element name="earliestDepartureTime" type="dateTimeType"/>
99   <xs:element name="latestArrivalTime" type="dateTimeType"/>
100  <xs:element name="method" type="methodType"/>
101  <xs:complexType name="methodType">
102    <xs:sequence>
103      <xs:element ref="identifier"/>
104      <xs:element ref="departureTime"/>
105      <xs:element ref="arrivalTime"/>
106    </xs:sequence>
107    <xs:anyAttribute namespace="##any" processContents="lax"/>
108  </xs:complexType>
109  <xs:element name="identifier" type="identifierType"/>
110  <xs:complexType name="identifierType">
111    <xs:simpleContent>
112      <xs:extension base="stringType">
113        <xs:attribute ref="xml:lang" use="optional"/>
114        <xs:anyAttribute namespace="##any" processContents="lax"/>
115      </xs:extension>
116    </xs:simpleContent>
117  </xs:complexType>
118  <xs:element name="departureTime" type="dateTimeType"/>
119  <xs:element name="arrivalTime" type="dateTimeType"/>
120  <xs:element name="stay" type="stayType"/>
121  <xs:complexType name="stayType">
122    <xs:sequence>
123      <xs:element ref="place"/>
124      <xs:element ref="arrivalDate"/>
125      <xs:element ref="departureDate"/>
126    </xs:sequence>
127    <xs:attribute name="status" type="xs:string" use="required"/>
128    <xs:anyAttribute namespace="##any" processContents="lax"/>
129  </xs:complexType>
130  <xs:element name="arrivalDate" type="dateType"/>
131  <xs:element name="departureDate" type="dateType"/>
132  </xs:schema>
```

FIG.47

```xml
1  <?xml version="1.0" encoding="Shift_JIS"?>
2  <itineraryInProcess xmlns:xsi="http://www.w3.org/2001/XMLSchema-instance"
   xsi:noNamespaceSchemaLocation="itineraryInProcess.xsd" xml:lang="ja">
3    <passengers>
4      <adult contentModel="any">2</adult>
5      <children contentModel="any">1</children>
6    </passengers>
7    <eventList>
8      <travel status="reserved">
9        <source type="station">
10         <place xml:lang="ja">JR Tokaido Main Line Ofuna station</place>
11         <earliestDepartureTime>2005-02-25T12:00:00+09:00</earliestDepartureTime>
12       </source>
13       <destination type="station">
14         <place xml:lang="ja">JR Narita Line Narita-Airport station</place>
15       </destination>
16       <method>
17         <identifier xml:lang="ja">Narita Express 100 the number 1 car, 1A,1B,2A,2B</identifier>
18         <departureTime>2005-02-25T13:35:00+09:00</departureTime>
19         <arrivalTime>2005-02-25T15:25:00+09:00</arrivalTime>
20       </method>
21     </travel>
22     <travel status="reserved">
23       <source type="airport">
24         <place xml:lang="en">NRT</place>
25         <earliestDepartureTime>2005-02-25T15:25:00+09:00</earliestDepartureTime>
26       </source>
27       <destination type="airport">
28         <place xml:lang="en">HNL</place>
29       </destination>
30       <method>
31         <identifier xml:lang="ja">Japan Airlines Flight 80</identifier>
32         <departureTime>2005-02-25T18:30:00+09:00</departureTime>
33         <arrivalTime>2005-02-25T06:45:00-10:00</arrivalTime>
34       </method>
35     </travel>
36     <travel status="requested">
37       <source type="rent-a-car">
38         <place/>
39         <earliestDepartureTime>2005-02-25T06:45:00-10:00</earliestDepartureTime>
40       </source>
41       <destination type="accommodation">
42         <place/>
43       </destination>
44     </travel>
45     <stay status="inactive">
46       <place/>
47       <arrivalDate>2005-02-25-10:00</arrivalDate>
48       <departureDate>2005-03-02-10:00</departureDate>
49     </stay>
50     <travel status="requested">
51       <source type="accomodation">
52         <place/>
53       </source>
54       <destination type="rent-a-car">
55         <place/>
56         <latestArrivalTime>2005-03-02T07:25:00-10:00</latestArrivalTime>
57       </destination>
58     </travel>
59     <travel status="reserved">
60       <source type="airport">
61         <place xml:lang="en">HNL</place>
62       </source>
63       <destination type="airport">
64         <place xml:lang="en">NRT</place>
65         <latestArrivalTime>2005-03-03T13:45:00+09:00</latestArrivalTime>
66       </destination>
67       <method>
68         <identifier xml:lang="ja">All Nippon Airways Flight 7025</identifier>
69         <departureTime>2005-03-02T09:25:00-10:00</departureTime>
70         <arrivalTime>2005-03-03T13:35:00+09:00</arrivalTime>
71       </method>
72     </travel>
73     <travel status="reserved">
74       <source type="station">
75         <place xml:lang="ja">JR Narita Line Narita-Airport station</place>
76       </source>
77       <destination type="station">
78         <place xml:lang="ja">JR Tokaido Main Line Tsujido station</place>
79         <latestArrivalTime>2005-03-03T17:00:00+09:00</latestArrivalTime>
80       </destination>
81       <method>
82         <identifier xml:lang="ja">Narita Express 101 the number 2 car, 1A,1B,2A,2B</identifier>
83         <departureTime>2005-03-03T14:45:00+09:00</departureTime>
84         <arrivalTime>2005-03-03T16:40:00+09:00</arrivalTime>
85       </method>
86     </travel>
87   </eventList>
88 </itineraryInProcess>
```

FIG.48

```
1   DOCUMENT: #document
2   ELEMENT: itineraryInProcess
3    ATTRIBUTE: "xml:lang"
4     TEXT: "ja"
5    ATTRIBUTE: "xmlns:xsi"
6     TEXT: "http://www.w3.org/2001/XMLSchema-instance"
7    ATTRIBUTE: "xsi:noNamespaceSchemaLocation"
8     TEXT: "itineraryInProcess.xsd"
9    ELEMENT: passengers
10    ELEMENT: adult
11     TEXT: "2"
12    ELEMENT: children
13     TEXT: "1"
14   ELEMENT: eventList
15    ELEMENT: travel
16     ATTRIBUTE: "status"
17      TEXT: "reserved"
18     ELEMENT: source
19      ATTRIBUTE: "type"
20       TEXT: "station"
21      ELEMENT: place
22       ATTRIBUTE: "xml:lang"
23        TEXT: "ja"
24       TEXT: "JR Tokaido Main Line Ofuna station"
25      ELEMENT: earliestDepartureTime
26       TEXT: "2005-02-25T12:00:00+09:00"
27     ELEMENT: destination
28      ATTRIBUTE: "type"
29       TEXT: "station"
30      ELEMENT: place
31       ATTRIBUTE: "xml:lang"
32        TEXT: "ja"
33       TEXT: "JR Narita Line Narita-Airport station"
34     ELEMENT: method
35      ELEMENT: identifier
36       ATTRIBUTE: "xml:lang"
37        TEXT: "ja"
38       TEXT: "Narita Express 100 the number 1 car, 1A,1B,2A,2B"
39      ELEMENT: departureTime
40       TEXT: "2005-02-25T13:35:00+09:00"
41      ELEMENT: arrivalTime
42       TEXT: "2005-02-25T15:25:00+09:00"
43    ELEMENT: travel
44     ATTRIBUTE: "status"
45      TEXT: "reserved"
46     ELEMENT: source
47      ATTRIBUTE: "type"
48       TEXT: "airport"
49      ELEMENT: place
50       ATTRIBUTE: "xml:lang"
51        TEXT: "en"
52       TEXT: "NRT"
53      ELEMENT: earliestDepartureTime
54       TEXT: "2005-02-25T15:25:00+09:00"
55     ELEMENT: destination
56      ATTRIBUTE: "type"
57       TEXT: "airport"
58      ELEMENT: place
59       ATTRIBUTE: "xml:lang"
60        TEXT: "en"
61       TEXT: "HNL"
62     ELEMENT: method
63      ELEMENT: identifier
64       ATTRIBUTE: "xml:lang"
65        TEXT: "ja"
66       TEXT: "Japan Airlines Flight 80"
67      ELEMENT: departureTime
68       TEXT: "2005-02-25T18:30:00+09:00"
69      ELEMENT: arrivalTime
70       TEXT: "2005-02-25T06:45:00-10:00"
71    ELEMENT: travel
72     ATTRIBUTE: "status"
73      TEXT: "requested"
74     ELEMENT: source
75      ATTRIBUTE: "type"
76       TEXT: "rent-a-car"
77      ELEMENT: place
78      ELEMENT: earliestDepartureTime
79       TEXT: "2005-02-25T06:45:00-10:00"
80     ELEMENT: destination
81      ATTRIBUTE: "type"
82       TEXT: "accommodation"
83      ELEMENT: place
84    ELEMENT: stay
85     ATTRIBUTE: "status"
86      TEXT: "inactive"
87     ELEMENT: place
88     ELEMENT: arrivalDate
89      TEXT: "2005-02-25-10:00"
90     ELEMENT: departureDate
91      TEXT: "2005-03-02-10:00"
92    ELEMENT: travel
93     ATTRIBUTE: "status"
94      TEXT: "requested"
95     ELEMENT: source
96      ATTRIBUTE: "type"
97       TEXT: "accomodation"
98      ELEMENT: place
99     ELEMENT: destination
100     ATTRIBUTE: "type"
101      TEXT: "rent-a-car"
102     ELEMENT: place
103    ELEMENT: latestArrivalTime
104     TEXT: "2005-03-02T07:25:00-10:00"
105   ELEMENT: travel
106    ATTRIBUTE: "status"
107     TEXT: "reserved"
108    ELEMENT: source
109     ATTRIBUTE: "type"
110      TEXT: "airport"
111     ELEMENT: place
112      ATTRIBUTE: "xml:lang"
113       TEXT: "en"
114      TEXT: "HNL"
115    ELEMENT: destination
116     ATTRIBUTE: "type"
117      TEXT: "airport"
118     ELEMENT: place
119      ATTRIBUTE: "xml:lang"
120       TEXT: "en"
121      TEXT: "NRT"
122     ELEMENT: latestArrivalTime
123      TEXT: "2005-03-03T13:45:00+09:00"
124    ELEMENT: method
125     ELEMENT: identifier
126      ATTRIBUTE: "xml:lang"
127       TEXT: "ja"
128      TEXT: "All Nippon Airways Flight 7025"
129     ELEMENT: departureTime
130      TEXT: "2005-03-02T09:25:00-10:00"
131     ELEMENT: arrivalTime
132      TEXT: "2005-03-03T13:35:00+09:00"
133   ELEMENT: travel
134    ATTRIBUTE: "status"
135     TEXT: "reserved"
136    ELEMENT: source
137     ATTRIBUTE: "type"
138      TEXT: "station"
139     ELEMENT: place
140      ATTRIBUTE: "xml:lang"
141       TEXT: "ja"
142      TEXT: "JR Narita Line Narita Airport station"
143    ELEMENT: destination
144     ATTRIBUTE: "type"
145      TEXT: "station"
146     ELEMENT: place
147      ATTRIBUTE: "xml:lang"
148       TEXT: "ja"
149      TEXT: "JR Tokaido Main Line Tsujido station"
150    ELEMENT: latestArrivalTime
151     TEXT: "2005-03-03T17:00:00+09:00"
152    ELEMENT: method
153     ELEMENT: identifier
154      ATTRIBUTE: "xml:lang"
155       TEXT: "ja"
156      TEXT: "Narita Express 101 the number 2 car, 1A,1B,2A,2B"
157     ELEMENT: departureTime
158      TEXT: "2005-03-03T14:45:00+09:00"
159     ELEMENT: arrivalTime
160      TEXT: "2005-03-03T16:40:00+09:00"
```

FIG.49

```
1  <!ELEMENT itineraryInProcess (passengers, eventList)>
2  <!ATTLIST itineraryInProcess xml:lang CDATA #REQUIRED>
3  <!ELEMENT passengers (adult, children)>
4  <!ELEMENT adult (#PCDATA)>
5  <!ELEMENT children (#PCDATA)>
6  <!ELEMENT eventList ((travel | stay)*)>
7  <!ELEMENT travel (source, destination, method?)>
8  <!ATTLIST travel status CDATA #REQUIRED>
9  <!ELEMENT source (place, earliestDepartureTime?)>
10 <!ATTLIST source type CDATA #REQUIRED>
11 <!ELEMENT destination (place, latestArrivalTime?)>
12 <!ATTLIST destination type CDATA #REQUIRED>
13 <!ELEMENT place (#PCDATA)>
14 <!ATTLIST place xml:lang CDATA #IMPLIED>
15 <!ELEMENT earliestDepartureTime (#PCDATA)>
16 <!ELEMENT latestArrivalTime (#PCDATA)>
17 <!ELEMENT method (identifier, departureTime, arrivalTime)>
18 <!ELEMENT identifier (#PCDATA)>
19 <!ATTLIST identifier xml:lang CDATA #IMPLIED>
20 <!ELEMENT departureTime (#PCDATA)>
21 <!ELEMENT arrivalTime (#PCDATA)>
22 <!ELEMENT stay (place, arrivalDate, departureDate)>
23 <!ATTLIST stay status CDATA #REQUIRED>
24 <!ELEMENT arrivalDate (#PCDATA)>
25 <!ELEMENT departureDate (#PCDATA)>
```

FIG.50

```xml
1  <?xml version="1.0" encoding="Shift_JIS"?>
2  <itineraryInProcess xmlns:xsi="http://www.w3.org/2001/XMLSchema-instance"
   xsi:noNamespaceSchemaLocation="itineraryInProcess.xsd" xml:lang="ja">
3    <passengers>
4      <adult contentModel="any">2</adult>
5      <children contentModel="any">1</children>
6    </passengers>
7    <eventList>
8      <travel status="reserved">
9        <source type="station">
10         <place xml:lang="ja">JR Tokaido Main Line Ofuna station</place>
11         <earliestDepartureTime>2005-02-25T12:00:00+09:00</earliestDepartureTime>
12       </source>
13       <destination type="station">
14         <place xml:lang="ja">JR Narita Line Narita-Airport station</place>
15       </destination>
16       <method>
17         <identifier xml:lang="ja">Narita Express 100 the number 1 car, 1A,1B,2A,2B</identifier>
18         <departureTime>2005-02-25T13:35:00+09:00</departureTime>
19         <arrivalTime>2005-02-25T15:25:00+09:00</arrivalTime>
20       </method>
21     </travel>
22     <travel status="reserved">
23       <source type="airport">
24         <place xml:lang="en">NRT</place>
25         <earliestDepartureTime>2005-02-25T15:25:00+09:00</earliestDepartureTime>
26       </source>
27       <destination type="airport">
28         <place xml:lang="en">HNL</place>
29       </destination>
30       <method>
31         <identifier xml:lang="ja">Japan Airlines Flight 80</identifier>
32         <departureTime>2005-02-25T18:30:00+09:00</departureTime>
33         <arrivalTime>2005-02-25T06:45:00-10:00</arrivalTime>
34       </method>
35     </travel>
36     <travel status="requested">
37       <source type="rent-a-car">
38         <place/>
39         <earliestDepartureTime>2005-02-25T06:45:00-10:00</earliestDepartureTime>
40       </source>
41       <destination type="accommodation">
42         <place/>
43       </destination>
44     </travel>
45     <stay status="inactive">
46       <place/>
47       <arrivalDate>2005-02-25-10:00</arrivalDate>
48       <departureDate>2005-03-02-10:00</departureDate>
49     </stay>
50     <travel status="requested">
51       <source type="accomodation">
52         <place/>
53       </source>
54       <destination type="rent-a-car">
55         <place/>
56         <latestArrivalTime>2005-03-02T07:25:00-10:00</latestArrivalTime>
57       </destination>
58     </travel>
59     <travel status="reserved">
60       <source type="airport">
61         <place xml:lang="en">HNL</place>
62       </source>
63       <destination type="airport">
64         <place xml:lang="en">NRT</place>
65         <latestArrivalTime>2005-03-03T13:45:00+09:00</latestArrivalTime>
66       </destination>
67       <method>
68         <identifier xml:lang="ja">All Nippon Airways Flight 7C25</identifier>
69         <departureTime>2005-03-02T09:25:00-10:00</departureTime>
70         <arrivalTime>2005-03-03T13:35:00+09:00</arrivalTime>
71       </method>
72     </travel>
73     <travel status="reserved">
74       <source type="station">
75         <place xml:lang="ja">JR Narita Line Narita-Airport station</place>
76       </source>
77       <destination type="station">
78         <place xml:lang="ja">JR Tokaido Main Line Tsujido station</place>
79         <latestArrivalTime>2005-03-03T17:00:00+09:00</latestArrivalTime>
80       </destination>
81       <method>
82         <identifier xml:lang="ja">Narita Express 101 the number 2 car, 1A,1B,2A,2B</identifier>
83         <departureTime>2005-03-03T14:45:00+09:00</departureTime>
84         <arrivalTime>2005-03-03T16:40:00+09:00</arrivalTime>
85       </method>
86     </travel>
87   </eventList>
88 </itineraryInProcess>
```

FIG.51

```xml
1  <?xml version="1.0" encoding="Shift_JIS"?>
2  <!DOCTYPE itineraryInProcess SYSTEM "itineraryInProcess.dtd">
3  <itineraryInProcess xml:lang="ja">
4    <passengers>
5      <adult>2</adult>
6      <children>1</children>
7    </passengers>
8    <eventList>
9      <travel status="reserved">
10       <source type="station">
11         <place xml:lang="ja">JR Tokaido Main Line Ofuna station</place>
12         <earliestDepartureTime>2005-02-25T12:00:00+09:00</earliestDepartureTime>
13       </source>
14       <destination type="station">
15         <place xml:lang="ja">JR Narita Line Narita-Airport station</place>
16       </destination>
17       <method>
18         <identifier xml:lang="ja">Narita Express 100 the number 1 car, 1A,1B,2A,2B</identifier>
19         <departureTime>2005-02-25T13:35:00+09:00</departureTime>
20         <arrivalTime>2005-02-25T15:25:00+09:00</arrivalTime>
21       </method>
22     </travel>
23     <travel status="reserved">
24       <source type="airport">
25         <place xml:lang="en">NRT</place>
26         <earliestDepartureTime>2005-02-25T15:25:00+09:00</earliestDepartureTime>
27       </source>
28       <destination type="airport">
29         <place xml:lang="en">HNL</place>
30       </destination>
31       <method>
32         <identifier xml:lang="ja">Japan Airlines Flight 80</identifier>
33         <departureTime>2005-02-25T18:30:00+09:00</departureTime>
34         <arrivalTime>2005-02-25T06:45:00-10:00</arrivalTime>
35       </method>
36     </travel>
37     <travel status="requested">
38       <source type="rent-a-car">
39         <place/>
40         <earliestDepartureTime>2005-02-25T06:45:00-10:00</earliestDepartureTime>
41       </source>
42       <destination type="accommodation">
43         <place/>
44       </destination>
45     </travel>
46     <stay status="inactive">
47       <place/>
48       <arrivalDate>2005-02-25-10:00</arrivalDate>
49       <departureDate>2005-03-02-10:00</departureDate>
50     </stay>
51     <travel status="requested">
52       <source type="accomodation">
53         <place/>
54       </source>
55       <destination type="rent-a-car">
56         <place/>
57         <latestArrivalTime>2005-03-02T07:25:00-10:00</latestArrivalTime>
58       </destination>
59     </travel>
60     <travel status="reserved">
61       <source type="airport">
62         <place xml:lang="en">HNL</place>
63       </source>
64       <destination type="airport">
65         <place xml:lang="en">NRT</place>
66         <latestArrivalTime>2005-03-03T13:45:00+09:00</latestArrivalTime>
67       </destination>
68       <method>
69         <identifier xml:lang="ja">All Nippon Airways Flight 7025</identifier>
70         <departureTime>2005-03-02T09:25:00-10:00</departureTime>
71         <arrivalTime>2005-03-03T13:35:00+09:00</arrivalTime>
72       </method>
73     </travel>
74     <travel status="reserved">
75       <source type="station">
76         <place xml:lang="ja">JR Narita Line Narita-Airport station</place>
77       </source>
78       <destination type="station">
79         <place xml:lang="ja">JR Tokaido Main Line Tsujido station</place>
80         <latestArrivalTime>2005-03-03T17:00:00+09:00</latestArrivalTime>
81       </destination>
82       <method>
83         <identifier xml:lang="ja">Narita Express 101 the number 2 car, 1A,1B,2A,2B</identifier>
84         <departureTime>2005-03-03T14:45:00+09:00</departureTime>
85         <arrivalTime>2005-03-03T16:40:00+09:00</arrivalTime>
86       </method>
87     </travel>
88   </eventList>
89 </itineraryInProcess>
```

FIG.53

| | | | |
|---|---|---|---|
| 1 | DOCUMENT: #document | 81 | ATTRIBUTE: "type" |
| 2 | ELEMENT: itineraryInProcess | 82 | TEXT: "accommodation" |
| 3 | ATTRIBUTE: "xml:lang" | 83 | ELEMENT: place |
| 4 | TEXT: "ja" | 84 | ELEMENT: stay |
| 5 | ATTRIBUTE: "xmlns:xsi" | 85 | ATTRIBUTE: "status" |
| 6 | TEXT: "http://www.w3.org/2001/XMLSchema-instance" | 86 | TEXT: "inactive" |
| 7 | ATTRIBUTE: "xsi:noNamespaceSchemaLocation" | 87 | ELEMENT: place |
| 8 | TEXT: "itineraryInProcess.xsd" | 88 | ELEMENT: arrivalDate |
| 9 | ELEMENT: passengers | 90 | ELEMENT: departureDate |
| 10 | ELEMENT: adult | 92 | ELEMENT: travel |
| 12 | ELEMENT: children | 93 | ATTRIBUTE: "status" |
| 14 | ELEMENT: eventList | 94 | TEXT: "requested" |
| 15 | ELEMENT: travel | 95 | ELEMENT: source |
| 16 | ATTRIBUTE: "status" | 96 | ATTRIBUTE: "type" |
| 17 | TEXT: "reserved" | 97 | TEXT: "accomodation" |
| 18 | ELEMENT: source | 98 | ELEMENT: place |
| 19 | ATTRIBUTE: "type" | 99 | ELEMENT: destination |
| 20 | TEXT: "station" | 100 | ATTRIBUTE: "type" |
| 21 | ELEMENT: place | 101 | TEXT: "rent-a-car" |
| 22 | ATTRIBUTE: "xml:lang" | 102 | ELEMENT: place |
| 23 | TEXT: "ja" | 103 | ELEMENT: latestArrivalTime |
| 25 | ELEMENT: earliestDepartureTime | 105 | ELEMENT: travel |
| 27 | ELEMENT: destination | 106 | ATTRIBUTE: "status" |
| 28 | ATTRIBUTE: "type" | 107 | TEXT: "reserved" |
| 29 | TEXT: "station" | 108 | ELEMENT: source |
| 30 | ELEMENT: place | 109 | ATTRIBUTE: "type" |
| 31 | ATTRIBUTE: "xml:lang" | 110 | TEXT: "airport" |
| 32 | TEXT: "ja" | 111 | ELEMENT: place |
| 34 | ELEMENT: method | 112 | ATTRIBUTE: "xml:lang" |
| 35 | ELEMENT: identifier | 113 | TEXT: "en" |
| 36 | ATTRIBUTE: "xml:lang" | 115 | ELEMENT: destination |
| 37 | TEXT: "ja" | 116 | ATTRIBUTE: "type" |
| 39 | ELEMENT: departureTime | 117 | TEXT: "airport" |
| 41 | ELEMENT: arrivalTime | 118 | ELEMENT: place |
| 43 | ELEMENT: travel | 119 | ATTRIBUTE: "xml:lang" |
| 44 | ATTRIBUTE: "status" | 120 | TEXT: "en" |
| 45 | TEXT: "reserved" | 122 | ELEMENT: latestArrivalTime |
| 46 | ELEMENT: source | 124 | ELEMENT: method |
| 47 | ATTRIBUTE: "type" | 125 | ELEMENT: identifier |
| 48 | TEXT: "airport" | 126 | ATTRIBUTE: "xml:lang" |
| 49 | ELEMENT: place | 127 | TEXT: "ja" |
| 50 | ATTRIBUTE: "xml:lang" | 129 | ELEMENT: departureTime |
| 51 | TEXT: "en" | 131 | ELEMENT: arrivalTime |
| 53 | ELEMENT: earliestDepartureTime | 133 | ELEMENT: travel |
| 55 | ELEMENT: destination | 134 | ATTRIBUTE: "status" |
| 56 | ATTRIBUTE: "type" | 135 | TEXT: "reserved" |
| 57 | TEXT: "airport" | 136 | ELEMENT: source |
| 58 | ELEMENT: place | 137 | ATTRIBUTE: "type" |
| 59 | ATTRIBUTE: "xml:lang" | 138 | TEXT: "station" |
| 60 | TEXT: "en" | 139 | ELEMENT: place |
| 62 | ELEMENT: method | 140 | ATTRIBUTE: "xml:lang" |
| 63 | ELEMENT: identifier | 141 | TEXT: "ja" |
| 64 | ATTRIBUTE: "xml:lang" | 143 | ELEMENT: destination |
| 65 | TEXT: "ja" | 144 | ATTRIBUTE: "type" |
| 67 | ELEMENT: departureTime | 145 | TEXT: "station" |
| 69 | ELEMENT: arrivalTime | 146 | ELEMENT: place |
| 71 | ELEMENT: travel | 147 | ATTRIBUTE: "xml:lang" |
| 72 | ATTRIBUTE: "status" | 148 | TEXT: "ja" |
| 73 | TEXT: "requested" | 150 | ELEMENT: latestArrivalTime |
| 74 | ELEMENT: source | 152 | ELEMENT: method |
| 75 | ATTRIBUTE: "type" | 153 | ELEMENT: identifier |
| 76 | TEXT: "rent-a-car" | 154 | ATTRIBUTE: "xml:lang" |
| 77 | ELEMENT: place | 155 | TEXT: "ja" |
| 78 | ELEMENT: earliestDepartureTime | 157 | ELEMENT: departureTime |
| 80 | ELEMENT: destination | 159 | ELEMENT: arrivalTime |

FIG.54

```
1  <!ELEMENT itineraryInProcess (passengers, eventList)>
2  <!ATTLIST itineraryInProcess xml:lang CDATA #REQUIRED>
3  <!ELEMENT passengers ANY>
4  <!ATTLIST passengers contentModel CDATA #IMPLIED>
5  <!ELEMENT adult (#PCDATA)>
6  <!ATTLIST adult contentModel CDATA #IMPLIED>
7  <!ELEMENT children (#PCDATA)>
8  <!ATTLIST children contentModel CDATA #IMPLIED>
9  <!ELEMENT eventList ((travel | stay)*)>
10 <!ATTLIST eventList contentModel CDATA #IMPLIED>
11 <!ELEMENT travel (source, destination, method?)>
12 <!ATTLIST travel status CDATA #REQUIRED>
13 <!ATTLIST travel contentModel CDATA #IMPLIED>
14 <!ELEMENT source (place, earliestDepartureTime?)>
15 <!ATTLIST source type CDATA #REQUIRED>
16 <!ATTLIST source contentModel CDATA #IMPLIED>
17 <!ELEMENT destination (place, latestArrivalTime?)>
18 <!ATTLIST destination type CDATA #REQUIRED>
19 <!ATTLIST destination contentModel CDATA #IMPLIED>
20 <!ELEMENT place (#PCDATA)>
21 <!ATTLIST place xml:lang CDATA #IMPLIED>
22 <!ATTLIST place contentModel CDATA #IMPLIED>
23 <!ELEMENT earliestDepartureTime (#PCDATA)>
24 <!ATTLIST earliestDepartureTime contentModel CDATA #IMPLIED>
25 <!ELEMENT latestArrivalTime (#PCDATA)>
26 <!ATTLIST latestArrivalTime contentModel CDATA #IMPLIED>
27 <!ELEMENT method (identifier, departureTime, arrivalTime)>
28 <!ATTLIST method contentModel CDATA #IMPLIED>
29 <!ELEMENT identifier (#PCDATA)>
30 <!ATTLIST identifier contentModel CDATA #IMPLIED>
31 <!ATTLIST identifier xml:lang CDATA #IMPLIED>
32 <!ELEMENT departureTime (#PCDATA)>
33 <!ATTLIST departureTime contentModel CDATA #IMPLIED>
34 <!ELEMENT arrivalTime (#PCDATA)>
35 <!ATTLIST arrivalTime contentModel CDATA #IMPLIED>
36 <!ELEMENT stay (place, arrivalDate, departureDate)>
37 <!ATTLIST stay status CDATA #REQUIRED>
38 <!ATTLIST stay contentModel CDATA #IMPLIED>
39 <!ELEMENT arrivalDate (#PCDATA)>
40 <!ATTLIST arrivalDate contentModel CDATA #IMPLIED>
41 <!ELEMENT departureDate (#PCDATA)>
42 <!ATTLIST departureDate contentModel CDATA #IMPLIED>
```

FIG.55

```
1  <?xml version="1.0" encoding="Shift_JIS"?>
2  <itineraryInProcess xmlns:xsi="http://www.w3.org/2001/XMLSchema-instance"
   xsi:noNamespaceSchemaLocation="itineraryInProcess.dtd" xml:lang="ja">
3    <passengers contentModel="any">
4      <adult>2</adult>
5      <children>1</children>
6  A child is three-year-old.
7    </passengers>
8    <eventList>
9      <travel status="reserved">
10       <source type="station">
11         <place xml:lang="ja">JR Tokaido Main Line Ofuna station</place>
12         <earliestDepartureTime>2005-02-25T12:00:00+09:00</earliestDepartureTime>
13       </source>
14       <destination type="station">
15         <place xml:lang="ja">JR Narita Line Narita-Airport station</place>
16       </destination>
17       <method>
18         <identifier xml:lang="ja">Narita Express 100 the number 1 car, 1A,1B,2A,2B</identifier>
19         <departureTime>2005-02-25T13:35:00+09:00</departureTime>
20         <arrivalTime>2005-02-25T15:25:00+09:00</arrivalTime>
21       </method>
22     </travel>
23     <travel status="reserved">
24       <source type="airport">
25         <place xml:lang="en">NRT</place>
26         <earliestDepartureTime>2005-02-25T15:25:00-09:00</earliestDepartureTime>
27       </source>
28       <destination type="airport">
29         <place xml:lang="en">HNL</place>
30       </destination>
31       <method>
32         <identifier xml:lang="ja">Japan Airlines Flight 80</identifier>
33         <departureTime>2005-02-25T18:30:00+09:00</departureTime>
34         <arrivalTime>2005-02-25T06:45:00-10:00</arrivalTime>
35       </method>
36     </travel>
37     <travel status="requested">
38       <source type="rent-a-car">
39         <place/>
40         <earliestDepartureTime>2005-02-25T06:45:00-10:00</earliestDepartureTime>
41       </source>
42       <destination type="accommodation">
43         <place/>
44       </destination>
45     </travel>
46     <stay status="inactive">
47       <place/>
48       <arrivalDate>2005-02-25-10:00</arrivalDate>
49       <departureDate>2005-03-02-10:00</departureDate>
50     </stay>
51     <travel status="requested">
52       <source type="accomodation">
53         <place/>
54       </source>
55       <destination type="rent-a-car">
56         <place/>
57         <latestArrivalTime>2005-03-02T07:25:00-10:00</latestArrivalTime>
58       </destination>
59     </travel>
60     <travel status="reserved">
61       <source type="airport">
62         <place xml:lang="en">HNL</place>
63       </source>
64       <destination type="airport">
65         <place xml:lang="en">NRT</place>
66         <latestArrivalTime>2005-03-03T13:45:00+09:00</latestArrivalTime>
67       </destination>
68       <method>
69         <identifier xml:lang="ja">All Nippon Airways Flight 7025</identifier>
70         <departureTime>2005-03-02T09:25:00-10:00</departureTime>
71         <arrivalTime>2005-03-03T13:35:00+09:00</arrivalTime>
72       </method>
73     </travel>
74     <travel status="reserved">
75       <source type="station">
76         <place xml:lang="ja">JR Narita Line Narita-Airport station</place>
77       </source>
78       <destination type="station">
79         <place xml:lang="ja">JR Tokaido Main Line Tsujido station</place>
80         <latestArrivalTime>2005-03-03T17:00:00+09:00</latestArrivalTime>
81       </destination>
82       <method>
83         <identifier xml:lang="ja">Narita Express 101 the number 2 car, 1A,1B,2A,2B</identifier>
84         <departureTime>2005-03-03T14:45:00+09:00</departureTime>
85         <arrivalTime>2005-03-03T16:40:00+09:00</arrivalTime>
86       </method>
87     </travel>
88   </eventList>
89 </itineraryInProcess>
```

Figures 59, 60:
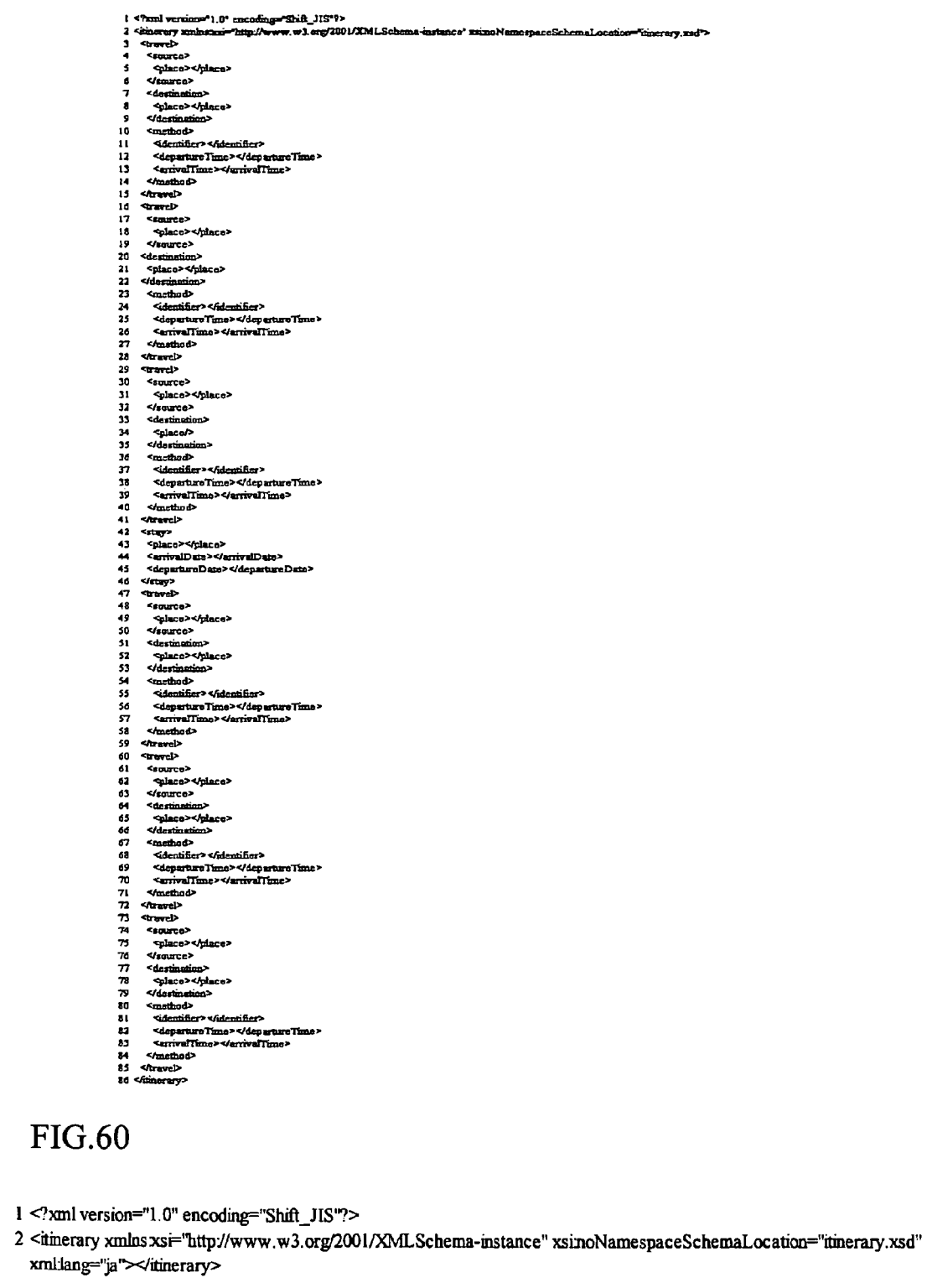

```
1 <?xml version="1.0" encoding="Shift_JIS"?>
2 <itinerary xmlns:xsi="http://www.w3.org/2001/XMLSchema-instance" xsi:noNamespaceSchemaLocation="itinerary.xsd"
   xml:lang="ja"></itinerary>
```

FIG.61

```
1 <?xml version="1.0" encoding="Shift_JIS"?>
2 <travel xmlns:xsi="http://www.w3.org/2001/XMLSchema-instance" xsi:noNamespaceSchemaLocation="itinerary.xsd"></travel>
```

FIG.62

```
1 <?xml version="1.0" encoding="Shift_JIS"?>
2 <source xmlns:xsi="http://www.w3.org/2001/XMLSchema-instance" xsi:noNamespaceSchemaLocation="itinerary.xsd"
    type="station">2</source>
```

FIG.63

```
1 <?xml version="1.0" encoding="Shift_JIS"?>
2 <place xmlns:xsi="http://www.w3.org/2001/XMLSchema-instance" xsi:noNamespaceSchemaLocation="itinerary.xsd"
    xml:lang="ja">JR Tokaido Main Line Ofuna station</place>
```

FIG.64

```
1 <?xml version="1.0" encoding="Shift_JIS"?>
2 <destination xmlns:xsi="http://www.w3.org/2001/XMLSchema-instance" xsi:noNamespaceSchemaLocation="itinerary.xsd"
    type="station"></destination>
```

FIG.65

```
1 <?xml version="1.0" encoding="Shift_JIS"?>
2 <place xmlns:xsi="http://www.w3.org/2001/XMLSchema-instance" xsi:noNamespaceSchemaLocation="itinerary.xsd"
    xml:lang="ja">JR Narita Line Narita-Airport station</place>
```

FIG.66

```
1 <?xml version="1.0" encoding="Shift_JIS"?>
2 <method xmlns:xsi="http://www.w3.org/2001/XMLSchema-instance" xsi:noNamespaceSchemaLocation="itinerary.xsd"></method>
```

FIG.67

```
1 <?xml version="1.0" encoding="Shift_JIS"?>
2 <identifier xmlns:xsi="http://www.w3.org/2001/XMLSchema-instance" xsi:noNamespaceSchemaLocation="itinerary.xsd"
  xml:lang="ja">Narita Express 100 the number 1 car, 1A,1B,2A,2B</identifier>
```

FIG.68

```
1 <?xml version="1.0" encoding="Shift_JIS"?>
2 <departureTime xmlns:xsi="http://www.w3.org/2001/XMLSchema-instance" xsi:noNamespaceSchemaLocation="itinerary.xsd">2005-
  02-25T13:35:00+09:00</departureTime>
```

FIG.69

```
1 <?xml version="1.0" encoding="Shift_JIS"?>
2 <arrivalTime xmlns:xsi="http://www.w3.org/2001/XMLSchema-instance" xsi:noNamespaceSchemaLocation="itinerary.xsd">2005-02-
  25T15:25:00+09:00</arrivalTime>
```

FIG.70

```
1 <?xml version="1.0" encoding="Shift_JIS"?>
2 <place xmlns:xsi="http://www.w3.org/2001/XMLSchema-instance" xsi:noNamespaceSchemaLocation="itinerary.xsd"
  xml:lang="ja">Ambassador Hotel of Waikiki</place>
```

FIG.71

```xml
1  <?xml version="1.0" encoding="Shift_JIS"?>
2  <xs:schema xmlns:xs="http://www.w3.org/2001/XMLSchema">
3  <xs:import namespace="http://www.w3.org/XML/1998/namespace" schemaLocation="xml.xsd"/>
4  <xs:element name="itinerary" type="itineraryType"/>
5  <xs:complexType name="itineraryType">
6    <xs:choice minOccurs="0" maxOccurs="unbounded">
7      <xs:element ref="travel"/>
8      <xs:element ref="stay"/>
9    </xs:choice>
10   <xs:attribute ref="xml:lang" use="optional"/>
11 </xs:complexType>
12 <xs:element name="travel" type="travelType"/>
13 <xs:complexType name="travelType">
14   <xs:sequence>
15     <xs:element ref="source"/>
16     <xs:element ref="destination"/>
17     <xs:element ref="method" minOccurs="0" maxOccurs="1"/>
18   </xs:sequence>
19 </xs:complexType>
20 <xs:element name="source" type="sourceType"/>
21 <xs:complexType name="sourceType">
22   <xs:sequence>
23     <xs:element ref="place"/>
24   </xs:sequence>
25   <xs:attribute name="type" type="xs:string" use="optional"/>
26 </xs:complexType>
27 <xs:element name="destination" type="destinationType"/>
28 <xs:complexType name="destinationType">
29   <xs:sequence>
30     <xs:element ref="place"/>
31   </xs:sequence>
32   <xs:attribute name="type" type="xs:string" use="optional"/>
33 </xs:complexType>
34 <xs:element name="place" type="placeType" nillable="true"/>
35 <xs:complexType name="placeType">
36   <xs:simpleContent>
37     <xs:extension base="xs:string">
38       <xs:attribute ref="xml:lang" use="optional"/>
39     </xs:extension>
40   </xs:simpleContent>
41 </xs:complexType>
42 <xs:element name="method" type="methodType"/>
43 <xs:complexType name="methodType">
44   <xs:sequence>
45     <xs:element ref="identifier"/>
46     <xs:element ref="departureTime"/>
47     <xs:element ref="arrivalTime"/>
48   </xs:sequence>
49 </xs:complexType>
50 <xs:element name="identifier" type="identifierType" nillable="true"/>
51 <xs:complexType name="identifierType">
52   <xs:simpleContent>
53     <xs:extension base="xs:string">
54       <xs:attribute ref="xml:lang" use="optional"/>
55     </xs:extension>
56   </xs:simpleContent>
57 </xs:complexType>
58 <xs:element name="departureTime" type="xs:dateTime" nillable="true"/>
59 <xs:element name="arrivalTime" type="xs:dateTime" nillable="true"/>
60 <xs:element name="stay" type="stayType"/>
61 <xs:complexType name="stayType">
62   <xs:sequence>
63     <xs:element ref="place"/>
64     <xs:element ref="arrivalDate"/>
65     <xs:element ref="departureDate"/>
66   </xs:sequence>
67 </xs:complexType>
68 <xs:element name="arrivalDate" type="xs:date" nillable="true"/>
69 <xs:element name="departureDate" type="xs:date" nillable="true"/>
70 </xs:schema>
```

FIG.72

```
1  <?xml version="1.0" encoding="Shift_JIS"?>
2  <xs:schema xmlns:xs="http://www.w3.org/2001/XMLSchema">
3    <xs:import namespace="http://www.w3.org/XML/1998/namespace" schemaLocation="xml.xsd"/>
4    <xs:element name="itinerary" type="itineraryType"/>
5    <xs:complexType name="itineraryType">
6      <xs:simpleContent>
7        <xs:extension base="xs:string">
8          <xs:attribute ref="xml:lang" use="required"/>
9        </xs:extension>
10     </xs:simpleContent>
11   </xs:complexType>
12 </xs:schema>
```

FIG.73

```
1  <?xml version="1.0" encoding="Shift_JIS"?>
2  <xs:schema xmlns:xs="http://www.w3.org/2001/XMLSchema">
3    <xs:element name="travel" type="travelType"/>
4    <xs:complexType name="travelType">
5      <xs:complexContent>
6        <xs:restriction base="xs:anyType"/>
7      </xs:complexContent>
8    </xs:complexType>
9  </xs:schema>
```

FIG.74

```
1  <?xml version="1.0" encoding="Shift_JIS"?>
2  <xs:schema xmlns:xs="http://www.w3.org/2001/XMLSchema">
3    <xs:element name="source" type="sourceType"/>
4    <xs:complexType name="sourceType">
5      <xs:simpleContent>
6        <xs:extension base="xs:string">
7          <xs:attribute name="type" type="xs:string" use="required"/>
8        </xs:extension>
9      </xs:simpleContent>
10   </xs:complexType>
11 </xs:schema>
```

FIG.75

```
1  <?xml version="1.0" encoding="Shift_JIS"?>
2  <xs:schema xmlns:xs="http://www.w3.org/2001/XMLSchema">
3   <xs:import namespace="http://www.w3.org/XML/1998/namespace" schemaLocation="xml.xsd"/>
4   <xs:element name="place" type="placeType"/>
5   <xs:complexType name="placeType">
6    <xs:simpleContent>
7     <xs:extension base="xs:string">
8      <xs:attribute ref="xml:lang" use="required"/>
9     </xs:extension>
10   </xs:simpleContent>
11  </xs:complexType>
12 </xs:schema>
```

FIG.76

```
1  <?xml version="1.0" encoding="Shift_JIS"?>
2  <xs:schema xmlns:xs="http://www.w3.org/2001/XMLSchema">
3   <xs:element name="destination" type="destinationType"/>
4   <xs:complexType name="destinationType">
5    <xs:simpleContent>
6     <xs:extension base="xs:string">
7      <xs:attribute name="type" type="xs:string" use="required"/>
8     </xs:extension>
9    </xs:simpleContent>
10  </xs:complexType>
11 </xs:schema>
```

FIG.77

```
1  <?xml version="1.0" encoding="Shift_JIS"?>
2  <xs:schema xmlns:xs="http://www.w3.org/2001/XMLSchema">
3   <xs:import namespace="http://www.w3.org/XML/1998/namespace" schemaLocation="xml.xsd"/>
4   <xs:element name="place" type="placeType"/>
5   <xs:complexType name="placeType">
6    <xs:simpleContent>
7     <xs:extension base="xs:string">
8      <xs:attribute ref="xml:lang" use="required"/>
9     </xs:extension>
10   </xs:simpleContent>
11  </xs:complexType>
12 </xs:schema>
```

FIG.78

```
1 <?xml version="1.0" encoding="Shift_JIS"?>
2 <xs:schema xmlns:xs="http://www.w3.org/2001/XMLSchema">
3   <xs:element name="method" type="methodType"/>
4   <xs:complexType name="methodType">
5     <xs:complexContent>
6       <xs:restriction base="xs:anyType"/>
7     </xs:complexContent>
8   </xs:complexType>
9 </xs:schema>
```

FIG.79

```
1  <?xml version="1.0" encoding="Shift_JIS"?>
2  <xs:schema xmlns:xs="http://www.w3.org/2001/XMLSchema">
3    <xs:element name="identifier" type="identifierType"/>
4    <xs:complexType name="identifierType">
5      <xs:simpleContent>
6        <xs:extension base="xs:string">
7          <xs:attribute name="lang" type="xs:language" use="required"/>
8        </xs:extension>
9      </xs:simpleContent>
10   </xs:complexType>
11 </xs:schema>
```

FIG.80

```
1 <?xml version="1.0" encoding="Shift_JIS"?>
2 <xs:schema xmlns:xs="http://www.w3.org/2001/XMLSchema">
3   <xs:element name="departureTime" type="xs:dateTime"/>
4 </xs:schema>
```

FIG.81

```
1 <?xml version="1.0" encoding="Shift_JIS"?>
2 <xs:schema xmlns:xs="http://www.w3.org/2001/XMLSchema">
3   <xs:element name="arrivalTime" type="xs:dateTime"/>
4 </xs:schema>
```

FIG.82

```
1  <?xml version="1.0" encoding="Shift_JIS"?>
2  <xs:schema xmlns:xs="http://www.w3.org/2001/XMLSchema">
3    <xs:import namespace="http://www.w3.org/XML/1998/namespace" schemaLocation="xml.xsd"/>
4    <xs:element name="place" type="placeType"/>
5    <xs:complexType name="placeType">
6      <xs:simpleContent>
7        <xs:extension base="xs:string">
8          <xs:attribute ref="xml:lang" use="required"/>
9        </xs:extension>
10     </xs:simpleContent>
11   </xs:complexType>
12 </xs:schema>
```

FIG.84

```xml
1  <?xml version="1.0" encoding="Shift_JIS"?>
2  <itinerary xmlns:xsi="" xsi:noNamespaceSchemaLocation="" xml:lang="ja">
3    <travel>
4      <source type="">
5        <place xml:lang="ja"></place>
6      </source>
7      <destination type="">
8        <place xml:lang="ja"></place>
9      </destination>
10     <method>
11       <identifier xml:lang="ja"></identifier>
12       <departureTime></departureTime>
13       <arrivalTime></arrivalTime>
14     </method>
15   </travel>
16   <travel>
17     <source type="">
18       <place xml:lang="ja"></place>
19     </source>
20     <destination type="">
21       <place xml:lang="ja"></place>
22     </destination>
23     <method>
24       <identifier xml:lang="ja"></identifier>
25       <departureTime></departureTime>
26       <arrivalTime></arrivalTime>
27     </method>
28   </travel>
29   <travel>
30     <source type="">
31       <place xml:lang="ja"></place>
32     </source>
33     <destination type="">
34       <place/>
35     </destination>
36     <method>
37       <identifier xml:lang="ja"></identifier>
38       <departureTime></departureTime>
39       <arrivalTime></arrivalTime>
40     </method>
41   </travel>
42   <stay>
43     <place xml:lang="ja"></place>
44     <arrivalDate></arrivalDate>
45     <departureDate></departureDate>
46   </stay>
47   <travel>
48     <source type="">
49       <place xml:lang="ja"></place>
50     </source>
51     <destination type="">
52       <place xml:lang="ja"></place>
53     </destination>
54     <method>
55       <identifier xml:lang="ja"></identifier>
56       <departureTime></departureTime>
57       <arrivalTime></arrivalTime>
58     </method>
59   </travel>
60   <travel>
61     <source type="">
62       <place xml:lang="ja"></place>
63     </source>
64     <destination type="">
65       <place xml:lang="ja"></place>
66     </destination>
67     <method>
68       <identifier xml:lang="ja"></identifier>
69       <departureTime></departureTime>
70       <arrivalTime></arrivalTime>
71     </method>
72   </travel>
73   <travel>
74     <source type="">
75       <place xml:lang="ja"></place>
76     </source>
77     <destination type="">
78       <place xml:lang="ja"></place>
79     </destination>
80     <method>
81       <identifier xml:lang="ja"></identifier>
82       <departureTime></departureTime>
83       <arrivalTime></arrivalTime>
84     </method>
85   </travel>
86 </itinerary>
```

FIG.85

```
1  <?xml version="1.0" encoding="Shift_JIS"?>
2  <xs:schema xmlns:xs="http://www.w3.org/2001/XMLSchema">
3   <xs:annotation>
4    <xs:documentation>This schema is for the itineraryInProcess document.  It is compliant with W3C XML Schema
      specification.</xs:documentation>
5   </xs:annotation>
6   <xs:import namespace="http://www.w3.org/XML/1998/namespace" schemaLocation="xml.xsd"/>
7   <xs:element name="itineraryInProcess" type="itineraryInProcessType"/>
8   <xs:complexType name="itineraryInProcessType">
9    <xs:sequence>
10    <xs:element ref="passengers"/>
11    <xs:element ref="eventList"/>
12   </xs:sequence>
13   <xs:attribute ref="xml:lang" use="required"/>
14  </xs:complexType>
15  <xs:element name="passengers" type="passengersType"/>
16  <xs:complexType name="passengersType">
17   <xs:sequence>
18    <xs:element ref="adult"/>
19    <xs:element ref="children"/>
20   </xs:sequence>
21  </xs:complexType>
22  <xs:element name="adult" type="xs:integer"/>
23  <xs:element name="children" type="xs:integer"/>
24  <xs:element name="eventList" type="eventListType"/>
25  <xs:complexType name="eventListType">
26   <xs:choice minOccurs="0" maxOccurs="unbounded">
27    <xs:element ref="travel"/>
28    <xs:element ref="stay"/>
29   </xs:choice>
30  </xs:complexType>
31  <xs:element name="travel" type="travelType"/>
32  <xs:complexType name="travelType">
33   <xs:sequence>
34    <xs:element ref="source"/>
35    <xs:element ref="destination"/>
36    <xs:element ref="method" minOccurs="0" maxOccurs="1"/>
37   </xs:sequence>
38   <xs:attribute name="status" type="xs:string" use="required"/>
39  </xs:complexType>
40  <xs:element name="source" type="sourceType"/>
41  <xs:complexType name="sourceType">
42   <xs:sequence>
43    <xs:element ref="place"/>
44    <xs:element ref="earliestDepartureTime" minOccurs="0" maxOccurs="1"/>
45   </xs:sequence>
46   <xs:attribute name="type" type="xs:string" use="required"/>
47  </xs:complexType>
48  <xs:element name="destination" type="destinationType"/>
49  <xs:complexType name="destinationType">
50   <xs:sequence>
51    <xs:element ref="place"/>
52    <xs:element ref="latestArrivalTime" minOccurs="0" maxOccurs="1"/>
53   </xs:sequence>
54   <xs:attribute name="type" type="xs:string" use="required"/>
55  </xs:complexType>
56  <xs:element name="place" type="placeType"/>
57  <xs:complexType name="placeType">
58   <xs:simpleContent>
59    <xs:extension base="xs:string">
60     <xs:attribute ref="xml:lang" use="optional"/>
61    </xs:extension>
62   </xs:simpleContent>
63  </xs:complexType>
64  <xs:element name="earliestDepartureTime" type="xs:dateTime"/>
65  <xs:element name="latestArrivalTime" type="xs:dateTime"/>
66  <xs:element name="method" type="methodType"/>
67  <xs:complexType name="methodType">
68   <xs:sequence>
69    <xs:element ref="identifier"/>
70    <xs:element ref="departureTime"/>
71    <xs:element ref="arrivalTime"/>
72   </xs:sequence>
73  </xs:complexType>
74  <xs:element name="identifier" type="identifierType"/>
75  <xs:complexType name="identifierType">
76   <xs:simpleContent>
77    <xs:extension base="xs:string">
78     <xs:attribute ref="xml:lang" use="optional"/>
79    </xs:extension>
80   </xs:simpleContent>
81  </xs:complexType>
82  <xs:element name="departureTime" type="xs:dateTime"/>
83  <xs:element name="arrivalTime" type="xs:dateTime"/>
84  <xs:element name="stay" type="stayType"/>
85  <xs:complexType name="stayType">
86   <xs:sequence>
87    <xs:element ref="place"/>
88    <xs:element ref="arrivalDate"/>
89    <xs:element ref="departureDate"/>
90   </xs:sequence>
91   <xs:attribute name="status" type="xs:string" use="required"/>
92  </xs:complexType>
93  <xs:element name="arrivalDate" type="xs:date"/>
94  <xs:element name="departureDate" type="xs:date"/>
95 </xs:schema>
```

| structure/ATTRIBUTE VALUE | LOCATION PATH | OLD DIGEST VALUE | NEW DIGEST VALUE | IDENTICAL |
|---|---|---|---|---|
| true | /itinerary | 2a796a18462 1aa0e0d6552619 5ca2c1b | 2a796a18462 1aa0e0d6552619 5ca2c1b | YES |
| false | /itinerary | 489b3e447b90b398d68194bb02c2b3a8 | 489b3e447b90b398d68194bb02c2b3a8 | YES |
| false | /itinerary/travel[1] | 9851851 6f001fd72f4162bbb1d56dcf9 | 9851851 6f001fd72f4162bbb1d56dcf9 | YES |
| false | /itinerary/travel[1]/source | e14c40987d84b0852c37f6e4d2291f99 | e14c40987d84b0852c37f6e4d2291f99 | YES |
| false | /itinerary/travel[1]/source/place | 39f0f096858de3c5f8106f318fc09413 | 39f0f096858de3c5f8106f318fc09413 | YES |
| false | /itinerary/travel[1]/destination | 19cfc9098724b4ac392650eb2202d7d3 | 19cfc9098724b4ac392650eb2202d7d3 | YES |
| false | /itinerary/travel[1]/destination/place | 22a5230ec03302cea80a0a4be7ea7e90 | 22a5230ec03302cea80a0a4be7ea7e90 | YES |
| false | /itinerary/travel[1]/method/place | 06e34339b5ce191df12335db0538528d | 06e34339b5ce191df12335db0538528d | YES |
| false | /itinerary/travel[1]/method/identifier | 5c2dc83bd263339236edb6badca1695b | 5c2dc83bd263339236edb6badca1695b | YES |
| false | /itinerary/travel[1]/method/departureTime | aa0d7d0e512acfc7a5a00d395dd95c26 | aa0d7d0e512acfc7a5a00d395dd95c26 | YES |
| false | /itinerary/travel[1]/method/arrivalTime | 033daa3ac29e030f14af3337887506ff | 033daa3ac29e030f14af3337887506ff | YES |
| false | /itinerary/stay[1]/place | 38119dc787834 86d11f22c95df37b32d | ac3524c877e5a7e186b10d63cfc0687b | NO |

FIG.88

```xml
1  <?xml version="1.0" encoding="Shift_JIS"?>
2  <soapenv:Envelope xmlns:soapenv="http://schemas.xmlsoap.org/soap/envelope">
3    <soapenv:Header>
4      <digest structure="true" text="true" attribute="true" path="itineraryInProcess" validity="true"></digest>
5      <modification path="itineraryInProcess/travel[2]" subtree="true"/>
6      <modification path="itineraryInProcess/travel[5]" subtree="true"/>
7    </soapenv:Header>
8    <soapenv:Body>
9      <itineraryInProcess xmlns:xsi="http://www.w3.org/2001/XMLSchema-instance"
         xsi:noNamespaceSchemaLocation="itineraryInProcess.xsd" xml:lang="ja">
10       <passengers>
11         <adult>2</adult>
12         <children>1</children>
13       </passengers>
14       <eventList>
15         <travel status="reserved">
16           <source type="station">
17             <place xml:lang="ja">JR Tokaido Main Line Ofuna station</place>
18             <earliestDepartureTime>2005-02-25T12:00:00+09:00</earliestDepartureTime>
19           </source>
20           <destination type="station">
21             <place xml:lang="ja">JR Narita Line Narita-Airport station</place>
22           </destination>
23           <method>
24             <identifier xml:lang="ja">Narita Express 100 the number 1 car, 1A,1B,2A,2B</identifier>
25             <departureTime>2005-02-25T12:35:00+09:00</departureTime>
26             <arrivalTime>2005-02-25T15:25:00+09:00</arrivalTime>
27           </method>
28         </travel>
29         <travel status="requested">
30           <source type="airport">
31             <place xml:lang="en">NRT</place>
32             <earliestDepartureTime>2005-02-25T15:25:00+09:00</earliestDepartureTime>
33           </source>
34           <destination type="airport">
35             <place xml:lang="en">HNL</place>
36           </destination>
37         </travel>
38         <travel status="inactive">
39           <source type="rent-a-car">
40             <place/>
41           </source>
42           <destination type="accommodation">
43             <place/>
44           </destination>
45         </travel>
46         <stay status="inactive">
47           <place/>
48           <arrivalDate>2005-02-25-10:00</arrivalDate>
49           <departureDate>2005-03-02-10:00</departureDate>
50         </stay>
51         <travel status="inactive">
52           <source type="accommodation">
53             <place/>
54           </source>
55           <destination type="rent-a-car">
56             <place/>
57           </destination>
58         </travel>
59         <travel status="requested">
60           <source type="airport">
61             <place xml:lang="en">HNL</place>
62           </source>
63           <destination type="airport">
64             <place xml:lang="en">NRT</place>
65             <latestArrivalTime>2005-03-03T13:45:00+09:00</latestArrivalTime>
66           </destination>
67         </travel>
68         <travel status="reserved">
69           <source type="station">
70             <place xml:lang="ja">JR Narita Line Narita-Airport station</place>
71           </source>
72           <destination type="station">
73             <place xml:lang="ja">JR Tokaido Main Line Tsujido station</place>
74             <latestArrivalTime>2005-03-03T17:00:00+09:00</latestArrivalTime>
75           </destination>
76           <method>
77             <identifier xml:lang="ja">Narita Express 101 the number 2 car, 1A,1B,2A,2B</identifier>
78             <departureTime>2005-03-03T14:45:00+09:00</departureTime>
79             <arrivalTime>2005-03-03T16:40:00+09:00</arrivalTime>
80           </method>
81         </travel>
82       </eventList>
83     </itineraryInProcess>
84   </soapenv:Body>
85 </soapenv:Envelope>
```

FIG.89

```
1  <?xml version="1.0" encoding="Shift_JIS"?>
2  <soapenv:Envelope xmlns:soapenv="http://schemas.xmlsoap.org/soap/envelope">
3    <soapenv:Header>
4      <digest structure="true" text="true" attribute="true" path="itineraryInProcess" validity="true"
       exclusionPath="itineraryInProcess/travel[2] itineraryInProcess/travel[5]">6a184621aa0e0d65526195ce2c1f2a79</digest>
5      <digest structure="true" text="true" attribute="true" path="itineraryInProcess/travel[2]" subtree="true"
       validity="true">3e447b90b398d68194bf02c2b3a8489b</digest>
6      <digest structure="true" text="true" attribute="true" path="itineraryInProcess/travel[5]" subtree="true"
       validity="true">8516f001fd72f4162bbb1d56dcf99851</digest>
7    </soapenv:Header>
8    <soapenv:Body>
9      <itineraryInProcess xmlns:xsi="http://www.w3.org/2001/XMLSchema-instance"
       xsi:noNamespaceSchemaLocation="itineraryInProcess.xsd" xml:lang="ja">
10       <passengers>
11         <adult>2</adult>
12         <children>1</children>
13       </passengers>
14       <eventList>
15         <travel status="reserved">
16           <source type="station">
17             <place xml:lang="ja">JR Tokaido Main Line Ofuna station</place>
18             <earliestDepartureTime>2005-02-25T12:00:00+09:00</earliestDepartureTime>
19           </source>
20           <destination type="station">
21             <place xml:lang="ja">JR Narita Line Narita-Airport station</place>
22           </destination>
23           <method>
24             <identifier xml:lang="ja">Narita Express 100 the number 1 car, 1A,1B,2A,2B</identifier>
25             <departureTime>2005-02-25T13:35:00+09:00</departureTime>
26             <arrivalTime>2005-02-25T15:25:00+09:00</arrivalTime>
27           </method>
28         </travel>
29         <travel status="requested">
30           <source type="airport">
31             <place xml:lang="en">NRT</place>
32             <earliestDepartureTime>2005-02-25T15:25:00+09:00</earliestDepartureTime>
33           </source>
34           <destination type="airport">
35             <place xml:lang="en">HNL</place>
36           </destination>
37         </travel>
38         <travel status="inactive">
39           <source type="rent-a-car">
40             <place/>
41           </source>
42           <destination type="accommodation">
43             <place/>
44           </destination>
45         </travel>
46         <stay status="inactive">
47           <place/>
48           <arrivalDate>2005-02-25-10:00</arrivalDate>
49           <departureDate>2005-03-02-10:00</departureDate>
50         </stay>
51         <travel status="inactive">
52           <source type="accomodation">
53             <place/>
54           </source>
55           <destination type="rent-a-car">
56             <place/>
57           </destination>
58         </travel>
59         <travel status="requested">
60           <source type="airport">
61             <place xml:lang="en">HNL</place>
62           </source>
63           <destination type="airport">
64             <place xml:lang="en">NRT</place>
65             <latestArrivalTime>2005-03-03T13:45:00+09:00</latestArrivalTime>
66           </destination>
67         </travel>
68         <travel status="reserved">
69           <source type="station">
70             <place xml:lang="ja">JR Narita Line Narita-Airport station</place>
71           </source>
72           <destination type="station">
73             <place xml:lang="ja">JR Tokaido Main Line Tsurido station</place>
74             <latestArrivalTime>2005-03-03T17:00:00+09:00</latestArrivalTime>
75           </destination>
76           <method>
77             <identifier xml:lang="ja">Narita Express 101 the number 2 car, 1A,1B,2A,2B</identifier>
78             <departureTime>2005-03-03T14:45:00+09:00</departureTime>
79             <arrivalTime>2005-03-03T16:40:00+09:00</arrivalTime>
80           </method>
81         </travel>
82       </eventList>
83     </itineraryInProcess>
84   </soapenv:Body>
85 </soapenv:Envelope>
```

FIG.90

```xml
 1  <?xml version="1.0" encoding="Shift_JIS"?>
 2  <soapenv:Envelope xmlns:soapenv='http://schemas.xmlsoap.org/soap/envelope/'>
 3    <soapenv:Header>
 4      <digest structure="true" text="true" attribute="true" path="itineraryInProcess" validity="true"
    exclusionPath="itineraryInProcess/travel[2] itineraryInProcess/travel[5]">6a184621aa0e0d65526195ca2c1b2a79</digest>
 5      <digest structure="true" text="true" attribute="true" path="itineraryInProcess/travel[2]" subtree="true"
    validity="true">3e447b90b393d68194bb02c2b3a8489b</digest>
 6      <digest structure="true" text="true" attribute="true" path="itineraryInProcess/travel[5]" subtree="true"
    validity="true">8516f0015d72f4162bbb1d56dc399851</digest>
 7    </soapenv:Header>
 8    <soapenv:Body>
 9      <itineraryInProcess xmlns:xsi="http://www.w3.org/2001/XMLSchema-instance"
    xsi:noNamespaceSchemaLocation="itineraryInProcess.xsd" xml:lang="ja">
10        <passengers>
11          <adult>2</adult>
12          <children>1</children>
13        </passengers>
14        <eventList>
15          <travel status="reserved">
16            <source type="station">
17              <place xml:lang="ja">JR Tokaido Main Line Ofuna station</place>
18              <earliestDepartureTime>2005-02-25T12:00:00+09:00</earliestDepartureTime>
19            </source>
20            <destination type="station">
21              <place xml:lang="ja">JR Narita Line Narita-Airport station</place>
22            </destination>
23            <method>
24              <identifier xml:lang="ja">Narita Express 10: the number 1 car, 1A,1B,2A,2B</identifier>
25              <departureTime>2005-02-25T13:35:00+09:00</departureTime>
26              <arrivalTime>2005-02-25T15:25:00+09:00</arrivalTime>
27            </method>
28          </travel>
29          <travel status="reserved">
30            <source type="airport">
31              <place xml:lang="en">NRT</place>
32              <earliestDepartureTime>2005-02-25T15:25:00+09:00</earliestDepartureTime>
33            </source>
34            <destination type="airport">
35              <place xml:lang="en">HNL</place>
36            </destination>
37            <method>
38              <identifier xml:lang="ja">Japan Airlines Flight 80</identifier>
39              <departureTime>2005-02-25T18:30:00+09:00</departureTime>
40              <arrivalTime>2005-02-25T06:45:00-10:00</arrivalTime>
41            </method>
42          </travel>
43          <travel status="inactive">
44            <source type="rent-a-car">
45              <place/>
46            </source>
47            <destination type="accommodation">
48              <place/>
49            </destination>
50          </travel>
51          <stay status="inactive">
52            <place/>
53            <arrivalDate>2005-02-25-10:00</arrivalDate>
54            <departureDate>2005-03-02-10:00</departureDate>
55          </stay>
56          <travel status="inactive">
57            <source type="accomodation">
58              <place/>
59            </source>
60            <destination type="rent-a-car">
61              <place/>
62            </destination>
63          </travel>
64          <travel status="requested">
65            <source type="airport">
66              <place xml:lang="en">HNL</place>
67            </source>
68            <destination type="airport">
69              <place xml:lang="en">NRT</place>
70              <latestArrivalTime>2005-03-03T13:45:00+09:00</latestArrivalTime>
71            </destination>
72          </travel>
73          <travel status="reserved">
74            <source type="station">
75              <place xml:lang="ja">JR Narita Line Narita-Airport station</place>
76            </source>
77            <destination type="station">
78              <place xml:lang="ja">JR Tokaido Main Line Tsurido station</place>
79              <latestArrivalTime>2005-03-03T17:00:00+09:00</latestArrivalTime>
80            </destination>
81            <method>
82              <identifier xml:lang="ja">Narita Express 10: the number 2 car, 1A,1B,2A,2B</identifier>
83              <departureTime>2005-03-03T14:45:00+09:00</departureTime>
84              <arrivalTime>2005-03-03T16:40:00+09:00</arrivalTime>
85            </method>
86          </travel>
87        </eventList>
88      </itineraryInProcess>
89    </soapenv:Body>
90  </soapenv:Envelope>
```

FIG.91

| VALUE OF path ATTRIBUTE | VALUE OF exclusionPath ATTRIBUTE | OLD DIGEST VALUE | NEW DIGEST VALUE |
|---|---|---|---|
| /itinerary | itineraryInProcess/travel[2] itineraryInProcess/travel[5] | dd0d7e60355f44950388e009c2a55027 | dd0d7e60355f44950388e009c2a55027 |
| /itineraryInProcess/travel[2] | NO ATTRIBUTE | e13e3eea80676963f22427eeb2db3d9b | 1acc241feac24481e5d9eccad56a0e |
| /itineraryInProcess/travel[5] | NO ATTRIBUTE | a0e19ada0ba09dfc7f6f340ac85fd897 | a0e19ada0ba09dfc7f6f340ac85fd897 |

FIG.94

```
1  <?xml version="1.0" encoding="Shift_JIS"?>
2  <xs:schema xmlns:xs="http://www.w3.org/2001/XMLSchema">
3   <xs:annotation>
4    <xs:documentation>This schema is for the itineraryInProcess document.  It is compliant with W3C XML Schema specification.
      Appearance of children element just below passengers element is changed as an option.  </xs:documentation>
5   </xs:annotation>
6   <xs:import namespace="http://www.w3.org/XML/1998/namespace" schemaLocation="xml.xsd"/>
7   <xs:element name="itineraryInProcess" type="itineraryInProcessType"/>
8   <xs:complexType name="itineraryInProcessType">
9    <xs:sequence>
10    <xs:element ref="passengers"/>
11    <xs:element ref="eventList"/>
12   </xs:sequence>
13   <xs:attribute ref="xml:lang" use="required"/>
14  </xs:complexType>
15  <xs:element name="passengers" type="passengersType"/>
16  <xs:complexType name="passengersType">
17   <xs:sequence>
18    <xs:element ref="adult"/>
19    <xs:element ref="children" minOccurs="0"/>
20   </xs:sequence>
21  </xs:complexType>
22  <xs:element name="adult" type="xs:integer"/>
23  <xs:element name="children" type="xs:integer"/>
24  <xs:element name="eventList" type="eventListType"/>
25  <xs:complexType name="eventListType">
26   <xs:choice minOccurs="0" maxOccurs="unbounded">
27    <xs:element ref="travel"/>
28    <xs:element ref="stay"/>
29   </xs:choice>
30  </xs:complexType>
31  <xs:element name="travel" type="travelType"/>
32  <xs:complexType name="travelType">
33   <xs:sequence>
34    <xs:element ref="source"/>
35    <xs:element ref="destination"/>
36    <xs:element ref="method" minOccurs="0" maxOccurs="1"/>
37   </xs:sequence>
38   <xs:attribute name="status" type="xs:string" use="required"/>
39  </xs:complexType>
40  <xs:element name="source" type="sourceType"/>
41  <xs:complexType name="sourceType">
42   <xs:sequence>
43    <xs:element ref="place"/>
44    <xs:element ref="earliestDepartureTime" minOccurs="0" maxOccurs="1"/>
45   </xs:sequence>
46   <xs:attribute name="type" type="xs:string" use="required"/>
47  </xs:complexType>
48  <xs:element name="destination" type="destinationType"/>
49  <xs:complexType name="destinationType">
50   <xs:sequence>
51    <xs:element ref="place"/>
52    <xs:element ref="latestArrivalTime" minOccurs="0" maxOccurs="1"/>
53   </xs:sequence>
54   <xs:attribute name="type" type="xs:string" use="required"/>
55  </xs:complexType>
56  <xs:element name="place" type="placeType"/>
57  <xs:complexType name="placeType">
58   <xs:simpleContent>
59    <xs:extension base="xs:string">
60     <xs:attribute ref="xml:lang" use="optional"/>
61    </xs:extension>
62   </xs:simpleContent>
63  </xs:complexType>
64  <xs:element name="earliestDepartureTime" type="xs:dateTime"/>
65  <xs:element name="latestArrivalTime" type="xs:dateTime"/>
66  <xs:element name="method" type="methodType"/>
67  <xs:complexType name="methodType">
68   <xs:sequence>
69    <xs:element ref="identifier"/>
70    <xs:element ref="departureTime"/>
71    <xs:element ref="arrivalTime"/>
72   </xs:sequence>
73  </xs:complexType>
74  <xs:element name="identifier" type="identifierType"/>
75  <xs:complexType name="identifierType">
76   <xs:simpleContent>
77    <xs:extension base="xs:string">
78     <xs:attribute ref="xml:lang" use="optional"/>
79    </xs:extension>
80   </xs:simpleContent>
81  </xs:complexType>
82  <xs:element name="departureTime" type="xs:dateTime"/>
83  <xs:element name="arrivalTime" type="xs:dateTime"/>
84  <xs:element name="stay" type="stayType"/>
85  <xs:complexType name="stayType">
86   <xs:sequence>
87    <xs:element ref="place"/>
88    <xs:element ref="arrivalDate"/>
89    <xs:element ref="departureDate"/>
90   </xs:sequence>
91   <xs:attribute name="status" type="xs:string" use="required"/>
92  </xs:complexType>
93  <xs:element name="arrivalDate" type="xs:date"/>
94  <xs:element name="departureDate" type="xs:date"/>
95 </xs:schema>
```

FIG.95

```xml
1  <?xml version="1.0" encoding="Shift_JIS"?>
2  <soapenv:Envelope xmlns:soapenv="http://schemas.xmlsoap.org/soap/envelope/">
3   <soapenv:Header>
4    <digest structure="true" text="true" attribute="true" path="itineraryInProcess" type="document" validity="true"></digest>
5    <digest structure="true" text="true" attribute="true" path="itineraryInProcess" type="schema"></digest>
6   </soapenv:Header>
7   <soapenv:Body>
8    <itineraryInProcess xmlns:xsi="http://www.w3.org/2001/XMLSchema-instance"
     xsi:noNamespaceSchemaLocation="itineraryInProcess.xsd" xml:lang="ja">
9     <passengers>
10      <adult>2</adult>
11      <children>1</children>
12     </passengers>
13     <eventList>
14      <travel status="reserved">
15       <source type="station">
16        <place xml:lang="ja">JR Tokaido Main Line Ofuna station</place>
17        <earliestDepartureTime>2005-02-25T12:00:00+09:00</earliestDepartureTime>
18       </source>
19       <destination type="station">
20        <place xml:lang="ja">JR Narita Line Narita-Airport station</place>
21       </destination>
22       <method>
23        <identifier xml:lang="ja">Narita Express 100 the number 1 car, 1A,1B,2A,2B</identifier>
24        <departureTime>2005-02-25T13:35:00+09:00</departureTime>
25        <arrivalTime>2005-02-25T15:25:00+09:00</arrivalTime>
26       </method>
27      </travel>
28      <travel status="reserved">
29       <source type="airport">
30        <place xml:lang="en">NRT</place>
31        <earliestDepartureTime>2005-02-25T15:25:00+09:00</earliestDepartureTime>
32       </source>
33       <destination type="airport">
34        <place xml:lang="en">HNL</place>
35       </destination>
36       <method>
37        <identifier xml:lang="ja">Japan Airlines Flight 80</identifier>
38        <departureTime>2005-02-25T18:30:00+09:00</departureTime>
39        <arrivalTime>2005-02-25T06:45:00-10:00</arrivalTime>
40       </method>
41      </travel>
42      <travel status="inactive">
43       <source type="rent-a-car">
44        <place/>
45       </source>
46       <destination type="accommodation">
47        <place/>
48       </destination>
49      </travel>
50      <stay status="inactive">
51       <place/>
52       <arrivalDate>2005-02-25-10:00</arrivalDate>
53       <departureDate>2005-03-02-10:00</departureDate>
54      </stay>
55      <travel status="inactive">
56       <source type="accomodation">
57        <place/>
58       </source>
59       <destination type="rent-a-car">
60        <place/>
61       </destination>
62      </travel>
63      <travel status="requested">
64       <source type="airport">
65        <place xml:lang="en">HNL</place>
66       </source>
67       <destination type="airport">
68        <place xml:lang="en">NRT</place>
69        <latestArrivalTime>2005-03-03T13:45:00+09:00</latestArrivalTime>
70       </destination>
71      </travel>
72      <travel status="reserved">
73       <source type="station">
74        <place xml:lang="ja">JR Narita Line Narita-Airport station</place>
75       </source>
76       <destination type="station">
77        <place xml:lang="ja">JR Tokaido Main Line Tsujido station</place>
78        <latestArrivalTime>2005-03-03T17:00:00+09:00</latestArrivalTime>
79       </destination>
80       <method>
81        <identifier xml:lang="ja">Narita Express 101 the number 2 car, 1A,1B,2A,2B</identifier>
82        <departureTime>2005-03-03T14:45:00+09:00</departureTime>
83        <arrivalTime>2005-03-03T16:40:00+09:00</arrivalTime>
84       </method>
85      </travel>
86     </eventList>
87    </itineraryInProcess>
88   </soapenv:Body>
89  </soapenv:Envelope>
```

FIG.103

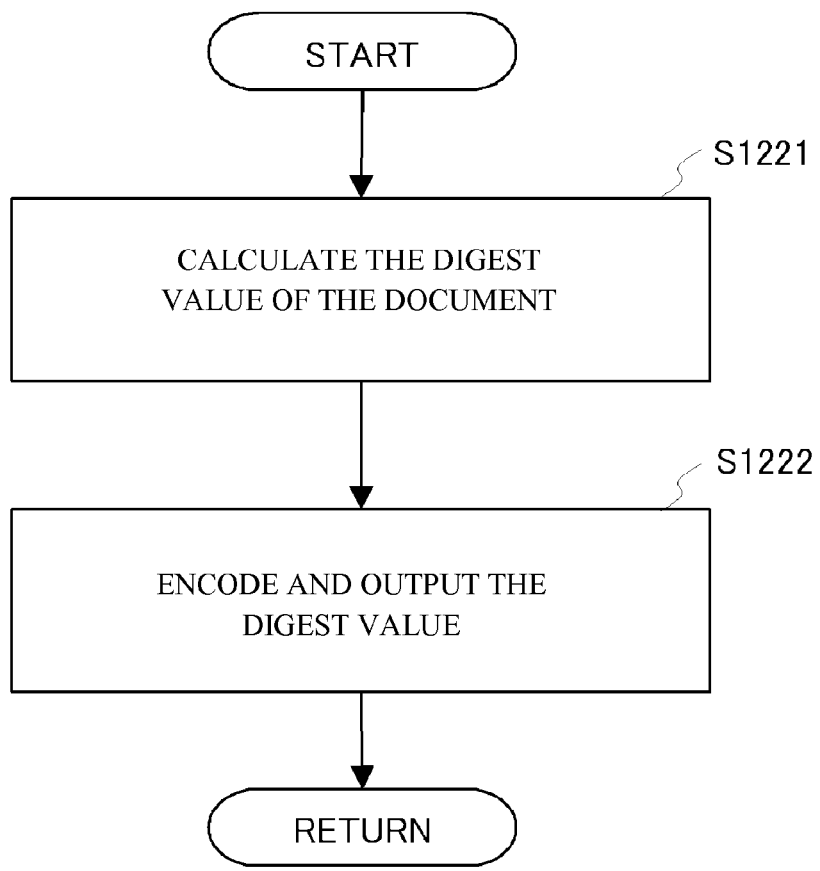

FIG.104

```
1  <?xml version="1.0" encoding="Shift_JIS"?>
2  <soapenv:Envelope xmlns:soapenv="http://schemas.xmlsoap.org/soap/envelope">
3    <soapenv:Header>
4      <digest welformedness="false">4162bbb1d56dcf998518516f001fd72f</digest>
6    </soapenv:Header>
7    <soapenv:Body>
8      <report>
9        <title>weekly report</title>
10       <author>Atsuhito Momma</author>
11       <p>This week my focus is to write patent documents.
12     </report>
13   </soapenv:Body>
14 </soapenv:Envelope>
```

FIG.105

```
1  <?xml version="1.0" encoding="Shift_JIS"?>
2  <soapenv:Envelope xmlns:soapenv="http://schemas.xmlsoap.org/soap/envelope">
3    <soapenv:Header>
4      <digest welformedness="false">4162bbb1d56dcf998518516f001fd72f</digest>
6    </soapenv:Header>
7    <soapenv:Body>
8      <report>
9        <title>weekly report</title>
10       <author>Atsuhito Momma</author>
11       <p>This week my focus is to write patent documents.</p>
12     </report>
13   </soapenv:Body>
14 </soapenv:Envelope>
```

FIG.106

```
1  <?xml version="1.0" encoding="Shift_JIS"?>
2  <soapenv:Envelope xmlns:soapenv="http://schemas.xmlsoap.org/soap/envelope">
3    <soapenv:Header>
4      <digest welformedness="true">001fd72f4162bbb1d56dcf998518516f</digest>
6    </soapenv:Header>
7    <soapenv:Body>
8      <report>
9        <title>weekly report</title>
10       <author>Atsuhito Momma</author>
11       <p>This week my focus is to write patent documents.</p>
12     </report>
13   </soapenv:Body>
14 </soapenv:Envelope>
```

FIG.109

| NUMBER OF PROCESSES | PROCESS (1) | PROCESS (2) | PROCESS (3) |
|---|---|---|---|
| 1 | 10 | 40 | 10 |
| 2 | 0 | 40 | 20 |
| 3 | 0 | 51 | 20 |
| 4 | 0 | 40 | 10 |
| 5 | 10 | 50 | 20 |
| 6 | 0 | 40 | 20 |
| 7 | 0 | 40 | 20 |
| 8 | 10 | 50 | 20 |
| 9 | 10 | 50 | 20 |
| 10 | 0 | 60 | 20 |
| AVERAGE | 4 | 46.1 | 18 |
| STANDARD DEVIATION | 5.2 | 7.1 | 4.2 |

EACH PROCESS IS REPEATED 10 TIMES, CALCULATE AVERAGE AND STANDARD DEVIATION, AND UNIT OF PROCESSING IS MILLISECOND.

FIG.111

```
1    <?xml version="1.0"?>
2    <po:purchaseOrder orderDate="1999-10-20" xmlns:po="http://purchaseOrder">
3        <po:shipTo country="US">
4            <po:name>Alice Smith</po:name>
5            <po:street>123 Maple Street</po:street>
6            <po:city>Mill Valley</po:city>
7            <po:state>CA</po:state>
8            <po:zip>90952</po:zip>
9        </po:shipTo>
10       <po:billTo country="US">
11           <po:name>Robert Smith</po:name>
12           <po:street>8 Oak Avenue</po:street>
13           <po:city>Old Town</po:city>
14           <po:state>PA</po:state>
15           <po:zip>95819</po:zip>
16       </po:billTo>
17       <po:comment>Hurry, my lawn is going wild!</po:comment>
18       <po:items>
19           <po:item partNum="872-AA">
20               <po:productName>Lawnmower</po:productName>
21               <po:quantity>1</po:quantity>
22               <po:USPrice>148.95</po:USPrice>
23               <po:comment>Confirm this is electric</po:comment>
24           </po:item>
25           <po:item partNum="926-AA">
26               <po:productName>Baby Monitor</po:productName>
27               <po:quantity>1</po:quantity>
28               <po:USPrice>39.98</po:USPrice>
29               <po:shipDate>1999-05-21</po:shipDate>
30           </po:item>
31       </po:items>
32   </po:purchaseOrder>
```

FIG.112

```
1  <xsd:schema xmlns:xsd="http://www.w3.org/2001/XMLSchema"
2          xmlns:po="purchaseOrder"
3          targetNamespace="purchaseOrder"
4          elementFormDefault="qualified"
5          attributeFormDefault="unqualified">
6      <xsd:annotation>
7          <xsd:documentation xml:lang="en"> Purchase order schema for
8              Example.com. Copyright 2000 Example.com. All rights reserved.
9          </xsd:documentation>
10     </xsd:annotation>
11     <xsd:element name="purchaseOrder" type="po:PurchaseOrderType"/>
12     <xsd:element name="comment" type="xsd:string"/>
13     <xsd:complexType name="PurchaseOrderType">
14         <xsd:sequence>
15             <xsd:element name="shipTo" type="po:USAddress"/>
16             <xsd:element name="billTo" type="po:USAddress"/>
17             <xsd:element name="comment" type="xsd:string"/>
18             <xsd:element name="items" type="po:Items"/>
19         </xsd:sequence>
20         <xsd:attribute name="orderDate" type="xsd:date"/>
21         <xsd:attribute name="digest" type="xsd:string" use="optional"/>
22     </xsd:complexType>
23     <xsd:complexType name="USAddress">
24         <xsd:sequence>
25             <xsd:element name="name" type="xsd:string"/>
26             <xsd:element name="street" type="xsd:string"/>
27             <xsd:element name="city" type="xsd:string"/>
28             <xsd:element name="state" type="xsd:string"/>
29             <xsd:element name="zip" type="xsd:decimal"/>
30         </xsd:sequence>
31         <xsd:attribute name="country" type="xsd:NMTOKEN"/>
32     </xsd:complexType>
33     <xsd:complexType name="Items">
34         <xsd:sequence>
35             <xsd:element name="item" minOccurs="0" maxOccurs="unbounded">
36                 <xsd:complexType>
37                     <xsd:sequence>
38                         <xsd:element name="productName" type="xsd:string"/>
39                         <xsd:element name="quantity">
40                             <xsd:simpleType>
41                                 <xsd:restriction base="xsd:positiveInteger">
42                                     <xsd:maxExclusive value="100"/>
43                                 </xsd:restriction>
44                             </xsd:simpleType>
45                         </xsd:element>
46                         <xsd:element name="USPrice" type="xsd:decimal"/>
47                         <xsd:element name="comment" type="xsd:string" minOccurs="0"/>
48                         <xsd:element name="shipDate" type="xsd:date" minOccurs="0"/>
49                     </xsd:sequence>
50                     <xsd:attribute name="partNum" type="po:SKU" use="required"/>
51                 </xsd:complexType>
52             </xsd:element>
53         </xsd:sequence>
54     </xsd:complexType>
55     <!-- Stock Keeping Unit, a code for identifying products -->
56     <xsd:simpleType name="SKU">
57         <xsd:restriction base="xsd:string">
58             <xsd:pattern value="\d{3}-[A-Z]{2}"/>
59         </xsd:restriction>
60     </xsd:simpleType>
61 </xsd:schema>
```

FIG.117

```
<xsd:schema xmlns:xsd="http://www.w3.org/2001/XMLSchema"
    xmlns="urn:oasis:names:specification:ubl:schema:xsd:OrderResponseSimple-1.0"
    xmlns:ccts="urn:oasis:names:specification:ubl:schema:xsd:CoreComponentParameters-1.0"
    xmlns:cbc="urn:oasis:names:specification:ubl:schema:xsd:CommonBasicComponents-1.0"
    xmlns:cac="urn:oasis:names:specification:ubl:schema:xsd:CommonAggregateComponents-1.0"
    xmlns:udt="urn:oasis:names:specification:ubl:schema:xsd:UnspecializedDatatypes-1.0"
    xmlns:sdt="urn:oasis:names:specification:ubl:schema:xsd:SpecializedDatatypes-1.0"
    xmlns:stat="urn:oasis:names:specification:ubl:schema:xsd:DocumentStatusCode-1.0"
    targetNamespace="urn:oasis:names:specification:ubl:schema:xsd:OrderResponseSimple-1.0"
    elementFormDefault="qualified"
    attributeFormDefault="unqualified"
    version="1.0">
  <xsd:import
namespace="urn:oasis:names:specification:ubl:schema:xsd:CoreComponentParameters-1.0"
schemaLocation="../common/UBL-CoreComponentParameters-1.0.xsd"/>
  <xsd:import namespace="urn:oasis:names:specification:ubl:schema:xsd:CommonBasicComponents-1.0"
schemaLocation="../common/UBL-CommonBasicComponents-1.0.xsd"/>
  <xsd:import
namespace="urn:oasis:names:specification:ubl:schema:xsd:CommonAggregateComponents-1.0"
schemaLocation="../common/UBL-CommonAggregateComponents-1.0.xsd"/>
  <xsd:import    namespace="urn:oasis:names:specification:ubl:schema:xsd:UnspecializedDatatypes-1.0"
schemaLocation="../common/UBL-UnspecializedDatatypes-1.0.xsd"/>
  <xsd:import         namespace="urn:oasis:names:specification:ubl:schema:xsd:SpecializedDatatypes-1.0"
schemaLocation="../common/UBL-SpecializedDatatypes-1.0.xsd"/>
  <xsd:import         namespace="urn:oasis:names:specification:ubl:schema:xsd:DocumentStatusCode-1.0"
schemaLocation="../codelist/UBL-CodeList-DocumentStatusCode-1.0.xsd"/>
  <xsd:element name="OrderResponseSimple" type="OrderResponseSimpleType">
    <xsd:annotation>
      <xsd:documentation>This element MUST be conveyed as the root element in any instance
document based on this Schema expression</xsd:documentation>
    </xsd:annotation>
  </xsd:element>
  <xsd:complexType name="OrderResponseSimpleType">
    <xsd:annotation>
      <xsd:documentation>
......
```

FIG.119

```
<dv:DividedValidation xmlns:dv="http://www.j-pal.crg.fujixerox.co.jp/schema/2005/07/">
    <dv:ResultOfDoc>true</dv:ResultOfDoc>
    <dv:SchemaDigest>yyyy</dv:SchemaDigest>
    <dv:Part>
       <dv:DividingPoint>aaa/aaa/aa</dv:DividingPoint>
       <dv:ResultOfPart> tr ue</dv:ResultOfDoc>
       <dv:PartDigest>xxxx</dv:PartDigest>
    </dv:Part>
    ....
</dv:DividedValidation>
```

FIG.124

```
DOCUMENT SCHEMA
<xsd:schema xmlns:xsd="http://www.w3.org/2001/XMLSchema"
   ... >
   <xsd:element name=" Root">
      <xsd:comple  xType>
         <xsd:sequence>
            <xsd:element name="Prev">
               ...
            </xsd:element>
         <xsd:element name=    "BreakHere">
               ...
            </xsd:element>
            <xsd:element name="Follow">
               ...
            </xsd:element>
         </xsd:sequence>
      </xsd:complexType>
   < /xsd:element>
</xsd:schema>
```

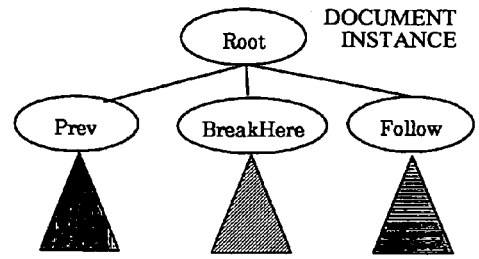

DOCUMENT INSTANCE

IN THE VERIFICATION OF THE PARTIAL STRUCTURE THAT EXCLUDES THE PORTION EQUAL TO AND LOWER THAN THE DOCUMENT ELEMENT BreakHere: THE VERIFICATION IS carried OUT FROM THE DOCUMENT ELEMENT ROOT. IF THERE ARE THE START TAG AND THE END TAG, THE VERIFICATION CONTINUES WITHOUT VERIFYING THE INSIDE THEREOF. IF NOT, THE RESULT OF "INVALID" IS RETURNED AND THE VERIFICATION IS COMPLETED. GENERALLY USED VERIFICATION IS PERFORMED OTHER THAN BreakHere ELEMENT.

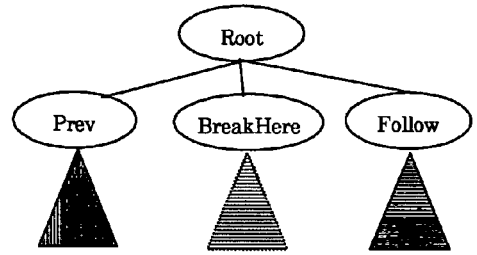

IN THE VERIFICATION OF THE PARTIAL STRUCTURE EQUAL TO AND LOWER THAN THE DOCUMENT ELEMENT BreakHere, THE GENERALLY USED VERIFICATION IS IMPLEMENTED FROM BreakHere ELEMENT AND OTHER PORTIONS ARE NOT VERIFIED

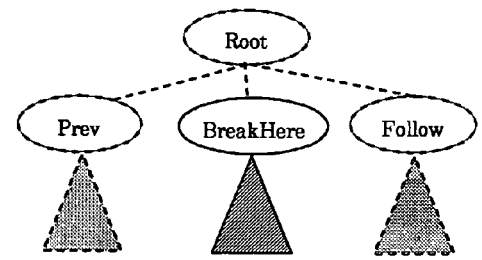

US 8,112,816 B2

DOCUMENT VERIFICATION APPARATUS AND DOCUMENT VERIFICATION METHOD

CROSS-REFERENCE TO RELATED APPLICATION

This application claims priority under 35 USC 119 from Japanese patent documents, 2005-144611 and 2006-132999, the disclosure of which is incorporated by reference herein.

BACKGROUND

1. Technical Field

This invention relates to a document verification apparatus and a document verification method.

2. Related Art

In establishing and operating a structured document processing system, a heavy work load is applied by a verification process of a structured document to be processed. This causes a degradation of processing efficiency. To address this problem, approaches have been taken as follows: (1) speeding up of a verification processing program, (2) elimination of the verification process, and (3) transfer the verification process to the outside of the system. The verification process denotes a process for checking whether or not the structured document satisfies conditions expressed in a document schema or the like. The verification process applied to documents conforming to Extensible Markup Language (XML), a well-known structured document, is categorized into two processes. One verification process is a process of verifying that the document is a well-formed XML document, in other words, a process of verifying whether the document is written on the basis of the syntax specified as XML standard. The other verification process is a process of verifying document validity, in other words, a process of determining whether or not the document satisfies conditions of the corresponding document schema. Document Type Definition (DTD) and W3C XML Schema are representative document schemata. "W3C" is the abbreviation of a standards body, World Web Consortium.

It is to be noted that the above-described approaches are not advanced enough to address the problem that the verification process increases processing workloads. The method of speeding up the verification processing program won't be able to deal with the document schema for business use to be introduced more in the future or a large-scale document.

SUMMARY

The present invention has been made in view of the above circumstances and provides a document verification apparatus, a document verification method, and a program product therefor, by which processing efficiency is improved by alleviating workloads of a verification process implemented on an electronic document.

According to one aspect of the present invention, there is provided a document verification apparatus including: a determining portion that determines whether a change that influences a verification result is made to at least one of an electronic document and a given condition, after it is verified whether or not the electronic document that has been input satisfies the given condition; and an outputting portion that outputs the verification result after it is verified whether or not the electronic document satisfies the given condition, if it is determined that the change is made to at least one of the electronic document and the given condition, or outputs a result of a time when it is verified whether or not the electronic document satisfies the given condition most recently, if it is determined that the change is not made.

BRIEF DESCRIPTION OF THE DRAWINGS

Embodiments of the present invention will be described in detail based on the following figures, wherein:

FIG. 3 shows an itinerary request that a user client sends to a travel agency;

FIG. 4 shows a schema of the itinerary request;

FIG. 5 shows an itinerary draft, which is generated by the travel agency a and sent to a railroad company;

FIG. 6 shows a schema of the itinerary draft;

FIG. 7 shows the itinerary draft, which is sent back to the travel agency from the railroad company;

FIG. 8 shows the itinerary draft, which is sent to a first airline from the travel agency;

FIG. 9 shows the itinerary draft, which is sent back to the travel agency from a second airline and is then sent to the second airline from the travel agency;

FIG. 10 shows the itinerary draft, which is sent back to the travel agency from the second airline;

FIG. 11 shows the itinerary draft, which is sent to a first car rental company from the travel agency, is sent back from the first car rental company, and is then sent to a second car rental company from the travel agency;

FIG. 12 shows the itinerary draft, which is sent back to the travel agency from the second car rental company;

FIG. 13 shows the itinerary draft, which is sent to a hotel from the travel agency;

FIG. 14 shows the itinerary draft, which is sent back to the travel agency from the hotel;

FIG. 15 shows the itinerary draft, in which the travel agency fills in missing information;

FIG. 16 shows the itinerary that the travel agency generates with the use of the itinerary draft and is sent to a translation service;

FIG. 17 shows a schema of the itinerary;

FIG. 18 shows the itinerary, which is sent back to the travel agency from the translation service, and is sent to the user from the travel agency;

FIG. 19 shows a sent and received document used when the first car rental company requests a document verification service for a validity verification process;

FIG. 22 shows a document retained in a verified document retaining portion;

FIG. 23 shows sent and received document to be input into a document verification service from the first car rental company;

FIG. 28 shows the sent and received document input into the document verification service from the first car rental company;

FIG. 29 shows a DOM tree to be generated;

FIG. 30 shows descriptions of the respective nodes from a first line to a forty-second line shown in FIG. 29;

FIG. 31 shows the sent and received document when step S1043 is completed;

FIG. 32 shows a document schema;

FIG. 33 shows a document after a verification process is implemented;

FIG. 35 shows an example of a sent and received document transmitted to the first car rental company according to a fourth embodiment of the present invention;

FIG. 39 shows the sent and received document sent back to the first car rental company;

FIG. 40 shows a document obtained as a result of implementing an addition processing on the document to be sent to the first car rental company from the travel agency;

FIG. 41 shows a document schema that corresponds to a document to be sent to the first car rental company from the travel agency;

FIG. 42 shows a document obtained as a result of the addition processing;

FIG. 44 shows a DOM tree obtained when the document shown in FIG. 40 and the document shown in FIG. 42 are respectively input into the subroutine CANONICALIZE;

FIG. 46 shows a document schema according to the sixth embodiment of the present invention;

FIG. 47 shows a document obtained as a result of the addition processing on the document sent to the first car rental company from the travel agency;

FIG. 48 shows a DOM tree obtained when the document shown in FIG. 47 is input into the subroutine CANONICALIZE with the use of the document schema shown in FIG. 46;

FIG. 49 shows a document schema that conforms to XML DTD specification according to a seventh embodiment of the present invention;

FIG. 50 shows a document that refers to the document schema shown in FIG. 49;

FIG. 51 shows an exemplary document that employs a description that conforms to the XML standard specification;

FIG. 53 shows a DOM tree according to the seventh embodiment of the present invention;

FIG. 54 shows a document schema that conforms to XML DTD according to an eighth embodiment of the present invention;

FIG. 55 is a document that refers to the document schema shown in FIG. 54;

FIG. 59, FIG. 60, FIG. 61, FIG. 62, FIG. 63, FIG. 64, FIG. 65, FIG. 66, FIG. 67, FIG. 68, and FIG. 69 respectively show the portions of processes at step S1142;

FIG. 70 shows a document that corresponds to a place element in a forty-three line in FIG. 18;

FIG. 71, FIG. 72, FIG. 73, FIG. 74, FIG. 75, FIG. 76, FIG. 77, FIG. 78, FIG. 79, FIG. 80, and FIG. 81 respectively show document schema fragments according to the ninth embodiment of the present invention;

FIG. 82 shows a document schema fragment the corresponds to the document shown in FIG. 70;

FIG. 84 shows a portion of processes at step S1302;

FIG. 85 shows the document schema fragment generated at step S1302;

FIG. 86 partially shows the sent and received document that includes the document shown in FIG. 18 sent back from the translation service;

FIG. 87 shows a list of digest values (new digest values) calculated by the document portion shown in FIG. 59 through FIG. 70 and the digest values (old digest values) shown in FIG. 86, when the sent and received document shown in FIG. 86 is input into the document verification service;

FIG. 88 shows the sent and received document according to the tenth embodiment of the present invention;

FIG. 89 shows a sent and received document sent back to the first airline from the document verification service;

FIG. 90 shows the sent and received document sent to a document verification service from the travel agency according to the tenth embodiment of the present invention;

FIG. 91 shows a list of the digest values (old digest values) retained as the digest element, the digest values (new digest values) calculated by the document verification service, with respect to three partial structures in which the validity verification results and the digest values are retained;

FIG. 94 shows a document schema after renewal;

FIG. 95 is the sent and received document shown in FIG. 9 sent back to the second airline from the travel agency;

FIG. 103 is a flow chart of processes at step S1211;

FIG. 104 is a view showing an example of the sent and received document to be input into the document verification service;

FIG. 105 is a view showing the sent and received document to be sent to the document verification service from a document editing service;

FIG. 106 shows the sent and received document;

FIG. 109 shows examples of calculation results of a verification processing time with a conventional method, the verification processing time of unverified document with the use of a method employed according to an aspect of the invention, and a processing time of the verified document with the use of a method employed according to an exemplary embodiment of the present invention;

FIG. 111 is a view showing a document used for measurement;

FIG. 112 is a view showing a document schema used for measurement;

FIG. 117 shows an example of a schema import;

FIG. 119 is an example of the information for verification;

FIG. 124 schematically shows the verification method of a validity verifying portion according to the seventeenth embodiment of the present invention;

DESCRIPTION OF THE EMBODIMENTS

A description will now be given, with reference to the accompanying drawings, of embodiments of the invention.
[Brief Overview of Itinerary Table Making Service]

Figure 1:
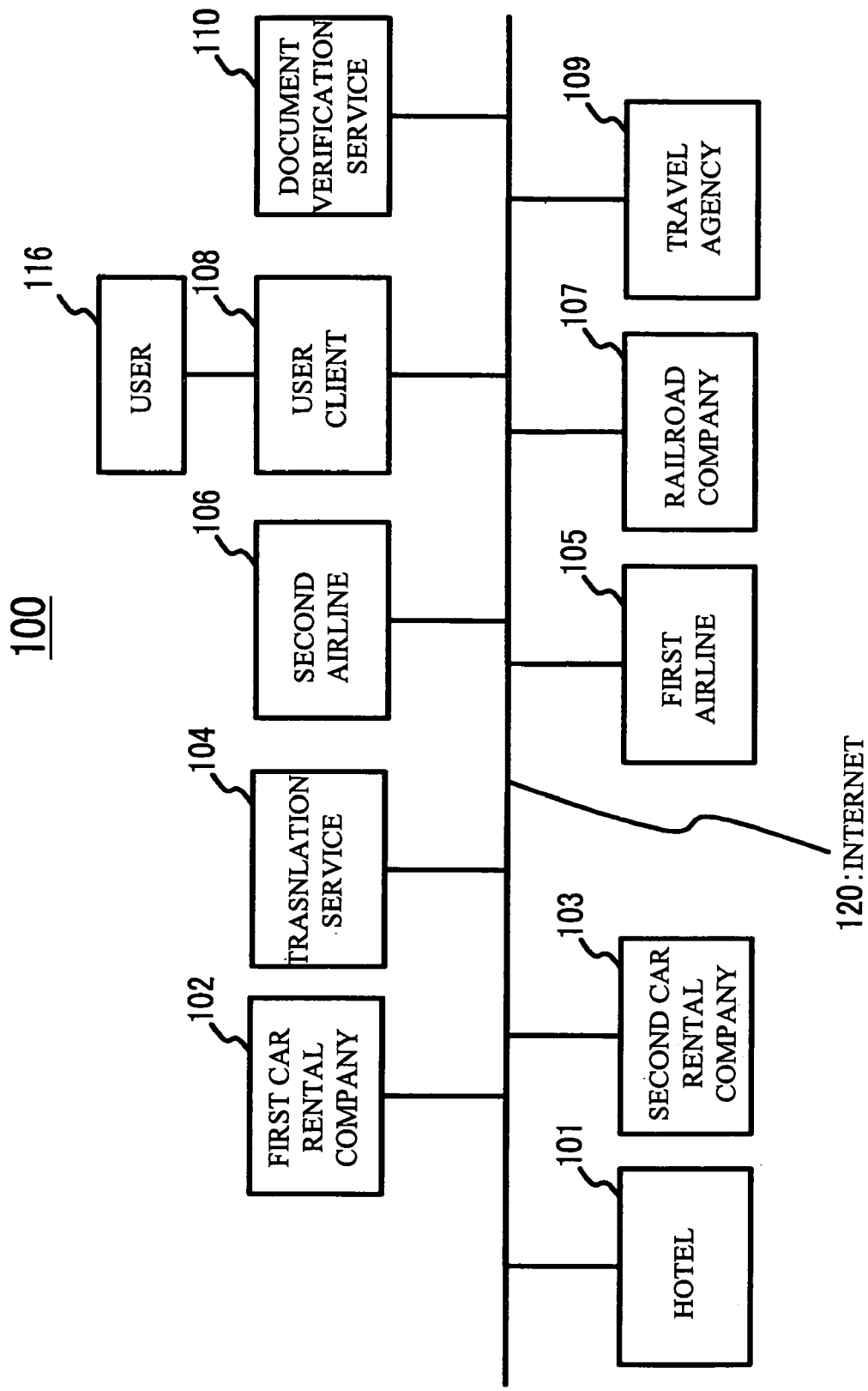
FIG. 1 shows an authentication agency system according to an exemplary embodiment of the present invention.
Figure 2:
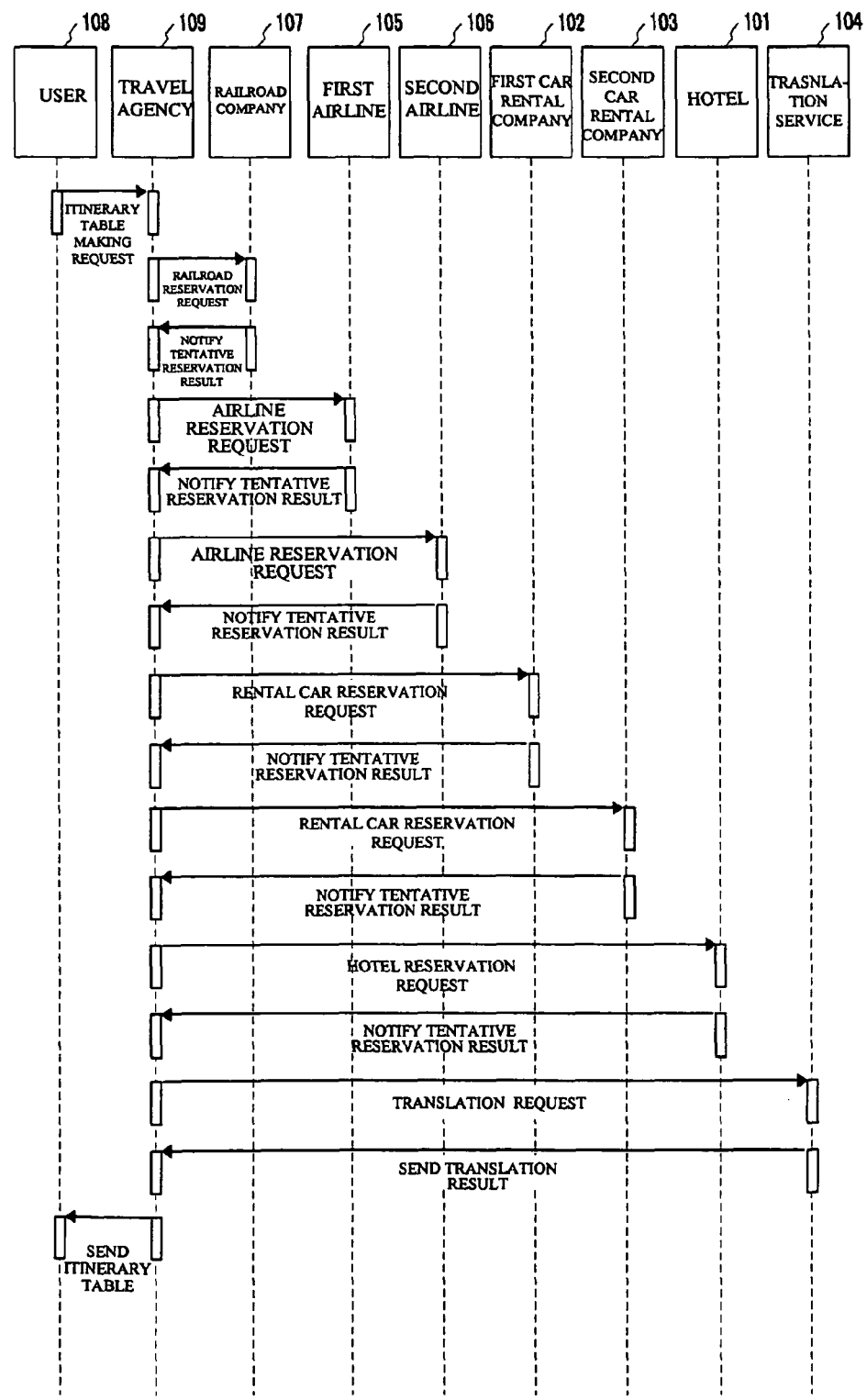
FIG. 2 is a flowchart of processes according to an exemplary embodiment of the present invention.

FIG. 1 is a block diagram of a present system. FIG. 2 exemplarily shows a flowchart of processes of the present system. Referring to FIG. 1, a system 100 includes a hotel 101, a first car rental company 102, a second car rental company 103, a translation service 104, a first airline 105, a second airline 106, a railroad company 107, a user client 108, a travel agency 109, and a document verification service 110. These are respectively composed of a server, personal computer having a CPU, RAM, ROM, and the like, and are connected on a network 120 such as the Internet. The document verification service (document verification apparatus) 110 implements the verification again only in a case where a change that influences a verification result is made to a document and document schema. If the change partially influences the verification result, the document verification service (document verification apparatus) 110 implements the process that performs verification only on a potion that is influenced. Accordingly, the workload of the verification process on an electronic document is reduced to improve the whole processing efficiency.

In an itinerary making service employed in the embodiments of the invention, the travel agency 109 receives an itinerary request from the user client 108 and generates an itinerary, while checking status of booking of the hotel 101, the first car rental company 102, the second car rental company 103, the first airline 105, the second airline 106, and the railroad company 107, and outputs the itinerary in a unified natural language requested by a user such as Japanese or English.

More specifically, when the itinerary request is sent to the travel agency 109 from the user client 108, the travel agency 109 respectively requests the railroad company 107 for a railroad reservation, the first airline 105 for an airline reservation, the second airline 106 for an airline reservation, the first car rental company 102 for a rental car reservation, the second car rental company 103 for a rental car reservation, the hotel 101 for a room reservation, and the translation service 104 for translation. Then, upon receiving tentative reservation results or translation results, the travel agency 109 arranges an itinerary plan and sends the itinerary plan to the user client 108. The document verification service 110 is provided for implementing the validity verification process of the document.

FIG. 3 shows the itinerary request that the user client 108 issues to the travel agency 109. In the second line of the document shown in FIG. 3, itineraryRequest elements includes xmlns:xsi attribute and xsi:noNamespaceSchemaLocation attribute. These attributes are specified in W3C XML Schema Standard to supply keys to a processing program to identify the document schema that corresponds to the document. The attributes are used in the documents to be described below. However, according to the W3C XML Schema Standard, "the processing program may identify the document schema with the use of keys other than these attributes". Therefore, even if the afore-described attributes are eliminated from the document shown in FIG. 3 and the documents to be described below and another method is employed to correspond to the document schema and the document, the similar effects to be described in the embodiments hereinafter are obtainable. A description is now given of alternative exemplary method of corresponding the document schema to the document. When each of the services is realized by a Web service, the document schema that corresponds to an input/output document to/from the service may be described or referred to, as a portion of Web Service Description Language (WSDL) that is generated and released for each service.

FIG. 4 through FIG. 18 show documents that are generated and used for implementing a series of processes illustrated as a sequence chart in FIG. 2, when the itinerary request is input into the present service. FIG. 4 shows a schema of the itinerary request. This schema conforms to the W3C XML Schema Standard.

FIG. 5 shows an itinerary draft, which is generated by the travel agency 109 and sent to the railroad company 107. The value of status attribute of a travel element (in the eighth line and in the fifty-fourth line) is set to "requested". The value will be described below with reference to FIG. 6. In the second line in FIG. 5, an itineraryinProcess element includes xml:lang attribute. This attribute is specified in the XML Standard to indicate the language of the character data such as Japanese, English, or the like in the content of the document element that includes the attribute.

FIG. 6 shows a schema of the itinerary draft. A travel element represents a conduct of traveling, and a stay element represents a conduct of lodging. If the values of status attribute of these elements are "inactive", which represents "not reserved yet". If the values thereof are "requested", which represents "reservation in process". If the values thereof are "reserved", which represents "already reserved".

FIG. 7 shows the itinerary draft, which is sent back to the travel agency 109 from the railroad company 107. The railroad company 107 makes a reservation for the travel element having the status attribute of "requested". If the reservation is made, a method element indicating the reservation content is added to the end of the travel element, and the value of the status attribute is changed to "reserved". FIG. 8 shows the itinerary draft, which is sent to the first airline 105 from the travel agency 109. In the twenty-second line and in the fifty-second line, the status attribute of the travel element is set to "requested".

FIG. 9 shows the itinerary draft, which is sent back to the travel agency 109 from the first airline 105 and is then sent to the second airline 106 from the travel agency 109. The first airline 105 only makes a reservation that corresponds to the travel element in the twenty-second line. Accordingly, the value of the status attribute of the travel element in the twenty-second line is changed to "reserved". The travel agency 109 requests the second airline 106 for a reservation that corresponds to the travel element in the fifty-seventh line. FIG. 10 shows the itinerary draft, which is sent back to the travel agency 109 from the second airline 106. The second airline 106 makes a reservation that corresponds to the travel element in the fifty-seventh line. Accordingly, the value of the status attribute of the travel element in the fifty-seventh line is changed to "reserved".

FIG. 11 shows the itinerary draft, which is sent to the first car rental company 102 from the travel agency 109, is sent back from the first car rental company 102, and is then sent to the second car rental company 103 from the travel agency 109. In the thirty-sixth line and in the fiftieth line, the value of the status attribute of the travel element is set to "requested". The first car rental company 102 is unable to arrange a rental car, and the itinerary draft is sent back to the travel agency 109 without change. FIG. 12 shows the itinerary draft, which is sent back to the travel agency 109 from the second car rental company 103. Accordingly, in the thirty-sixth line and in the fifty-fifth line, the value of the status attribute of the travel element is changed to "reserved".

FIG. 13 shows the itinerary draft, which is sent to the hotel 101 from the travel agency 109. In the fiftieth line, the value of the status attribute of the stay element is set to "requested". FIG. 14 shows the itinerary draft, which is sent back to the travel agency 109 from the hotel 101. The hotel 101 arranges the reservation, adds the result to the itinerary draft, and sends a reply to the itinerary draft to the travel agency 109. FIG. 15 shows the itinerary draft, in which the travel agency 109 fills in missing information. The travel agency 109 changes the status attribute in the thirty-sixth line and in the fifty-fifth line to "reserved", and adds lang attribute and the contents thereof of a place element in the forty-second line and in the fifty-seventh line.

FIG. 16 shows the itinerary that the travel agency 109 generates with the use of the itinerary draft and is sent to the translation service 104. The travel agency 109 extracts only information necessary for the itinerary, a final output, from the information in the itinerary draft. The itinerary is partially written in English, and is sent to the translation service 104 in order to convert into Japanese desired by the user. FIG. 17 shows a schema of the itinerary. FIG. 18 shows the itinerary, which is sent back to the travel agency 109 from the translation service 104, and is sent to the user from the travel agency 109. The itinerary sent back from the translation service 104 is sent to a user 116 via the user client 108.

[Role of Document Verification Service]

The document verification service 110 is not shown in the sequence chart in FIG. 2. However, when the document (itinerary request, the itinerary draft, or the itinerary) is sent to the respective services (the hotel 101, the first car rental company 102, the second car rental company 103, the translation service 104, the first airline 105, the second airline 106, the railroad company 107, and the travel agency 109) that are included in the itinerary making service, the respective services of the sending destinations output the document to the document verification service 110 to request for the validity verification process.

When the documents are sent and received between the services, not only the documents but also a sent and received document that includes the above-mentioned document are actually sent and received. FIG. 19 shows the sent and received document used, when the first car rental company 102 requests the document verification service 110 for the validity verification process.

Referring to FIG. 19, the sent and received document is realized as a SOAP document, and the document to be sent and received is represented as the content of a SOAP body (Body element from the sixth line to the ninety-second line). The contents of a SOAP header (Header element from the third line to the fifth line) include the information necessary for process implemented by the document verification service 110 as a validatorID element (to be described below in accordance with a first embodiment) or a digest element (to be described below in accordance with a second embodiment and later). The content of the validatorID element includes an identifier applied to the document that is the content of the SOAP body. The content of the digest element includes a digest value of the document. The value of a validity attribute represents a true value of the process result of a document, which is the content of the SOAP body, when the validity verification process is performed on the document most recently.

The service that has requested the document verification service 110 for the validity verification process receives the sent and received document from the document verification service 110, refers to the value of the validity attribute of the validatorID element or the digest element in the SOAP header, and obtains the result of the validity verification process. If the validity verification process is successful, a given process is performed on the document. If unsuccessful, a give error process is performed.

First Embodiment

A first embodiment of the invention will be described. The first embodiment is an exemplary embodiment where documents are compared. A consideration is given to a situation when the itinerary draft shown in FIG. 11 is sent to the first car rental company 102 from the travel agency 109 and is then sent back to the travel agency 109 without change. At this time, the itinerary draft becomes a processing object of the validity verification process to be implemented by the document verification service 110, when the itinerary draft is sent to the first car rental company 102 and when the itinerary is sent back to the travel agency 109. In the document verification service 110 employed in accordance with the present embodiment, the validity verification process does not have to be implemented when the itinerary draft is sent back to the travel agency 109, thereby realizing the promotion of efficiency in processing.

Figure 20:
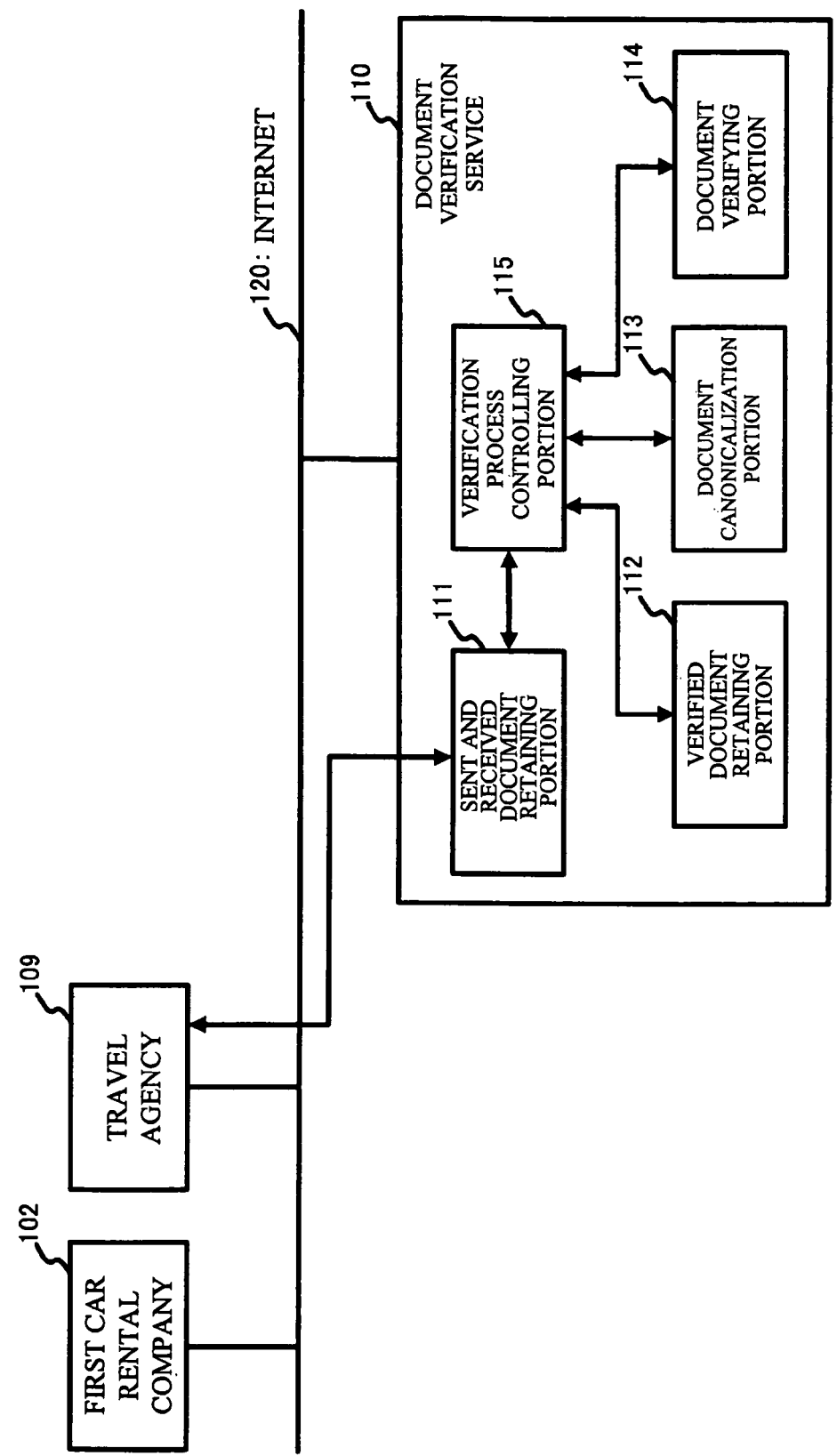
FIG. 20 is a block diagram of a system according to a first embodiment of the present invention.

FIG. 20 is a block diagram of a system in accordance with the first embodiment of the invention. The system 100 is provided with the first car rental company 102, the travel agency 109, and the document verification service 110. These are connected to each other via a network 120. The document verification service 110 includes a sent and received document retaining portion 111, a verified document retaining portion 112, a document canonicalization portion 113, a document verifying portion 114, and a verification process controlling portion 115. In FIG. 20, data flows are indicated by arrows.

The sent and received document retaining portion 111 retains the sent and received document that has been input, applies an identifier to the document to be verified, and also retains a copy of a verification result. The verified document retaining portion 112 retains a set of a value obtained as a result that one-directional function process is applied when an electronic document is verified most recently and the verification result, in association with the electronic document that has been verified.

The verification process controlling portion 115 controls the whole verification process, and determines whether a change that influences the verification result is made to the electronic document or condition, after it is verified whether such input electronic document satisfies a given condition. Here, the given condition denotes a condition defined by a given schema if the electronic document is a structured document. If the verification process controlling portion 115 determines that a change is made to the electronic document or to the condition, the verification process controlling portion 115 implements the verification to see whether the electronic document satisfies a given condition and the verification result is output. If it is determined that a change is not made, the verification process controlling portion 115 refers to the verified document retaining portion 112 to output the result of the time when it is verified whether or not the electronic document satisfies the above-described condition most recently, as a verification result. Here, if there is no most recent verification result, the verification process controlling portion 115 verifies to see whether the electronic document satisfies a give condition and then outputs the result.

The verification process controlling portion 115 determines that a change that influences the verification result is made to the electronic document, when the information obtained by performing a given calculation on the electronic document at the time when the electronic document is verified most recently is different from the information obtained by performing the given calculation on such input electronic document. The afore-described given calculation includes a preprocessing. The preprocessing includes the canonicalization process. The canonicalization process is executed on the document canonicalization portion 113. The canonicalization process is a process that absorbs the fluctuations of description generated by the processes (such as addition of space or linefeed mark, conversion of character code, or the like) unrelated to the original functions of the individual programs. By implementing the canonicalization process on the document, it is possible to produce the documents that should be considered identical to have an identical notation. This facilitates the determination of identity. The document verifying portion 114 is provided for verifying the document. So, when the electronic document is a structured document, the document verifying portion 114 verifies to learn whether the structured document satisfies the condition defined by a given document schema.

FIG. 22 shows a document retained in the verified document retaining portion 112 in the above-mentioned situation. In FIG. 22, a SOAP document mainly has a header part (from the third line to fifth line in FIG. 22) and a body part (from the sixth line to the ninety-fourth line in FIG. 22). The validatorID element in the fourth line of FIG. 22 retaines the identifier (the content of the validatorID element) of the document retained in the SOAP body and in the validity verification result (the value of the validity attribute) of the document.

FIG. 23 shows sent and received document to be input into the document verification service 110 from the first car rental company 102. In the document in the SOAP body in FIG. 23, the value of the status attribute of the travel element is changed to "requested" from "inactive" in the fourty-first line and in the fifty-fifth line. The SOAP header of the sent and received document has an identical identifier as that of the document in FIG. 22.

Figure 21:
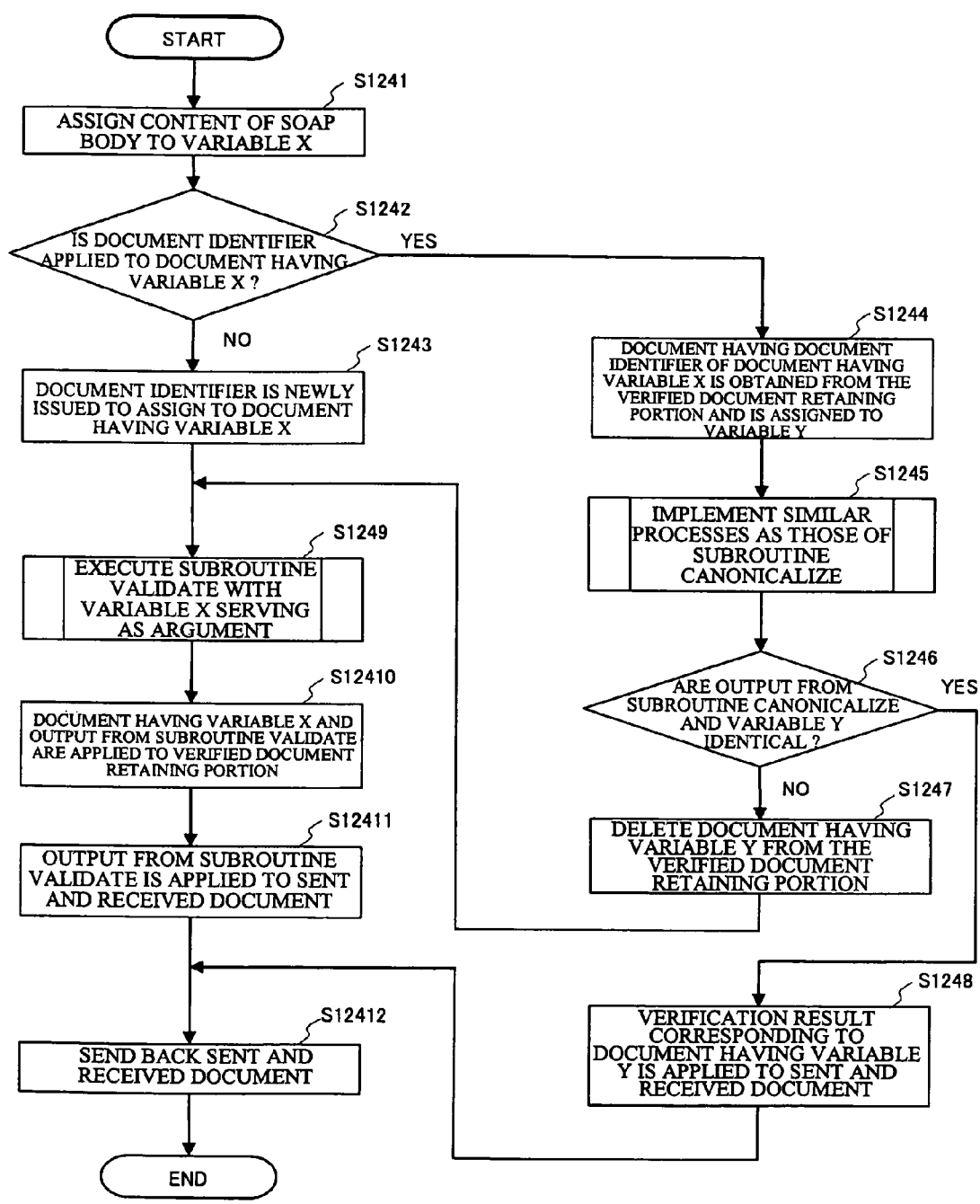
FIG. 21 exemplarily shows a process flowchart of processes of the verification process controlling portion according to the first embodiment of the present invention.

Next, the process flow of the document verification service 100 is described. FIG. 21 exemplarily shows a flow chart of processes in the verification process controlling portion 115 in accordance with the first embodiment of the invention. A subroutine CANONICALIZE and a subroutine VALIDATE are activated in the process shown in FIG. 21, and are respectively executed by the document canonicalization portion 113 and the document verifying portion 114.

When the sent and received document in FIG. 23 is input into the document verification service 110, the process in FIG. 21 is activated. At step S1241, the verification process controlling portion 115 assigns the content of the SOAP body to a variable X. If the document identifier is not applied to the document retained as a value of the variable X at step S1242, the document identifier is newly issued to assign to the document retained as a value of the variable X at step S1243, and processing goes to step S1249. If the document identifier is applied to the document retained as a value of the variable X at step S1242, the document having the document identifier of the document retained as a value of the variable X is obtained from the verified document retaining portion 112 and is assigned to a variable Y at step S1244. Since the document in the SOAP body in FIG. 23 has the identifier, the document (shown in FIG. 22) having such identifier is obtainable form the verified document retaining portion 112. The document canonicalization portion 113 executes the subroutine CANONICALIZE with the value of the variable X serving as an argument. The subroutine CANONICALIZE implements the canonicalization process.

The output from the subroutine CANONICALIZE and the variable Y are compared at step S1246. If they are identical, the verification result corresponding to the document having the variable Y is applied to the sent and received document at step S1248, and processing goes to step S12412. That is to say, when the first car rental company 102 sends a reply with the document shown in FIG. 11 to the travel agency 109, without changing the document shown in FIG. 11, and the travel agency 109 requests the document verification service 110 to implement the verification process of the document shown in FIG. 23, both documents are determined identical, because the documents compared at step S1246 are those shown in FIG. 23. Accordingly, the subroutine VALIDATE is skipped. In this manner, the validity verification process can be eliminated when the sent and received document is sent back to the travel agency 109, by utilizing the document verification service employed in the present embodiment, thereby improving the processing efficiency.

If the output from the subroutine CANONICALIZE and the variable Y are not identical at step S1246, the document having the variable Y is deleted from the verified document retaining portion 112 at step S1247. In FIG. 23, as described above, the output from the subroutine CANONICALIZE and the variable Y are not identical, the document shown in FIG. 22 is deleted from the verified document retaining portion 112 at step S1247. At step S1249, the document verifying portion 114 performs the subroutine VALIDATE with the variable X serving as an argument. In the subroutine VALIDATE, the validity verification process is implemented on the document schema of the document, and the verification result is output as a truth-value. At step S12410, the document retained as a value of the variable X and the output from the subroutine VALIDATE are applied to the verified document retaining portion 112. In accordance with the present embodiment, the subroutine VALIDATE returns "true", and the document shown in FIG. 23 is added to the verified document retaining portion 112. At step S12411, the output from the subroutine VALIDATE is applied to the sent and received document. At step S12412, the sent and received document is sent back. In other words, the document shown in FIG. 23 is sent back to the first car rental company 102 without change.

The canonicalization process for XML document includes Canonical XML and Exclusive XML Canonicalization. At step S1224, any of the canonicalization process is executed on the basis of the specification thereof. The detailed processes executed in the canonicalization process are categorized into the processes implemented by an XML processor (which is a program that reads the XML document and provides an access to the content and structure thereof, and is specified in the XML standard) and canonicalization-specific processes. Such categorization processes respectively include zero or more processes described below.

(Processes Executed by the XML Processor)
Standardize linefeed marks to #xA
Canonicalization of the attribute value
Replace CDATA section with character content
Replace character reference and entity reference to be analyzed (canonicalization-specific process)
Standardize the character code to UTF-8
XML declaration and DTD deletion
Replace start tag and end tag of an empty element to form a set
Standardize separating character of the attribute value to double quotation mark
Delete redundant name space declaration
Setting of default attribute value
Sort of document element attribute and name space declaration The order relations of the document element attribute and name space declaration specified in Section 2.2 XML Canonicalization Standard are described as follows:
The name space declaration appears before the document element attribute.
The name space declaration is sorted by the name of the name space (local name).
The document element attribute is sorted by a primary key of a name space URI and by a secondary key of a name (local name).

According to the present embodiment, the validation verification process needs not to be executed, when the sent and received document is sent back to the travel agency 109, enabling the processing efficiency to be improved.

Second Embodiment

A second embodiment of the invention is described. The second embodiment is an exemplary embodiment in which the digest values are compared. In the second embodiment, a consideration is given to a situation when the itinerary draft shown in FIG. 11 is sent to the first car rental company 102 from the travel agency 109 and is then sent back to the travel agency 109 without change. At this time, the itinerary draft becomes a processing object of the validity verification process to be implemented by the document verification service 110, when the itinerary draft is sent to the first car rental company 102 and when the itinerary is sent back to the travel agency 109.

Figure 24:
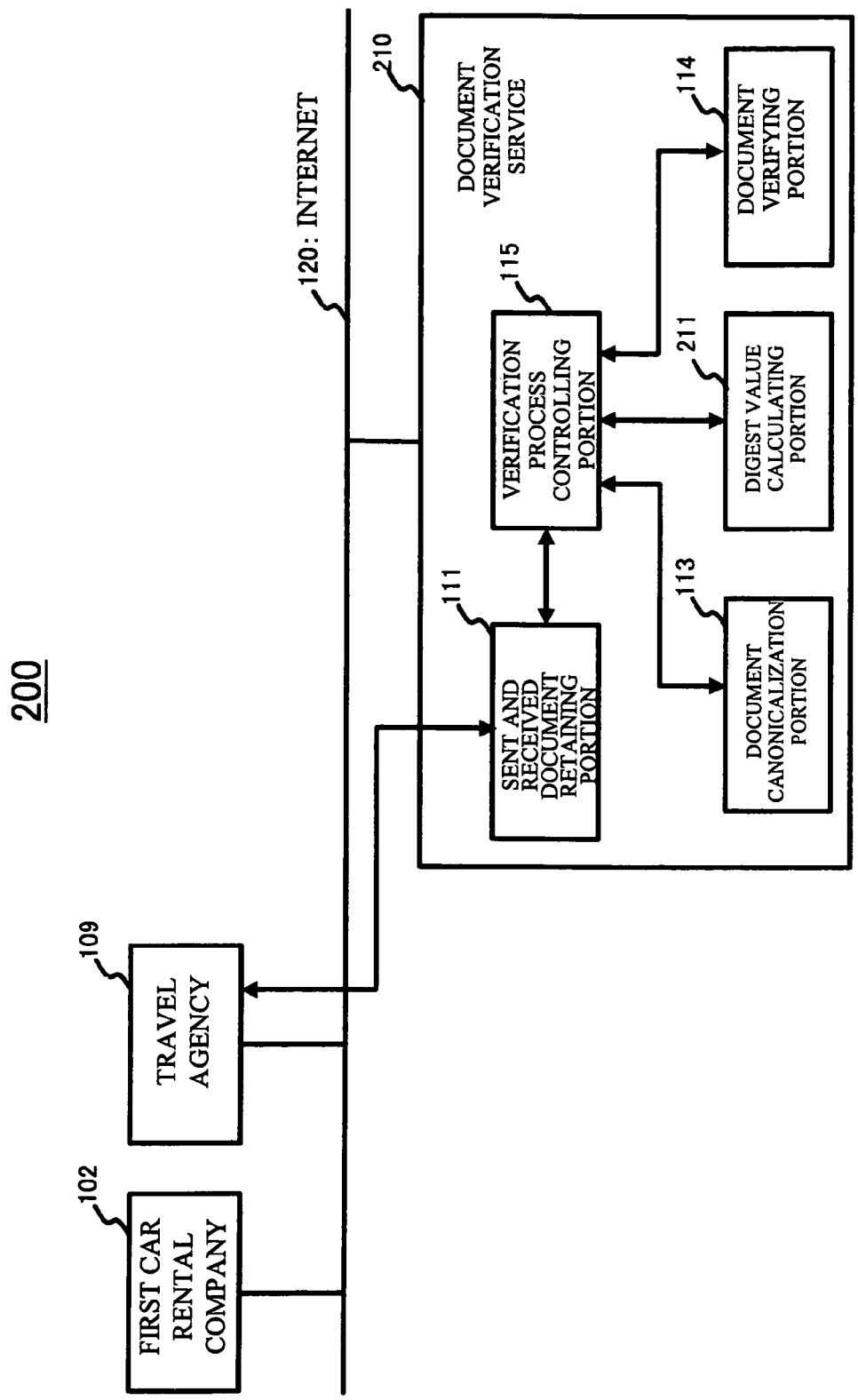
FIG. 24 is a view showing a system structure according to a second embodiment of the present invention.

FIG. 24 is a view showing a system structure in accordance with the second embodiment of the invention. A system 200 includes the first car rental company 102, the travel agency 109, and a document verification service 210, which are connected on the network 120 such as the Internet. The document verification service 210 is provided with the sent and received document retaining portion 111, the document canonicalization portion 113, the document verifying portion 114, the verification process controlling portion 115, and a digest value calculating portion 211. In FIG. 24, data flows are indicated by arrows. The document verification service 210 retains the sent and received document that has been input in the sent and received document retaining portion 111, and the process is activated by the verification process controlling portion 115.

The verification process controlling portion 115 determines that the change that influences the verification result has been made to the electronic document, when the information obtained by performing a given calculation on the electronic document when the electronic document is verified most recently is different from the information obtained by performing a given calculation on the electronic document that has been input. The afore-described given calculation includes one-directional function process implemented by the digest value calculating portion 211, in addition to the preprocessing described in the first embodiment.

Figure 25:
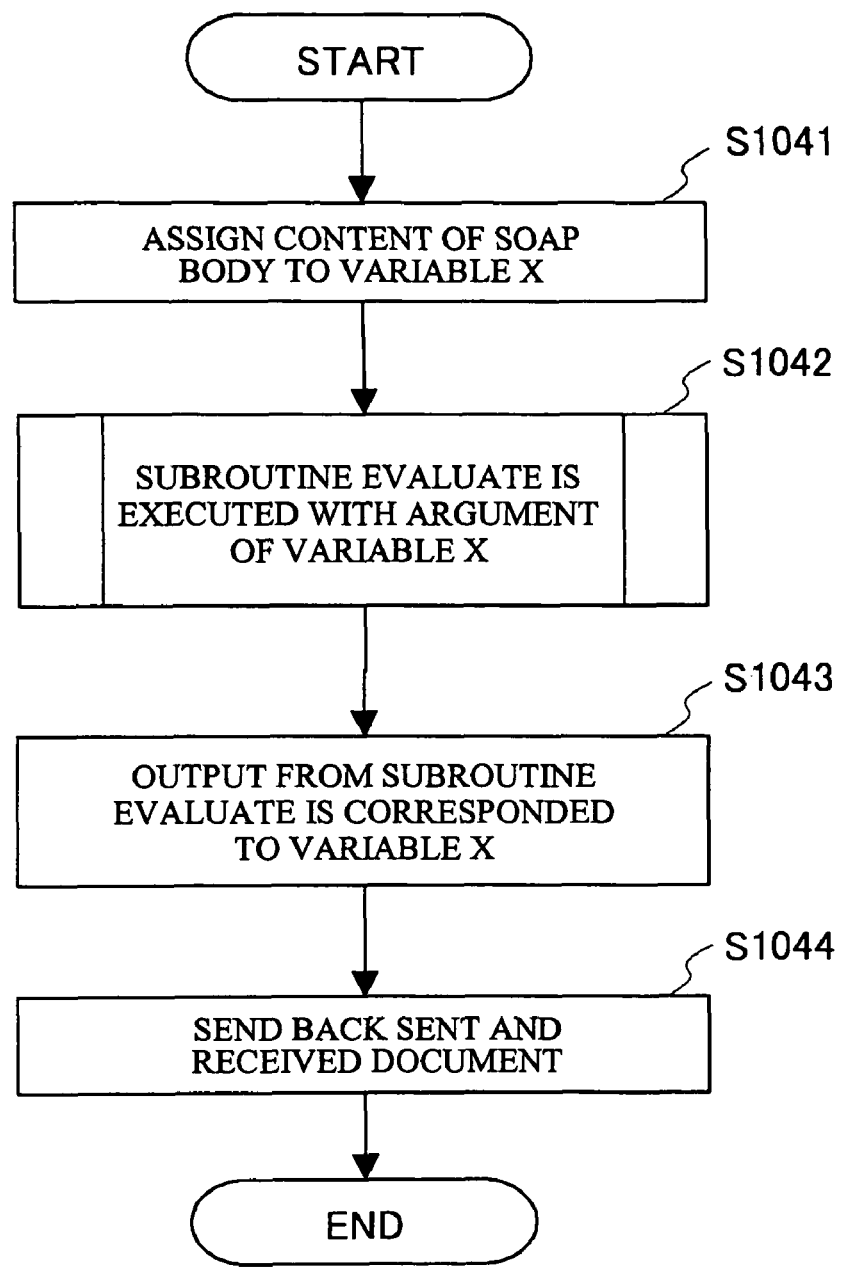
FIG. 25 exemplarily shows a flowchart of processes of a verification process controlling portion according to the second embodiment of the present invention.

FIG. 25 exemplarily shows a flow chart of processes of the verification process controlling portion 115 in accordance with the second embodiment. FIG. 28 shows the sent and received document that is input into the document verification service 210 from the first car rental company 102, when the first car rental company 102 requests for the validity verification process. At step S1041, the verification process controlling portion 115 assigns the content of the SOAP body to the variable X. That is to say, the document shown in FIG. 11 is assigned to the variable X. A subroutine EVALUATE is executed with an argument of the variable X, at step S1042. The output from the subroutine EVALUATE is corresponded to the variable X at step S1043. That is to say, at step S1043, a set of the values output at step S1042 are associated with a document retained as a value of the variable X, and are written into the SOAP header of the sent and received document. FIG. 31 shows the sent and received document when step S1043 is completed.

At step S1044, the sent and received document shown in FIG. 31 is sent back to the first car rental company 102, and processing ends. The first car rental company 102 refers to the value of the validity attribute of the digest element in the fourth line in the sent and received document shown in FIG. 31, and learns that the validity verification process has been completed successfully, and then implements the process on the document. In accordance with the present embodiment, the first car rental company 102 sends the sent and received document shown in FIG. 31 to the travel agency without change.

Figure 26:
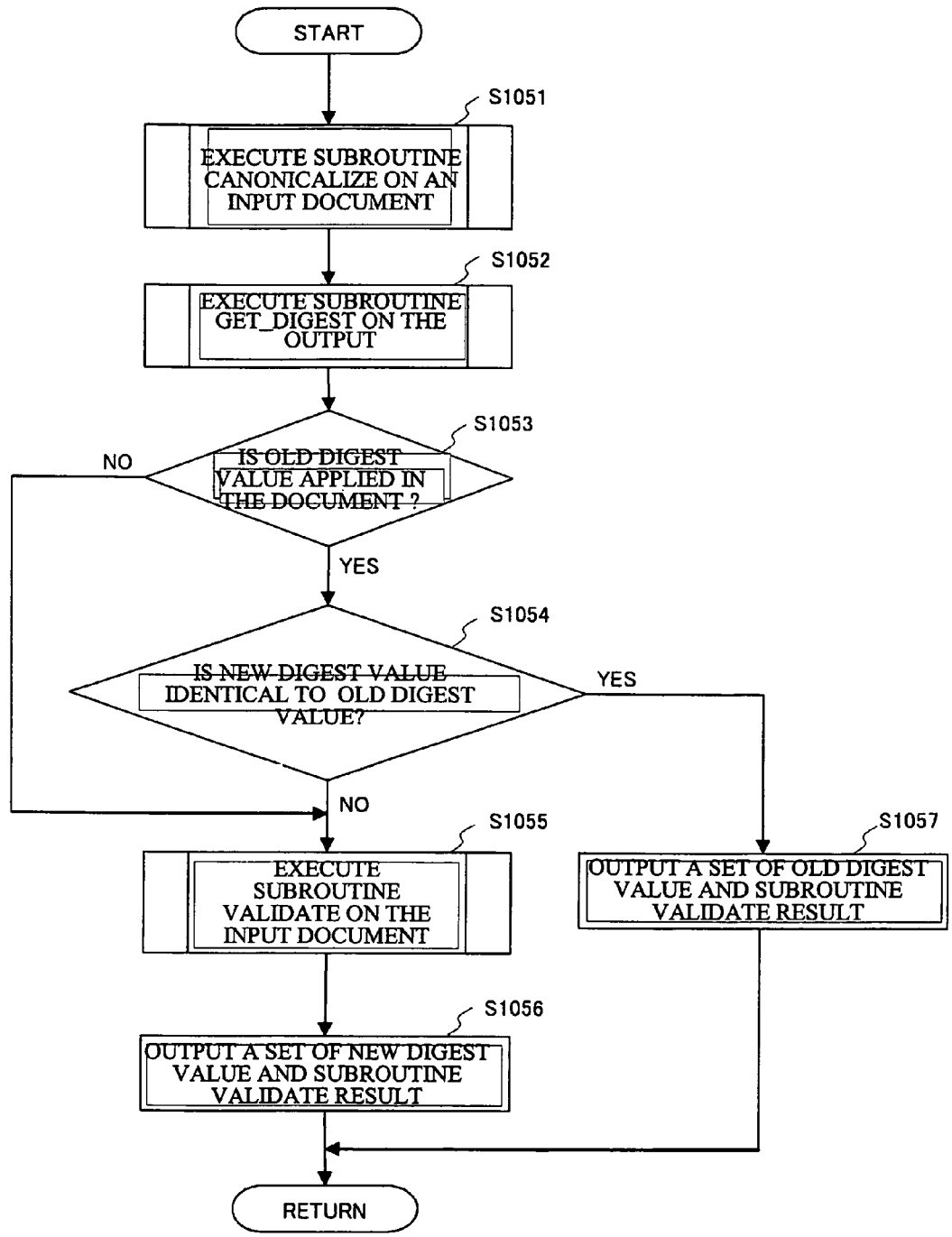
FIG. 26 exemplarily shows a flowchart of processes of the subroutine EVALUATE executed at step S1042.

FIG. 26 is a flow chart of processes of the subroutine EVALUATE implemented at step S1042. The processes are executed by the verification process controlling portion 115. At step S1051, the subroutine CANONICALIZE is executed on an input document to generate a Document Object Module (DOM) tree with the document shown in FIG. 11. DOM is a model and interface to access the model of processing the structured document such as XML document as a tree having nodes of objects representing document (DOCUMENT), document element (ELEMENT), document element attribute (ATTRIBUTE), attribute value (TEXT), and character data (TEXT), instead of processing the structured document as a text document. FIG. 29 shows a DOM tree to be generated. In FIG. 29, each line represents each node that makes up the DOM tree. The type of node is expressed by a character string from the beginning of each line to ":". For example, the type of the node in the first line is a DOCUMENT node that represents the whole document. If the node representing the document element (ELEMENT node) or the document element attribute (ATTRIBUTE node), the element name of attributer name is shown subsequent to ":". If the node represents the text (TEXT node), the text data is shown subsequent to ":".

Indent from the line head represents a parent-child relationship between nodes. For example, the DOCUMENT node in the first line is a parent node of the ELEMENT node in the second line. The ELEMENT node in the second line has child nodes of the ATTRIBUTE nodes in the third, fifth, and seventh lines and the ELEMENT nodes in the ninth and fourteenth lines. FIG. 30 shows descriptions of the respective nodes from the first line to the forty-second line shown in FIG. 29.

At step S1052, a subroutine GET_DIGEST is implemented on the output. If there is no old digest value in the document at step S1053, processing goes to step S1055. As a result of referring to the digest element (in the fourth line) in the SOAP header of the sent and received document on the sent and received document retaining portion 111 (see FIG. 28), it is determined that an old digest value is applied to the document and processing goes to step S1054. It is determined whether the old digest value and a new digest value output from a subroutine GET_DIGEST are identical. If the new digest value and the old digest value are identical, output are a set of the old digest value and a result of a most recent result of a subroutine VALIDATE at step S1057.

If the new digest value and the old digest value are not identical at step S1054, processing goes to step S1055. In the present embodiment, the new digest value and the old digest value are not identical, processing goes to step S1055 and the subroutine VALIDATE is executed. In the subroutine VALIDATE, the validity verification process is implemented on the document for the document schema, the verification result is output in a truth-value. In the present embodiment, "true" is output as a result of the validity verification process. At step S1056, a set of the following subroutine VALODATE and the new digest value are output, and step S1042 is completed.

"true", "3bebcec335f6e46bfe3563897ee544e0"

The subroutine CANONOCALIZE at step S1051 generates the DOM tree with the input document as an exemplary canonicalization process. The DOM tree is generated by the XML processor having a DOM interface. The process by the XML processor is also implemented here, out of the canonicalization processes described in the first embodiment.

Before the DOM tree is output, the following processes are to be implemented.

Standardize the character code to UTF-8

Delete redundant name space declaration

Setting of default attribute value

Sort of document element attribute and name space declaration

Meanwhile, in the embodiments of the invention, including the present embodiment, when the DOM tree is generated with the input document, the node to be deleted is the TEXT node having a sibling node of the ELEMENT node and the content thereof is made up with only a blank character such as space, return, line feed, and tab. The XML standard allows a blank character to be inserted between the document elements included in the content that corresponds to the element content model in the document schema. However, the blank character does not influence the verification process result. The content models defined by the document schema to be used in the embodiment of the invention, including the present embodiment, are all element content models. Accordingly, even if the blank character is deleted in the TEXT node as stated above, the verification process result is not influenced. Also, according to the specification of DOM, a DOM tree is composed of the relationship between the document element and the content, and the relationship between the document element and the document element attribute is not included in the DOM tree. However, according to exemplary embodiments of the invention, including the present embodiment, not only the former relationship but also the latter relationship are to be included in the DOM tree.

Figure 27:
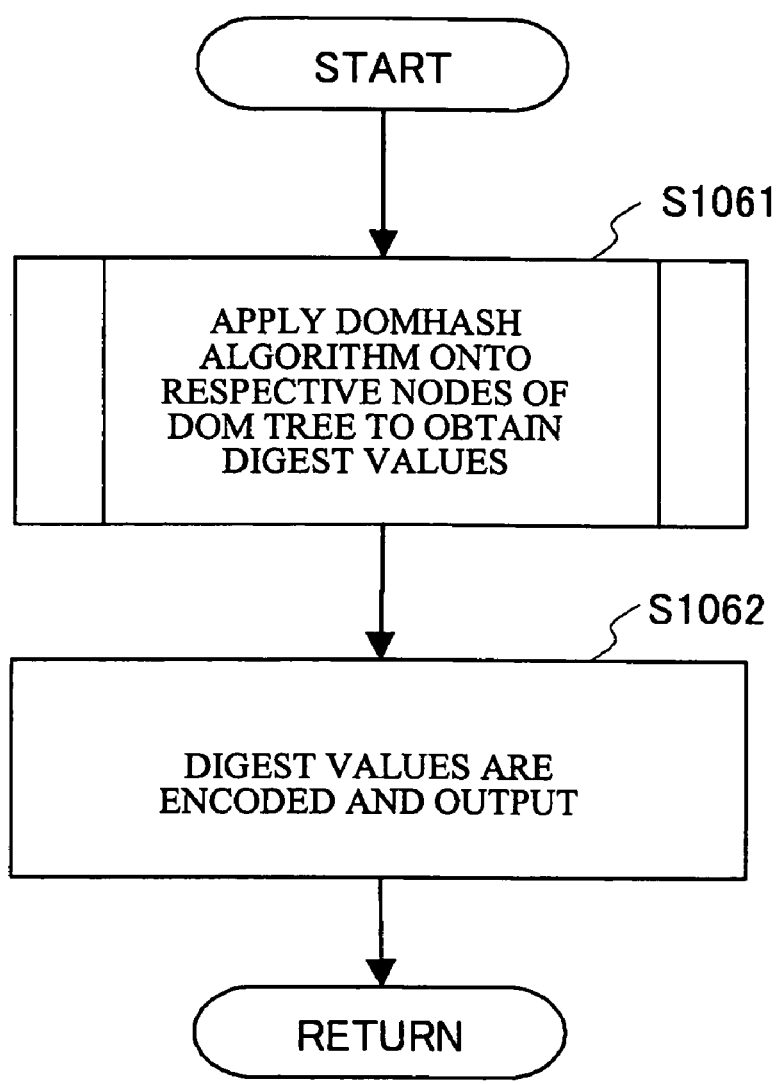
FIG. 27 is a flow chart of processes of the subroutine GET_DIGEST at step S1052.

FIG. 27 is a flow chart of processes of the subroutine GET_DIGEST at step S1052. The processes are implemented on the digest value calculating portion 211. At step S1061, the digest value calculating portion 211 sequentially applies a DOMHASH algorithm onto the respective nodes of the DOM tree to obtain the digest values. At step S1062, the digest values are encoded and output. The digest value output from the subroutine GET_DIGEST is shown as below:

3bebcec335f6e46bfe3563897ee544e0

In the afore-described processes, the respective nodes of the DOM tree have to be ordered so as to apply the DOMNASH algorithm to the nodes of the DOM tree. Retrieval sequence such as depth first order algorithm or breadth first order algorithm may be employed.

The DOMHASH algorithm calculates the digest values of the nodes for text, processing instruction, document element attribute, document attribute, and document, among the nodes that compose the DOM tree. When the DOMHASH algorithm is utilized in the exemplary embodiments of the invention, the process of calculating the digest value of the node for processing an instruction is not implemented. As a hush function used in the DOMHASH algorithm, MD5 algorithm, SHA algorithm, SHA1 algorithm, or the like can be utilized. However, SHA1 algorithm is employed in the present embodiment and in other exemplary embodiments of the present invention.

[Validity Verification Process Requested by the Travel Agency]

Upon receiving the sent and received document, the travel agency 109 requests the document verification service 210 for the validity verification process. At this time, the digest value output from the subroutine GET_DIGEST at step S1052 is shown as below.

3bebcec335f6e46bfe3563897ee544e0

At step S1053, as a result of reference to the digest element (in the fourth line) in the SOAP header of the sent and received document (see FIG. 28) on the sent and received document retaining portion 111, it is determined that the old digest value is applied to the document and processing goes to step S1054. At step S1054, it is determined whether the old digest value and the digest value output from the subroutine GET_DIGEST are identical. Here, since both digest values are identical, the old digest value and the result of the most recent subroutine VALIDATE are read out of the digest element and output at step S1057, and step S1042 is completed.

At step S1043, the set of values output at step S1042 are associated with the document that is the value of the variable X, and are written into the SOAP header of the sent and received document. Here, the set of the values output at step S1042 are identical to the contents of the digest element in the SOAP header of the sent and received document on the sent and received document retaining portion 111, and accordingly, the sent and received document is not changed. At step S1044, the sent and received document shown in FIG. 31 is sent to the travel agency 109, and processing ends.

As stated, by using the document verification service 210 employed in the present embodiment, the digest values are used for comparing the current document and the document that was a target of the verification process most recently. This eliminates the necessity of implementing the validity verification process when the document is sent back to the travel agency 109, and in addition, eliminates the necessity of storing the document that was a target of the verification process most recently, thereby reducing the memory area to be needed drastically. Also, the digest value at the processing the verification most recently can be distributed with the document, eliminating the costs to manage a document identifier.

In the exemplary embodiments of the invention, it is based on the assumption that the document obtained as a result of executing the subroutine CANONICALIZE at the document verification service 210 is not output from the document verification service 210. However, the verification process with the use of W3C XML Schema, in some cases, includes the process of changing the document, such as the process of reflecting a default value of the content of the document element that is defined in the document schema on the document element of the document. For example, when the document shown in FIG. 6 is verified by the document schema shown in FIG. 32, the default value "TBD" is added, as the value of the place element (as shown in the twenty-seventh line), to the document shown as the verification result (see FIG. 33).

When the changed document is used for another service, it may be configured in such a manner that the document on the sent and received document retaining portion 111 is exchanged with the document output from the subroutine CANONICALIZE, and the digest value and the set of the true values are output, the digest value being output as a result of executing the subroutine GET_DIGEST on the document output from the subroutine CANONICALIZE, the true value being an output from the subroutine VALIDATE. That is to say, the verification process controlling portion 115 outputs the verification result, the changed document, and the information obtained by performing a given calculation on such changed document.

Third Embodiment

A third embodiment of the invention is described. The third embodiment is an exemplary embodiment where the digest value is calculated from a text expression. The document verification service employed in the third embodiment is the similar as the document verification service employed in the second embodiment, except the contents of the subroutine CANONICALIZE (step S105) and those of the subroutine GET_DIGEST (step S1052). Also in the third embodiment, a description will be given with reference to FIG. 24. The preprocessing performed by the verification process controlling portion 115 is a process of generating a tree with the nodes that neither includes the document element nor the document element attribute from the string expression of the electronic document. A process is shown as an example, where the process to which the digest value calculating portion 211 applies one-directional function is a process of applying the digest function that includes the MD5 algorithm or the SHA1 algorithm. The subroutine CANONICALIZE of the document verification service 210 used in accordance with the present embodiment implements the similar processes as those of the subroutine CANONICALIZE (step S1245) employed in the first embodiment, and the explanation is omitted here.

Figure 34:
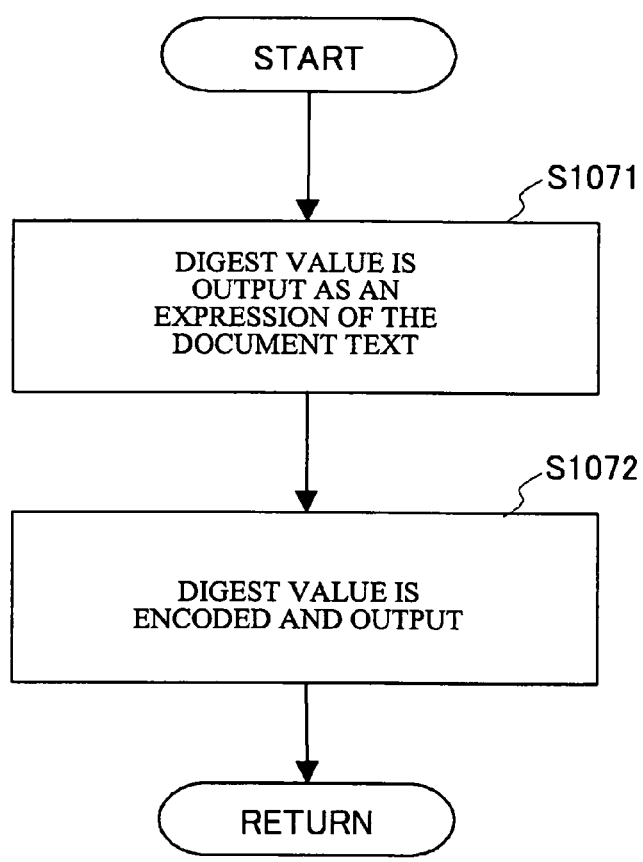
FIG. 34 exemplarily shows a flow chart of processes of the subroutine GET_DIGEST according to a third embodiment of the present invention.

FIG. 34 exemplarily shows a flowchart of processes of the subroutine GET_DIGEST executed by the verification process controlling portion 115 in accordance with the third embodiment. At step S1071, the digest value is output as an expression of the document text. Although the digest value is calculated by way of the DOM tree from the document in the subroutine GET_DIGEST employed in the second embodiment (see FIG. 27), the digest value is calculated by the expression of the document text in accordance with the present embodiment. The MD5 algorithm, the SHA algorithm, the SHA1 algorithm, or the like may be used as a hash function for calculating the digest value. At step S1072, the digest value is encoded and output. The encode process is a process of converting the digest value output as binary data, into the text data. Here, in the respective exemplary embodiments of the invention, the new and old digest values are compared after encoded. However, it is possible to retain the digest value with the binary data without changing and obtain the similar effects without implementing the encode process.

The document verification service 210 enables to obtain the similar effects as those of the document verification service used in the second embodiment. Specifically, similarly as described in the second embodiment, a consideration is given to a situation where the itinerary draft shown in FIG. 11 is sent to the first car rental company 102 from the travel agency 109, and the itinerary draft is sent back to the travel agency 109 without change. At this time, the validity verification process needs not to be performed on the document verification service 210 used in the present embodiment, thereby enabling the process to be facilitated.

In accordance with the present embodiment, the canonicalization process, similarly as described in the first embodiment, is implemented by the subroutine CANONICALIZE, and accordingly the output from the subroutine CANONICALIZE is expressed by text of the XML document. On the other hand, as specified in the XML Canonicalization Standard, the canonicalization process can be performed not only for the text representation of the XML document but also for an XPath node set. By use of this, it may be configured in such a manner that the XPath node set (a tree having the nodes of the document element, the document element attribute, and the contents that do not include the document element) is generated from the text representation of the document (string representation of the electronic document) and the digest value is directly calculated by the XPath node set without returning to the text representation of the document after the canonicalization process that conforms to the XML Canonicalization Standard is implemented.

Fourth Embodiment

A fourth embodiment of the invention is described. The fourth embodiment is an exemplary embodiment where a sampling function is employed. In accordance with the fourth embodiment, the process of applying the one-directional function performed by the digest value calculating portion 211 is a process of applying a pseudo-random algorithm that has a repeatability that includes a linear congruential method or Mersenne Twister. That is to say, the document verification service employed in the fourth embodiment is basically similar to that described in the third embodiment, except that a combination of a function of calculating the number of characters or bites and the pseudo-random algorithm that has repeatability that includes a linear congruential method or Mersenne Twister, whereas the hash function such as MD5 algorithm or SHA1 algorithm used at step S1071 performed by the digest value calculating portion 211 of the document verification service in the third embodiment.

The combination of the functions outputs a set of the number of characters or bites in a document and a sample character string. Referring to FIG. 24 again, the present embodiment is described. In the present embodiment, 32 is an example of the number of characters in the sample character string. Instead of the method employed in accordance with the present embodiment, the function of calculating the number of characters or the number of bites in the document and the pseudo-random algorithm having repeatability that includes a linear congruential method or Mersenne Twister may be used together and applicable to not only the document verification service employed in the third embodiment but also to the document verification service employed in the second embodiment at step S1061.

In the present embodiment, in a similar fashion as described in the first embodiment, a consideration is given to a situation when the itinerary draft shown in FIG. 11 is sent to the first car rental company 102 from the travel agency 109 and is then sent back to the travel agency 109 without change. FIG. 35 shows an exemplary sent and received document transmitted to the first car rental company 102. The digest element in the fourth line retains the verification result (value of the validity attribute), the number of characters in the document (value of documentLength attribute), and a sample character string (content), when the document is verified by the document verification service most recently. However, "<", a starting character of a tag and "&", a starting character of character reference may appear in the sample character string. Accordingly, the sample character string is described in a CDATA section with the afore-mentioned starting characters considered as a character.

Figure 36:
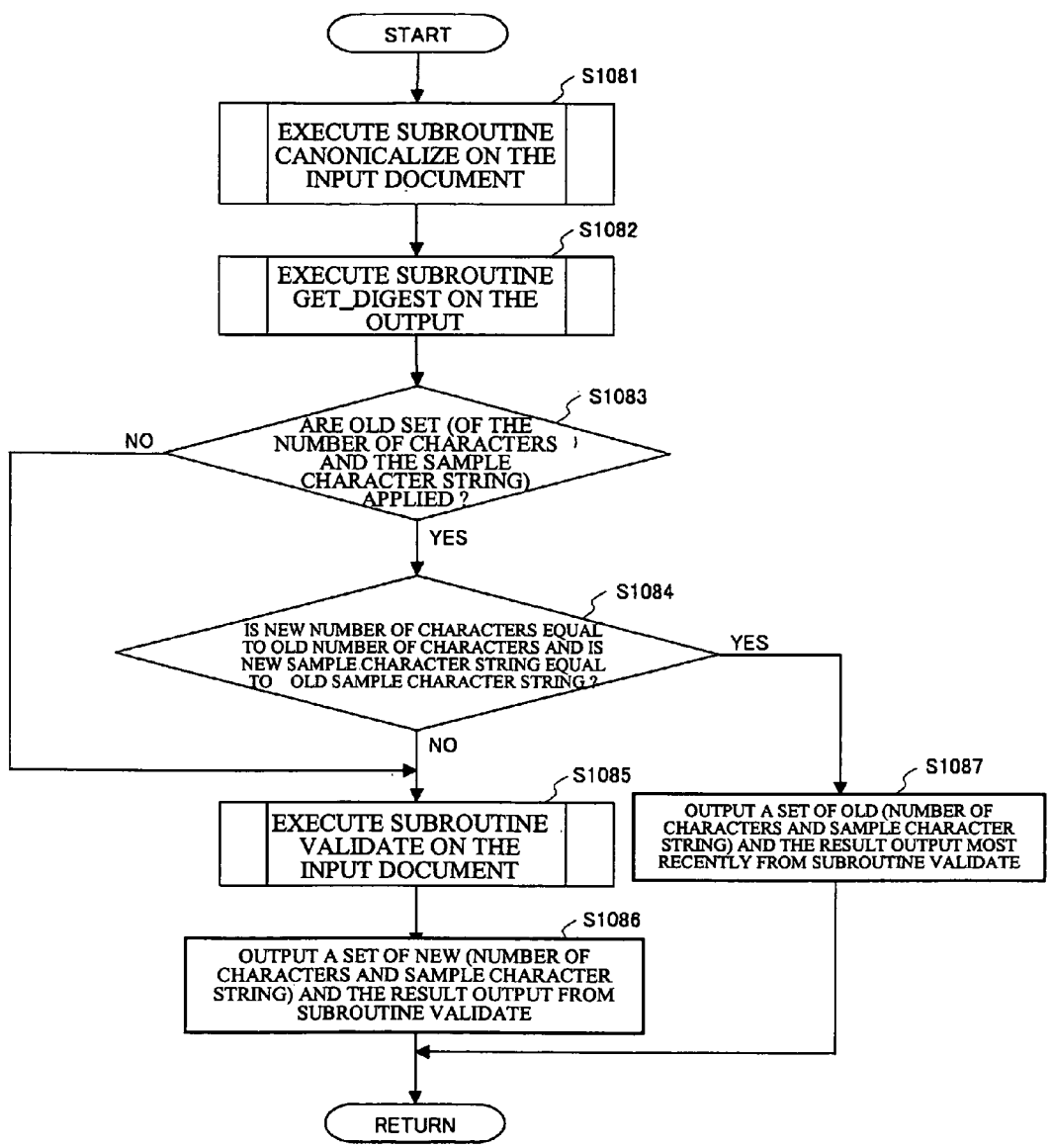
FIG. 36 exemplarily shows a flow chart of processes of the subroutine EVALUATE according to the fourth embodiment of the present invention.

FIG. 36 exemplarily shows a flowchart of processes of the subroutine EVALUATE performed by the verification process controlling portion 115 of the document verification service 210 in accordance with the present embodiment. At step S1081, the subroutine CANONICALIZE is executed on the document input. At step S1082, the subroutine GET_DIGEST is executed on the output from the subroutine CANONICALIZE. When the sent and received document shown in FIG. 35 is input into the document verification service 210 employed in the present embodiment, the number of the characters and the sample character string output from the subroutine GET_DIGEST are shown below (double quotes are excluded).

"2923"
"annl 5ee0/n5 tu ri=dlma00at100p"

At step S1083, if an old set (of the number of characters and the sample character string) is applied to the document, processing goes to step S1084. If not, processing goes to step S1085. At step S1084, if a new number of characters equals to an old number of characters and a new sample character string equals to an old sample character string, a set of old (number of characters and sample character string) and the result output most recently from the subroutine VALIDATE are output at step S1087. At step S1084, if a new number of characters equals to an old number of characters, and a new sample character string does not equal to the old sample character string, processing goes to step S1085. In the present embodiment, the value output from the subroutine GET_DIGEST at step S1082 is different from the number of characters and the sample character string described in the digest element in the fourth line in FIG. 35 at step S1084, and processing goes to step S1085.

At step S1085, the subroutine VALIDATE is executed on an input document. At step S1086, the set of new (number of characters and sample character string) and the result output from the subroutine VALIDATE is output. In accordance with the present embodiment, "true" is output as a result of the afore-mentioned number of characters in the document, the sample character string, and the subroutine VALIDATE. This result is shown in FIG. 39. FIG. 39 shows the sent and received document sent back to the first car rental company 102. With respect to the sent and received document shown in FIG. 35, the value of the digest element in the fourth line is renewed.

Figure 37:
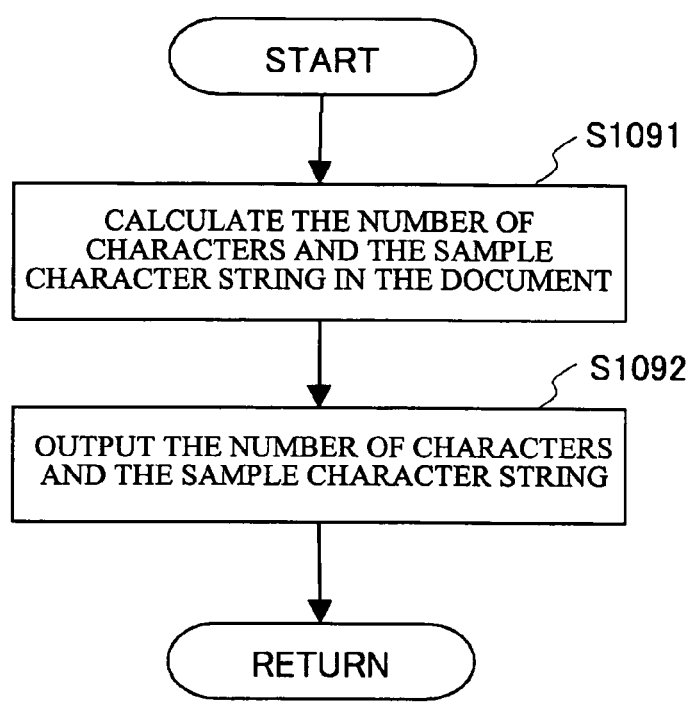
FIG. 37 exemplarily shows a flow chart of processes of the subroutine GET_DIGEST according to the fourth embodiment of the present invention.

FIG. 37 exemplarily shows a flowchart of processes of the subroutine GET_DIGEST executed by the digest value calculating portion 211. At step S1091, the digest value calculating portion 211 calculates the number of characters and the sample character string in the document. At step S1092, the number of characters and the sample character string are output.

Figure 38:
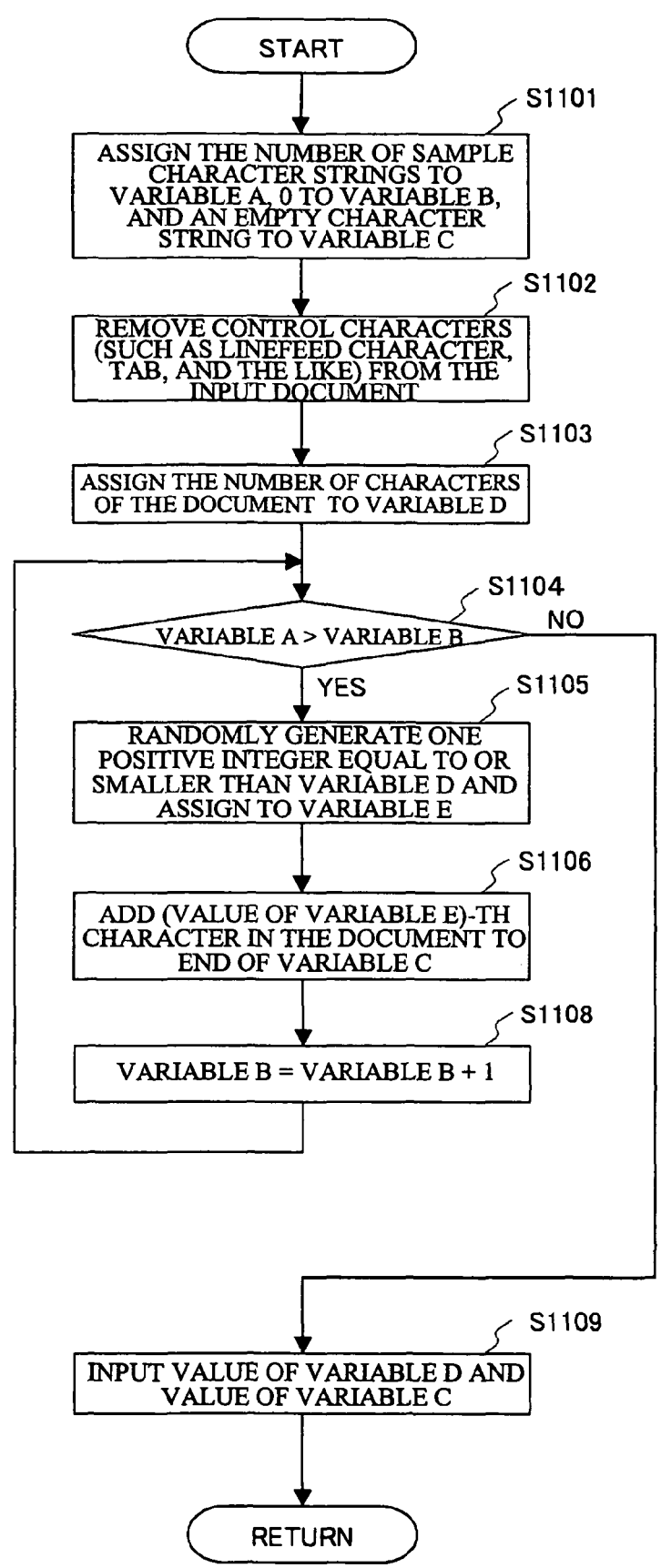
FIG. 38 exemplarily shows a flow chart of processes implemented at step S1091.

FIG. 38 exemplarily shows a flowchart of processes implemented at step S1091. At step S1101, the digest value calculating portion 211 assigns the number of sample character strings to a variable A, 0 to a variable B, and an empty character string to a variable C. At step S1102, control characters (such as linefeed character, tab, and the like) are removed from the input document. At step S1103, the number of characters in the document is assigned to a variable D. At step S1104, if the value of the variable A is greater than the value of the variable B, one positive integer equal to or smaller than the variable D is randomly generated and assigned to a variable E, at step S1105. The pseudo-random algorithm that includes a linear congruential method or Mersenne Twister is used at step S1105. At step S1106, the (the value of the variable E)-th character in the document is added to an end of the variable C. At step S1108, the variable B is incremented by one and returns to step S1104. At step S1104, if the variable A is not greater than the variable B, the value of variable D and the value of the variable C are output at step S1109.

Next, a consideration is given to a situation where the sent and received document shown in FIG. 39 is sent back to the travel agency 109 from the first car rental company 102. The travel agency 109 requests the document verification service 210 for the validity verification process again. At this time, the number of characters in the document and the sample character string output from the subroutine GET_DIGEST are shown as follows, and correspond to the number of characters and the sample character string output from the subroutine GET_DIGEST described in the digest element in the fourth line in FIG. 39.

"2923"

"annl 5ee0/n5 tu ri=dlma00at100p"

Processing goes to step S1087, and is capable of skipping the subroutine VALIDATE, thereby enabling the improved efficiency of the process.

Fifth Embodiment

A fifth embodiment will be described. The document verification service 210 employed in the fifth embodiment performs a digest value calculation process on the result where a portion that does not influence the validity verification process result is deleted from the document. Also in the present embodiment, a description is given with reference to FIG. 24.

In a case where the document schema conforms to W3C XML Schema specification, even if the processing instruction in the document or the content in a string type is excluded from the document, this does not influence the validity verification process result. Therefore, in accordance with the present embodiment, if the electronic document is an XML document, the verification process controlling portion 115 excludes character data ("A child is three years old" in the sixth line in FIG. 42) included in the content that corresponds to a mixed content model in the CDATA section, comment, processing instruction, and document schema, as a portion that does not influence the verification result.

When the XML document is input as an electronic document and W3C XML Schema is input as a document schema, the verification process controlling portion 115, as a portion that does not influence the verification result, excludes from the XML document, the content that does not include another element or the value of the document element attribute that should have the content of a string type, in the contents of the document element that should have the content of the string type defined by W3C XML Schema. It is possible to improve the efficiency of the digest value calculation process by calculating the digest value, the number of characters, and the sample character string, after the afore-mentioned content is excluded.

The document verifying portion 114 employed in the present embodiment processes the document element having the content of the character data only, while the validity verification process is being carried out. Then, the document verifying portion 114 adds a contentType attribute of the document element, and sets the character string that corresponds to the data type of the character data of the content, as a value thereof. Also, after the document element that corresponds to the element type having the mixed content model is processed, the content-Type attribute is added to the document element, and the value thereof is set to "mixed".

FIG. 40 shows a document obtained as a result of implementing an addition processing on the document to be sent to the first car rental company 102 from the travel agency 109. As compared to the document shown in FIG. 11, the data type of the character data is added as the contentType attribute of the document element having the content of the character string (an example is an adult element in the fourth line). FIG. 41 shows a document schema that corresponds to a document to be sent to the first car rental company 102 from the travel agency 109. FIG. 42 shows a document obtained as a result of the addition processing. As compared to the document shown in FIG. 40, the character data of "A child is three years old" (this is actually written in Japanese in the drawings) is added to immediately below a passengers element. As an attribute of the passengers element having a mixed content model, the contentType attribute is added and the value thereof is set to "mixed".

Figure 43:
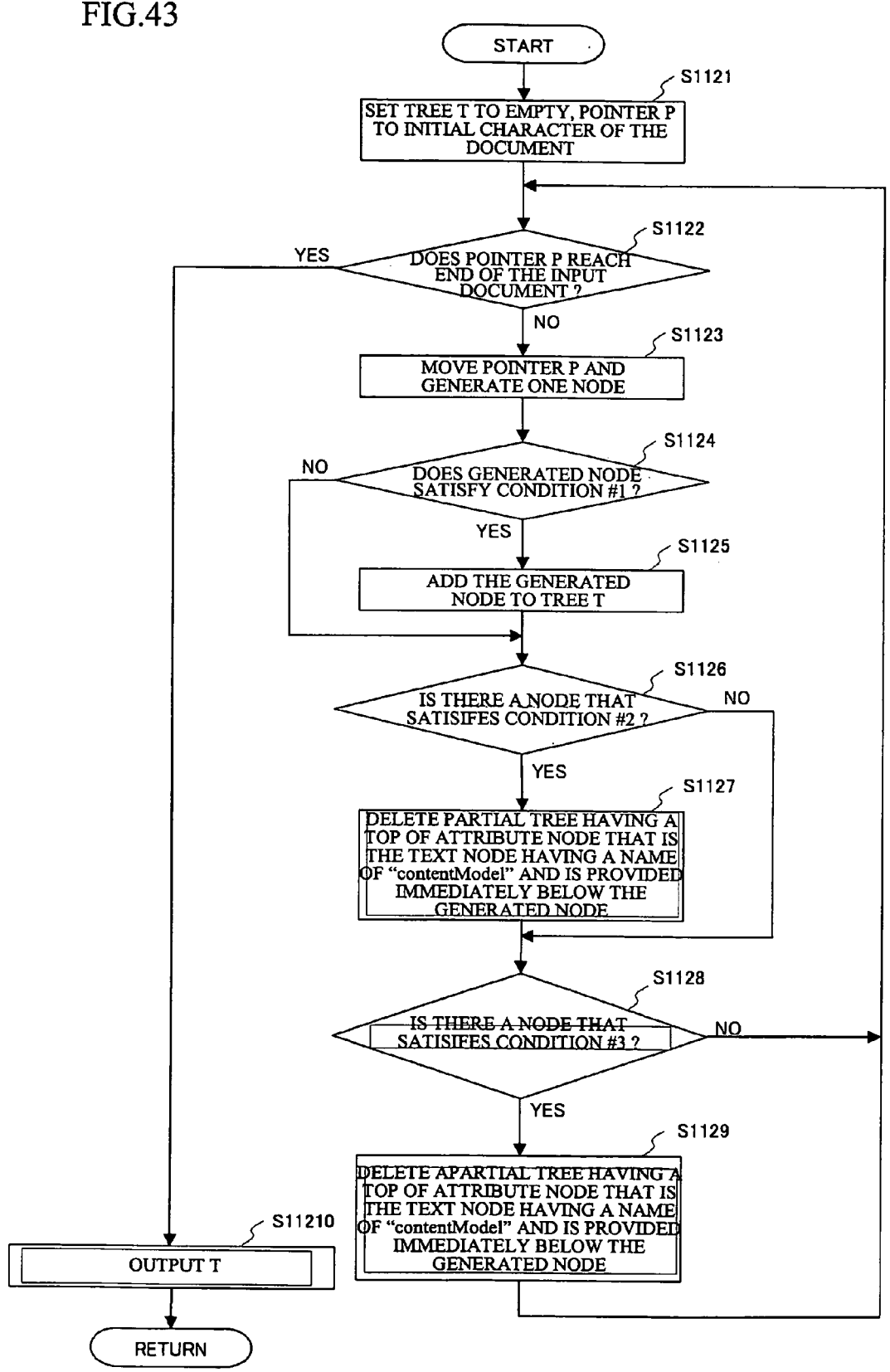
FIG. 43 exemplarily shows a flow chart of processes of a subroutine CANONICALIZE according to a fifth embodiment of the present invention.

FIG. 43 exemplarily shows a flowchart of processes of the subroutine CANONICALIZE in accordance with the present embodiment. At step S1121, a tree T is set to empty, a pointer P is set to an initial character of the document. If the pointer P does not reach the end of the input document t step S1122, the pointer P is moved and one node is generated at step S1123. If such generated node satisfies a condition #1: "the generated node is any one of character node, document element node, document element attribute node, and text node" at step S1124, processing goes to step S1125. If not, processing goes to step S1126. At step S1125, the generated node is added to the tree T. If the generated node satisfies a condition #2: "there is an attribute node having a name of "contentModel" immediately below the generated node, and there is a text node having a value of "string" immediately below the attribute node" at step S1126, processing goes to step S1127. If not, processing goes to step S1128.

At step S1127, deleted is a partial tree having a top of the attribute node that is the text node having a name of "contentModel" and is provided immediately below the generated node. If the generated node satisfies a condition #3: "there is an attribute node having a name of "contentModel" immediately below the generated node, and there is a text node having a value of "mixed" immediately below the attribute node" at step S1128, processing returns to step S1122. At step S1129, deleted are the text node immediately below the generated node and a partial tree having a top that is an attribute node having the name of "contentModel", and processing goes back to step S1122. At step S1122, when the pointer P reaches the end of the input document, the tree T is output at step S11210.

FIG. 44 shows a DOM tree obtained when the document shown in FIG. 40 and the document shown in FIG. 42 are respectively input into the subroutine CANONICALIZE. In FIG. 44, the nodes that do not influence the validity verification process result, such as nodes 24, 33, and 38, are excluded. Accordingly, there are 148 nodes, whereas there are 160 nodes in FIG. 29. The node that corresponds to the character data "A child is three years old." is excluded, whereas the character data is added to the document shown in FIG. 40, resulting in the document shown in FIG. 42. Accordingly, it is possible to realize the efficiency of the process of calculating the digest value, which is a post-processing.

In accordance with the present embodiment, the document is converted into the DOM tree, and then the node corresponding to the portion that does not influence the verification process result is deleted. However, other than the above-described process, it is possible to configure in such a manner that the portion that does not influence the verification process result is excluded with the use of the document in a text format.

Sixth Embodiment

A sixth embodiment will be described. The document verification service employed in the sixth embodiment implements a digest value calculation process on the result where a portion that does not influence the validity verification process result is deleted from the document, in a similar manner as described in the fifth embodiment. Also in the present embodiment, a description is given with reference to FIG. 24.

In a case where the document schema conforms to W3C XML Schema specification, even if the document element corresponding to the content model that does not include the definition of the document element other than an any element ("skip" of "lax" is the value of a processCentents attribute) in the document schema, this does not influence the validity verification process result. Also, even if the document element attribute corresponding to the content model that does not include the definition of the document element attribute other than an anyAttribute element ("skip" or "lax" is the value of the processCentents attribute) in the document schema, this does not influence the validity verification process result. For this reason, in accordance with the present embodiment, if W3C XML Schema is input as a document schema, the verification process controlling portion 115 determines the XML document of an electronic document as a portion that does not influence the verification result, and excludes a document element that appears at a position corresponding to the any element specified in W3C XML Schema and the document element attribute that appears at a position corresponding to the anyAttribute element from the XML document. The efficiency of the digest value calculation process can be improved by calculating the digest value, the number of characters and the sample character string, after the above-mentioned portions are deleted.

The document verifying portion 114 employed in the present embodiment adds an attribute contentModel and an attribute value any to the document element during the validity verification process, after processing the document element corresponding to the content model that does not include the definition of the document element other than an any element ("skip" or "lax" is the value of a processCentents attribute) in the document schema. The document verifying portion 114 adds the attribute contentModel and the attribute value anyAttribute as an attribute of the document element to which the document element attribute belongs, after processing the document element attribute corresponding to the content model that does not include the definition of the document element attribute other than an anyAttribute element ("skip" is the value of the processCentents attribute) in the document schema.

FIG. 46 shows a document schema in accordance with the present embodiment. As compared to the document schema shown in FIG. 6, there is a difference in that the content model of the passengers element (in forty-seventh line) is represented by an any element. FIG. 47 shows a document obtained as a result of the addition processing on the document sent to the first car rental company 102 from the travel agency 109. As compared to the document shown in FIG. 11, the contentModel attribute is added to the adult element and the children element included in the passengers element (from the third line to the sixth line).

Figure 45:
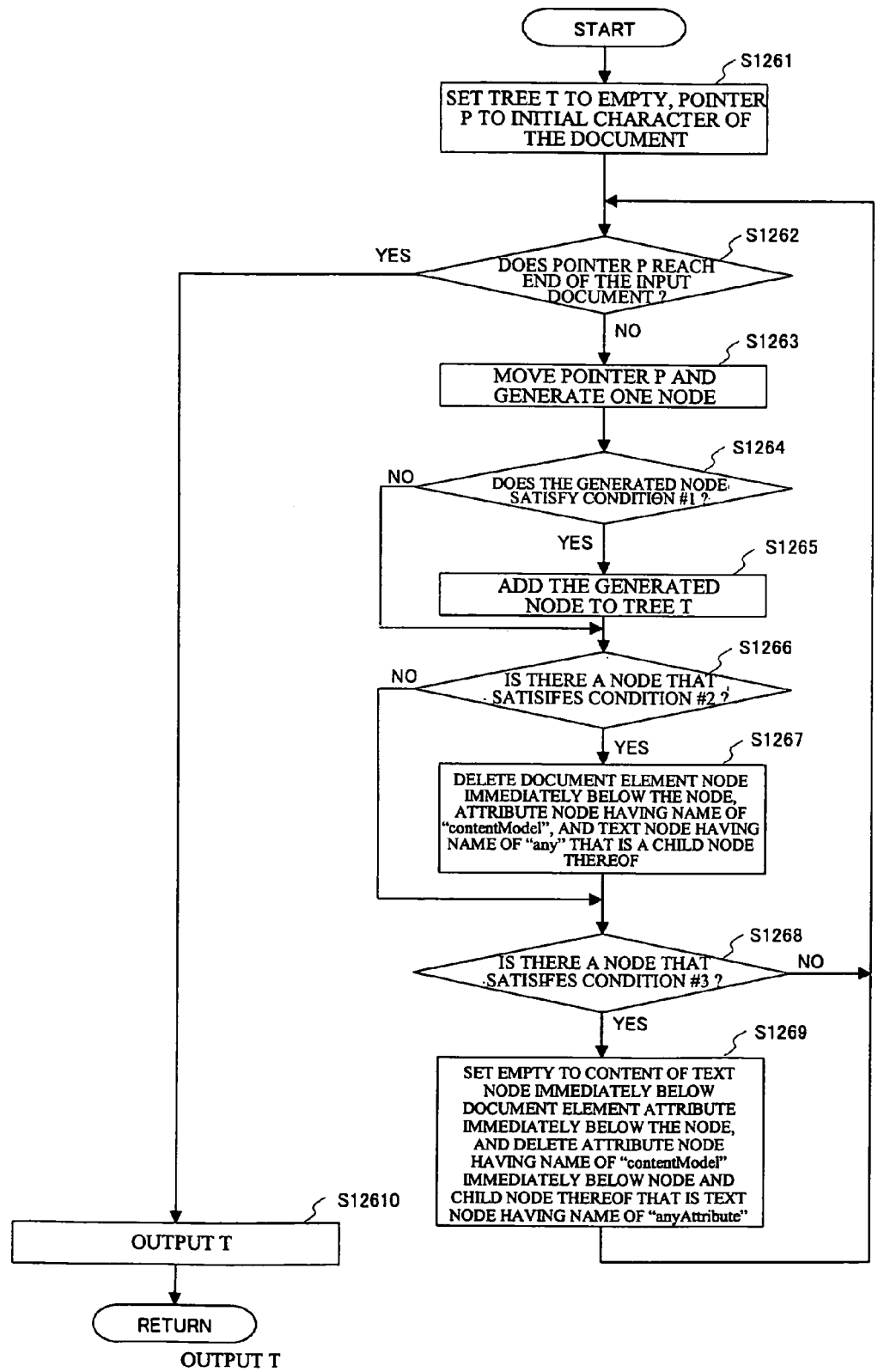
FIG. 45 exemplarily shows a flow chart of processes of the subroutine CANONICALIZE according to a sixth embodiment of the present invention.

FIG. 45 exemplarily shows a flowchart of processes of the subroutine CANONICALIZE in accordance with the present embodiment. At step S1261, the tree T is set to empty, and the pointer P is set to an initial character of the document. If the pointer P reaches an end of the input document at step S1262, processing goes to step S12610. The tree T is output at step S12610. If not, processing goes to step S1263. The pointer P is moved and one node is generated at step S1263. If such generated node does not satisfy a condition #1: "the generated node is any one of character node, document element node, document element attribute node, and text node" at step S1124, processing goes to step S1266. If such generated node satisfies the condition #1, such generated node is added to the tree T at step S1265.

If there is no node that satisfies a condition #2: "there is an attribute node having a name of "contentModel" immediately below the node itself, and there is a text node having a value of "any" immediately below the attribute node" at step S1266, processing goes to step S1268. If there is anode that satisfies the condition #2, the document element node immediately below the node, the attribute node having the name of "contentModel", and the text node having the name of "any" that is a child node thereof are deleted at step S1267. If there is no node that satisfies a condition #3: "there is an attribute node having the name of "contentModel" immediately below the node itself, and there is a text node having a value of "anyAttribute" immediately below the attribute node" at step S1268, processing goes back to step S1262. If there is a node that satisfies the condition #3, empty is set to the content of the text node immediately below the document element attribute immediately below the node at step S1269. In addition, the attribute node having a name of "contentModel" immediately below the node and a child node thereof that is the text node having the name of "anyAttribute" are deleted.

FIG. 48 shows a DOM tree obtained when the document shown in FIG. 47 is input into the subroutine CANONICALIZE with the use of the document schema shown in FIG. 46. The nodes that do not influence the validity verification process result (the node numbers 10, 11, 12, and 13) are excluded. Accordingly, 160 nodes shown in FIG. 29 are decreased to 156 nodes. As a result, the efficiency is realized in the post-processing that is a digest value calculation process.

In accordance with the present embodiment, the document is converted into a DOM tree, and the node corresponding to the portion that does not influence the verification process result are deleted. In addition, it is possible to configure such that the portion that does not influence the verification process result is excluded from the document in a text format.

Seventh Embodiment

A seventh embodiment will be described. The document verification service employed in the seventh embodiment implements a digest value calculation process on the result where a portion that does not influence the validity verification process result is deleted from the document, in a similar manner as described in the fifth and sixth embodiments. However, in the present embodiment, the document schema that conforms to XML DTD specification is to be processed. Also in the present embodiment, a description is given with reference to FIG. 24.

In a case where the document schema conforms to the XML DTD specification, even if the content composed only of a processing instruction or character data is excluded from the document, this does not influence the validity verification result. The verification process controlling portion 115 excludes a portion that is a content of the document element and that does not include another document element, from the XML document, as a portion that does not influence the verification result, if the XML document is input as an electronic document and the XML DTD (Document Type Definition) is input as a document schema. The efficiency of the digest value calculation process can be improved by excluding the above-mentioned portions and then calculating the digest value, the number of characters, and sample character string.

FIG. 49 shows a document schema that conforms to XML DTD specification, almost similar to the document schema that conforms to W3C XML Schema shown in FIG. 6. FIG. 50 shows a document almost similar to that shown in FIG. 11, and shows the document that refers to the document schema shown in FIG. 49 instead of the document schema shown in FIG. 6. The description shown in FIG. 50 is different from that defined in the XML Standard Specification, but refers to the document schema (XML DTD) uses the description of a case where the document schema specified in the X3C XML Schema Standard is referred to. FIG. 51 shows an exemplary document that employs a description that conforms to the XML standard specification.

The reason the description that conforms to the XML standard specification is not employed is as follows: if the description shown in FIG. 51 is employed and the document is retained as a content of the SOAP body and processed as a portion of the sent and received document, a DOCTYPE declaration that is only allowed to appear immediately after the XML declaration appears in the sent and received document, causing an error. It is preferable that the description in FIG. 50 should be replaced with a new description, when the new description can solve the afore-described problem.

Figure 52:
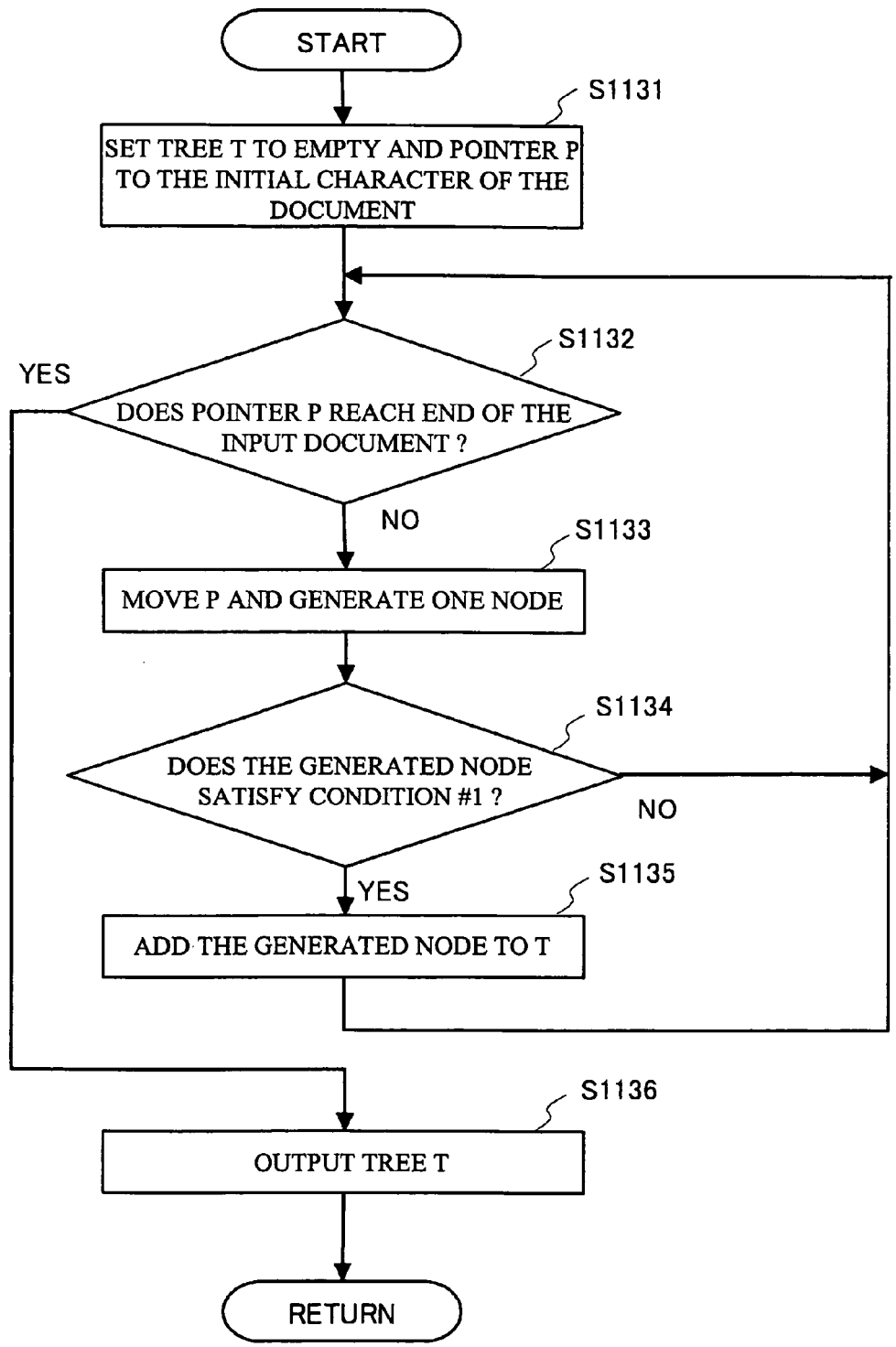
FIG. 52 exemplarily shows a flow chart of processes of the subroutine CANONICALIZE according to the seventh embodiment of the present invention.

FIG. 52 exemplarily shows a flowchart of processes of the subroutine CANONICALIZE executed by the digest value calculating portion 211 in accordance with the present embodiment. At step S1131, the digest value calculating portion 211 sets the tree T to empty and the pointer P to an initial character of the document. If the pointer P does not reach an end of the input document at step S1132, the pointer P is moved and one node is generated at step S1133. If the pointer P reaches the end of the input document at step S1132, processing goes to step S1136. If such generated node satisfies a condition #1: "the generated node is any one of "character node, document element node, document element attribute node, and text node having a parent node of the document attribute node" at step S1134, processing goes to step S1135. If not, processing goes back to step S1132. The generated node is added to the tree T at step S1135, and processing goes back to step S1132. If the pointer P reaches the end of the input document at step S1132, the tree T is output at step S1136.

FIG. 53 shows a DOM tree obtained when the document shown in FIG. 50 is input into the subroutine CANONICALIZE. The nodes that do not influence the validity verification process result (the node numbers 11, 13, 24, 31, 36, 38, and 40) are excluded. Accordingly, 160 nodes shown in FIG. 29 are decreased to 153 nodes. As a result, the efficiency is realized in the digest value calculation process, which is a post-processing.

In addition, it is easily possible to realize the process of excluding the content of the character data of the document element having a mixed content model in a case where the document schema is not only the W3C XML Schema but also XML DTD, as described in the fifth embodiment. In accordance with the present embodiment, the document is converted into the DOM tree, and then the node corresponding to the portion that does not influence the verification process result is deleted. However, in addition to this, it is possible to configure in such a manner that the portion that does not influence the verification process result is excluded from the document in a text format.

Eighth Embodiment

An eighth embodiment will be described. The document verification service employed in the eighth embodiment processes the document schema that conforms to the specification of XML DTD or W3C SML Schema, and implements the digest value calculation process on the result where the portion that does not influence the validity verification process result is deleted from the document. Also in the present embodiment, a description is given with reference to FIG. 24.

The verification process controlling portion 115 excludes a portion that does not influence the verification result from an electronic document, and then determines whether or not a change that influences the verification result is made to the electronic document from which the portion that does not influence the verification result is excluded. In a case where the document schema conforms to the XML DTD specification, even if the character data immediately below the content corresponding to the content model that is defined as ANY keyword, this does not influence the validity verification result. In a similar manner, in a case where document schema conforms to the W3C XML Schema specification, even if the document and the character data corresponding to any element, this does not influence the validity verification result.

For this reason, when the XML document is input as an electronic document, the verification process controlling portion 115 deletes the content of the character data immediately below the document element corresponding to a portion that includes ANY keyword in the XML DTD element type definition and also deletes the document element and the character data corresponding to any element in the W3C XML Schema, as portions that do not influence the verification result. The efficiency of the digest value calculation process can be improved by calculating the digest value, the number of characters and sample character string, after these portions are deleted.

The document verifying portion 114 adds an attribute contentModel and an attribute value any to the document element, after processing the document element that corresponds to the content model defined by ANY keyword of the document schema during the validity verification process. Here, in the description hereafter, XML DTD is assumed to be employed as a document schema. However, also in W3C XML Schema, the similar effects are obtainable by adding the attribute contentModel and the attribute value any to the document element, after the document element that corresponds to any element is processed.

FIG. 54 shows a document schema that conforms to XML DTD, almost similar to the document schema that conforms to W3C XNL Schema shown in FIG. 46. FIG. 55 is a document similar to that shown in FIG. 42, and shows a document that refers to the document schema shown in FIG. 54 instead of the document schema in FIG. 6. The description that refers to the document schema (XML DTD) is different from that specified in the XML standard specification, as described with reference to FIG. 50.

Figure 56:
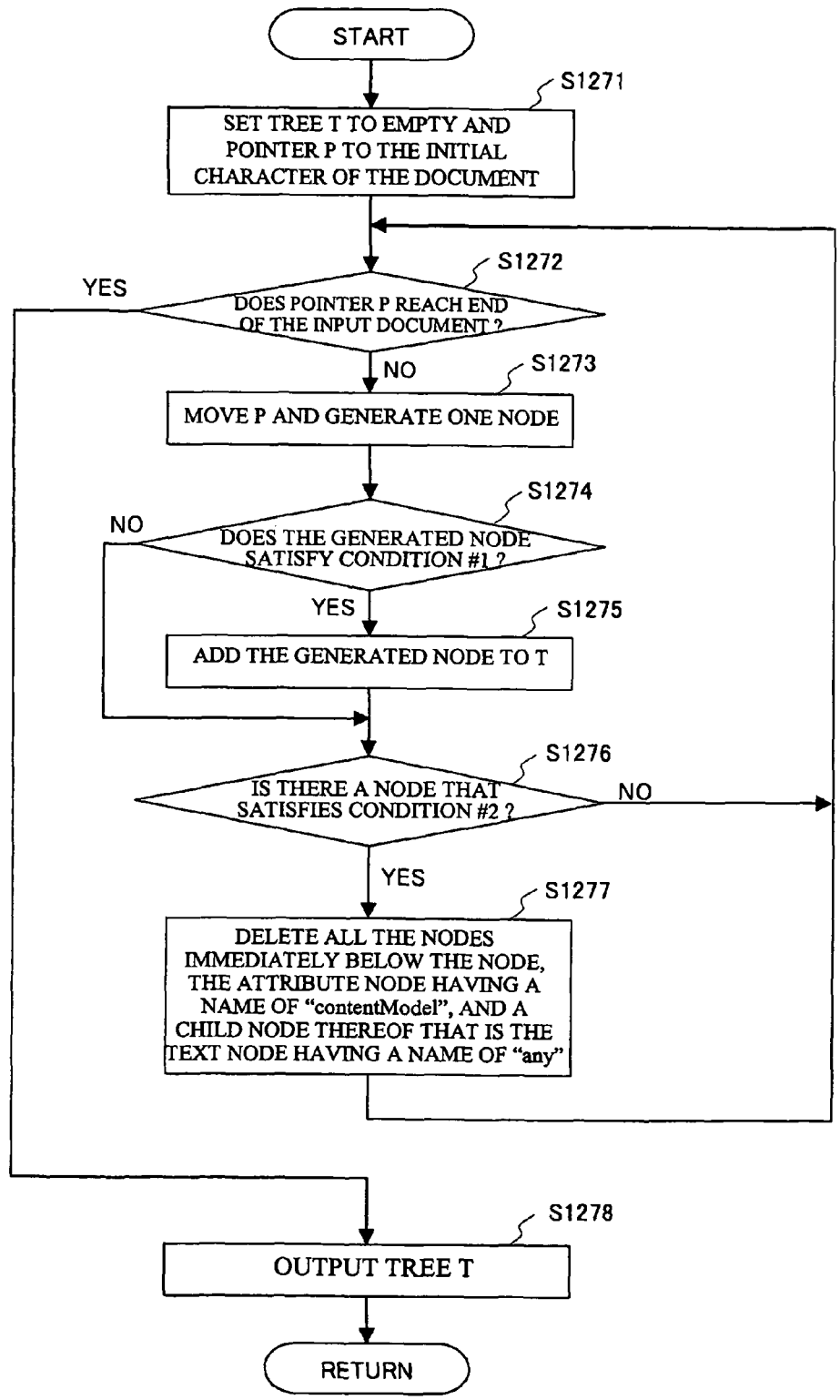
FIG. 56 exemplarily shows a flow chart of processes of the subroutine CANONICALIZE according to the eighth embodiment of the present invention.

FIG. 56 exemplarily shows a flowchart of processes of the subroutine CANONICALIZE executed by the digest value calculating portion 211 in accordance with the present embodiment. At step S1271, the digest value calculating portion 211 sets empty to the tree T and an initial character of the document to the pointer P. If the pointer P does not reach an end of the input document at step S1272, the pointer P is moved and one node is generated at step S1273. If the generated node satisfies a condition #1: "the generated node is anyone of the character node, document element node, document element attribute node, and text node" at step S1274, such generated node is added to the tree T at step S1275. If not, processing goes to step S1276.

If the generated node does not satisfy a condition #2: "there is an attribute node having a name of "contentModel" immediately below the generated node, and there is a text node having a value of "any" immediately below the attribute node" at step S1276, processing goes back to step S1272. If the generated node satisfies the condition #2, all the nodes immediately below the node, the attribute node having a name of "contentModel", and a child node thereof that is the text node having a name of "any" are deleted at step S1277 and processing goes back to step S1272. If the pointer P reaches the end of the input document at step S1272, the tree T is output at step S1278.

The DOM tree obtained when the document shown in FIG. 55 is input into the subroutine CANONICALIZE is identical to the document shown in FIG. 29, after the node corresponding to the character data of "A child is three years old" added in the sixth line in the document shown in FIG. 55 is deleted. As a result, it is possible to improve the efficiency of the digest value calculation process, which is a subsequent process.

In accordance with the present embodiment, the document is converted into the DOM tree, and then the node corresponding to the portion that does not influence the verification process result is deleted. However, in addition to this, it is possible to delete the portion that does not influence the verification result from the document in a text format.

Ninth Embodiment

A ninth embodiment will be described. In the document verification service employed in the ninth embodiment, the document is partially input into the subroutine EVALUATE. Also in the present embodiment, a description will be given by reference to FIG. 24. The verification process controlling portion 115 divides an electronic document into two or more portions. At this time, the verification process controlling portion 115 divides the electronic document into a content of character data and a rest thereof. If the electronic document is a structured document represented by a tree having nodes of component elements, the verification process controlling portion 115 divides the structured document into document element attributes and a rest thereof. The document verifying portion 114 verifies whether or not portions of such divided electronic document respectively satisfy a given condition. Even if a change is made on the document, the portion on which the validity verification process is performed can be smaller than the whole document, thereby improving the processing efficiency.

Figure 57:
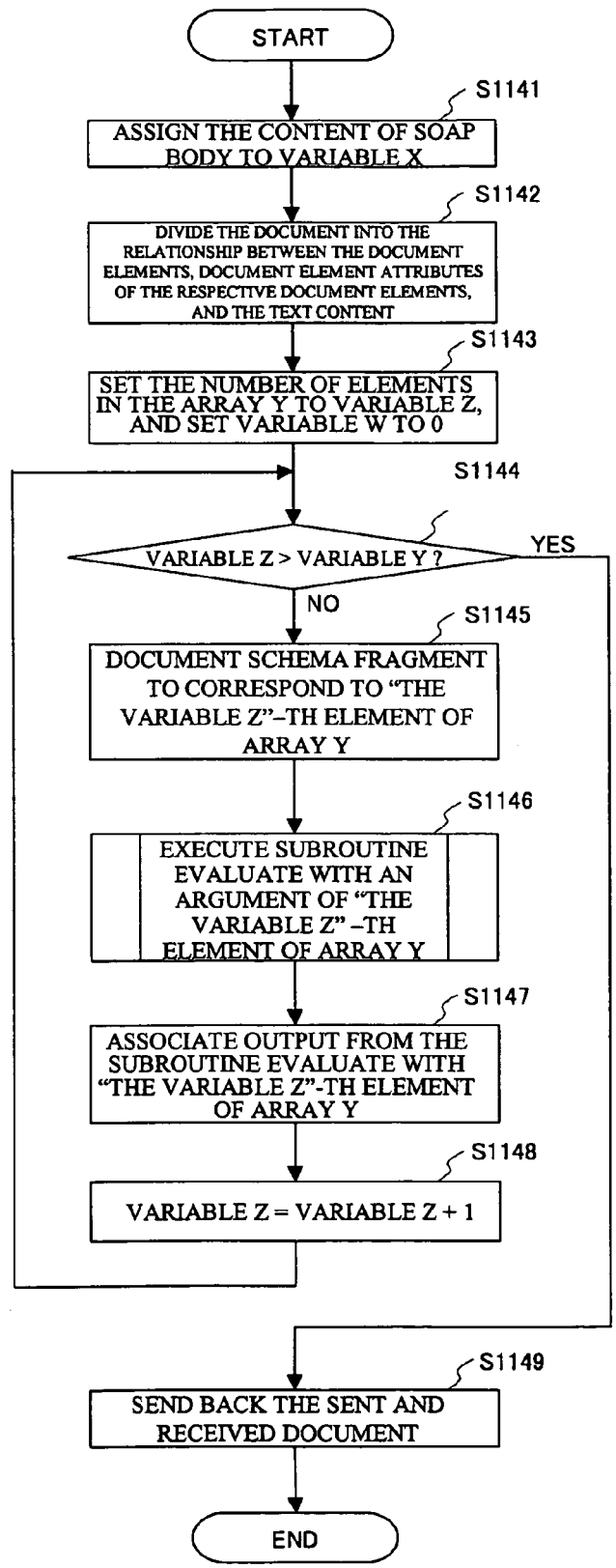
FIG. 57 exemplarily shows a flow chart of processes of the subroutine CANONICALIZE according to a ninth embodiment of the present invention.

FIG. 57 exemplarily shows a flowchart of processes of the verification process controlling portion 115 in accordance with the ninth embodiment of the invention. The verification process controlling portion 115 assigns the content of the SOAP body in the SOAP document in the sent and received document retaining portion for a variable X at step S1141. The content of the variable X is divided into a relationship between the document elements and respective document elements, which are respectively assigned to an array Y. That is to say, the document is divided into the relationship between the document elements, document element attributes of the respective document elements, and the text content at step S1142. At step S1143, the number of elements in the array Y is set to a variable Z, and 0 is set to a variable W.

If the value of the variable Z is not greater than that of the variable Y at step S1144, a document schema fragment is generated to correspond to a "the variable Z"-th element of the array Y at step S1145. The subroutine EVALUATE is executed with an argument of "the variable Z"-th element of the array Y at step S1146. An output from the subroutine EVALUATE is associated with "the variable Z"-th element of the array Y at step S1147. The variable Z is incremented at step S1148, and processing goes back to steps 1144. If the value of the variable Z is greater than that of the variable Y at step S1144, the sent and received document is received at step S1149.

Figure 58:
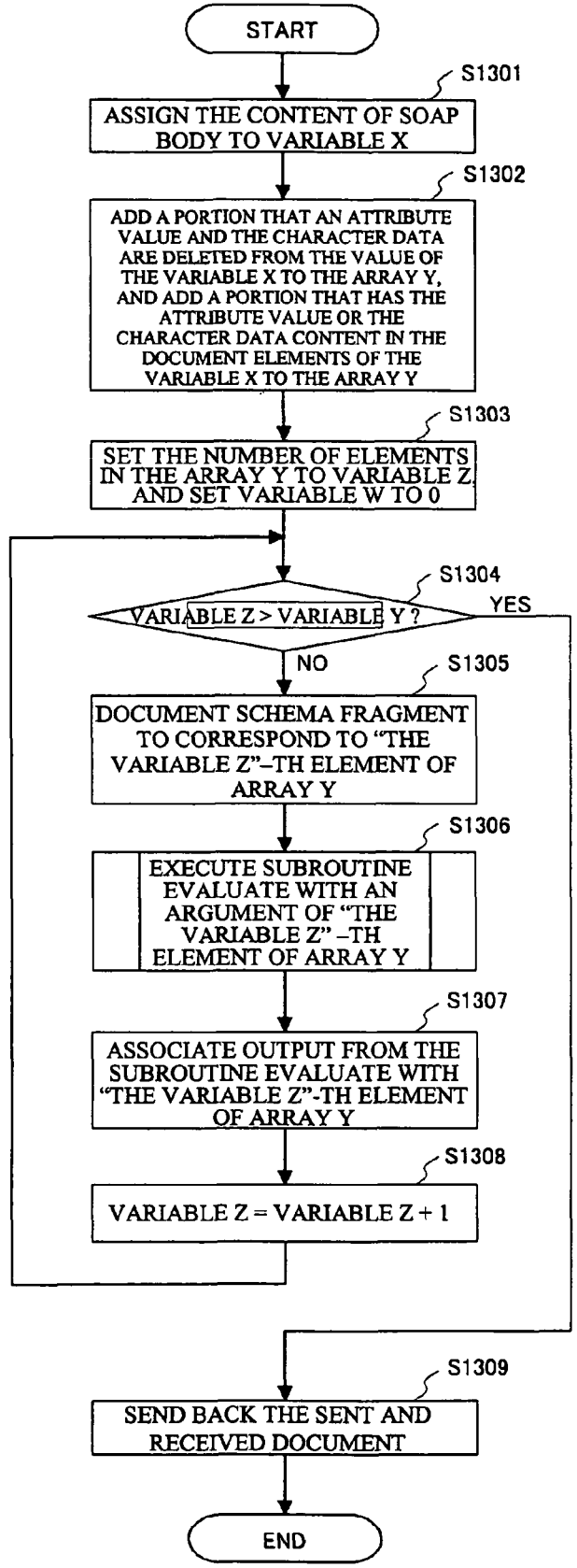
FIG. 58 exemplarily shows an alternative flow chart of the subroutine CANONICALIZE according to the ninth embodiment of the present invention.

FIG. 58 exemplarily shows an alternative flowchart of processes of the verification process controlling portion 115 in accordance with the ninth embodiment of the invention. The verification process controlling portion 115 assigns the content of the SOAP body to the variable X, at step S1301. At step S1302, a portion in which an attribute value and the character data are deleted from the value of the variable X is added to the array Y, and a portion that has the attribute value or the character data content in the document elements of the variable X is added to the array Y. In other words, at step S1302, processed are the portion in which the attribute value and character data are deleted from the document (except for the content and attribute of the document element defined by an external document schema) and the portion that has the attribute or the character data content in the respective document elements that compose a document.

At step S1301, the number of elements in the array Y is set to variable Z, and 0 is set to the variable W. If the value of the variable Z is not greater than that of the variable Y at step S1304, a document schema fragment is generated to correspond to a "the variable Z"-th element of the array Y at step S1305. At step S1305, a schema, in which all data types of the character data in the input document schema are converted into string types, is generated as a document schema for the whole document. At step S1306, the subroutine EVALUATE is executed with an argument of the variable Z-th element of the array Y. At step S1307, the output from the subroutine EVALUATE is corresponded to the variable Z-th element of the array Y. At step S1308, the variable Z is incremented and processing returns to step S1304. If the value of the variable Z is greater than the value of the variable Y at step S1304, the sent and received document is sent back at step S1309.

In the processes shown in FIG. 57, the document is divided into the relationship between the document elements and the respective document elements, and the respectively corresponding document schemas are generated. In the processes shown in FIG. 58, the document schema that does not check the character data type and the document schema that checks the character data type of the respective document elements are generated, and in addition, the respectively corresponding document fragments are generated. This is based on the assumption that the change in the document is made locally in many cases with respect to a specific document element. In addition to this, it is possible to divide the document into the relationship between the document elements, the respective document elements that exclude the character data, and the respective character data. Furthermore, it is possible to divide the document into a partial tree having a top of a specific document element and a rest thereof.

FIG. 59 through FIG. 69 partially show the process (the relationship between the document elements and the document elements that appear from the first line to the fifth line in FIG. 18) generated at step S1142, when the document shown in FIG. 18 is input into the document verification service and the process shown in FIG. 57 is performed by the verification process controlling portion 115, in accordance with the present embodiment. FIG. 70 shows a document that corresponds to a place element in the forty-third line in FIG. 18. FIG. 71 through FIG. 81 show document schema fragments corresponding to the documents shown in FIG. 59 through FIG. 70. FIG. 82 shows a document schema fragment corresponding to the document shown in FIG. 70.

Figure 83:
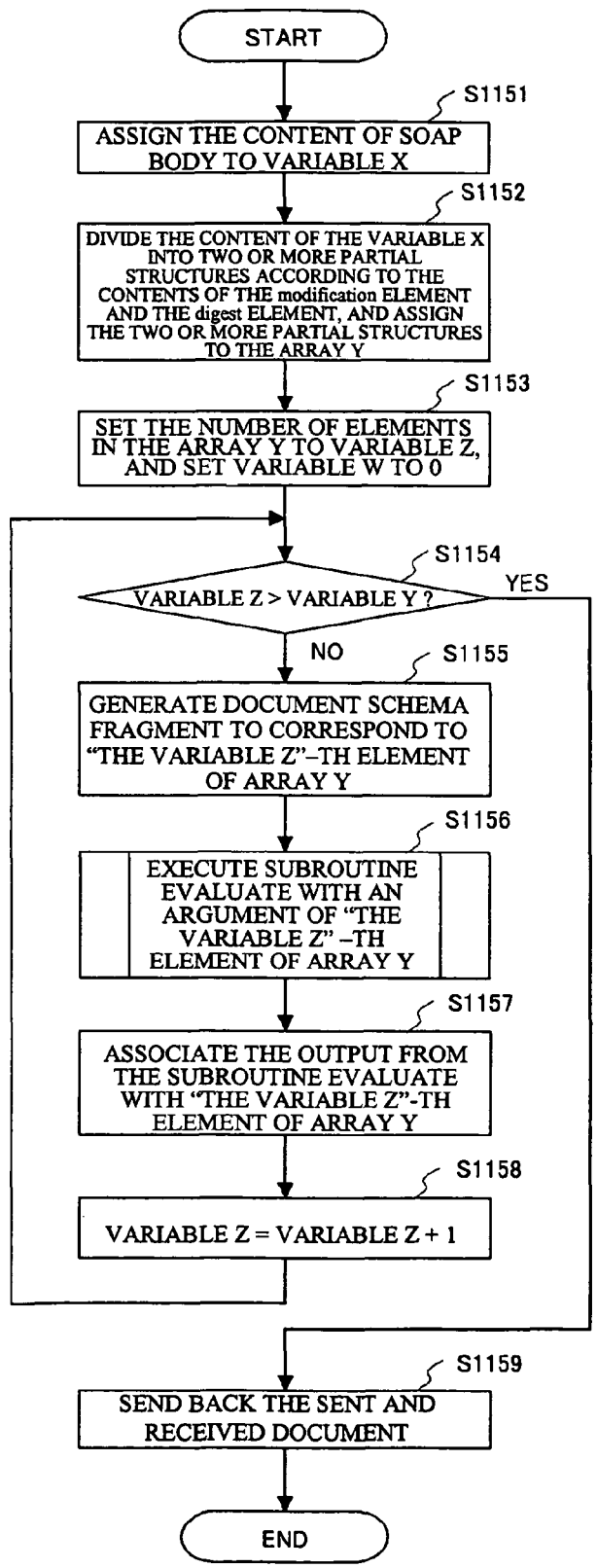
FIG. 83 exemplarily shows a flow chart of processes according to a tenth embodiment of the present invention.

FIG. 84, FIG. 60, FIG. 62, and FIG. 63 respectively show portions (a portion in which the character data that includes the attribute value is deleted from the document and the document elements that appear from the first line to the sixth line in FIG. 18) to be processed, which are generated at step S1302, when the document shown in FIG. 18 is input into the document verification service 210 employed in the present embodiment and the processes shown in FIG. 83 are carried out on the verification process controlling portion 115. FIG. 85, FIG. 72, FIG. 74, and FIG. 75 show document schema fragments that correspond to the above-described portions.

It is also possible to generate, in advance, all the document schema fragments that include the document schema fragment shown in FIG. 71 through FIG. 82 and FIG. 86 when the document schema is obtained. This makes it possible to improve the processing efficiency of a case where lots of documents associated with an identical document schema are processed.

Hereinafter, in the present embodiment, it is assumed that the process shown in FIG. 67 is implemented on the verification process controlling portion 115. Even in a case where the processes shown in FIG. 83 are implemented, similar process results are obtainable as described hereinafter.

FIG. 86 partially shows the sent and received document that includes the document shown in FIG. 18 sent back from the translation service. Fourth line to fifteenth line in FIG. 86 retain the description that specifies a document portion that corresponds to FIG. 59 through FIG. 69, the true value of the process result when the validity verification of the document portion is processed most recently, and the digest element that retains the digest value obtained from the document portion. For simplification, the digest elements that correspond to other document portions are omitted.

For example, the document portion that corresponds to the structure attribute, text attribute, and attribute of the digest element in the fourth line includes only the relationship between the document elements, and does not include the text content or the document element attribute. The value of a path attribute denotes an XPath location path to specify the document element located on the top of the document portion that corresponds to the digest element. Here, the content of the validity attribute and that of the digest element are described above.

FIG. 87 shows a list of the digest values (new digest values) calculated by the document portion shown in FIG. 59 through FIG. 70 and the digest values (old digest values) shown in FIG. 86, when the sent and received document shown in FIG. 86 is input into the document verification service. As shown in FIG. 87, only the document portion (a place element in the forty-third line in FIG. 18) having a location path of "/itinerary/stay[1]/place" is different between the new and old digest values, and the subroutine VALIDATE is executed on only the document portion and the digest values are renewed.

The document verification service 210 employed in the present embodiment calls the subroutine EVALUATE after the input document is divided in a text format without change. In addition to this, it is possible to configure such that the input document is converted into the DOM tress and then divided.

As described heretofore, a document to be processed is divided into multiple portions, and it is determined whether a change is made on each of the verification process results of the multiple portions. Accordingly, even if a change is made to the document, the portion on which the validity verification process is to be performed can be reduced as compared to the whole document, thereby improving the processing efficiency.

Tenth Embodiment

A tenth embodiment will be described. The document verification service 210 employed in a tenth embodiment a portion of the document, not the whole document, is input into the subroutine EVALUATE, same as described in the sixth embodiment. In addition to this, the document verification service employed in the tenth embodiment receives from a service that has requested the validity verification process, information on the document part that has been changed by the service, and then divides the document with the use of the information received. A description is given with reference to FIG. 24. When it is determined that a change is made to the electronic document that influences the verification result, the verification process controlling portion 115 divides the electronic document into a portion to which the changed is made and the rest of the document. At this time, if the electronic document is a structured document, the verification process controlling portion 115 divides the structured document into a partial tree and the rest thereof. The document verifying portion 114 verifies whether or not the portion in which a change is made satisfies a given condition. Even if a change is made to the document, the portion on which the validity verification process is performed can be smaller than the whole document, thereby improving the processing efficiency.

A description is now given in more detail. The document shown in FIG. 8 is sent to the first airline 105 from the travel agency 109, the sent and received document that includes the document shown in FIG. 8 is sent to the document verification service 210 employed in the present embodiment, from the first airline 105, and the validity verification process is requested. FIG. 88 shows the sent and received document that is sent at this time.

In the fourth line in FIG. 88, the digest element is shown. The digest element retains the verification result and the digest value, when the validity verification process was performed on the whole document most recently. In addition to this, in the fifth and sixth lines, the modification elements are added by the travel agency 109 that has sent this sent and received document. The modification element represents a possibility that a change will be made by the first airline 105, who is a receiver of the sent and received document. The value of a path attribute of the modification element is a location path of XPath that represents the document element located on the top of a partial structure to which there is a possibility that a change is made.

A subtree attribute specifies that the partial structure to which there is a possibility that a change is made is any of a partial tree having a top of the document element specified by the path attribute and a portion that excludes the partial tree having a top of the document element. If the attribute value is "true", this represents the former. If the attribute value is "false", this represents the latter. The modification elements in the fifth and sixth lines denote that there is a possibility of changing a partial tree having a top of a second-appearing travel element immediately below itineraryInProcess element and a partial tree having a top of a fifth-appearing travel element.

FIG. 83 exemplarily shows a flowchart of processes of the verification process controlling portion 115. The processes shown in FIG. 83 are identical to those shown in FIG. 17 except the content of step S1152. According to the process in FIG. 57, the division result of the document is determined in advance. However, in the process in FIG. 83, the division result of the document is determined on the basis of the contents of the modification element and the digest element, which are written in the SOAP header of the sent and received document.

At step S1151, the verification process controlling portion 115 assigns the content of the SOAP body to the variable X. At step S1152, the content of the variable X is divided into two or more partial structures according to the contents of the modification element and the digest element, and such two or more partial structures are assigned to the array Y. At step S1153, the variable Z is set to the number of the elements of the array Y, and the variable W is set to 0. If the value of the variable Z is not greater than the value of the variable Y at step S1154, a document schema fragment that corresponds to the variable Z-th element of the array Y is generated at step S1155. At step S1156, the subroutine EVALUATE is executed with an argument of the variable Z-th element of the array Y. At step S1157, the output from the subroutine EVALUATE is corresponded to the variable Z-th element of the array Y. At step S1158, the variable Z is incremented and processing returns to step S1154. If the value of the variable z is greater than the value of the variable Y at step S1154, the sent and received document is sent back at step S1159.

FIG. 89 shows a sent and received document sent back to the first airline 105 from the document verification service 210. In FIG. 89, a partial tree having a top of the second-appearing travel element immediately below the itineraryInProcess element is retained as the digest element in the fifth line, a partial tree having a top of the fifth-appearing travel element is retained as the digest element in the sixth line, and the validation verification result and the digest value of the document obtained by excluding the afore-described partial trees from the document are respectively retained as the digest elements in the fourth line.

Next, a consideration is given to a situation when the whole sent and received document shown in FIG. 89 is renewed from FIG. 8 to FIG. 9 by the travel agency 109. FIG. 90 shows the sent and received document sent to the document verification service 110 from the travel agency 109. FIG. 91 shows a list of the digest values (old digest values) retained as the digest element, the digest values (new digest values) calculated by the document verification service 110, with respect to three partial structures in which the validity verification results and the digest values are retained.

Since FIG. 91 exhibits that only the partial tree, which has a top of the second-appearing travel element immediately below the itineraryInProcess element, has been changed, the subroutine VALIDATE is executed on only the afore-described partial tree. If the document schema that conforms to W3C XML Schema is used, the document schema corresponding to the document can be utilized to execute the verification process on only an arbitrary partial tree. Therefore, the document schema shown in FIG. 6 can be used without change at the time of executing the subroutine VALIDATE.

The document verification service employed in the present embodiment calculates and compares the digest values of the portions (a portion that excludes, from the document, the partial tree having a top of the second-appearing travel element and the partial tree having a top of the fifth-appearing travel element immediately below the itineraryInProcess element) that are specified by the modification element shown in FIG. 88 that there is no possibility of a change. However, it is possible to configure to skip the above-described process.

It is also possible to configure such that the document verification service 210 divides the input document in a text format and calls the subroutine EVALUATE. In addition to this, it is possible to configure such that the input document is converted into a DOM tree and the DOM tree is divided.

As stated, by dividing the document to be processed into multiple portions according to the information obtained from the service and determining whether or not a change that influences the verification process result has been made, the portion on which the validity verification process should be performed can be made smaller than the whole document, even if a change has been made on the document. Thus, the processing efficiency can be improved.

Eleventh Embodiment

Figure 92:
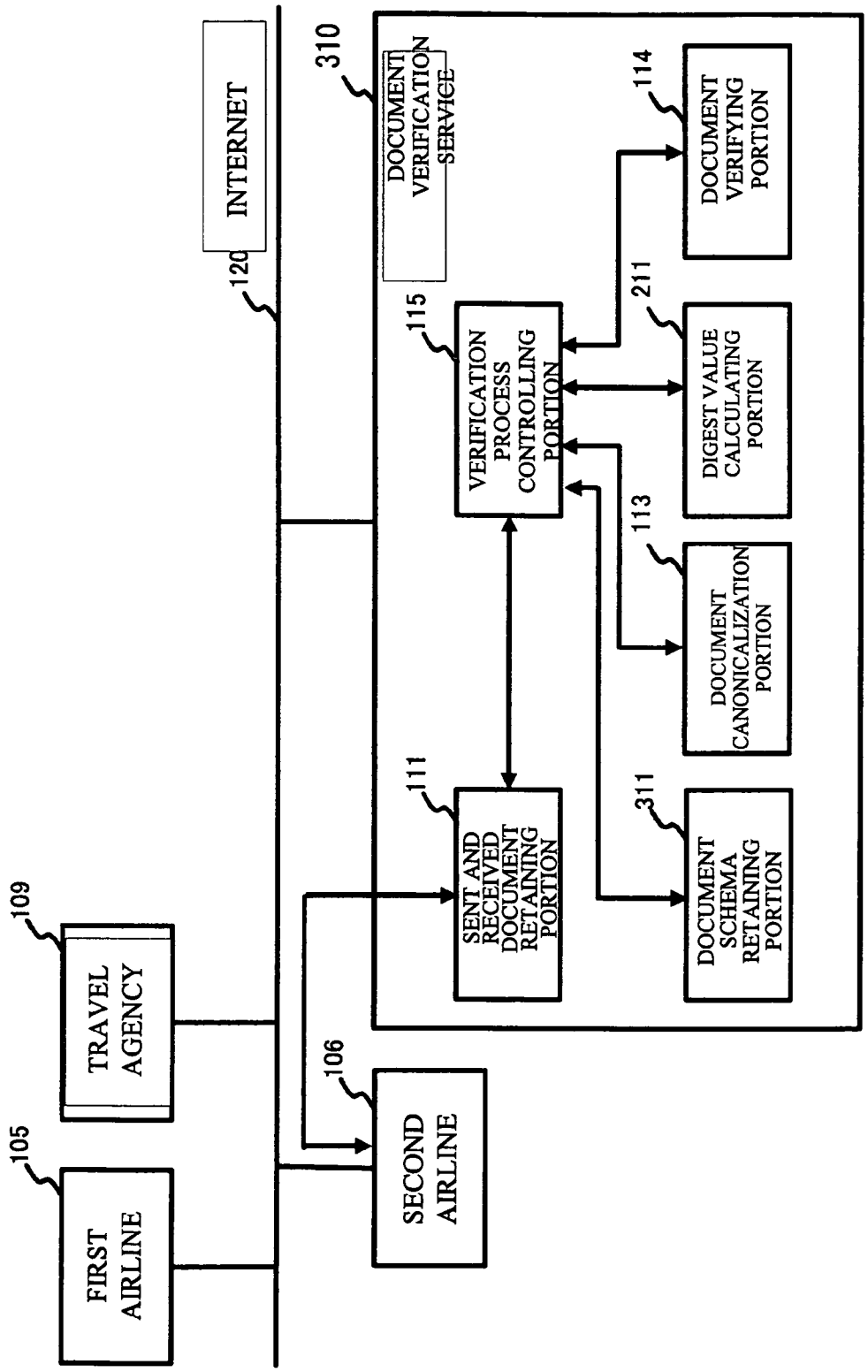
FIG. 92 shows a schematic view of a system employed in an eleventh embodiment of the present invention.

An eleventh embodiment will be described. The eleventh embodiment of the invention exemplarily describes a case where the document schema is revalidated due to a change of the document schema. The document verification service employed in the eleventh embodiment detects the change not only of the document but also of the document schema, and the validity verification is performed. FIG. 92 shows a schematic view of a system 300 employed in the present embodiment. The system 300 includes the first airline 105, the travel agency 109, and a document verification service 310. These are respectively connected onto the network 120 such as the Internet. The document verification service 310 includes the sent and received document retaining portion 111, the document canonicalization portion 113, the document verifying portion 114, the verification process controlling portion 115, the digest value calculating portion 211, and a document schema retaining portion 311. That is to say, in addition to the components shown in FIG. 24, the document schema retaining portion 311 is added. The document schema retaining portion 311 retains the schema.

The verification process controlling portion 115 determines that a change that influences the verification result is made on a given schema, if the information obtained by implementing a given operation on a given document schema (an old digest value of the document schema) is different from the information obtained by implementing a given operation on a given document schema (anew digest value of the document schema) at the time when a structured document is validated most recently. The document verification service 310 employed in the present embodiment is capable of detecting the change not only of the document but also of the document schema and performing the validity verification.

Figure 93:
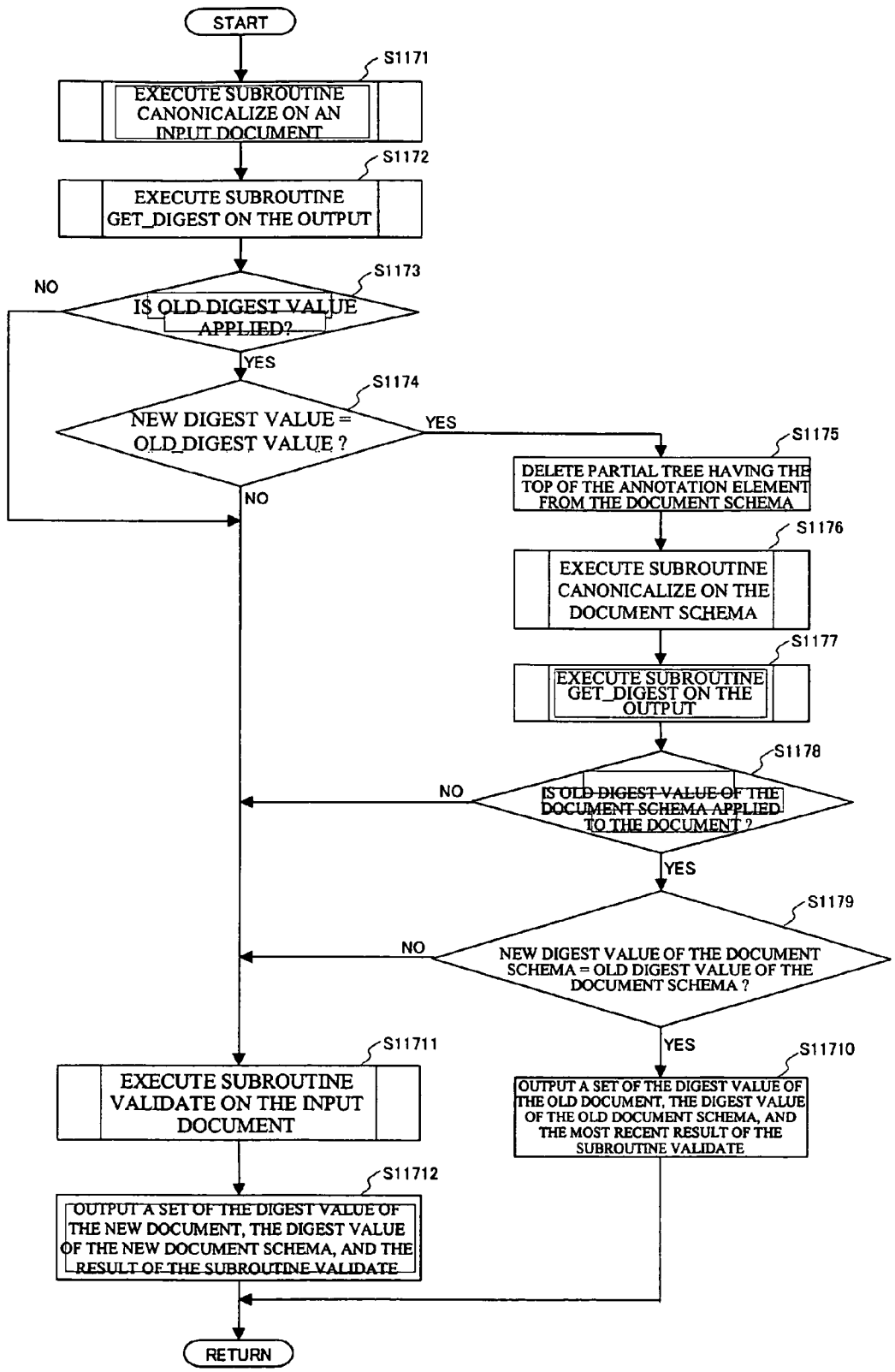
FIG. 93 is a flow chart of processes of the subroutine EVALUATE according to an eleventh embodiment of the present invention.

FIG. 93 is a flowchart of processes of the subroutine EVALUATE on the verification process controlling portion 115 in accordance with the eleventh embodiment. In FIG. 93, only if the old digest value and the new digest value of the document and document schema are identical, a set of the old digest values and the validity verification result are output. If not, the subroutine VALIDATE is called. However, for the document schema, the verification process controlling portion 115 deletes (excludes) a partial tree having a top of an annotation element from the document schema as a portion that does not influence the verification result at step S1175, before the subroutine CANONICALIZE is called.

At step S1171, the subroutine CANONICALIZE is executed on an input document. At step S1172, the subroutine GET_DIGEST is executed on the output. If the old digest value is not applied at step S1173, processing goes to step S11711. If the old digest value is applied, processing goes to step S1174. If the new digest value and the old digest value are not identical at step S1174, processing goes to step S11711. If the new digest value and the old digest value are identical, processing goes to step S1175. At step S1175, the partial tree having the top of the annotation element is deleted from the document schema.

At step S1176, the subroutine CANONICALIZE is executed on the document schema. At step S1177, the subroutine GET_DIGEST is executed on the output. If the old digest value of the document schema is applied to the document at step S1178, processing goes to step S1179. If not, processing goes to step S11711. If the new digest value of the document schema and the old digest value of the document schema are identical at step S1179, a set of the digest value of the old document, the digest value of the old document, and the most recent result of subroutine VALIDATE at step S11710. At step S11711, the most recent result of subroutine VALIDATE is output. At step S11712, the set of the digest value of the new document, the digest value of the new document schema, and the result of the subroutine VALIDATE are output.

It is assumed that the document shown in FIG. 9 is sent back to the travel agency 109 from the first airline 105, and the document schema shown in FIG. 6 is renewed before the document is sent to the second airline 106 from the travel agency 109. FIG. 94 shows a document schema after renewal. In the document schema shown in FIG. 6, the children element has to be appeared immediately below the passengers element. However, in the document schema in FIG. 94, there is a change in that the children element needs not to be appeared in the document schema in FIG. 94 (see the nineteenth line). In accordance with this change, the content of the annotation element (in the fourth line) is also changed.

FIG. 95 is a view showing the sent and received document when the document shown in FIG. 9 is returned to the travel agency 109. In the SOAP header of FIG. 95, added are the digest element retaining not only the digest value of the document and the most recent verification result (in the fourth line) but also the digest value of the document schema (in the fifth line).

The document shown in FIG. 95 is sent to the second airline 106 from the travel agency 109, and the validity verification process is requested to the document verification service from the second airline 106. Then, the new digest value and the old digest value of the document and that of the document schema are compared on the basis of the process flow shown in FIG. 93, at step S1174. As a result, the new digest value and the old digest value of the document are identical. However, the new digest value and the old digest value of the document schema are not identical at step S1179. Processing moves to step S11711 from step S1179. At step S11711, the subroutine VALIDATE is called, and the new digest value and the process result of the subroutine VALIDATE are output at step S11712.

Twelfth Embodiment

A twelfth embodiment will be described. The twelfth embodiment exemplarily describes a case where inclusion relation of the language defined by the document schema is determined. The document verification service 310 employed in the present embodiment detects the change of the document schema and implements the validity verification, in a similar manner as described in the eleventh embodiment. In addition, the document verification service 310 employed in the present embodiment determines whether or not the change of the schema influences the validity verification result. Only when the change influences the validity verification result, the validity verification is performed.

The schematic view of the document verification service employed in the present embodiment is similar to that employed in the eleventh embodiment as shown in FIG. 92. However, the document verification service 310 employed in the present embodiment retains a latest document schema specified by an identical identifier on the document schema retaining portion 311, whenever the subroutine VALIDATE is executed.

The verification process controlling portion 115 determines that there is no change in the document schema that influences the validity verification result, if a language defined by a new document schema (a first language defined by a given document schema) includes the language defined by the old document schema (a second language defined by the given document schema when the structured document is verified most recently), and the result (verification result) of the most recent subroutine VALIDATE is "true". The verification process controlling portion 115 also determines that there is not a change in the document schema that influences the validity verification result, if the language defined by the old document schema includes the language defined by the new document schema, and the result (verification result) of the most recent subroutine VALIDATE is "false".

Figure 96:
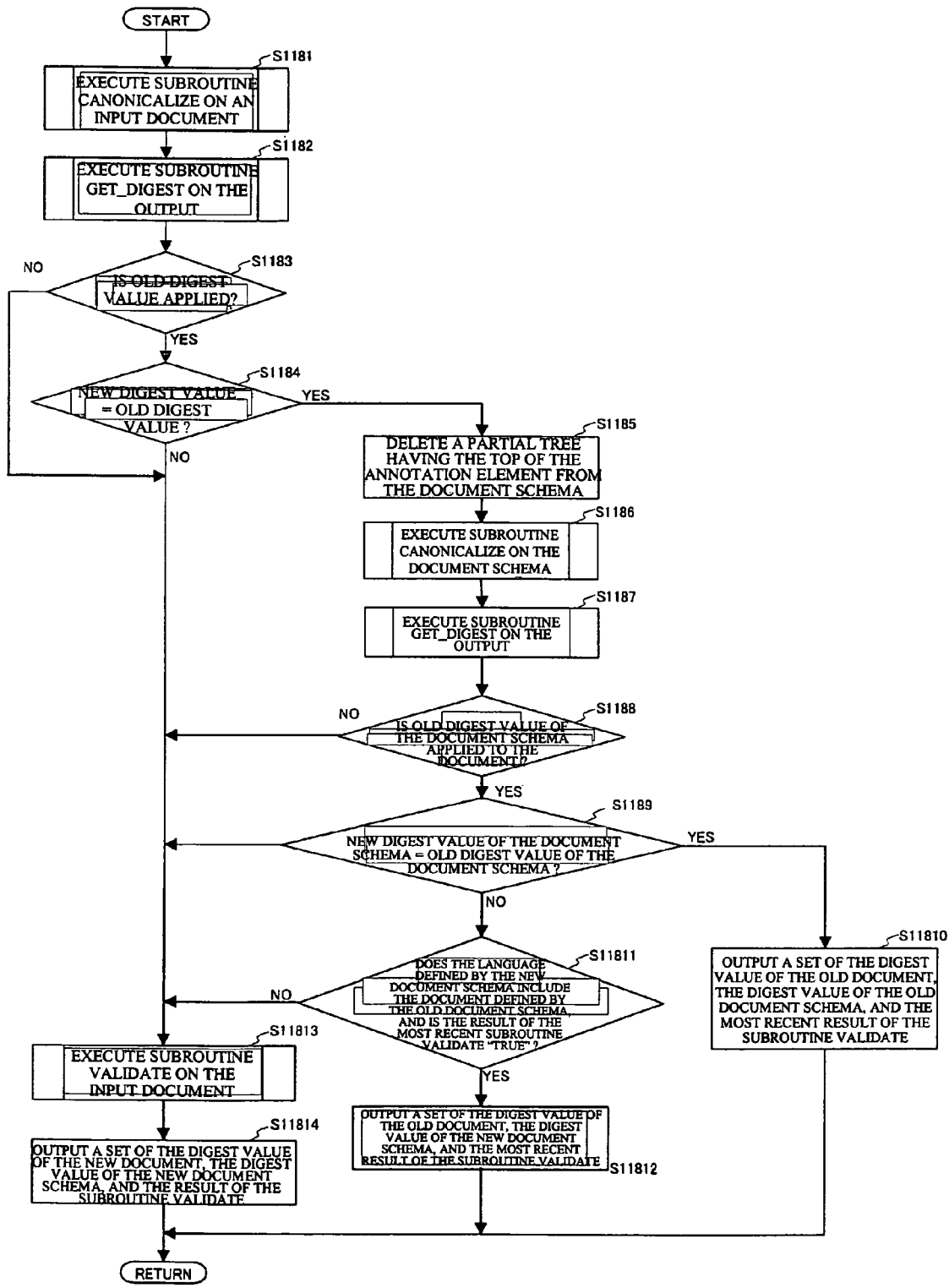
FIG. 96 is a flow chart of processes of the verification process controlling portion according to a twelfth embodiment of the present invention.

FIG. 96 is a flowchart of processes of the verification process controlling portion 115. At step 1181, the verification process controlling portion 115 executes the subroutine CANONICALIZE on the input document. At step S1182, the subroutine GET_DIGEST is executed on the output. If the old digest value of the document is not applied at step S1183, processing goes to step S11813. If the old digest value is applied, processing goes to step S1184. If the new digest value of the document is not identical to the old digest value of the document at step S1184, processing goes to step S11813. If the new digest value of the document is identical to the old digest value of the document, processing goes to step S1185. At step S1185, the partial tree having the top of the annotation element is deleted from the document schema. At step S1186, the subroutine CANONICALIZE is executed on the document schema.

At step S1187, the subroutine GET_DIGEST is executed on the output. If the old digest value of the document schema is not applied to the document at step S1188, processing goes to step S11813. If the old digest value of the document schema is applied to the document at step S1188, processing goes to step S1189. If the new digest value of the document schema is not identical to the old digest value of the document schema at step S1189, processing goes to step S11811. If the new digest value of the document schema is identical to the old digest value of the document schema at step S1189, a set of the digest value of the old document, the digest value of the old document, and the result of the most recent subroutine VALIDATE at step S11810. If the language defined by the new document schema includes the document defined by the old document schema, and the result of the most recent subroutine VALIDATE is not "true", processing goes to step S11813. If it is "true", the set of the old digest value, the digest value of the new document, and the result of the most recent subroutine VALIDATE at step S11812. At step S11813, the subroutine VALIDATE is executed on the input document. At step S11814, the set of the digest value of the new document, the digest value of the new document schema, and the result of the VALIDATE are output.

In the processes of the verification process controlling portion 115 employed in the ninth embodiment (shown in FIG. 93), the subroutine VALIDATE is activated unconditionally, if the new digest value of the document schema is not identical to the old digest value of the document schema. Meanwhile, if the language defined by the new document schema includes the language defined by the old document schema and the result of the most recent subroutine VALIDATE is "true", although the new and the old digest values of the document schema are not identical, the verification process controlling portion 115 employed in the twelfth embodiment determines that a change of the document schema does not influence the validity verification result and terminates the process without activating the subroutine VALIDATE.

Although the processes in FIG. 96 do not include, it is possible to add a process of determining that the change of the document schema does not influence the validity verification result and terminating the process without activating the subroutine VALIDATE, even in a case where the language defined by the old document includes the language defined by the new document schema and the result of the most recent subroutine VALIDATE is "false".

Figure 97:
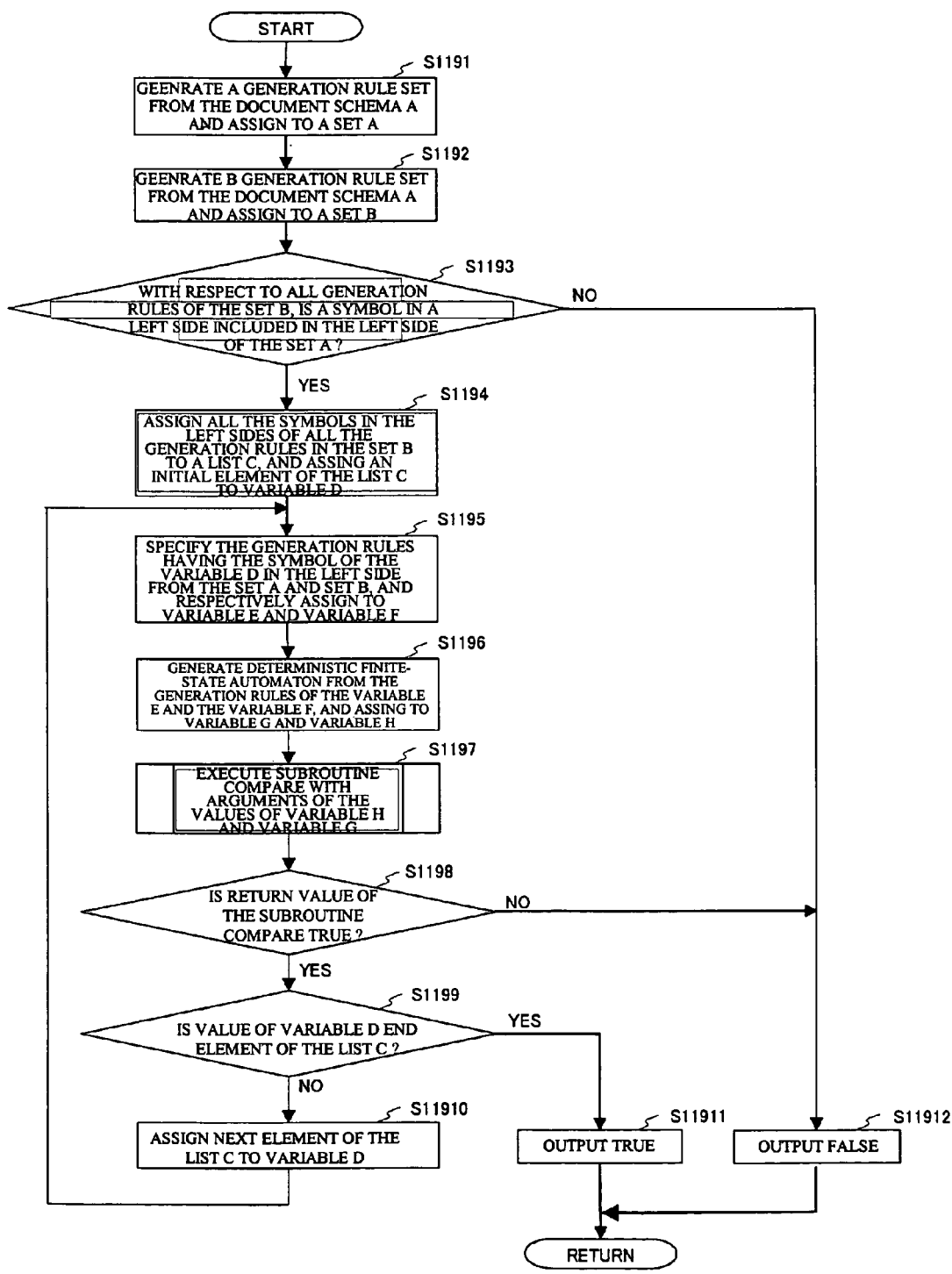
FIG. 97 shows a flow chart of processes of determining whether or not the language defined by a document schema A includes the language defined by a document schema B.

FIG. 97 shows a flowchart of processes of determining whether or not the language defined by a document schema A includes the language defined by a document schema B. At step S1191, a production rule set is generated from the document schema A and assigned to a set A. At step S1192, a production rule set is generated from the document schema B and assigned to a set B. With respect to all production rules of the set B, if a symbol in a left side is included in the left side of the set A, at step S1193, "false" is output at step S11912. If not, processing goes to step S1194. At step S1194, all the symbols in the left sides of all the production rules in the set B are assigned to a list C, and an initial element of the list C is assigned to a variable D. At step S1195, the production rules having the symbol of the variable D in the left side are respectively specified from the set A and set B, and are respectively assigned to a variable E and a variable F.

At step S1196, a deterministic finite-state automaton is generated from the production rules of the variable E and the variable F, and is assigned to a variable G and a variable H. At step S1197, a subroutine COMPARE is executed with arguments of the values of the variable H and the variable G. If a return value of the subroutine COMPARE is not true at step S1198, false is output at step S1198. If true, processing goes to step S1199. If the value of the variable D is not an end element of the list C at step S1199, the next element of the list C is assigned to the variable D at step S11910 and processing returns to step S1195. If the value of the variable D is an end element, true is output at step S11910.

The processes shown in FIG. 97 are implemented on the assumption that there is only one production rule having an identical symbol in the left side. Such assumption is satisfied in XML DTD. Meanwhile, in W3C XML Schema, multiple production rules having the identical symbol in the left side may be obtainable, because different content models can be defined according to the appearing position of the document element, with the use of the mechanism of local element and local attribute. According to exemplary embodiments of the invention, the document schema is employed such that a single content model is defined regardless of the appearing position of the document element.

Figure 98:
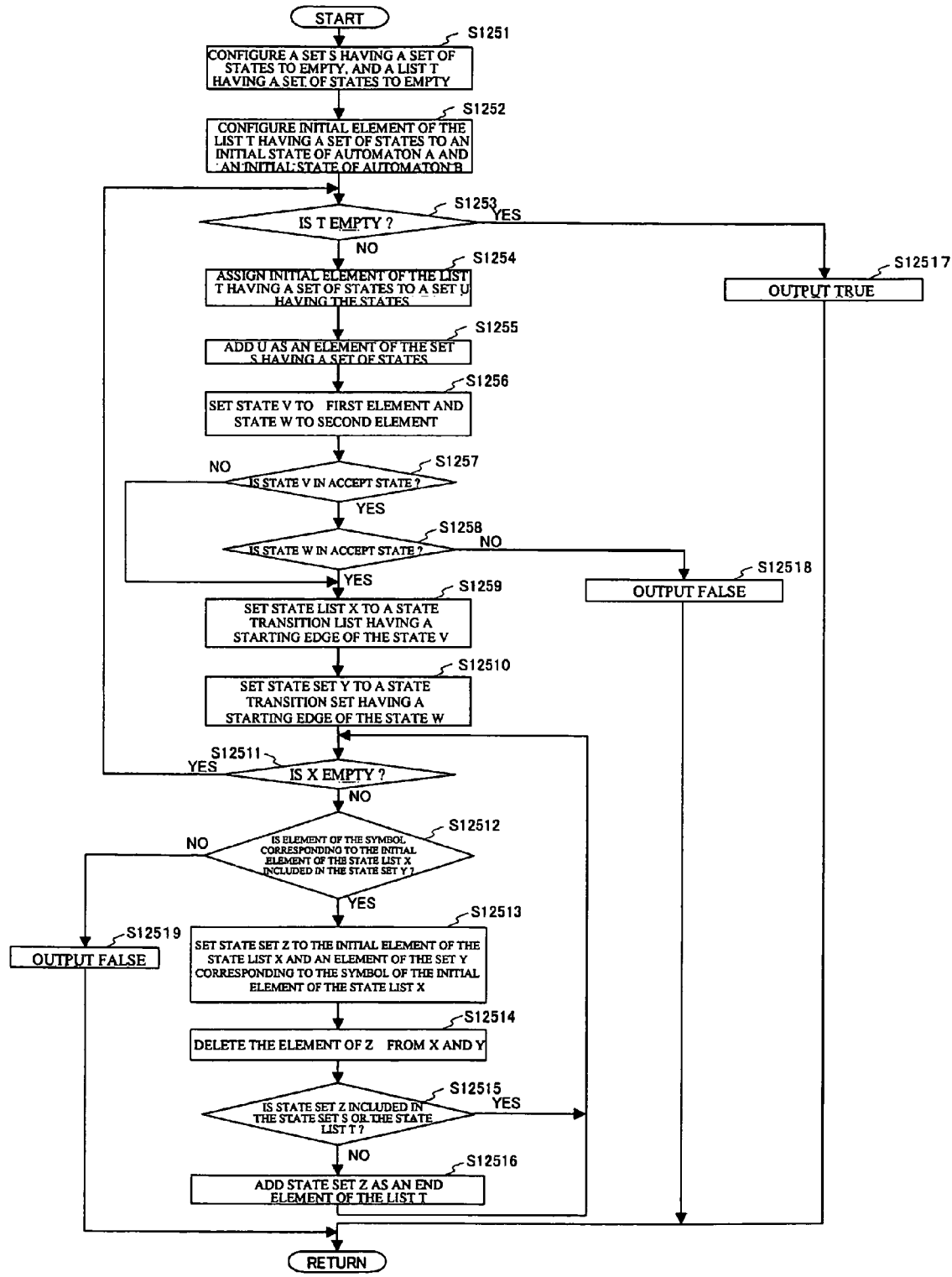
FIG. 98 is a flow chart of processes of the subroutine COMPARE according to the twelfth embodiment of the present invention.

FIG. 98 is a flowchart showing processes of the subroutine COMPARE at step S1197. The processes of the subroutine COMPARE determine whether the language defined by the deterministic finite-state automaton having a first argument includes the language defined by the deterministic finite-state automaton having a second argument. At step S1251, a set S having a set of states is set to empty, and a list T having a set of states is set to empty. At step S1252, an initial element of the list T having a set of states is set to an initial state of an automaton A and an initial state of an automaton B. If the list T having a set of states is empty at step S1253, true is output at step S12517. If the list T having a set of states is not empty, an initial element of the list T having a set of states is assigned to a set U having the states at step S1254. At step S1255, U is added as an element of the set S having a set of states. At step S1256, a state V is set to a first element of the set U having a set of states, and a state W is set to a second element of the set U having a set of states. If the state V is in an accept state at step S1257, processing goes to step S1258. If the state V is not in an accept state, processing goes to step S1259.

If the state W is in an accept state at step S1258, processing goes to step S1259. If not, false is output at step S12518. At step S1259, a state list X is set to a state transition list having a starting edge of the state V. At step S12510, a state set Y is set to a state transition set having a starting edge of the state W. If the state list X is empty at step S12511, processing goes back to step S1253. If not, processing goes to step S12512. If an element of the symbol corresponding to the initial element of the state list X is not included in the state set Y at step S12512, false is output at step S12519. If it is included in the state set Y, a state set Z is set to the initial element of the state list X and an element of the set Y corresponding to the symbol of the initial element of the state list X at step S12513.

At step S12514, the element of Z is deleted from X and Y. If the state set Z is included in the state set S or the state list T at step S12515, processing returns to step S12511. If not, the state set Z is added as an end element of the list T having a set of states at step S12516, and processing goes back to step S12511.

Figure 99:
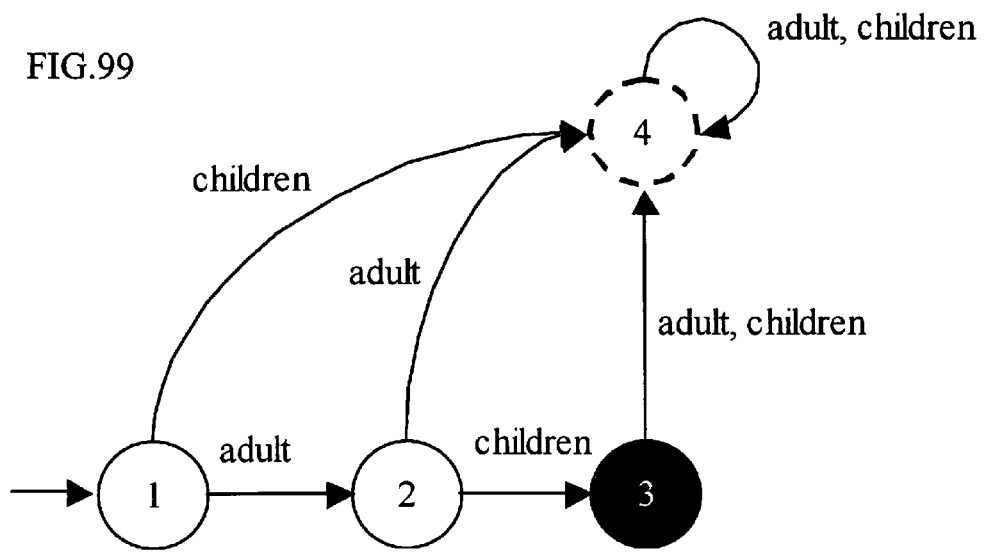
FIG. 99 is a view showing a deterministic finite-state automaton that accepts the language lead by the production rule that generates the symbol corresponding to the passengers element in the document schema shown in FIG. 6 in the left side.
Figure 100:
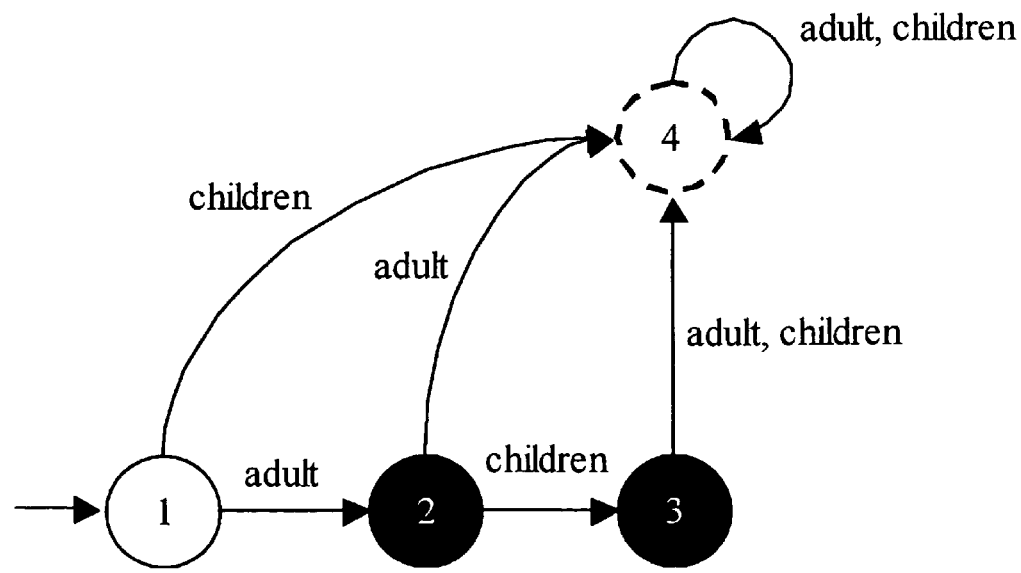
FIG. 100 is a view showing a deterministic finite-state automaton that accepts the language lead by the production rule that generates the symbol corresponding to the passengers element in the document schema shown in FIG. 94 in the left side.

FIG. 99 is a view showing a deterministic finite-state automaton that accepts the language derived by the production rule having the symbol corresponding to the passengers element in the document schema shown in FIG. 6 in the left side. FIG. 100 is a view showing a deterministic finite-state automaton that accepts the language derived by the production rule having the symbol corresponding to the passengers element in the document schema shown in FIG. 94 in the left side. In FIG. 99 and FIG. 100, the initial state is represented by a node located on a terminal of a side that does not have a node on a starting edge. The accept state is represented by a node having a white number. A trap state is represented by a node surrounded by a dashed line. A state transition is represented by a side having a node of a starting edge. Characters added to the side are symbols corresponding to the state transition.

The language composed of a symbol string accepted by the deterministic finite-state automaton shown in FIG. 100 includes the language accepted by the deterministic finite-state automaton shown in FIG. 99. The deterministic finite-state automaton shown in FIG. 100 accepts a symbol string composed only of a symbol "adult", but the deterministic finite-state automaton shown in FIG. 99 does not accept the above-described symbol. All the symbol strings accepted by the deterministic finite-state automaton shown in FIG. 99 are accepted by the deterministic finite-state automaton shown in FIG. 100.

With respect to the production rule and the deterministic finite-state automaton having the symbol corresponding to other document elements in the left side, identical production rules and the deterministic finite-state automatons are obtainable from the document shown in FIG. 6 and that in FIG. 94. When the subroutine COMPARE is activated with the afore-described automatons serving as arguments, the language accepted by the deterministic finite-state automaton shown in FIG. 100 includes the language accepted by the deterministic finite-state automaton shown in FIG. 99. Accordingly, the subroutine COMPARE returns "true". It is thus possible to end the process without executing the subroutine VALIDATE, improving the processing efficiency.

Thirteenth Embodiment

Figure 101:
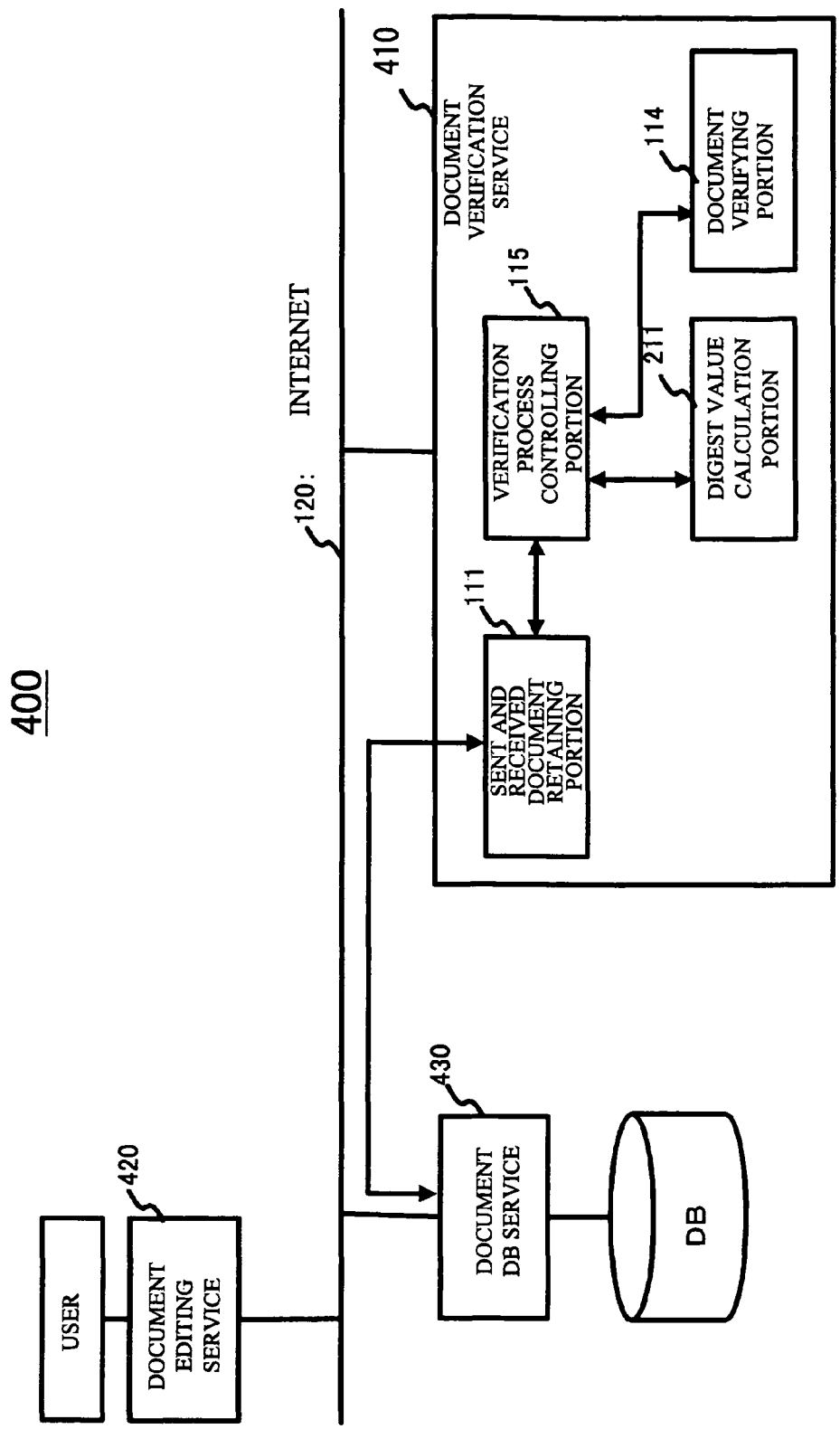
FIG. 101 is a schematic view of a system employed according to a thirteenth embodiment of the present invention.

A thirteenth embodiment will be described. The thirteenth embodiment is an exemplary embodiment that verifies an integral form. The document verification service employed in the thirteenth embodiment is different from the document verification services employed in the firth through twelfth embodiments, and is provided for determining whether or not the input document is an XML document in an integral form. FIG. 101 is a schematic view of a system employed in the present embodiment. A system 400 includes a document editing service 420, a document DB service 430, and a document verification service 410. These are connected onto the network such as the Internet. The document verification service 410 includes the sent and received document retaining portion 111, the verification process controlling portion 115, a digest value calculation portion 211, and the document verifying portion 114. The verification process controlling portion 115 is provided for verifying whether or not the input electronic document is an XML document in an integral form.

The document editing service 420 shown in FIG. 101 provides a document editing program suitable for a document edited by the user. For instance, if the document to be edited is not an XML document, a text editor is activated. If the document is an XML document, an XML document editor is activated. The user stores the document in process of editing on the document DB service 430, and reloads the document onto the document editing service 420 as needed, when restarting editing.

When the document is reloaded on the document editing service 420, the document editing service 420 sends the document to the document verification service 410, and asks whether or not the document is an XML document in an integral form. The document verification service 410 sends a reply of the sent and received document that includes the digest value of the determination result of the document to the document editing service 420. If the document is determined to be an XML document in an integral form, the document editing service 420 activates the XML document editor. If not, the document editing service 420 activates a text editor.

Figure 102:
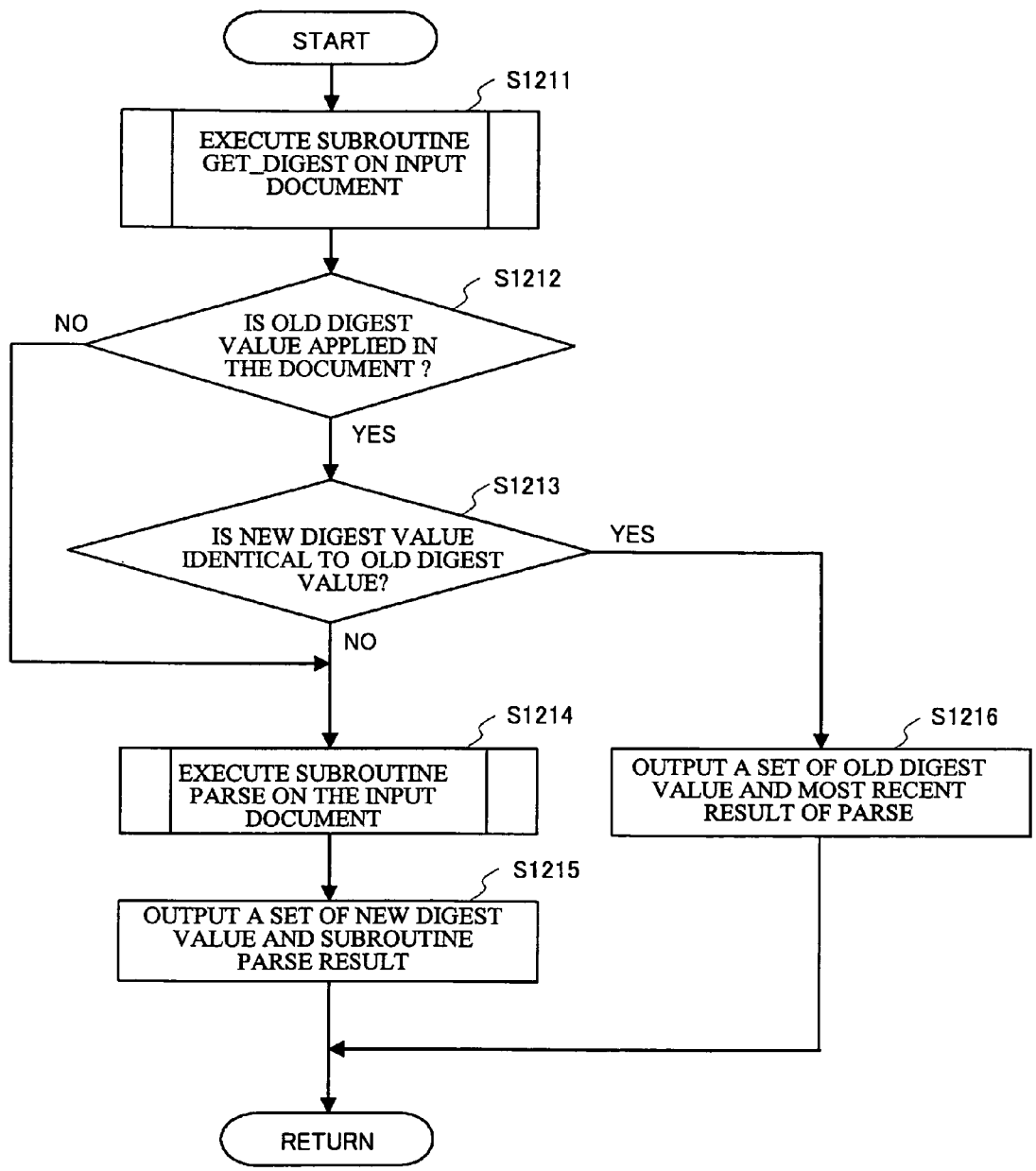
FIG. 102 is a flow chart of processes of the subroutine EVALUATE according to the thirteenth embodiment of the present invention.

The process flow of the document verification service 410 and that of the verification process controlling portion 115 are identical to that shown in FIG. 25. FIG. 102 is a flowchart of processes of the subroutine EVALUATE. At step S1211, the subroutine GET_DIGEST is executed on the input document. If the old digest value is applied to the document at step S1212, processing goes to step S1213. If not, processing goes to step S1214. If the new digest value equals to the old digest value at step S1213, a set of the old digest value and the result of a most recent subroutine PARSE are output at step S1216. At step S1214, the subroutine PARSE is executed on the input document. At step S1215, a set of the new digest value and the result of the subroutine PARSE.

FIG. 103 is a flowchart of processes at step S1211. In the processes shown in FIG. 102, the subroutine CANONICALIZE is not activated. This is because it is unknown whether the document is a well-formed XML document in integral form and the canonicalization process cannot be executed. At step S1221, the digest value of the document is calculated. At step S1222, the digest value is encoded and output.

FIG. 104 is a view showing an example of the sent and received document to be input into the document verification service employed in the present embodiment. The document in process of editing is retained in the content of the SOAP body. This document seems an XML document. However, there is no end tag of a p element in the eleventh line, and this is not a well-formed XML document in an integral form. Accordingly, there is "false" in the value of a welformedness attribute of the digest element on the fourth line. This value exhibits that it is determined this document is not well-formed, when it was determined most recently whether or not this document was written in an integral form. It is assumed that the following digest value is obtained, when the sent and received document shown in FIG. 104 is input.
4162bbb1d56dcf998518516f001fd72f This value is identical to the content of the digest value in the fourth line. Therefore, the document verification service 410 determines that there is no change in the document and the sent and received document is sent to the document editing service 420.

Next, a consideration is given to a situation when the document in the sent and received document shown in FIG. 4 is edited by the text editor to a well-formed XML document in an integral form, is stored on the document DB service 430, and is reloaded onto the document editing service 420. FIG. 105 is a view showing the sent and received document to be sent to the document verification service from the document editing service 420. It is assumed that the following digest value is obtained, when the sent and received document shown in FIG. 105 is input.
001fd72f4162bbb1d56dcf998518516f This value is different from the content of the digest element in the fourth line. Therefore, the document verification service 410 determines that there is a change in the document, and the subroutine PARSE is executed. As a result, the document is determined to be a well-formed XML document in an integral form, the content of the digest element is renewed, and the sent and received document shown in FIG. 106 is sent to the document editing service 420. The document editing service 420 refers to the result (the value of the welformedness attribute of the digest value), activates the XML document editor as an editor for the document, instead of the text editor.

As stated, even if the process of determining whether or not the document is a well-formed XML document in integral form when there is no change in the document, it is possible to know whether or not the document is a well-formed XML document having an integral form, by using the document verification service 410, enabling the improved processing efficiency.

Fourteenth Embodiment

Figure 107:
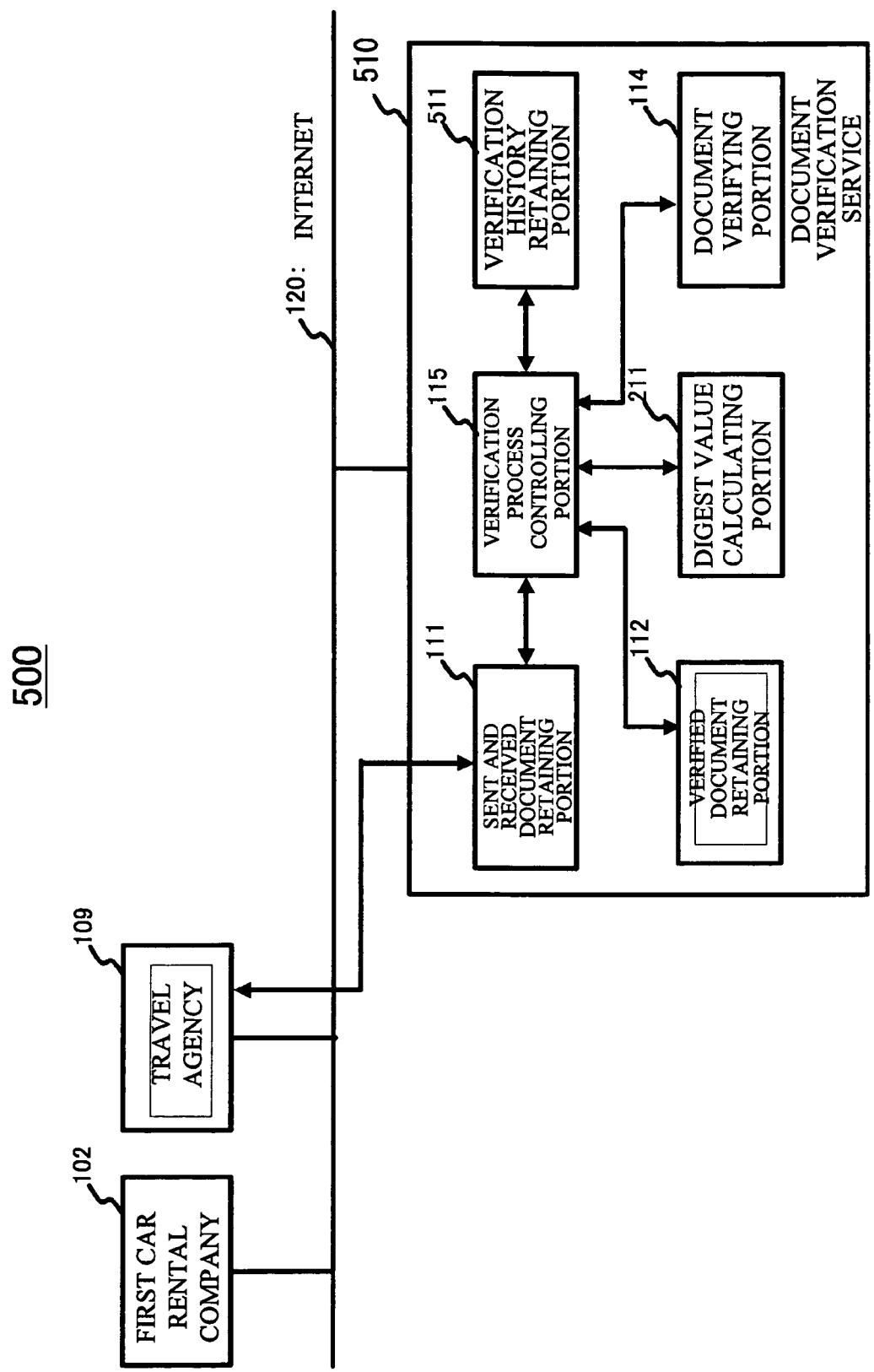
FIG. 107 is a schematic view of a system according to a fourteenth embodiment of the invention.

A fourteenth embodiment will be described. The fourteenth embodiment of the invention is an example where a verification history is retained. FIG. 107 is a schematic view of a system 500 in accordance with the present embodiment. The system 500 is provided with the first car rental company 102, the travel agency 109, and a document verification service 510. These are connected on the network 120 such as the Internet. The document verification service 510 is provided with the sent and received document retaining portion 111, the document canonicalization portion 113, the document verifying portion 114, the verification process controlling portion 115, the digest value calculating portion 211, and a verification history retaining portion 511.

In the embodiments described above, the digest value and the verification result when the document to be verified was verified most recently are retained in the header of the sent and received document (SOAP document). The verification history retaining portion 511 employed in the present embodiment retains a set of the value obtained as a result that one directional function process is applied (digest value of the document) in a past verification result and a verification result. If the value obtained as a result that one-directional function process is applied to the document to be verified is identical to any of the values retained on the verification history retaining portion 511, the verification result that corresponds to the value is set to the verification result of the electronic document.

This eliminates the necessity of making a set of the digest value and the verification result in association with the document to be verified. Only the document to be verified has to be sent to the document verification service from the service that requests the verification. Accordingly, in addition to SOAP employed in the above-described embodiments, representational state transfer (REST) protocol can be used. REST protocol is one of the protocols used for sending and receiving the document between the services connected over the Internet.

Figure 108:
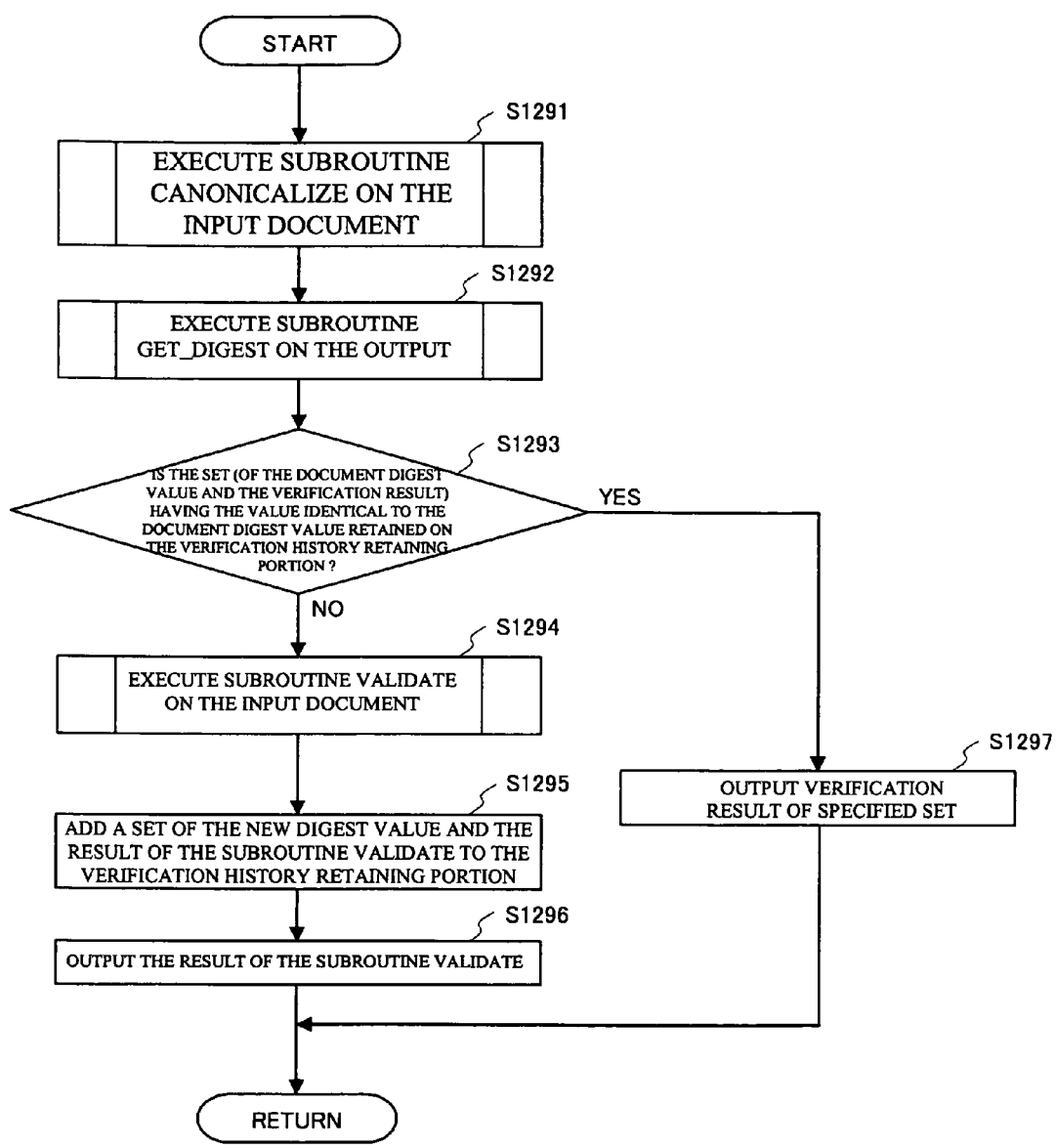
FIG. 108 is a flow chart of processes of the subroutine EVALUATE according to the fourteenth embodiment of the invention.

FIG. 108 is a flowchart of processes of the subroutine EVALUATE executed by the verification process controlling portion 115. At step S1291, the verification process controlling portion 115 executes the subroutine CANONICALIZE on the input document. At step S1292, the subroutine GET_DIGEST is executed on the output. IF the set (of the document digest value and the verification result) having the value identical to the document digest value is retained on the verification history retaining portion at step S1293, the verification result of a specified set is output at step S1293. IF the set (of the document digest value and the verification result) having the value identical to the document digest value is not retained on the verification history retaining portion, the subroutine VALIDATE is executed on the input document at step S1294. At step S1295, a set of the new digest value and the result of the subroutine VALIDATE is added to the verification history retaining portion 511. At step S1296, the result of the subroutine VALIDATE is output.

In a similar manner as described in the first and second embodiments, a consideration is given to a situation where the itinerary draft shown in FIG. 11 is sent to the first car rental company 102 from the travel agency 109 and sent back to the travel agency 109 without change. At this time, the verification history retaining portion 511 of the document verification service 510 retains in the following as a set of the verification result and the digest value.

"true", "3bebcec335f6e46bfe3563897ee544e0"

The document verification service 510 calculates the digest value of the itinerary draft, when the travel agency 109 requests for the verification process of the itinerary draft shown in FIG. 11. Then, the document verification service 510 tries to specify a set having an identical digest value in the verification history retaining portion 511, and specifies the above-described set. The verification history retaining portion 511 outputs "true", which is the verification result in such specified set, to the travel agency 109, and completes the process. This makes it possible to skip the verification process of the itinerary draft, thereby improving processing efficiency.

FIG. 109 shows examples of calculation results of (1) a verification processing period with a conventional method (only the subroutine VALIDATE is executed), (2) the verification processing period of unverified document with the use of a method employed according to an aspect of the invention (the subroutine CANONICALIZE, the subroutine GET_DIGEST, and the subroutine VALIDATE are executed in FIG. 26), and (3) a processing period of the verified document with the use of a method employed according to an aspect of the invention (the subroutine CANONICALIZE and the subroutine GET_DIGEST are executed), when the document shown in FIG. 111 and the document schema shown in FIG. 112 are processed, with the use of the document verification service employed in accordance with the second embodiment. Here, the document shown in FIG. 111 and the document schema shown in FIG. 112 are included in the W3C XML Schema Specification (Part 0: Primer). As is obvious from FIG. 109, the processing period of the process (3) is longer than that of the process (1), but is smaller that that of the process (2). When the method employed according to an aspect of the invention is applied to the document having a small number of changed times and a large number of used times, the number of execution times is small in the process (2) and the number of execution times is large in the process (3). Accordingly, in many cases, the total processing period is smaller than that of the conventional method.

Figure 110:
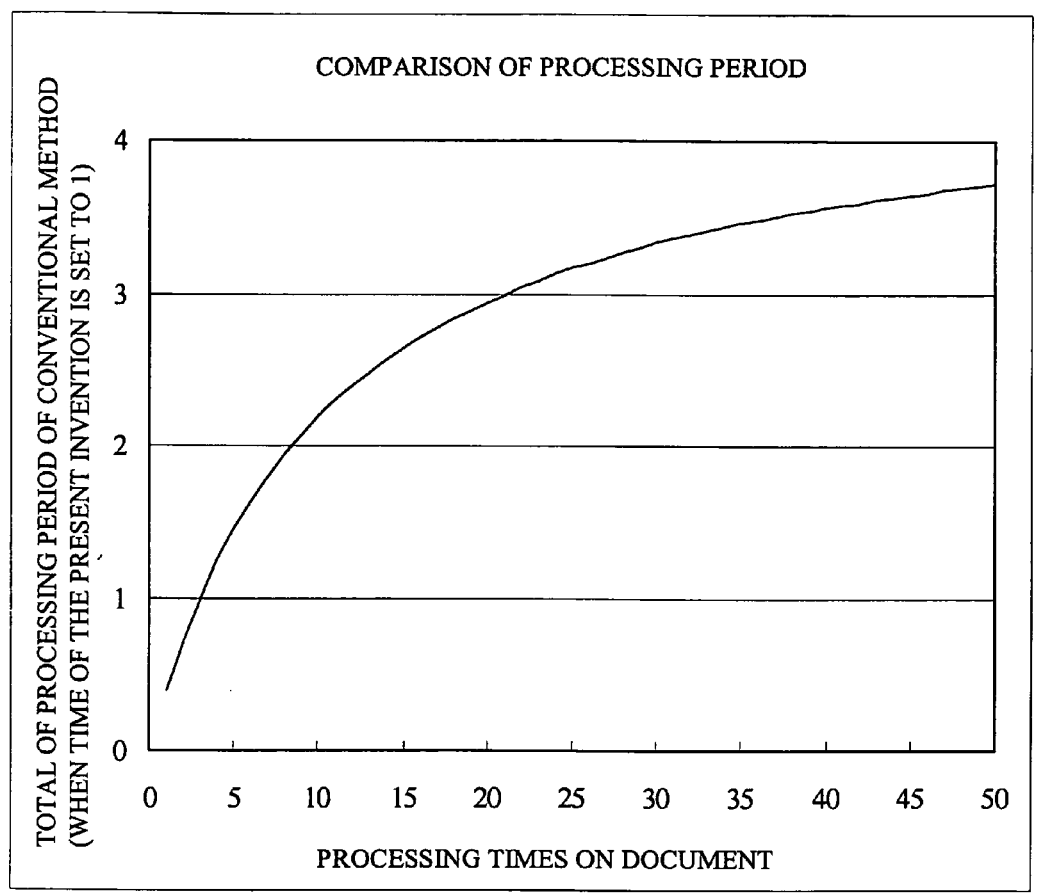
FIG. 110 shows correlation of the number of process times of an identical document and the processing time of the conventional method with the processing time of the method employed according to an aspect of the invention being set as 1, when the processing times shown in FIG. 109 is considered.

FIG. 110 shows correlation of the number of process times of an identical document and the processing period of the conventional method with the processing period of the method employed according to an aspect of the invention being set as 1, when the process times shown in FIG. 109 is considered. As is obvious from FIG. 110, the processing period of the conventional method is small when the number of process times is small. However, when the number of the process times is 4, the processing period of the conventional method becomes longer than that employed according to an aspect of the invention for the first time. As the number of the process times becomes greater, the processing period employed according to an aspect of the invention becomes relatively smaller than that of the conventional method. That is to say, as the number of the process times becomes greater without changing the document to be processed, the effect caused by an aspect of the invention is greater. Thus, if the number of the process times is greater than a given value (4 is an example in FIG. 110) after adding the subroutine CANONICALIZE or the subroutine GET_DIGEST to the subroutine VALIDATE in the method employed according to an aspect of the invention, the processing period is smaller than that of the conventional method in which the subroutine VALIDATE is repeated.

The document verification method employed according to an aspect of the invention, after it is verified whether the electronic document input satisfies a given condition, includes a step of determining whether or not there is a change that influences the verification result in at least one of the electronic document and the given condition, and if it is determined that there is a change that influences the verification result in at least one of the electronic document and the given condition, further includes a step of verifying the electronic document whether the electronic document satisfies the given condition to output a verification result and if it is determined that there is a change, output a result whether it is verified most recently that the electronic document satisfies the given condition, as a verification result. The steps are realized by executing the steps on CPU. The determining portion is realized by the verification process controlling portion 115. The outputting portion is realized by the document verifying portion and the verification process controlling portion 115.

The verification history retaining portion 511 of the system 500 employed according to an aspect of the invention retains only a set of the document digest value and the verification result. However, it is possible to configure to retain the information retained by the digest value in the SOAP header of the sent and received document employed according to embodiments of the invention. In addition, according to embodiments of the invention, the document verification apparatus is described as an independent service. However, it is possible to realize as a function applied to one or more services.

Fifteenth Embodiment

Figure 113:
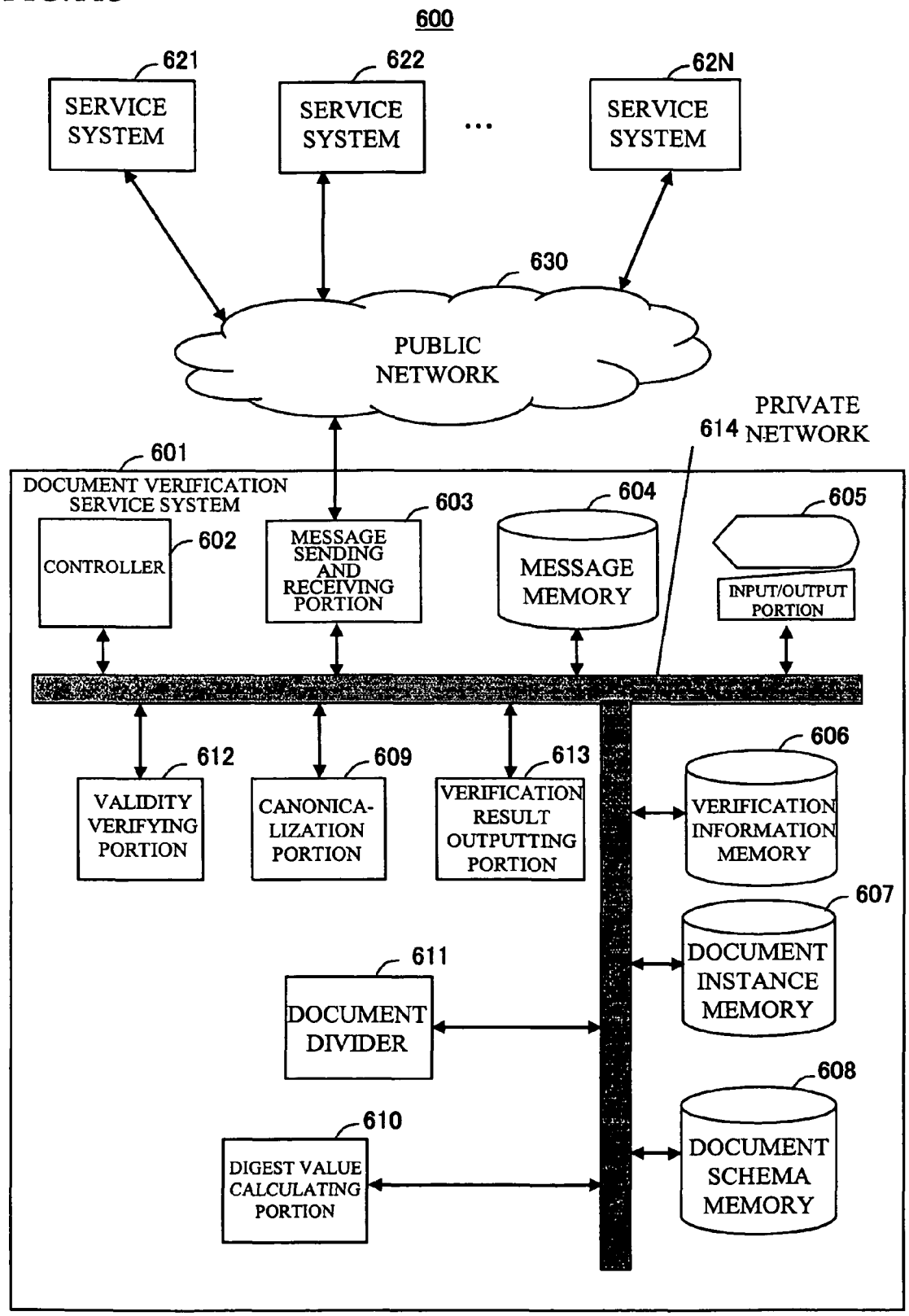
FIG. 113 illustrates a system configuration according to a fifteenth embodiment of the present invention.

A fifteenth embodiment will be described. FIG. 113 illustrates a system configuration in accordance with a fifteenth embodiment of the invention. Referring to FIG. 113, a system 600 is provided with a document verification service system 601 and service systems 621 through 62N. The document verification service system 601 is capable of sending and receiving messages to and from the service systems 621 through 62N over a public network 630. The document verification service system 601 receives a message that requests for the verification of a structured document from the service systems 621 through 62N, and sends a message of the verification result. Such sent and received message includes information for verification, as will be described later in detail. The document verification service system 601 is provided for verifying whether or not a structured document that has been input satisfies a given document schema. The document verification service system 601 promotes efficiency of the verification process with the use of the information for verification.

The document verification service system 601 includes a controller 602, a message sending and receiving portion 603, a message memory 604, an input/output portion 605, a verification information memory 606, a document instance memory 607, a document schema memory 608, a canonicalization portion 609, a digest value calculating portion 610, a document divider 611, a validity verifying portion 612, and a verification result outputting portion 613.

The document divider 611 divides the structured document into two or more portions on the basis of a structural feature of the document schema, as a method of dividing the structured document in view of data structure. The controller 602, after such divided structured document is verified whether or not it satisfies the document schema, determines whether or not there is a change that influences the verification result in at least one of such divided portions of the structured document and the document schema.

The verification result outputting portion 613 verifies whether or not a specific portion, in which the controller 602 determines that there is a change that influences the verification result from among such divided portions of the structured document, satisfies the document schema to set as the verification result. With respect to the portion where it is determined that no change is made, the verification result outputting portion 613 sets the result of the time when the respective portions are verified whether the portions satisfy the condition most recently. The verification result outputting portion 613 outputs the verification result of the whole structured document input with the above-mentioned result.

Meanwhile, the document divider 611, for example, extracts a structural feature of the document schema from one document schema. At this time, when one or more other document schemata are utilized, the document divider 611, as an element that composes one document schema, extracts an element that uses another document schema, as a structural feature. For example, the structured document is written in XML and the document schema is written in W3C XML Schema, the element that uses another document schema is expressed by importing another document schema. The document divider 611 divides the structured document with a unit of the element that uses another document schema.

The document divider 611 may extract a document element necessary for adjusting to the document schema on the basis of one document schema, as a structural feature of the document schema. Also, the document divider 611 may extract the document element that is allowed to appear multiple times in the document schema on the basis of one document schema, as a structural feature of the document schema. For example, the document divider 611 specifies the necessary document element on the basis of a particle in the document schema, when the structural document of the document schema is written in XML and the document schema is written in W3C XML Schema.

Also, the document divider 611 may extract the structural feature of the document schema on the basis of multiple document schemata. In this case, when multiple document schemata are a document schema for inputting and a document schema for outputting for one document service, the document divider 611 extracts a common portion that is common to the document schema for inputting and the document schema for outputting, as a structural feature of the document schema. Then, the document divider 611 divides the structured document as a unit of the common portion of the document schema for inputting and the document schema for outputting. For example, the document divider 611 specifies the document schema for inputting and the document schema for outputting for one document service on the basis of a WSDL document of one document service, when the structural document of the document schema is written in XML and the document schema is written in W3C XML Schema.

In an example of focusing on the processing, the document divider 611 divides the structured document into two or more portions according to the change made to the structured document. At this time, the document divider 611 specifies a possibility of change to be made to the structured document, before a change is made to the structured document. For example, the document divider 611 specifies a possibility of change to be made to the structured document, on the basis of the document schema for inputting and the document schema for outputting, in which the process of making a change to the structured document is described. The document divider 611 may extract a common portion of multiple document schemata to be used in a group of linked document services, as a structural feature of the document schema, if multiple document schemata are those used by the group of linked document services.

At this time, the document divider 611 specifies multiple document schemata used in the group of the document services, on the basis of the information that forms a linkage. For example, the structured document is written in XML, and the document schema is written in W3C XML schema, and the information that forms a linkage is written in BPEL4WS. In an alternative example, the document divider 611 pursues the document processed by a linked document service to specify multiple document schemata used in the group of linked document services.

The document divider 611 is capable of specifying a possibility of a change made to the structured document on the basis of change information that becomes public by the process of making a change to the structured document. The change information becomes public, for example, by notifying to a verification processing apparatus, with the use of a registry service, with the use of a service description language, and with the use of an inquiry interface.

The document divider 611 may specify a possibility of change for the structured document according to the change made to the structured document. Specifically, the document divider 611 checks a change made to the structured document by sampling the structured document. For instance, the document divider 611 checks a change made to the structured document by sampling an input document and an output document of one service. The document divider 611 is capable of checking a change made to the structured document by sampling a group of documents used by the linked services. For example, the document divider 611 takes a sample of the group of documents to be used in a service linked in a hub for linked services. The document divider 611 rakes a sample of the structured document by pursuing a message flow.

The controller 602 determines that there is a change that influences the verification result, in the respective portions of such input structured document, if the information obtained by executing a given calculation on the respective portions of the structured document at the time when the structured document is verified most recently is different from the information obtained by executing a given calculation on the respective portions of such input structured document. The controller 602 determines that there is a change that influences the verification result, in the respective portions of a given document schema, if the information obtained by performing a given calculation on a given document schema at the time when the structured document is verified most recently is different from the information obtained by performing a given calculation on a given document schema.

Here, a given calculation includes at least one of preprocessing and a process of applying one-directional function. Preprocessing is, for example, a canonicalization process that absorbs the fluctuations of description in the structured document. The preprocessing may be a process of producing at least one of the document element and a tree having nodes whose contents does not include the document element attribute or the document element. The process of applying one-directional function is, for example, a process of applying a digest function that includes MD5 algorithm or SHA1 algorithm. The process of applying one-directional function may be a process of applying the pseudo-random algorithm having repeatability that includes a linear congruential method or Mersenne Twister.

The document divider 611 generates a document schema fragment to verify such divided portions according to the division of the structured document. The verification result outputting portion 613 may verify a portion where it is determined that there is a change in the structured document according to the document schema fragment. At this time, the document divider 611 generates the document schema fragment after the controller 602 determines that there is a change to a specific portion of the structured document. The document schema memory 608 retains the document schema fragment used in the verification of the structured document, and the validity verifying portion 612 reuses the document schema fragment retained when another structured document having an identical document schema is verified.

The validity verifying portion 612, in verifying the portion of the document where it is determined that there is a change made to the structured document, verifies the structured document, according to the division of the structured document divided by the document divider 611 without verifying a lower-level structure of a specific document element, considering that the lower-level structure satisfies the document schema with an existence of a specific document element.

Figure 114:
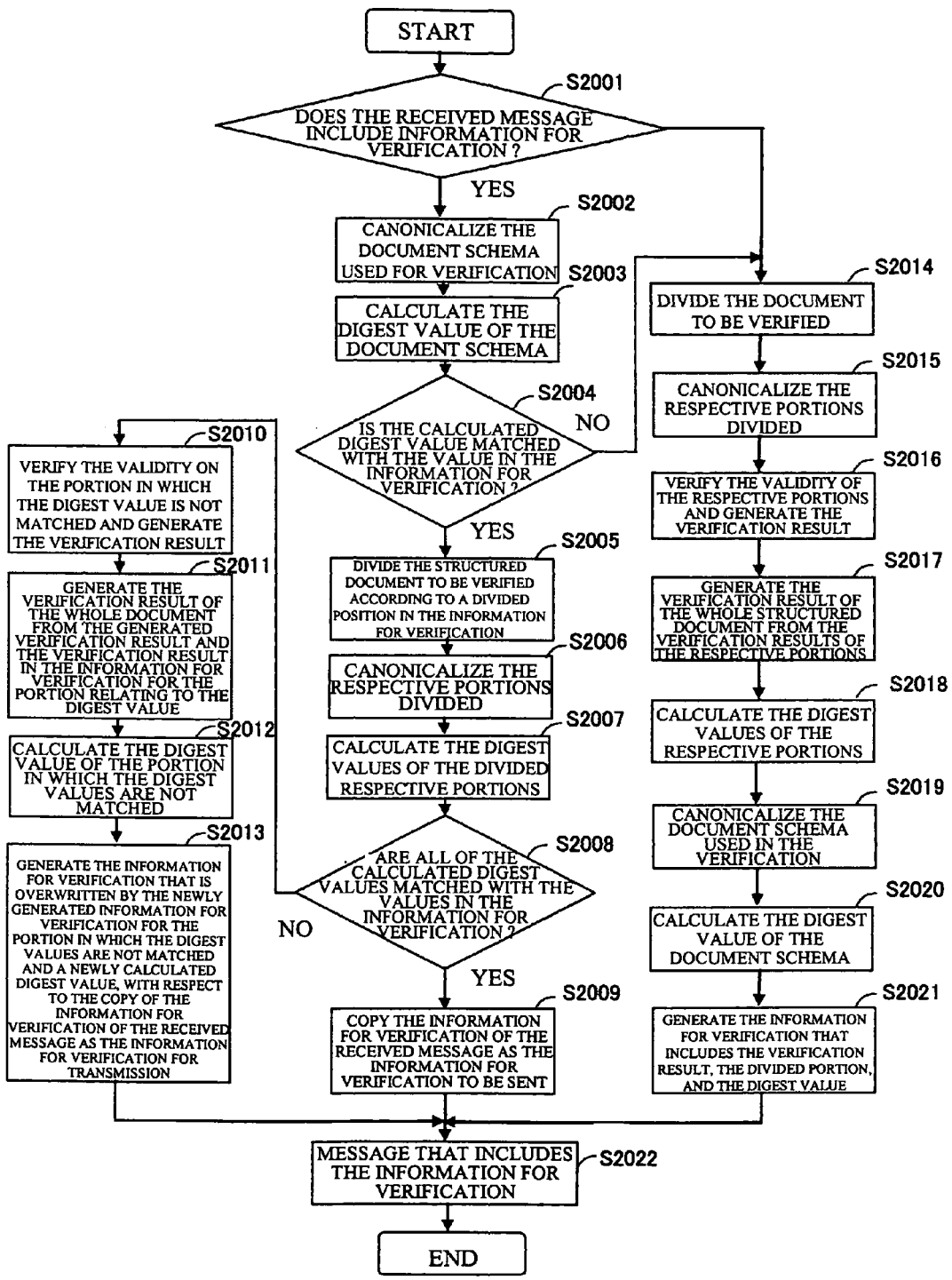
FIG. 114 is a flow chart of a fundamental verification process of a document verification service system.

FIG. 114 is a flowchart of a fundamental verification process of the document verification service system 601. Specifically, FIG. 114 is a flowchart of a fundamental verification process from receiving a verification request message to sending a verification result message. The process flow shown in FIG. 114 is executed by the controller 602.

In the above-described process flow, the verification process is more efficient due to the following reasons.

(1) In the structured document in which the verification is once implemented, the verification result is identical to the last time, if there is no change in the structured document or the document schema. Accordingly, the verification is not carried out one again.

(2) It is easy to determine whether or not there is a change in the structured document or the document schema, by comparing the values generated from a given calculation such as the calculation of the digest value.

(3) With the preparation of the verification result of the respective portions divided from the structured document and the value generated by a given calculation, if there is a change in the structured document, it is possible to obtain the whole verification result of the structured document by verifying only the portion that includes the portion changed.

A description will be given in more detail. Referring to FIG. 114, the controller 602 determines whether or not the received message includes the information for verification. If the received message includes information for verification ("Yes" at step S2001), the canonicalization portion 609 canonicalizes the document schema used for verification, at step S2002. Next, the controller 602 calculates the digest value of the document schema with the use of the digest value calculating portion 610, at step S2003. If such calculated digest value is matched with the value in the information for verification ("Yes" at step S2004), the controller 602 divides the structured document to be verified according to a divided position in the information for verification, with the use of the document divider 611, at step S2005.

The controller 602 canonicalizes the respective portions divided by the canonicalization portion 609 at step S2006, and calculates the digest values of such divided respective portions with the use of the digest value calculating portion 610 at step S2007. If all of such calculated digest values are matched with the values in the information for verification ("Yes" at step S2008), the controller 602 copies the information for verification of the received message at step S2009, and goes to step S2022. If all of the calculated digest values are not matched with the values in the information for verification ("No" at step S2008), the controller 602 verifies the validity on the portion in which the digest value is not matched by the validity verifying portion 612, and generates the verification result at step S2010. The controller 602 generates the verification result of the whole document from the generated verification result and the verification result in the information for verification for the portion relating to the digest value at step S2011.

The controller 602 calculates the digest value of the portion in which the digest values are not matched, with the use of the digest value calculating portion 610 at step S2012. The controller 602 generates the information for verification that is overwritten by the newly generated information for verification for the portion in which the digest values are not matched and a newly calculated digest value, with respect to the copy of the information for verification of the received message as the information for verification for transmission at step S2013, and processing goes to step S2022. If the received message does not include the information for verification at step S2001, or if such calculated digest value is not matched with the value in the information for verification, the controller 602 divides the document to be verified with the use of the document divider 611 at step S2014. The controller 602 canonicalizes the respective portions divided by the canonicalization portion 609 at step S2015.

The controller 602 verifies the validity of the respective portions with the use of the validity verifying portion 612, and generates the verification result at step S2016. The controller 602 generates the verification result of the whole structured document from the verification results of the respective portions at step S2017, calculates the digest values of the respective portions with the use of the digest value calculating portion 610 at step S2018, canonicalizes the document schema used in the verification with the use of normalization portion 609 at step S2019, and calculates the digest value of the document schema with the use of the digest value calculating portion 610 at step S2020. The controller 602 generates the information for verification that includes the verification result, the divided portion, and the digest value at step S2021, and processing goes to step S2022. Lastly, the controller 602 sends the message that includes the information for verification to the service system where the request is issued at step S2022.

Sixteenth Embodiment

Figure 115:
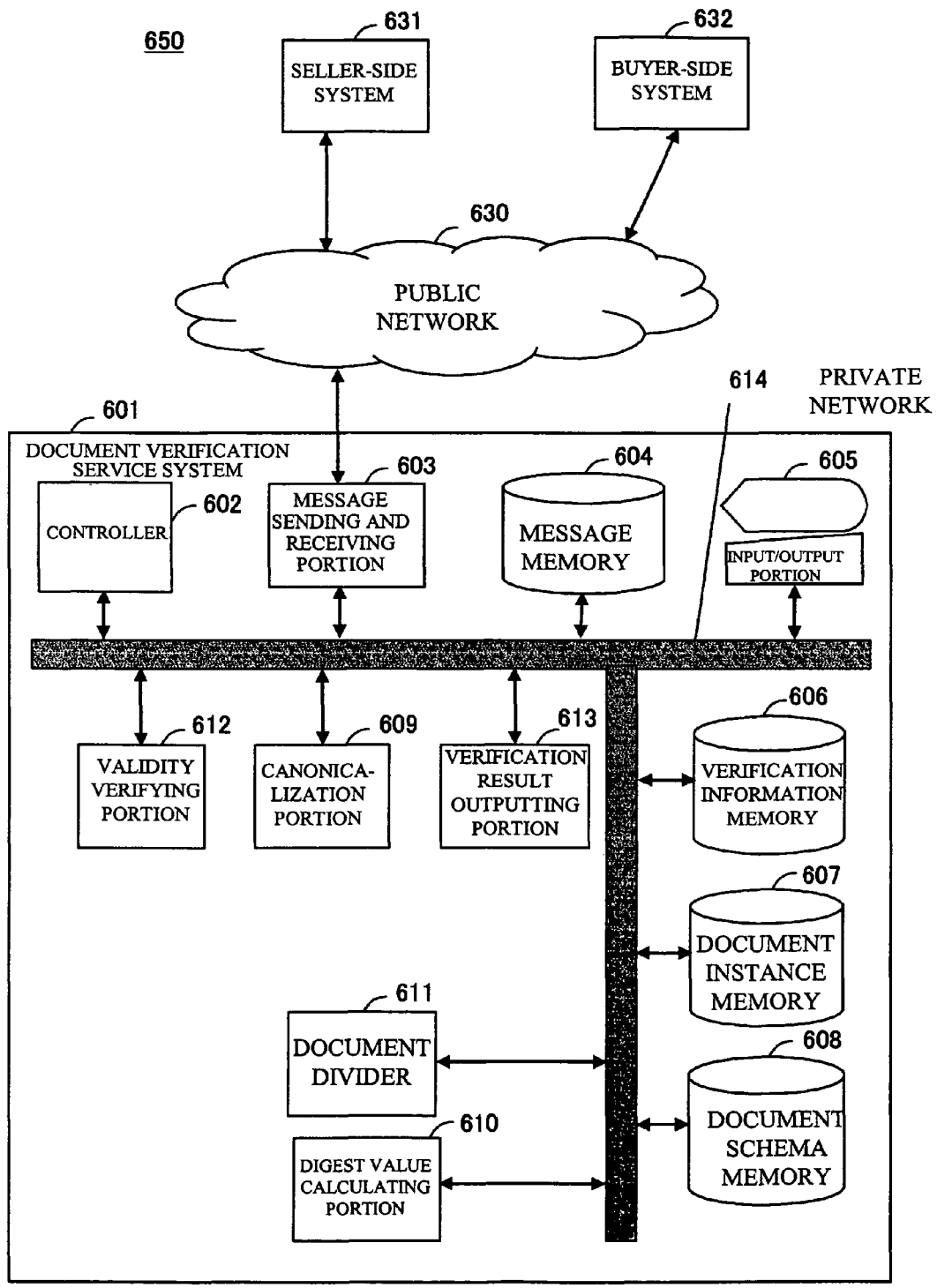
FIG. 115 illustrates a system configuration according to the sixteenth embodiment of the invention.

A sixteenth embodiment will be described. FIG. 115 illustrates a system configuration in accordance with the sixteenth embodiment of the invention. In the present embodiment, a document verification service system 650 verifies the structured document exchanged between a buyer-side system 631 and a seller-side system 632 in procurement of supplies and equipment. In accordance with the present embodiment, universal business language (UBL) 1.0 recommended by Organization for the Advancement of Structured Information Standards (OASIS) is employed in the exchange of the structured document between the buyer-side system 631 and the seller-side system 632 in the procurement of supplies and equipment.

Figure 116:
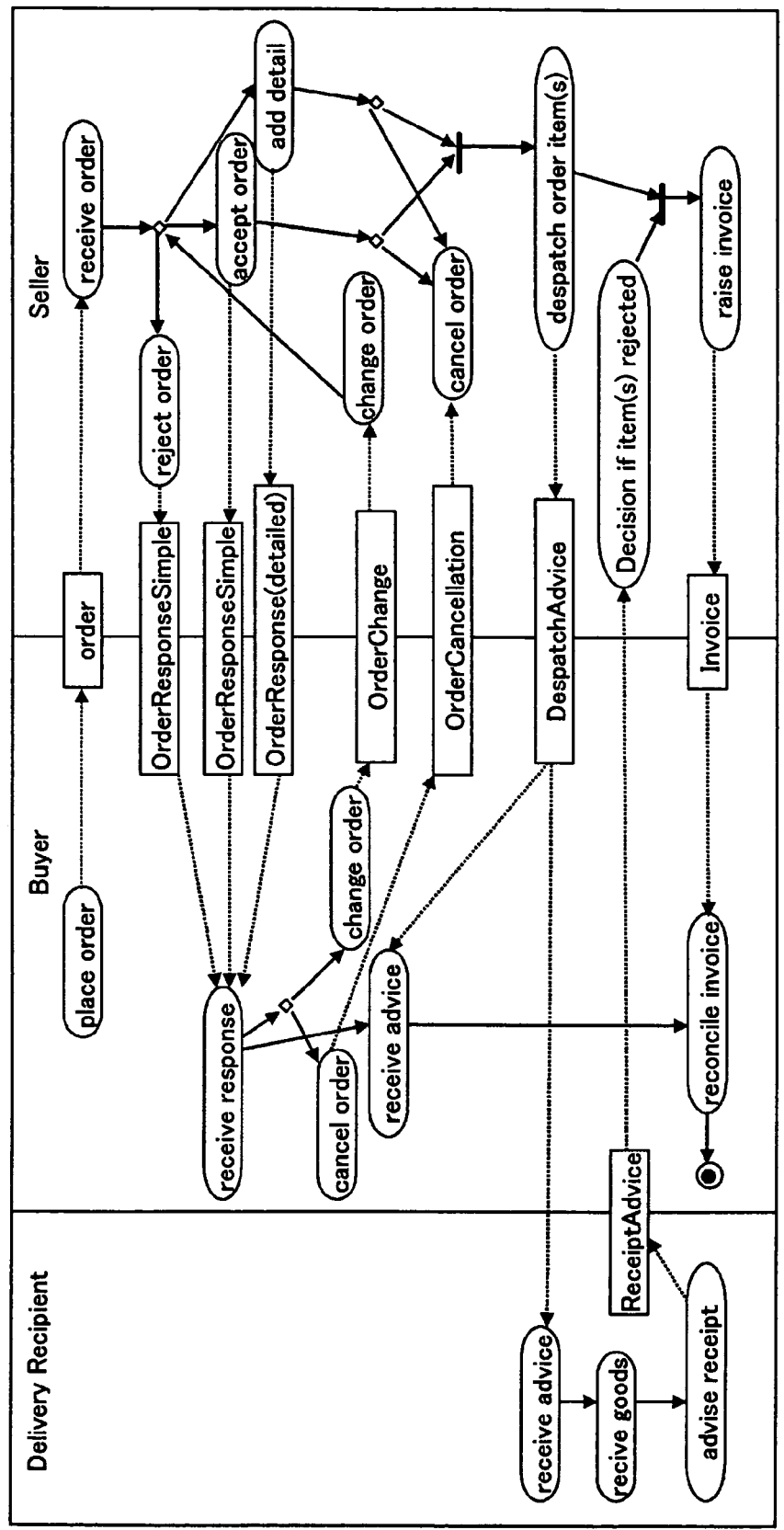
FIG. 116 shows a UBL procurement process and schemata used.

FIG. 116 shows a UBL procurement process and a schema used. In UBL, as shown in FIG. 116, the structured document exchanged between a buyer and a seller in a procurement process is defined by the document schemata such as "Order", "OrderResponseSimple", and the like. As a data format, XML is employed in the structured document, W3C XML Schema in the document schema, and SOAP in the message.

In the present embodiment, the document divider 611 extracts a structural feature of the document schema on the basis of one document schema as a division method of the structured document. Also, as a document schema, the document schema used for the procurement process of UBL is employed. Here, one document schema imports another document schema, and accordingly, the structured document is divided as an example. As a dividing point specification, XPath expression that represents the document element, which is a root element of such imported document schema, is generated. As a given calculation method, the canonicalization portion 609 implements the canonicalization process as preprocessing, and the digest value calculating portion 610 performs the calculation of the digest value as a process of applying one-directional function.

The digest value calculating portion 610 calculates the digest value of a partial structure a in which the document element specified as a dividing point and a lower-level element thereof are deleted and the digest value of a partial structure b in having only the element and the lower-level element. A method of generating a fragment is employed for the verification method of such divided structured document. Lazy evaluation generates the document schema fragment. As the document schema fragment, there are generated the document schema fragment in which the document element specified as a dividing point is deleted from an original document schema and the document schema fragment in which the document element specified as a dividing point is set as a root. The former document schema fragment is used for verification of the partial structure a, and the latter document schema fragment is used for verification of the partial structure b.

As a modification of the sixteenth embodiment, a division by an essential element and a recursive element, another preprocessing and a process of applying one-directional function, a fragment reuse, and the lazy evaluation are now mentioned to cover the description.

A description will be given of respective functional portions. The controller 602 has a function of controlling the overall process of the system. The message sending and receiving portion 603 has a function of sending and receiving the message with other service systems on the public network 630. The message received by the present system includes at least a message that is issued from another service system to request for the verification of the structured document. The message sent by the present system includes a message that includes a verification result to another system to respond to the received verification request.

The message memory 604 has a function of storing the message received by the message sending and receiving portion 603 and the message generated for sending to another system from the present system. The input/output portion 605 has a function of providing the information to the administrator of the present system and a function of receiving an instruction to the system from the administrator. The document instance memory 607 has a function of storing the structured document to be verified and the partial structure created by the document division, as will be described later. The document schema memory 608 has a function of storing the document schema used for verification and the document schema fragment created by the document division, as will be described later. The document schema stored in the document schema memory 608 is defined by UBL 1.0.

The canonicalization portion 609 has a function of implementing a canonicalization process to absorb the fluctuations of description in the structured document, as a preprocessing of the digest value calculation. Here, the canonicalization process is a process of absorbing the fluctuations of description occurred by processes irrelevant to the original functions of the respective programs, when the document is sequentially processed by multiple programs. The processes irrelevant to the original functions of the respective programs include, for example, addition of space or line feed, conversion of character code, and the like. It is possible to provide identical documents having an identical description, by carrying out the canonicalization process on the structured document. In the present embodiment, the canonicalization portion 609 carries out the canonicalization process according to Canonical XML recommended by W3C.

The digest value calculating portion 610 has a function of calculating the digest value of the document schema in the document schema memory 608 and that of a partial structure in the document instance memory 607. A unique digest value is calculated from a given piece of electronic information. Accordingly, with respect to whether or not there is a change in the electronic information, it is possible to determine that there is no change in the electronic information, if the former digest value and the current digest value are compared and are matched. It is possible to determine that there is a change in the electronic information, if the former digest value and the current digest value are compared and are not matched. In the sixteenth embodiment, the digest value is used for determining whether or not there is a change in the partial structure or the document schema in the structured document. As a process of applying one-directional function, a process of applying the digest function such as MD5 algorithm, SHA algorithm, or SHA1 algorithm can be utilized.

The document divider 611 has a function of dividing the structured document to be verified into partial structures. In the sixteenth embodiment, the structured document to be verified is divided into partial structures. At this time, the document divider 611 divides the structured document, focusing on one structural feature of the document schema. The structural feature used in accordance with the sixteenth embodiment is that one document schema includes another document schema as a component element thereof.

FIG. 117 shows an example of a schema import. In the example shown in FIG. 117, a document schema OrderResponseSimple imports another document schema such as UBL-CoreComponentParameters-1.0 or the like, and uses as a component element. Such imported document schema forms a meaningful block in a document such as order information in an order sheet. In many cases, the meaningful block in the document is generated or renewed in a document processing in a lump, or is only referred to without change. Therefore, there is a little chance that a change in one portion influences another portion, in a case where it is configured such that the document structure is divided, with focusing on a block, the verification is implemented on the portion, and the verification is further implemented according to the need. As a whole, it is possible to improve the efficiency of verification process.

The document divider 611 checks the structured document to be verified, and extracts the document element (multiple document elements depending on the case) that is a root element in the document schema to be imported, as a dividing point of the document structure. The document divider 611 generates the partial structure equal to and lower than the dividing point and a portion in which the partial structure is removed from the original structured document to store them in the document instance memory 607. The document divider 611 generates the document schema fragment according to the document element to store in the document schema memory 608. The document schema fragment employed in the present embodiment is a document schema for verifying such divided partial structure, and is a portion where a partial element is removed from the original document schema. Here, the necessity of the document schema fragment and the relationship between the document division and the document schema fragment are described by reference to a schematic view of FIG. 118.

Figure 118:
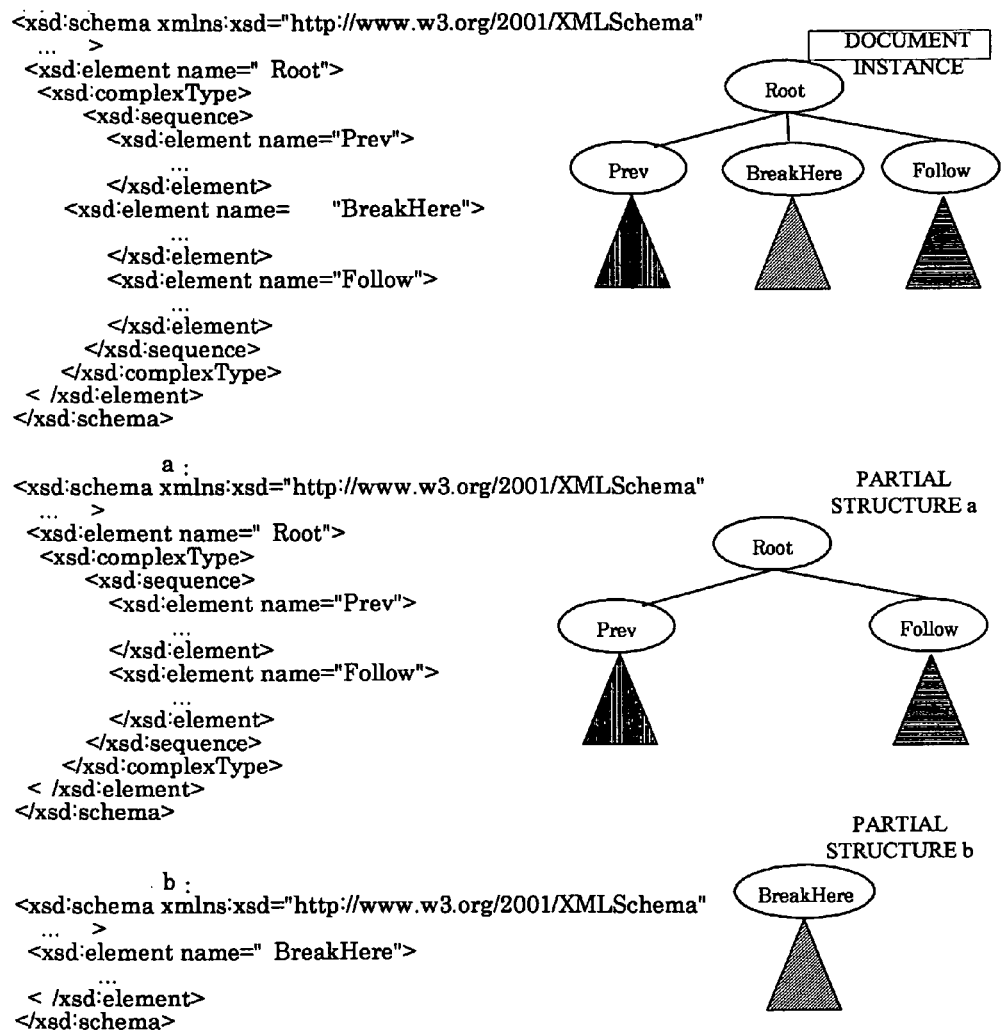
FIG. 118 shows an example of a document schema fragment.

FIG. 118 shows an example of a document schema fragment. A document instance shown in upper right of FIG. 118 is assumed to satisfy an original document schema shown in upper left of FIG. 118. Here, if a document element BreakHere is a dividing point, a partial structure a and a partial structure b are generated. At this time, if the partial structures are verified with the use of the original document schema, the verification results thereof are both "invalid". This is because both of the partial structures lack the document element specified as an essential element in the original document schema. As stated, even if the original document schema is used, there is an inconvenient case, in some cases, in verifying such divided partial structure. Accordingly, a consideration is given to a situation where the document schema for verification of the partial structure is generated from the original document schema.

FIG. 118 exemplarily shows a document schema fragment a and a document schema fragment b. The document schema fragment a removes a portion that specifies the BreakHere element from the original document schema. The document schema fragment b sets the BreakHere element as a root and removes other portions. In a case where the document instance shown in upper right of FIG. 118 satisfies the original document schema, the result of verifying the partial structure a with the use of the document schema fragment a is "valid", and the result of verifying the partial structure b with the use of the document schema fragment b is "valid". In a case where the document instance shown in upper right of FIG. 118 does not satisfy the original document schema, the result of "invalid" is obtainable in at least one of the verification results of the partial structures with the use of the document schema fragments.

It is thus possible to verify the partial structure and obtain the verification result as a whole structured document, by utilizing the document schema fragment. For ease of description of FIG. 118, it is assumed that the definitions of the partial structure b are all written between a start tag and an end tag of the document schema element BreakHere. However, in the document schema written in W3C XML Schema, the element included in a Composite element is defined outside of the Composite element, and a particle existent between the start tag and the end tag of the Composite element is defined, in some cases. Even in this case, the document divider 611 employed in the present embodiment includes a necessary definition in the document schema fragment.

The validity verifying portion 612 has a function of verifying whether or not a partial structure satisfies a specific document schema fragment. In the validity verification used in the present embodiment, the partial structure and the document schema fragment are generated as described. It is therefore possible to apply a general method of verifying the validity of the XML document on the document schema. The verification information memory 606 has a function of storing the information for verification for each structured document to be verified.

FIG. 119 is an example of the information for verification. The information for verification is composed of a boolean value as a most recent verification result of the whole structured document (element ResultOfDoc in FIG. 119), the digest value of the document schema at the time of most recent verification (element SchemaDigest in FIG. 119), and the information for verification in each portion of the structured document (element Part in FIG. 119). The information for verification in each portion of the structured document is composed of the information of the dividing point of the structured document shown in the XPath expression (element DividingPoint in FIG. 119), the boolean value as a most recent verification result of the portion of the structured document (element SchemaDigest in FIG. 119), and the digest value of the portion of the structured document at the time of most recent verification (element PartDigest in FIG. 119). When the portion of the structured document is shown in the portion from which the portion equal to and lower than the dividing point is removed, which is the partial structure a, a null value is assigned to the content of the element DividingPoint.

The information for verification is sometimes included in the message, when the document verification is requested from another system. Also, when the result of the verification request is sent back, the information for verification is included in the message. In accordance with the present embodiment, SOAP envelope is used for exchanging the information with another system, and the information for verification is included in the header of the envelope.

The verification result outputting portion 613 newly generates the information for verification, or makes a copy from the verification request to store in the verification information memory 606. Then, the verification result outputting portion 613 has a function of renewing the information for verification according to the process result of the document divider 611, the validity verifying portion 612, and the digest value calculating portion 610.

A modification of the sixteenth embodiment is now described. As a division according to the structural feature of one document schema, an essential element and an optional element in the document structure may be divided in addition to the above-described dividing method. Alternatively, repeatedly appearing elements may be divided respectively. This is because the optional element and the repeatedly appearing element have a high possibility of adding or deleting. The division is capable of applying the information for verification that does not influence another portion, even if there is an addition or a deletion.

As an alternative modification of the sixteenth embodiment, a preprocessing may employ a process of generating at least one of the document element, the document element attribute, and a tree having the content of the node that does not include the document element, from the expression of a character string in the structured document to be verified. The preprocessing is a process that a prefix that denotes a name space or the difference in superficial expression of the character string is configured not to be influential, before one-direction function is applied to the DOM tree. The preprocessing corresponds to, for example, a process for a code fragment in DOMHASH defined by RFC2803.

As a further alternative modification of the sixteenth embodiment, the process of applying one-directional function may be a process of applying a pseudo-random algorithm that has repeatability that includes a linear congruential method or Mersenne Twister. If the pseudo-random algorithm that has repeatability is applied, it is possible to determine whether or not there is a change in a document portion by comparing the values, in a similar manner as described in the calculation of the digest value, without studying the portion in detail.

As a yet alternative modification of the sixteenth embodiment, the document schema fragment generated in the former verification process and stored in the document schema memory 608 may be reused, instead of the document divider 611 generating the document schema fragment for each verification request. For example, a consideration is given to a situation where the portion that corresponds to the document schema fragment b is reused. The document schema fragment and the digest value of the original document schema are associated with each other and stored in the document schema memory 608.

If an element name of the document element that is a dividing point of a new verification request is matched with an attribute name of a root element of the document schema fragment, and the digest value of the document schema at that time is identical to the digest value of such associated and stored, the document schema fragment is provided for verifying the document element and the original document schema is not changed, thereby enabling the document schema fragment to be reused. As a yet alternative modification of the sixteenth embodiment, the lazy evaluation that generates the document schema fragment only after the verification is necessary as a result of comparing the digest values may be employed in the generation of the document schema fragment.

Seventeenth Embodiment

Figure 120:
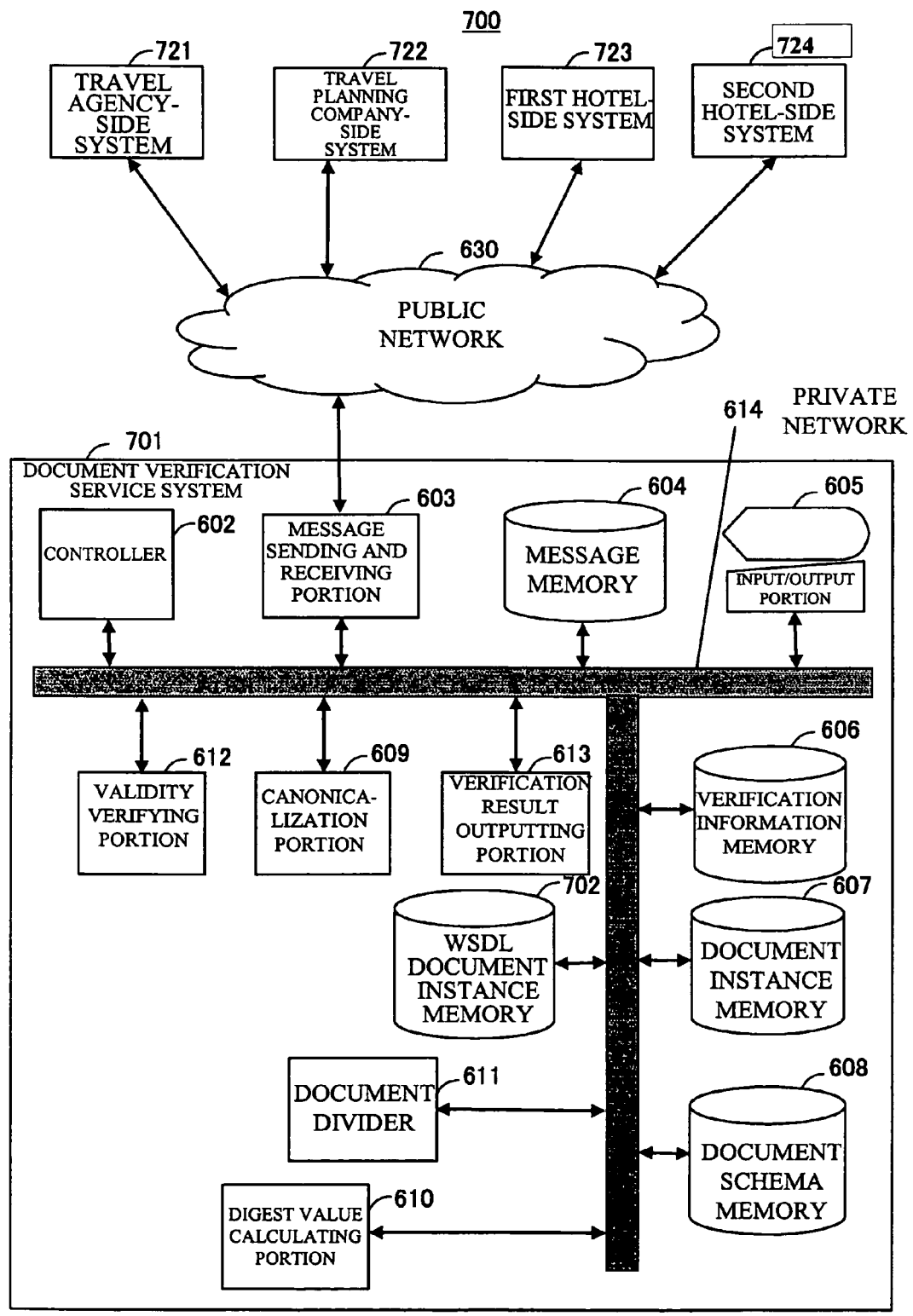
FIG. 120 shows a configuration of a system according to a seventeenth embodiment of the invention.

A seventeenth embodiment will be described. FIG. 120 shows a configuration of a system 700. A travel agency-side system 721, a travel planning company-side system 722, a first hotel-side system 723, and a second hotel-side system 724 are connected on the network 630. Referring to FIG. 120, a document verification service 701 employed in the present embodiment further includes a WSDL document instance memory 702, as compared to the document verification service 601 shown in FIG. 113.

In the present embodiment, the method of dividing the structured document includes a method of extracting the structural feature from multiple document schemata and a method of specifying a possibility of change in the structured document from the document schema. The document schema uses the document schema for inputting and the document schema for outputting of a specific service, out of the document schemata used in a TravelXML demonstration experiment. In accordance with the present embodiment, the aforedescribed document schemata have a common portion. Accordingly, the document divider 611 extracts the common portion to divide the structured document. It is possible to learn the correlation between the document schema for inputting and the document schema for outputting from the WSDL document of the service. The dividing point is similar to that of the sixteenth embodiment. The TravelXML is a standard recommended by a nonprofit organization XML consortium.

A deemed verification is employed for the verification of such divided document. The validity verification algorithms are different in verifying a partial structure equal to and lower than a dividing point and in verifying the partial structure excluding the portion equal to and lower than the dividing point. In verifying the partial structure equal to and lower than the dividing point, a generally used verification is employed in a similar manner as employed for the original document schema, except that the dividing point is allowed to be a root. In verifying the partial structure excluding the portion equal to and lower than the dividing point, at the time of recognizing the dividing point, the verification is skipped on the assumption that the structure equal to and lower than the dividing point satisfies the document schema, and the verification continues.

A given calculation method is almost similar to that employed in the sixteenth embodiment. However, the verification method employed in the seventeenth embodiment is different from that employed in the sixteenth embodiment. Accordingly, there is a slight difference in the partial structure for the calculation of the digest value. The partial structure a includes the information that shows an existence of the document element that serves as a dividing point. Here, with respect to XML, the information that shows an existence of the document element that serves as a dividing point is a pair of the start tag and the end tag of the document element. The information that serves as the dividing point is excluded in the partial structure b. As a modification of the seventeenth embodiment, such extracted common portion is reused and an input/output document is sampled for narrowing down the division are now mentioned to cover the description.

In the present embodiment, the structured document used in inventory inquiry and reservation arrangement of a package tour is verified by the document verification service system 701. In the present embodiment, the buyer-side system and the seller-side system are communicated with the use of TravelXML. A series of procedure in the inventory inquiry and reservation arrangement initiated by the inquiry of the travel agency-side system 721 are mounted on the travel planning company-side system 722. As a data format, XML is used for the structured document, W3C XML Schema is used for the document schema, WSDL is used for description of a service interface, and SOAP is used for message.

The functional portions are respectively described. However, the same components as described in the sixteenth embodiment are omitted. The WSDL document instance memory 702 has a function of storing a WSDL document in which the service interface of another system is described. The WSDL document, as will be described later in detail, is used for dividing the structured document to be verified. The WSDL document instance memory 702 has a validity verification method different from that employed in the sixteenth embodiment. Accordingly, the partial structure is not described in the functional portion. The document schema memory 608 employed in the present embodiment has a function of storing the document schema written in the WSDL document stored in the WSDL document instance memory 702. The validity verification method employed in the present embodiment is different from that employed in the sixteenth embodiment, and the document schema fragment is not stored in the functional portion.

Figure 122:
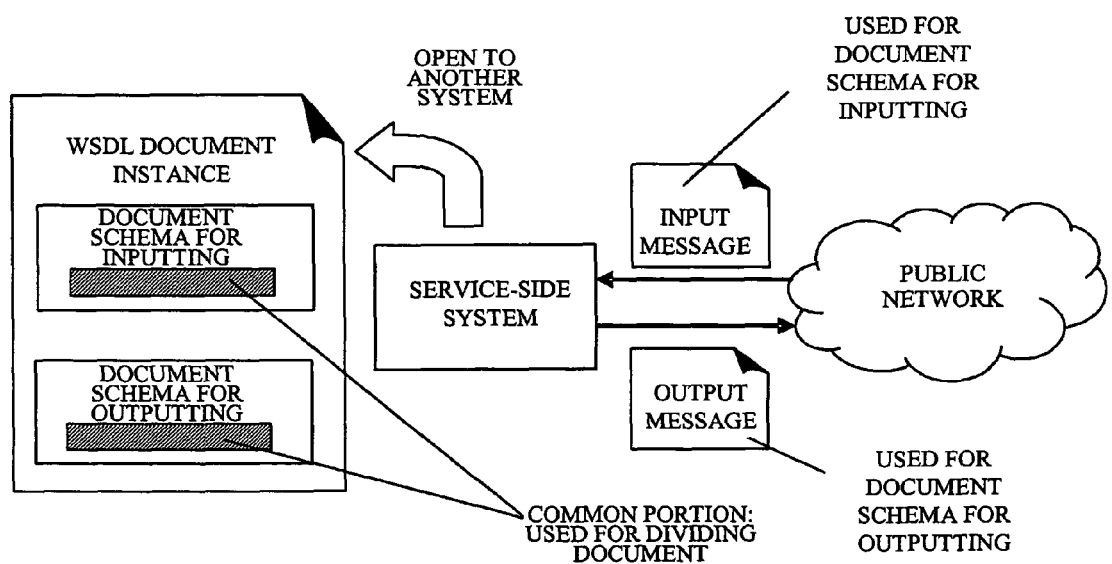
FIG. 122 is a schematic view of a WSDL document instance according to the seventeenth embodiment of the present invention.

The document divider 611 focuses on the structural feature of two document schemata, and has a function of determining the dividing point of the structured document to be verified. Here, two document schemata are the document schema for inputting and the document schema for outputting in one system, which is written in one WSDL document stored in the WSDL document instance memory 702 (see FIG. 122). FIG. 122 illustrates a schematic view of the WSDL document instance in accordance with the seventeenth embodiment.

The document divider 611 extracts the common portion in the afore-described schemata, and divides the document portion if the document portion of the structured document to be verified is included in the common portion. This is because there is a possibility that an identical partial structure and content thereof are included in the input portion and the output portion, which are the common portion. For example, traveler information and the package tour information are included in the input and output of a vacant room inquiry to a hotel, but the information is just referred to by the hotel and is not overwritten. The input portion and the output portion have the identical partial structure and content thereof. By implementing the verification with such divided common portion and implementing the verification as necessary again, the partial structure and the content that are not changed needs not to be verified again, thereby enabling the verification efficiency to be improved. Such determined dividing point is described in XPath expression as a dividing point for the information for verification in a similar manner as described in the fifteenth embodiment.

The document divider 611 employed in the present embodiment is different from that employed in the sixteenth embodiment and does not generate the partial structure or the document schema fragment, since the validity verification methods are different, as will be described later.

The validity verifying portion 612 is different from a generally used algorithm used for validity verification, and changes the validity verification algorithm, in a case where the partial structure equal to and lower than the dividing point and in a case where the partial structure that excludes the portion equal to and lower than the dividing point is verified. This verification algorithm is described by reference to FIG. 124. FIG. 124 schematically shows the verification method of the validity verifying portion 612 in accordance with the seventeenth embodiment.

The document schema, the document instance, and the document element BreakHere that serves as the dividing point shown in FIG. 124 are similar to those shown in FIG. 118. In the verification of the partial structure that excludes the portion equal to and lower than the document element BreakHere that is the dividing point, the verification is carried out from the document element root, in left to right, depth first order. Then, the existence of the dividing point, namely, the start tag and the end tag of the BreakHere element are confirmed. If there are the start tag and the end tag, the verification continues without verifying the inside thereof. If not, it is determined that there is no dividing point and the result of "invalid" is returned and the verification is completed. In the verification of the partial structure equal to and lower than the document element BreakHere that is the dividing point, the generally used verification is implemented except that another portion is not verified.

A modification of the seventeenth embodiment is now described. As a modification of the seventeenth embodiment, the document divider 611 may extract and store the common portion in the document schema, whenever the WSDL document is newly stored in the WSDL document instance memory 607. Such extracted portion may be used again in dividing the structured document. As an alternative modification, the dividing point may be narrowed down by sampling the verification information of the input/output document, if there are multiple common portions. For example, in such sampled multiple documents, if the digest values of multiple document portions corresponding to the common portion are always aligned and there is no change in one document, an upper element that includes the common portion may be divided.

Eighteenth Embodiment

Figure 121:
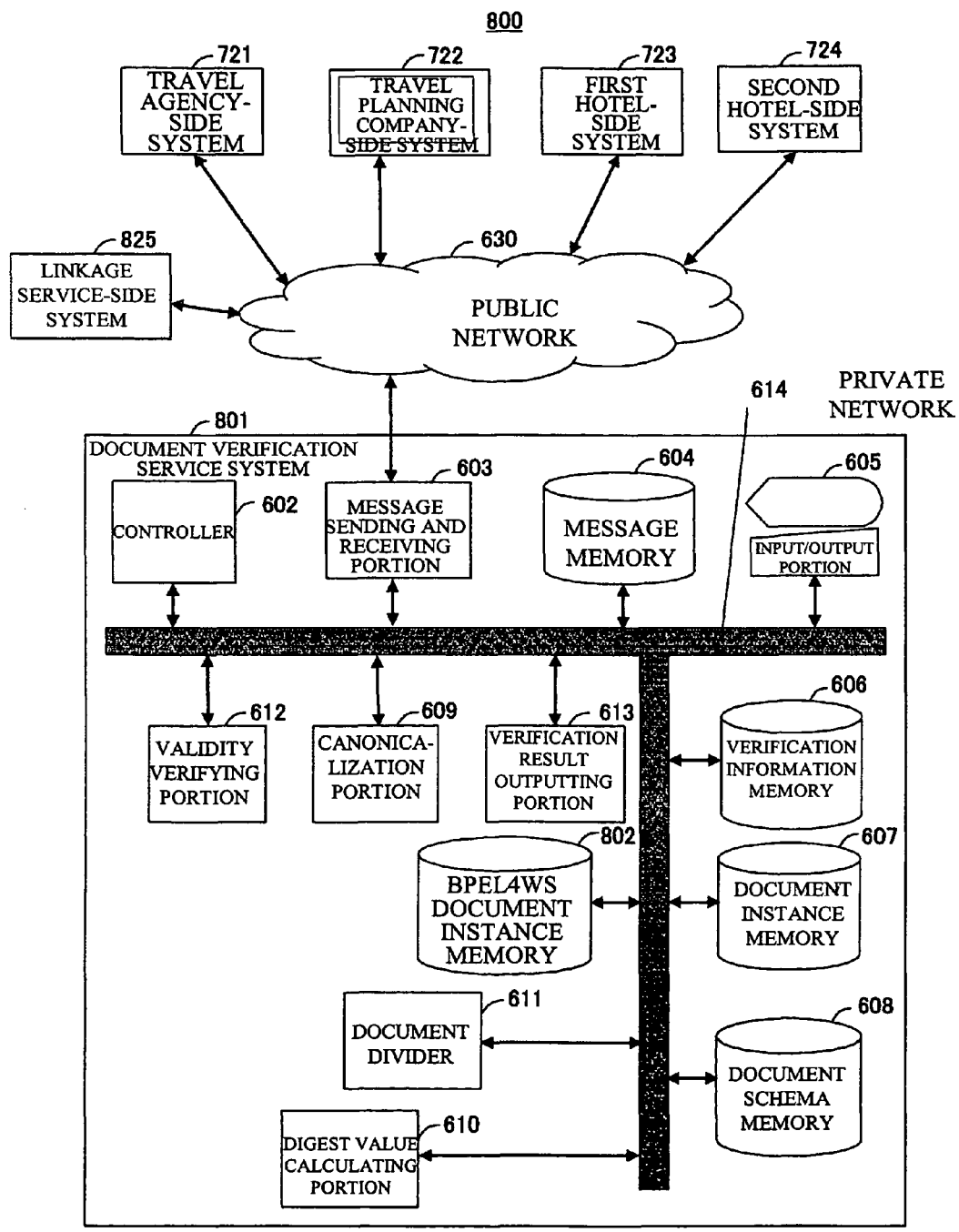
FIG. 121 illustrates a system configuration according to an eighteenth embodiment of the present invention.

An eighteenth embodiment of the invention will be described. FIG. 121 illustrates a system configuration in accordance with the eighteenth embodiment. In a system 800, the travel agency-side system 721, the travel planning company-side system 722, the first hotel-side system 723, the second hotel-side system 724, and the linkage service-side system 825 are connected on the network 630. A BPEL4WS document instance memory 802 is additionally provided in a document verification service 801.

In the present embodiment, the structured document used in the inventory inquiry and reservation arrangement of a package tour is verified by the document verification service system 800 in a similar manner as described in the seventeenth embodiment. The difference from the seventeenth embodiment is that a series of procedure of in the inventory inquiry and reservation arrangement initiated by the inquiry of the travel agency-side system 721 is mounted on the linkage service-side system 825 and are written with the use of BPEL4WS. Accordingly, in accordance with the present embodiment, messages are exchanged with the use of the linkage service-side system 825 that serves as a hub, and a series of procedure are carried out.

As a division method of the structured document, the method of extracting a feature from multiple document schemata and the method of specifying a possibility of change in the structured document from the structured document in a similar manner as described in the seventeenth embodiment.

What is different is that the document schema in the linked services is used as a document schema. The document schema used in a specific process scenario is employed from among those used in a TravelXML demonstration experiment. In this example, those document schemata have a common portion, and the common portion is extracted for dividing the structured document. A method of finding the common portion of the document schemata utilizes the WSDL document referred to by the VPEL4WS document, which uses BPEL4WS in the description of linkage. Here, the dividing point is specified in a similar manner as described in the sixteenth embodiment. Such divided structured document is verified and calculated in a similar manner as described in the sixteenth embodiment.

As a modification of the eighteenth embodiment, the division is further narrowed down by sampling the structured document, which is exchanged between the linked services, with a BPEL4WS execution process that serves as a hub for linkage. This is now mentioned to cover the description.

Figure 123:
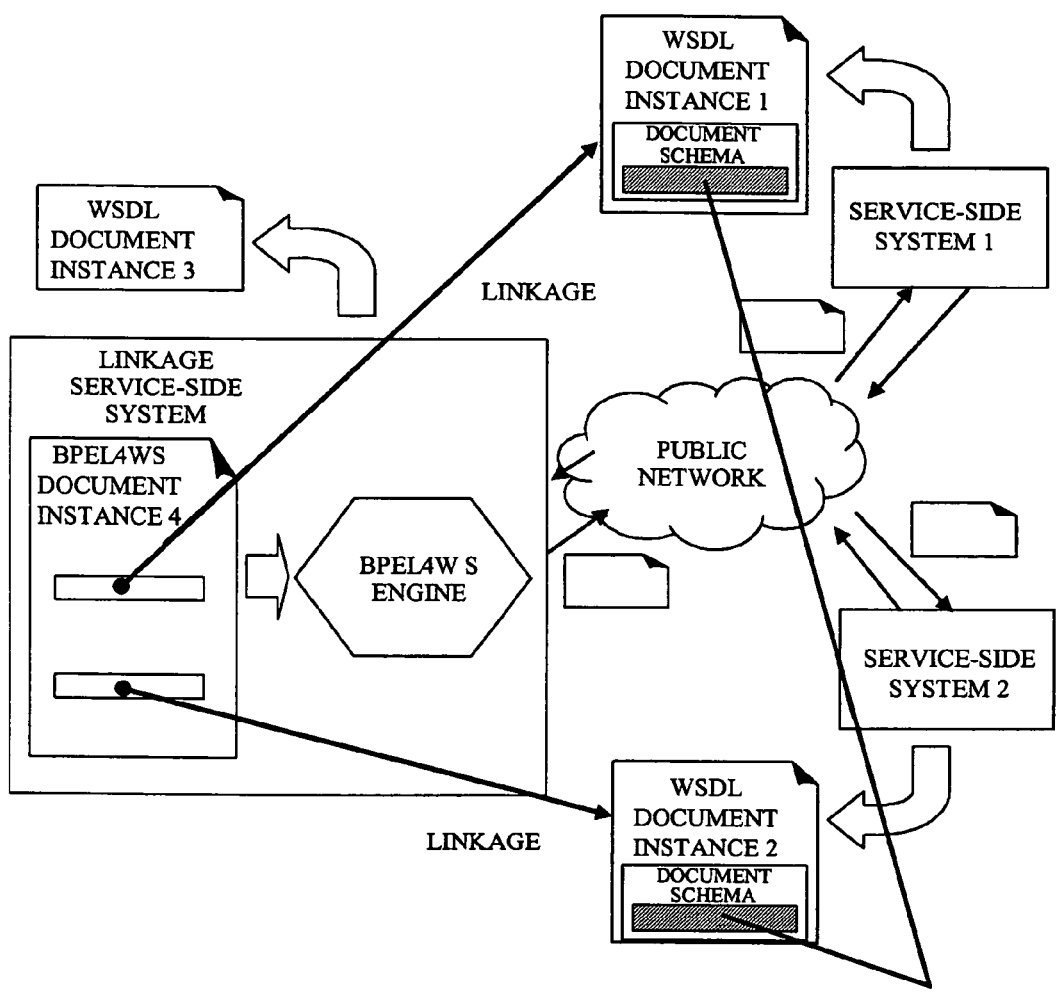
FIG. 123 is a schematic view of the BPEL4WS document instance according to the eighteenth embodiment of the present invention.

Hereinafter, the functional portions are described. However, the same components as those of the seventeenth embodiment will be omitted. The BPEL4WS document instance memory 802 has a function of storing the BPEL4WS document to be used in the linkage service side. The BPEL4WS document, as will be described later, is used for dividing the structured document to be verified. The document divider 611 has a function of focusing on the structural feature of multiple document schemata and determining the dividing point of the structured document to be verified. Here, multiple document schemata is a document schema written in multiple WSDL documents linked to one BPEL4WS document stored in the BPEL4WS document instance memory 802 (see FIG. 123). FIG. 123 illustrates a schematic view of the BPEL4WS document instance in accordance with the eighteenth embodiment.

The document divider 611 extracts the common portion of the document schema. If the document portion of the structured document to be verified is included in the common portion, the document portion is divided. The reason the common portion is used is similar as described in the sixteenth embodiment.

As a modification of the above-described embodiment, in a case where there are multiple common portions, the information for verification included in a message input into or output from the linkage service-side system 825 is sampled for narrowing down the dividing point. For example, in multiple documents from which samples are taken, if the digest values of the multiple document portions that correspond to the common portion are always aligned and there is no change, an upper element that includes the common portion may be divided.

Nineteenth Embodiment

Figure 125:
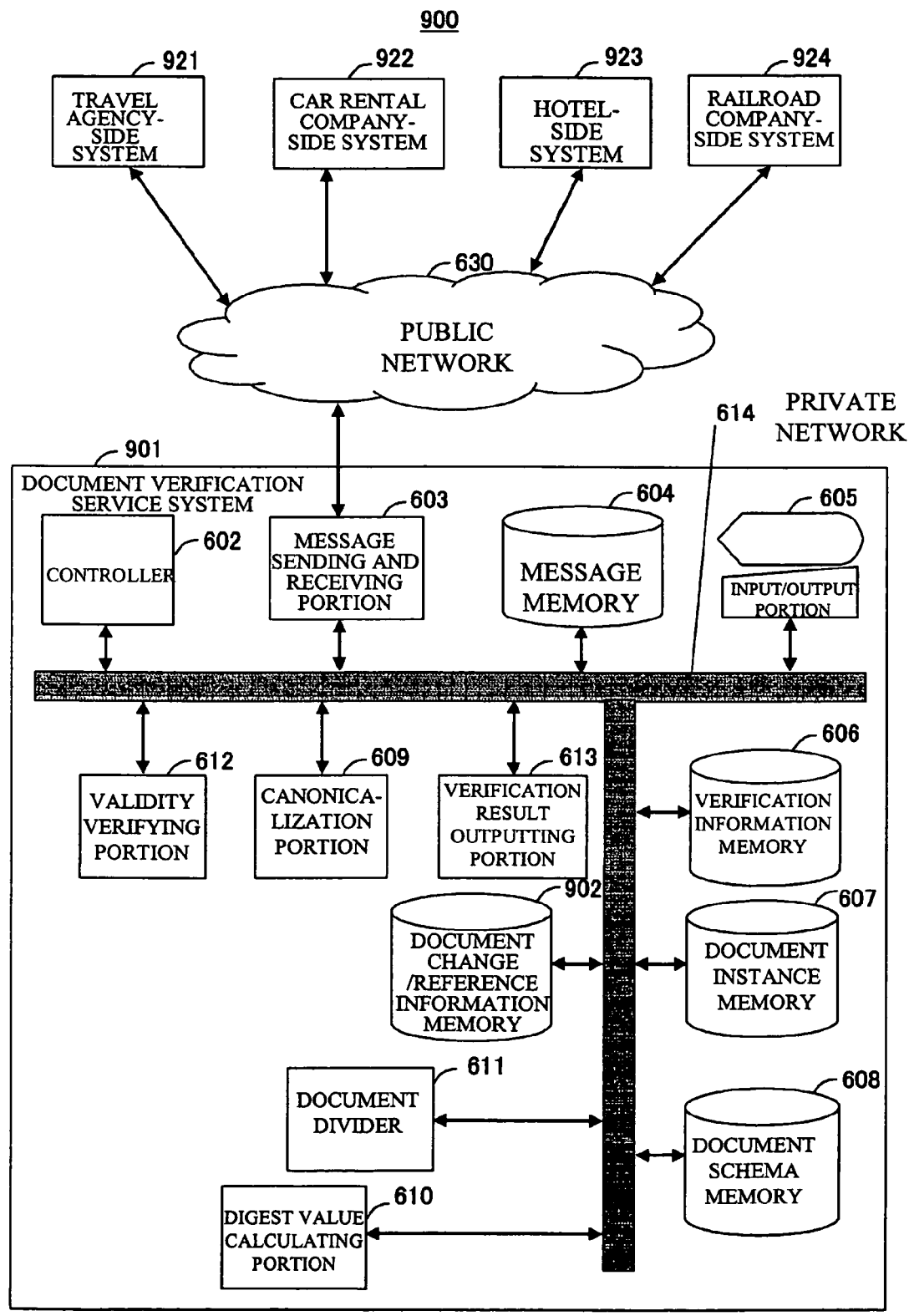
FIG. 125 illustrates a system configuration according to a nineteenth embodiment of the present invention.

A nineteenth embodiment will be described. FIG. 125 illustrates a system configuration in accordance with the nineteenth embodiment of the invention. In a system 900, the service systems of a travel agency-side system 921, a car rental company-side system 922, a hotel-side system 923, and a railroad company-side system 924 are connected to the network 630. In a document verification service 901, a document change/reference information memory 902 is additionally provided.

In the present embodiment, a method of dividing the structured document employs a method of notifying to a verification process from among the processes that the respective services open whether or not there is a change. The verification method and the method of performing a given calculation on such divided structured document are similar as described in the sixteenth embodiment. Here, as a modification of the nineteenth embodiment, open to the registry, extension of a service description language (specifically, WSDL), and a dedicated inquiry interface are now mentioned to cover the description. The message flow is pursued and sampled for narrowing down the dividing point, which is also mentioned now.

Figure 126:
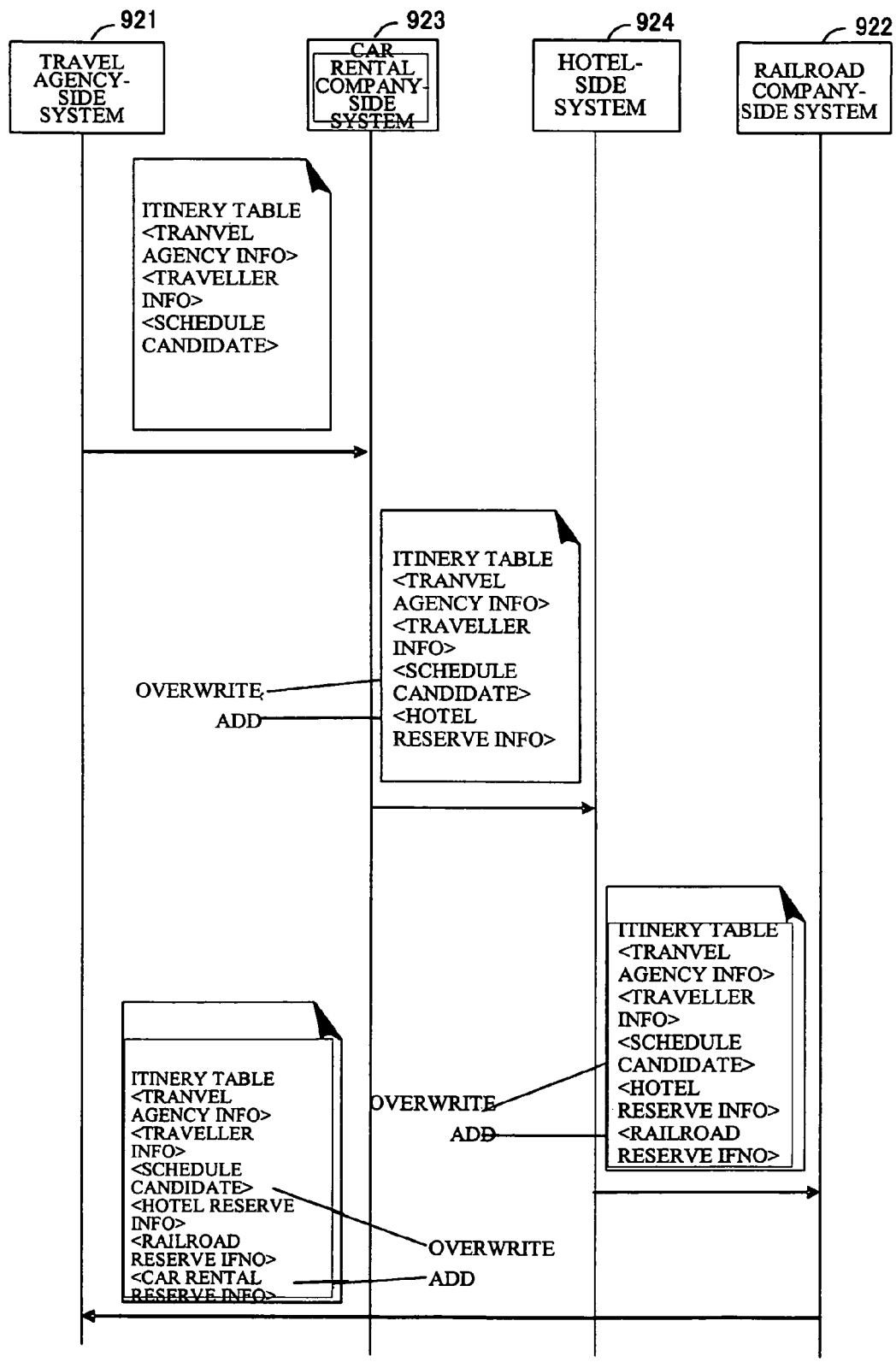
FIG. 126 is a schematic view showing a message flow according to the nineteenth embodiment.

FIG. 126 is a schematic view showing a message flow in accordance with the nineteenth embodiment. In the present embodiment, the travel agency-side system 921 is a starting point of a travel reservation process. If there is a vacancy in a schedule candidate of such received itinerary, the railroad-side system 924, the car rental company-side system 922 respectively write reservation information and passes a renewed itinerary to a system in the next process. If there is no vacancy, a reservation failure is notified to the travel agency-side system 921 to terminate the process. For ease of description, FIG. 126 shows only a successful case.

The respective systems 921 through 924 related to a series of processes request the document verification service system 901 for verification of the itinerary. Here, in the present embodiment, the systems 921 through 924 follows an instruction from the travel agency before receiving the itinerary, and have a knowledge of the system in the next process. The processes are respectively mounted on the respective systems so that receive the itinerary and pass onto the next process.

Hereinafter, the respective functional portions are described. The same components as described in the above embodiments are omitted. The document schema memory 608 employed in the present embodiment stores the document schema of the itinerary. The document change/reference information memory 902 stores the information having a set of the element name and an edit type (a reserved word that represents change or reference) of the document schema of the itinerary, with respect to the document element changed or referred to by each system. Here, the change includes addition or deletion of the document element and additional description of the content or overwriting. This information is written in an XML format together with the information for verification in the header portion of the verification request message sent from each system.

The document divider 611 employed in the present embodiment divides the structured document according to the information in the document change/reference information memory 902. If an identical portion in the information stored in the document change/reference information memory 902 is referred to by multiple systems, it is possible to improve the efficiency of the verification process by dividing this portion in the structured document. On the other hand, if an identical portion is changed in the structured document in the multiple systems, that portion is divided. Such change no longer influences to another portion, thereby enabling the efficiency of the verification process to be improved.

As a modification of the present embodiment, when each system registers the service in a registry service to open the service, the document change/reference information may also be registered simultaneously, so that the document verification service system 901 may confirm the registry and divide the structured document according to the document change/reference information to be changed. In particular, in a case where there is a document schema of industry standard such as the travel XML, the message having an identical type is managed uniformly on the basis of the document schema of industry standard, even in multiple systems managed in different organizations. In such a case, in view of the use of the network bandwidth, it is preferable in some cases that the document verification service system 901 should refer to the registry service according to the need, instead of the document change/reference information being included in the message received by the document verification service system 901

As an alternative modification, the service description language that defines the input and output of each service is extended may be extended to describe the document change/reference information. For example, in WSDL, the document structure and the type of content of an input message and an output message can be defined as a message element. However, WSDL may be extended such that correspondence between a new element that represents the document change/reference information and the message element can be described. As an alternative modification, each system may have a dedicated interface that inquires the document change/reference information such that the document verification service system 901 inquires about the document change/reference information for each system as necessary.

As a further alternative modification, the document verification service system 901 may take a sample from the message that issues the verification request, and may narrow down the dividing point according to the level of the change in the structured document, which actually occurs in a series of processes. For example, in a case where there is a possibility that one system changes one portion of the structured document but the change is not made every time, the portion is represented as "change" as the document change/reference information. In such a case, if there is a small possibility of the change in the structured document, it is more effective in some cases, in view of the process period for the division, that the verification process is implemented without dividing the portion in the structured document.

As described heretofore, in accordance with the fifteenth through nineteenth embodiments of the invention, the structured document is divided according to the structural feature of the document schema and the document process, and the information for verification is generated in each portion to be used for verification. By this, as far as the structured document is changed, the verification process may be implemented on the document only once. If the structured document is changed, only the portion having a change has to be verified again, thereby improving the efficiency of the verification process in the structured document. It is therefor possible to provide a document verification apparatus, a document verification method, and a program product therefor, by which processing efficiency is improved by alleviating workloads of a verification process implemented on an electronic document.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document verification apparatus comprising:
   a non-transitory computer readable medium for storing process portions; and
   a processor that executes the process portions, the process portions including:
      a verification portion that verifies whether or not a portion of an electronic document that has been input satisfies a given condition;
      a determining portion that determines whether a change that influences a verification result is made to at least one of the electronic document and the given condition;
      a verification result outputting portion that outputs the verification result after the verification portion verifies whether the electronic document satisfies the given condition if the determining portion determines that the change influences the verification result; and
      a recent time outputting portion that outputs a result of a most recent time when the verification portion verifies whether the electronic document satisfies the given condition if the determination portion determines that the change does not influence the verification result, the verification portion bypassing validation of the portion of the electronic document, after determining that the change does not influence the verification result,
      wherein the document schema is a description of a type of mark-up language document defining constraints on the structure and content of the type of mark-up language document,
      the given condition is a condition applying to a specific portion of mark-up language data as defined by the document schema, and
      the verification portion only bypassing validation of the specific portion of mark-up language data while still verifying other mark-up language data.

2. The document verification apparatus according to claim 1, wherein the determining portion verifies whether or not the electronic document is a well-formed XML document.

3. The document verification apparatus according to claim 1, wherein if the electronic document is a structured document represented by a tree having nodes of component elements, the outputting portion verifies whether or not the structured document satisfies a condition defined by a given document schema.

4. The document verification apparatus according to claim 1, wherein if information obtained by performing a given calculation on the electronic document when the electronic document is verified most recently is different from the information obtained by performing the given calculation on the electronic document that has been input, the determining portion determines that the change that influences the verification result is made to the electronic document.

5. The document verification apparatus according to claim 3, wherein if information obtained by performing a given calculation on a given document schema when the electronic document is verified most recently is different from the information obtained by performing the given calculation on the given document schema, the determining portion determines that the change that influences the verification result is made to the given document schema.

6. The document verification apparatus according to claim 1, wherein:
   the determining portion divides the electronic document into two or more portions; and
   the outputting portion verifies whether or not portions divided from the electronic document respectively satisfy the given condition.

7. The document verification apparatus according to claim 1, wherein:
the determining portion divides the electronic document into a portion to which the change is made and a rest thereof, if it is determined that the change that influences the verification result is made to the electronic document; and
the outputting portion verifies whether or not the portion to which the change is made satisfies the given condition.

8. The document verification apparatus according to claim 6, wherein the determining portion divides the electronic document into a character data content.

9. The document verification apparatus according to claim 6, wherein if the electronic document is a structured document represented by a tree having nodes of component elements, the determining portion divides the structured document into a document element attribute.

10. The document verification apparatus according to claim 6, wherein if the electronic document is a structured document represented by a tree having nodes of component elements, the determining portion divides the structured document into a partial tree.

11. The document verification apparatus according to claim 1, wherein after excluding a portion that does not influence the verification result from the electronic document, the determining portion analyzes the excluded portion and determines whether or not the change that influences the verification result is made to the electronic document from a portion of the electronic document that was excluded as not influencing the verification result.

12. The document verification apparatus according to claim 11, wherein if the electronic document is an XML document, the determining portion excludes at least one of character data included in contents corresponding to mixed content models in a CDATA section, a comment, a processing instruction, and a document schema, as the portion that does not influence the verification result, or excludes a blank character between document elements included in a content corresponding to an element content model in the document schema.

13. The document verification apparatus according to claim 11, wherein if an XML document is input as the electronic document and an XML DTD is input as a document schema, the determining portion excludes a content of a document element that is the portion that does not include another document element from the XML document, as the portion that does not influence the verification result.

14. The document verification apparatus according to claim 11, wherein if the XML document is input as the electronic document, the determining portion excludes a character data content immediately below a document element associated with a portion, which includes ANY keyword in an element type declaration of an XML DTD, and also excludes the document element or the character data associated with the portion that includes any element of W3C XML Schema, from the XML document, as the portion that does not influence the verification result.

15. The document verification apparatus according to claim 11, wherein if an XML document is input as the electronic document and W3C XML Schema is input as a document schema, the determining portion excludes a content of a document element that should have the content of a character string defined by W3C XML Schema, which does not include another document element, and a value of a document element attribute that should have the value of the character string from the XML document, as the portion that does not influence the verification result.

16. The document verification apparatus according to claim 11, wherein if an XML document is input as the electronic document and W3C XML Schema is input as a document schema, the determining portion excludes a document element that appears at a position corresponding to any element defined by W3C XML Schema and a document element attribute that appears at the position corresponding to any Attribute element, from the XML document, as the portion that does not influence the verification result.

17. The document verification apparatus according to claim 1, further comprising a dividing portion that divides a structured document that is the electronic document on the basis of a structural feature of a document schema into two or more portions,
wherein:
the determining portion determines whether or not the change is made to at least one of respective portions of the structured document that has been divided and the document schema, after it is verified whether or not the structured document that has been divided satisfies the document schema; and
the outputting portion verifies a specific portion determined by the determining portion that there is the change that influences the verification result, whether or not the specific portion satisfies the document schema to set as the verification result of the specific portion, sets a portion determined that there is no change to have a result of the time when it is verified whether or not the respective portions of the structured document satisfy most recently as the verification result, and outputs the verification result as a whole structured document that has been input on the basis of the verification result.

18. The document verification apparatus according to claim 17, wherein the dividing portion extracts the structural feature of the document schema on the basis of one document schema.

19. The document verification apparatus according to claim 17, wherein the dividing portion extracts the structural feature of the document schema on the basis of a plurality of document schemata.

20. The document verification apparatus according to claim 1, further comprising a dividing portion that divides a structured document into two or more portions, according to the change made to the structured document that is the electronic document,
wherein:
the determining portion determines whether or not the change is made to at least one of respective portions of the structured document that has been divided and the document schema, after it is verified whether or not the structured document that has been divided satisfies the document schema; and
the outputting portion verifies a specific portion determined by the determining portion that there is the change that influences the verification result, whether or not the specific portion satisfies the document schema to set as the verification result of the specific portion, sets a portion determined that there is no change to have a result of the time when it is verified whether or not the respective portions of the structured document satisfy most recently as the verification result, and outputs the verification result as a whole structured document that has been input on the basis of the verification result.

21. The document verification apparatus according to claim 20, wherein the dividing portion specifies a portion of the structured document that may have an actual change to the structured document before the actual change is made to the structured document.

22. The document verification apparatus according to claim 21, wherein the dividing portion specifies the possibility of the change in the structured document on the basis of the document schema for inputting and the document schema for outputting in which a process of making the change to the structured document is described.

23. The document verification apparatus according to claim 21, wherein the dividing portion specifies the possibility of the change in the structured document on the basis of information on the change that becomes public by a process of making the change in the structured document.

24. The document verification apparatus according to claim 21, wherein the dividing portion specifies the possibility of the change in the structured document according to the change made in the structured document.

25. The document verification apparatus according to claim 18, wherein if one or more document schemata are used as an element that composes one document schema, the dividing portion extracts the element that uses another document schema as the structural feature.

26. The document verification apparatus according to claim 25, wherein the structured document is written in XML, the document schema is written in W3C XML Schema, and the element that uses the another document schema imports the another document schema.

27. The document verification apparatus according to claim 18, wherein the dividing portion extracts a document element necessary to conform to the document schema on the basis of the one document schema, as the structural feature of the document schema.

28. The document verification apparatus according to claim 18, wherein the dividing portion extracts a document element allowed to appear several times in the document schema on the basis of one document schema, as the structural feature of the document schema.

29. The document verification apparatus according to claim 27, wherein if the structured document of the document schema is written in XML and the document schema is written in W3C XML schema, the dividing portion specifies a necessary document element on the basis of a particle in the document schema.

30. The document verification apparatus according to claim 19, wherein if the plurality of the document schemata are the document schema for inputting into and the document schema for outputting from a document service, the dividing portion extracts a common portion of the document schema for inputting and the document schema for outputting, as the structural feature of the document schema.

31. The document verification apparatus according to claim 30, wherein if the structured document is written in XML and the document schema is written in W3C XML Schema, the dividing portion specifies the document schema for inputting into and the document schema for outputting from the document service on the basis of a WSDL document of the document service.

32. The document verification apparatus according to claim 19, wherein if the plurality of the document schemata are the document schemata used in a group of linked document services, the dividing portion extracts a common portion of the plurality of the document schemata used in the group of linked document services, as the structural feature of the document schema.

33. The document verification apparatus according to claim 32, wherein the plurality of the document schemata used in the group of linked document services are specified by information that forms a linkage.

34. The document verification apparatus according to claim 33, wherein the structured document is written in XML, the document schema is written in W3C XML Schema, and the information that forms the linkage is written in BPEL4WS.

35. The document verification apparatus according to claim 32, wherein the dividing portion specifies the plurality of the document schemata used in the group of linked document services by pursuing the document processed by a linked document service.

36. The document verification apparatus according to claim 23, wherein the information on the change becomes public by notifying to a verification processing apparatus.

37. The document verification apparatus according to claim 23, wherein the information on the change becomes public with the use of a registry service.

38. The document verification apparatus according to claim 23, wherein the information on the change becomes public with the use of a service description language.

39. The document verification apparatus according to claim 23, wherein the information on the change becomes public with the use of an inquiry interface.

40. The document verification apparatus according to claim 24, wherein the dividing portion checks the change made to the structured document by sampling the structured document.

41. The document verification apparatus according to claim 40, wherein the dividing portion checks the change made to the structured document by sampling an input document into and an output document from one service to the document, the service to the document being at least one of a translation service, an editing service, and a document verification service.

42. The document verification apparatus according to claim 40, wherein the dividing portion checks the change made to the structured document by sampling a group of documents to be used by a linked service to the document, the service to the document being at least one of a translation service, an editing service, and a document verification service.

43. The document verification apparatus according to claim 42, wherein the group of the documents used by the linked service are sampled in a hub for linked services to the document, the services to the document being at least one of a translation service, an editing service, and a document verification service.

44. The document verification apparatus according to claim 42, wherein the dividing portion takes a sample of the structured document by pursuing a message flow.

45. The document verification apparatus according to claim 17, wherein if information obtained by performing a given calculation on each portion of the structured document when the structured document is verified most recently is different from the information obtained by performing the given calculation on the each portion of the structured document that has been input, the determining portion determines that the change that influences the verification result is made to the each portion.

46. The document verification apparatus according to claim 17, wherein if information obtained by performing a given calculation on a given document schema when the structured document is verified most recently is different from the information obtained by performing the given calculation on the given calculation, the determining portion determines that the change that influences the verification result is made to the given document schema.

47. The document verification apparatus according to claim 17, wherein:
the dividing portion generates a document schema fragment to verify each portion divided according to division of the structured document; and
the outputting portion uses the document schema fragment generated, in verifying the portion by which it is determined that the change is made to the structured document.

48. The document verification apparatus according to claim 47, wherein the dividing portion generates a document schema fragment corresponding to the specific portion, after the determining portion determines that the change is made to the specific portion of the structured document.

49. The document verification apparatus according to claim 48, wherein the outputting portion retains the document schema fragment used for verifying one structured document, and uses the document schema fragment retained again, in verifying another structured document having an identical document schema.

50. The document verification apparatus according to claim 17, wherein the outputting portion verifies a higher-level structure of the structured document according to a division of the structured document by the dividing portion and then verifies a lower-level structure of the structured document, the higher-level and lower-level structure of the document being defined by a hierarchical structure of the document schema.

51. The document verification apparatus according to claim 4, wherein the given calculation includes at least one of a preprocessing and a process of applying one-directional function.

52. The document verification apparatus according to claim 51, wherein the preprocessing is a canonicalization process to absorb fluctuations of description in the electronic document or the structured document.

53. The document verification apparatus according to claim 51, wherein the preprocessing is a process of generating at least one of a document element, a document element attribute, and a tree having nodes that do not include the document element, from expression of a character string in the electronic document or the structured document.

54. The document verification apparatus according to claim 51, wherein the process of applying one-directional function is the process of applying a digest function that includes MD5 algorithm or SHA1 algorithm.

55. The document verification apparatus according to claim 51, wherein the process of applying one-directional function is the process of applying a pseudo-random algorithm that has a repeatability that includes a linear congruential method or Mersenne Twister.

56. The document verification apparatus according to claim 5, wherein the determining portion excludes a partial tree having a top of an annotation element from the document schema as a portion that does not influence the verification result.

57. The document verification apparatus according to claim 5, wherein if a first language defined by the given document schema includes a second language defined by the given document schema when the structured document is verified most recently and a most recent verification result is true, or if the second language includes the first language and the most recent verification result is false, the determining portion determines that the change that influences the verification result is not made to the document schema.

58. The document verification apparatus according to claim 51, further comprising a retaining portion that retains a set of the verification result and a value obtained as a result that the one-directional function process is applied when the electronic document is verified most recently, in association with the electronic document that has been verified.

59. The document verification apparatus according to claim 51, further comprising a retaining portion that retains a set of the verification result and a value obtained as a result that the one-directional function process was applied in the past,
wherein if the value obtained as the result that the one-directional function process is applied to the electronic document to be verified is identical to any of values retained in the retaining portion, the outputting portion sets the verification result corresponding to the value to the verification result of the electronic document.

60. The document verification apparatus according to claim 4, wherein the outputting portion outputs the verification result, the electronic document to which the change is made, and the information obtained by performing the given calculation on the electronic document that has been input.

61. A document verification method comprising:
verifying whether or not a portion of an electronic document that has been input satisfies a given condition;
determining whether or not a change that influences a verification result is made to at least one of the electronic document and the given condition;
outputting the verification result after it is verified whether or not the electronic document satisfies the given condition if it is determined that the change influences the verification result; and
outputting a result of a most recent time when it is verified whether the electronic document satisfies the given condition if it is determined that the change does not influence the verification result, and bypassing validation of the portion of the electronic document, after determining that the change does not influence the verification result,
wherein the document schema is a description of a type of mark-up language document defining constraints on the structure and content of the type of mark-up language document,
the given condition is a condition applying to a specific portion of mark-up language data as defined by the document schema, and
only validation of the specific portion of mark-up language data is bypassed while other mark-up language data is still verified.

62. The document verification method according to claim 61, wherein if the electronic document is a structured document represented by a tree having nodes of component elements, outputting verifies whether or not the structured document satisfies a condition defined by a given document schema.

63. The document verification method according to claim 61, wherein if information obtained by performing a given calculation on the electronic document when the electronic document is verified most recently is different from the information obtained by performing the given calculation on the electronic document that has been input, determining determines that the change that influences the verification result is made to the electronic document.

64. The document verification method according to claim 61, wherein if information obtained by performing a given calculation on a given document schema when the electronic document is verified most recently is different from the information obtained by performing the given calculation on the given document schema, determining that the change that influences the verification result is made to the given document schema.

65. The document verification method according to claim 61, further comprising determining divides the electronic document into two or more portions,
   wherein outputting verifies whether or not portions divided from the electronic document respectively satisfy the given condition.

66. The document verification method according to claim 61, further comprising dividing a structured document that is the electronic document on the basis of a structural feature of a document schema into two or more portions,
   wherein:
   determining determines whether or not the change is made to at least one of respective portions of the structured document that has been divided and the document schema, after it is verified whether or not the structured document that has been divided satisfies the document schema; and
   outputting verifies a specific portion determined by determining that there is the change that influences the verification result, whether or not the specific portion satisfies the document schema to set as the verification result of the specific portion, sets a portion determined that there is no change to have a result of the time when it is verified whether or not the respective portions of the structured document satisfy most recently as the verification result, and outputs the verification result as a whole structured document that has been input on the basis of the verification result.

67. The document verification method according to claim 61, further comprising dividing a structured document into two or more portions, according to the change made to the structured document that is the electronic document,
   wherein:
   determining determines whether or not the change is made to at least one of respective portions of the structured document that has been divided and the document schema, after it is verified whether or not the structured document that has been divided satisfies the document schema; and
   outputting verifies a specific portion determined by determining that there is the change that influences the verification result, whether or not the specific portion satisfies the document schema to set as the verification result of the specific portion, sets a portion determined that there is no change to have a result of the time when it is verified whether or not the respective portions of the structured document satisfy most recently as the verification result, and outputs the verification result as a whole structured document that has been input on the basis of the verification result.

68. A non-transitory computer readable medium storing a program causing a computer to execute a process for verifying a document, the process comprising:
   verifying whether or not a portion of an electronic document that has been input satisfies a given condition;
   determining whether or not a change that influences a verification result is made to at least one of the electronic document and the given condition;
   outputting either the verification result after it is verified whether or not the electronic document satisfies the given condition if it is determined that the change influences the verification result; and
   outputting a result of a most recent time when it is verified whether the electronic document satisfies the given condition if it is determined that the change does not influence the verification result, and bypassing validation of the portion of the electronic document, after determining that the change does not influence the verification result,
   wherein the document schema is a description of a type of mark-up language document defining constraints on the structure and content of the type of mark-up language document,
   the given condition is a condition applying to a specific portion of mark-up language data as defined by the document schema, and
   only validation of the specific portion of mark-up language data is bypassed while other mark-up language data is still verified.

* * * * *